United States Patent [19]
Nakahara et al.

[11] Patent Number: 6,081,671
[45] Date of Patent: Jun. 27, 2000

[54] DISTANCE MEASURING APPARATUS

[75] Inventors: Naoto Nakahara; Takuma Sato; Kosei Kosako, all of Tokyo, Japan

[73] Assignee: Asahi Kogaku Kogyo Kabushiki Kaisha, Tokyo, Japan

[21] Appl. No.: 09/309,913

[22] Filed: May 11, 1999

Related U.S. Application Data

[62] Division of application No. 08/877,501, Jun. 17, 1997, Pat. No. 5,923,910, which is a continuation of application No. 08/605,759, Feb. 22, 1996, abandoned.

[30] Foreign Application Priority Data

| | | | |
|---|---|---|---|
| Feb. 22, 1995 | [JP] | Japan | 7-34064 |
| Feb. 22, 1995 | [JP] | Japan | 7-34065 |
| Feb. 22, 1995 | [JP] | Japan | 7-34066 |
| Mar. 22, 1995 | [JP] | Japan | 7-62254 |
| Apr. 12, 1995 | [JP] | Japan | 7-87124 |
| Apr. 14, 1995 | [JP] | Japan | 7-89645 |
| May 26, 1995 | [JP] | Japan | 7-128670 |
| May 26, 1995 | [JP] | Japan | 7-128671 |

[51] Int. Cl.$^7$ .................................................. G03B 13/36
[52] U.S. Cl. ............................. 396/96; 348/298; 396/98
[58] Field of Search ................ 396/98, 96; 348/297, 348/298, 299

[56] References Cited

U.S. PATENT DOCUMENTS

| | | | |
|---|---|---|---|
| 4,349,254 | 9/1982 | Jyojiki et al. | 396/119 |
| 4,621,191 | 11/1986 | Suzuki et al. | 250/201.7 |
| 4,664,495 | 5/1987 | Alyfuku et al. | 396/234 |
| 4,701,626 | 10/1987 | Ishizaki et al. | 348/297 X |
| 4,746,790 | 5/1988 | Sorimachi | 250/201.2 |
| 4,771,308 | 9/1988 | Tejima et al. | 396/106 |
| 4,812,869 | 3/1989 | Akashi et al. | 396/104 |
| 4,851,657 | 7/1989 | Taniguchi et al. | 250/201.7 |
| 4,878,081 | 10/1989 | Kishida et al. | 396/106 |
| 4,903,065 | 2/1990 | Taniguchi et al. | 396/92 |

(List continued on next page.)

FOREIGN PATENT DOCUMENTS

| | | |
|---|---|---|
| 0440171 | 8/1991 | European Pat. Off. . |
| 0444952 | 9/1991 | European Pat. Off. . |
| 0465671 | 1/1992 | European Pat. Off. . |
| 0570968 | 11/1993 | European Pat. Off. . |
| 0818697 | 1/1998 | European Pat. Off. . |
| 2293833 | 12/1990 | Japan . |
| 5-68203 | 3/1993 | Japan . |
| 2096855 | 10/1982 | United Kingdom . |
| 2222337 | 2/1990 | United Kingdom . |
| 2231676 | 11/1990 | United Kingdom . |
| 2266781 | 11/1993 | United Kingdom . |
| 2280810 | 2/1995 | United Kingdom . |

OTHER PUBLICATIONS

WPI Abstract No. 1993-130389.

*Primary Examiner*—W. B. Perkey
*Attorney, Agent, or Firm*—Greenblum & Berstein, P.L.C.

[57] ABSTRACT

There is provided a distance measuring apparatus in a lens-shutter type camera provided with a photographic lens, a focal length of the photographic lens being variable. The distance measuring device includes: a pair of image forming lenses each forming a subject image; a pair of line sensors on which the subject images are respectively formed through the pair of image forming lenses, the pair of line sensors each having a plurality of light receiving elements; a plurality of light receiving areas formed correspondingly on each of the pair of line sensors, the plurality of light receiving areas each including a predetermined number of the plurality of light receiving elements, wherein the plurality of light receiving areas respectively receive different areas of a corresponding one of the subject images formed through the pair of image forming lenses, and wherein each adjacent pair of light receiving areas of the plurality of light receiving areas overlap each other; means for detecting a current focal length of the photographic lens; and means for shifting at least one of the plurality of light receiving areas on each of the pair of line sensors in accordance with the current focal length detected by the detecting means, wherein each light receiving element included in the at least one of the plurality of light receiving areas shifted by the shifting means is used to convert received light into an electrical signal which is integrated to output image data.

7 Claims, 62 Drawing Sheets

U.S. PATENT DOCUMENTS

| | | | |
|---|---|---|---|
| 4,924,247 | 5/1990 | Suzuki et al. | 396/118 |
| 4,931,822 | 6/1990 | Yamano | 396/96 |
| 4,952,963 | 8/1990 | Akashi | 396/96 |
| 4,959,726 | 9/1990 | Miida et al. | 348/350 |
| 5,051,767 | 9/1991 | Honma et al. | 396/80 |
| 5,053,801 | 10/1991 | Ishida et al. | 396/79 |
| 5,068,682 | 11/1991 | Utagawa | 396/104 |
| 5,113,215 | 5/1992 | Nishibe | 396/124 |
| 5,155,347 | 10/1992 | Nishibe | 250/201.8 |
| 5,182,658 | 1/1993 | Ishizaki et al. | 348/297 X |
| 5,202,718 | 4/1993 | Uchiyama | 396/104 |
| 5,247,327 | 9/1993 | Suzuka et al. | 396/56 |
| 5,278,602 | 1/1994 | Honma et al. | 396/92 |
| 5,363,169 | 11/1994 | Ishida et al. | 396/123 |
| 5,856,663 | 1/1999 | Suzuki et al. | 250/201.2 |
| 5,923,910 | 7/1999 | Nakahara et al. | 396/124 |

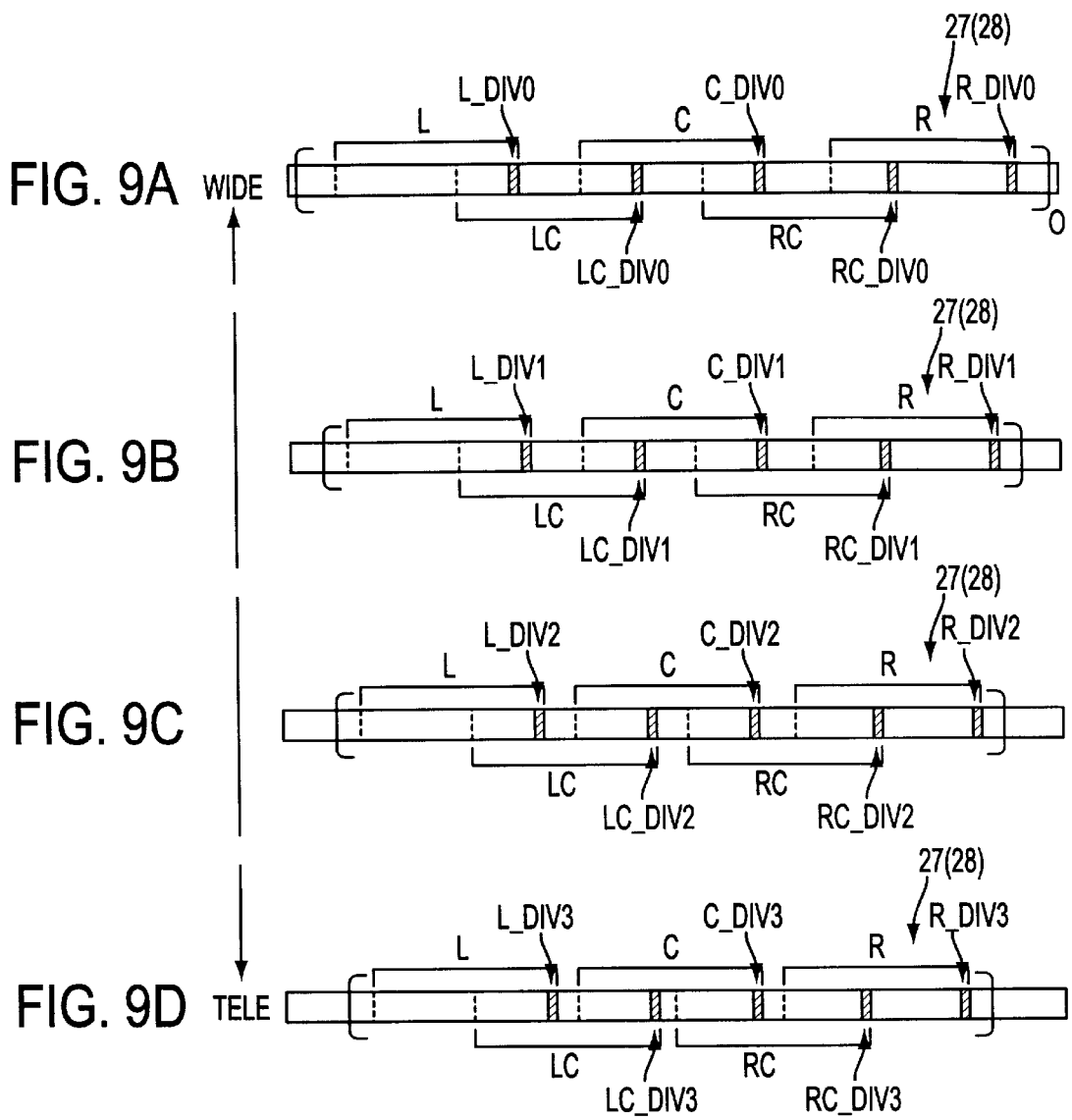
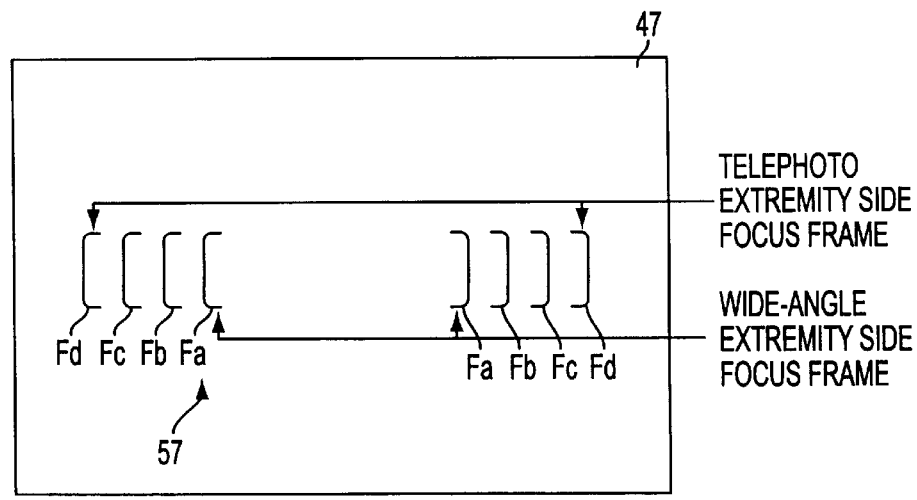

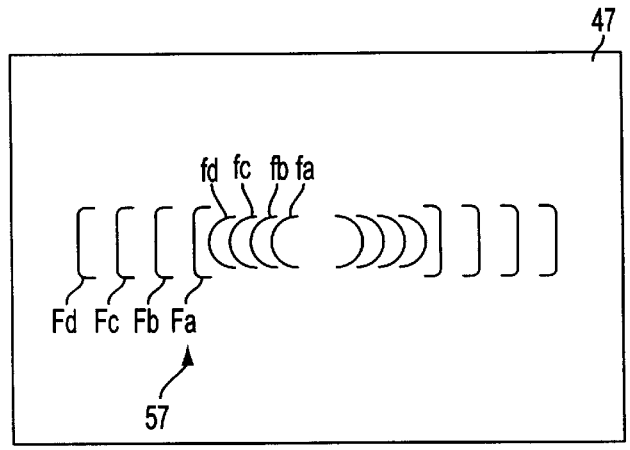
FIG. 18
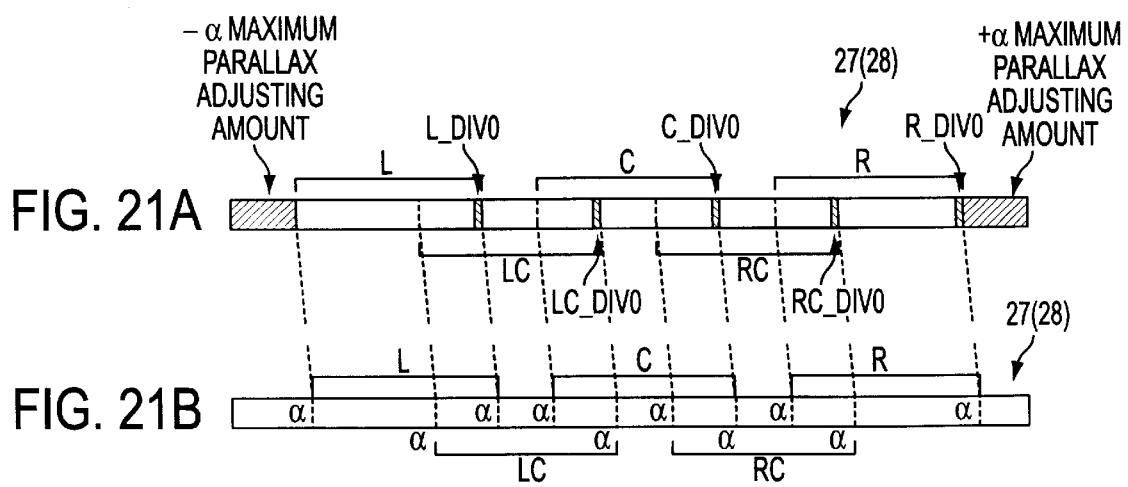
FIG. 21A
FIG. 21B

FIG. 32A WIDE

FIG. 32D TELE

FIG. 45A (L) (R)
FIG. 45B (L) (R)
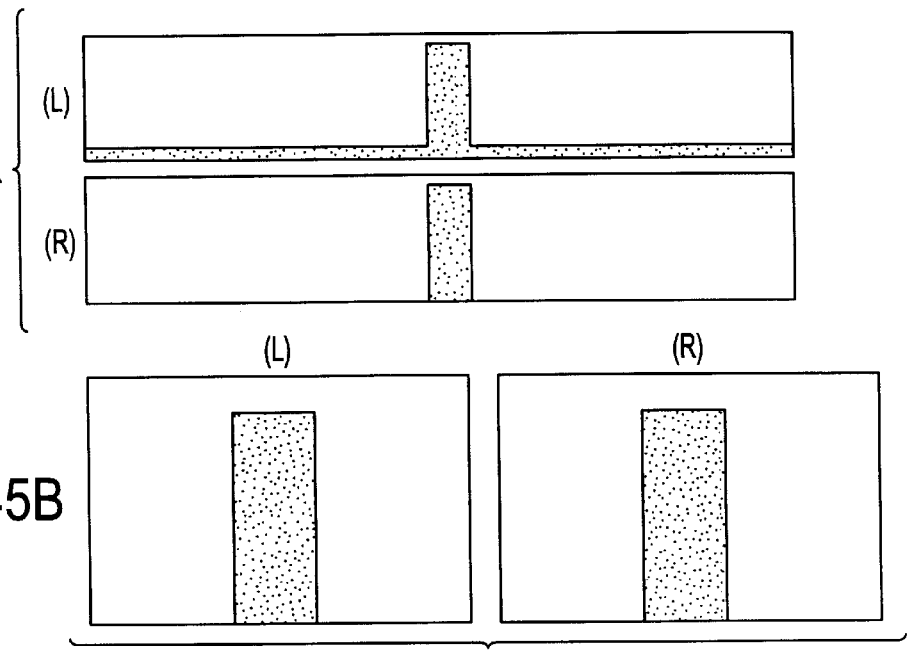
FIG. 45C
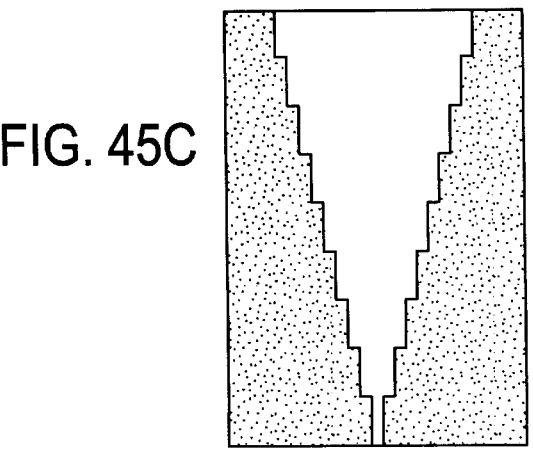

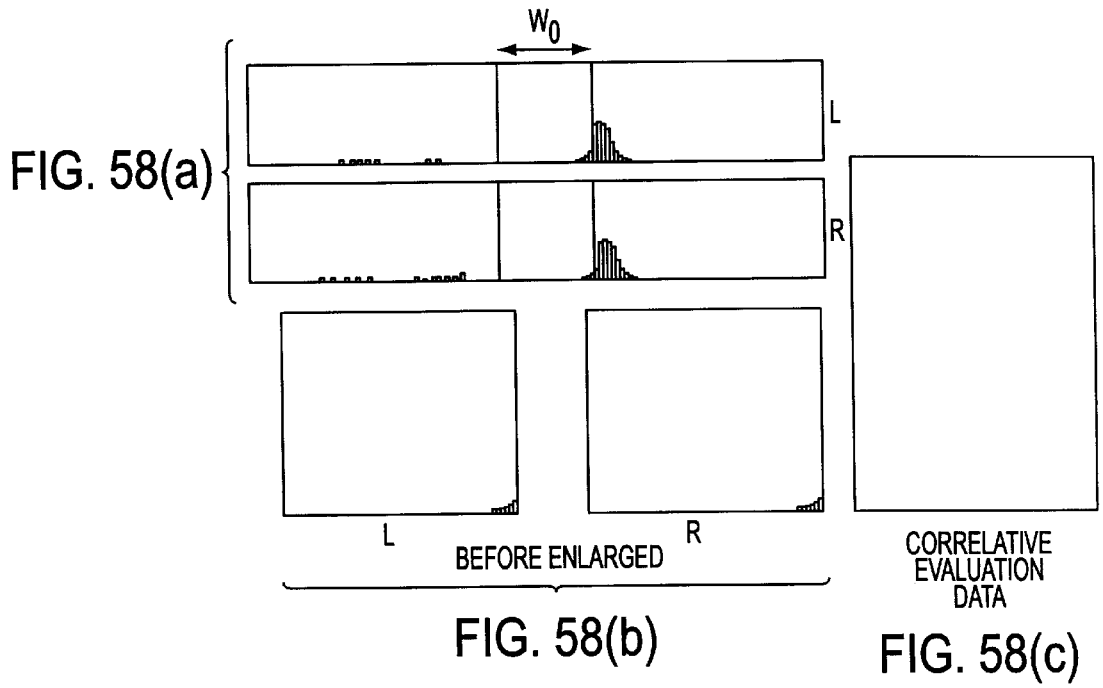
FIG. 58(a)
FIG. 58(b)
FIG. 58(c)
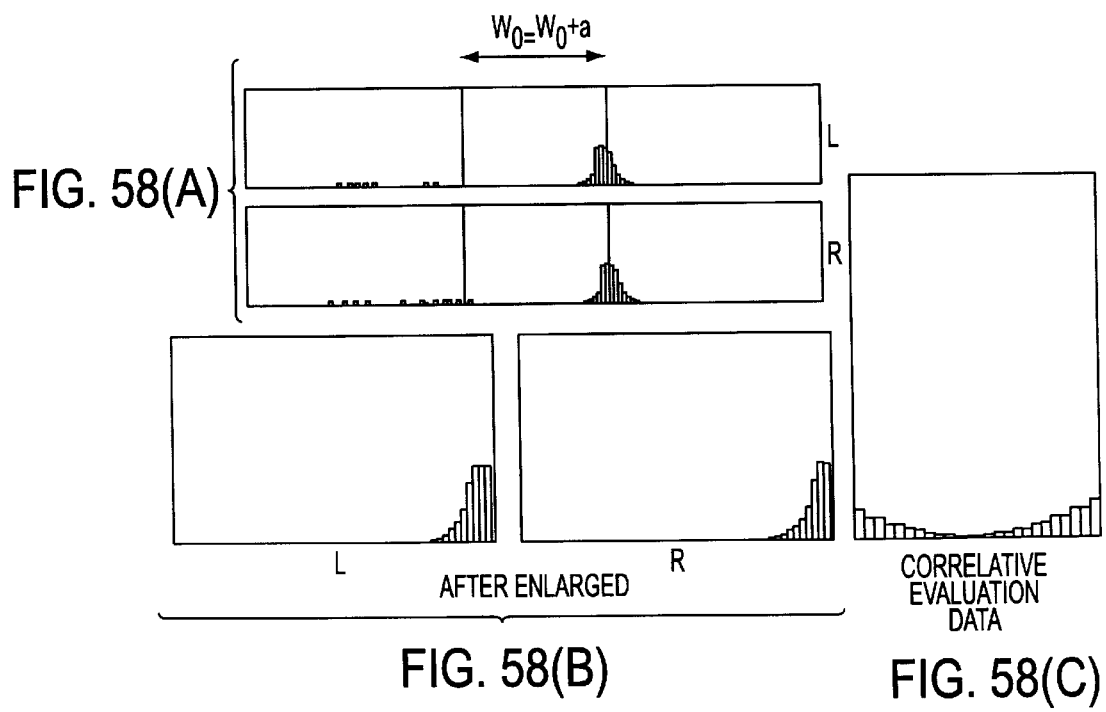
FIG. 58(A)
FIG. 58(B)
FIG. 58(C)

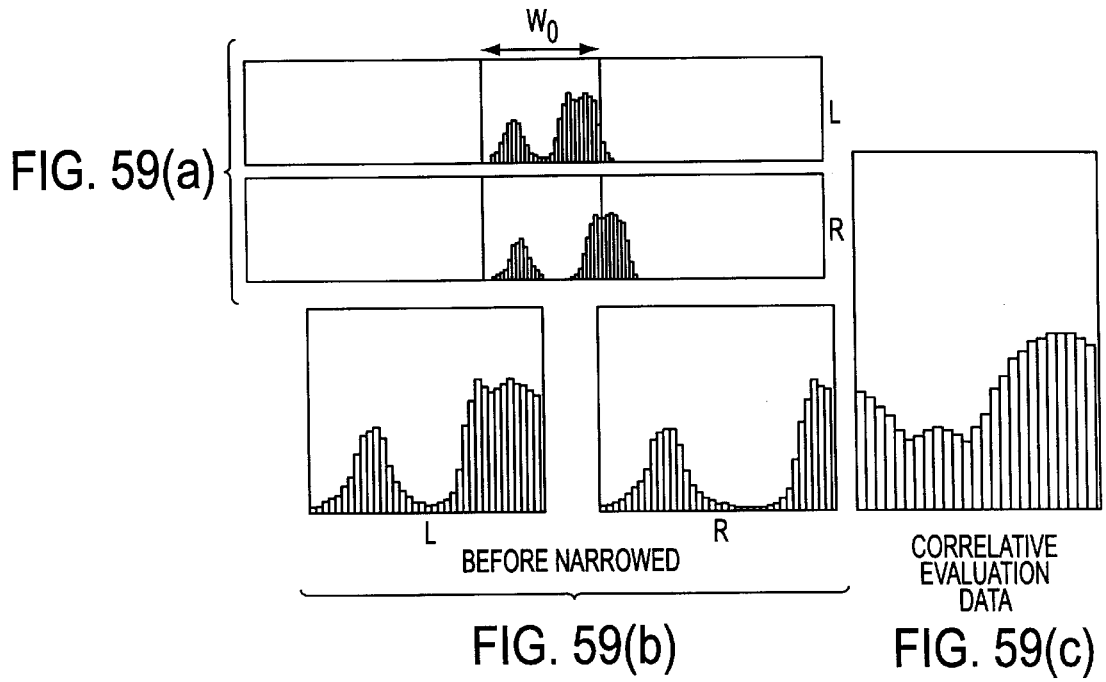
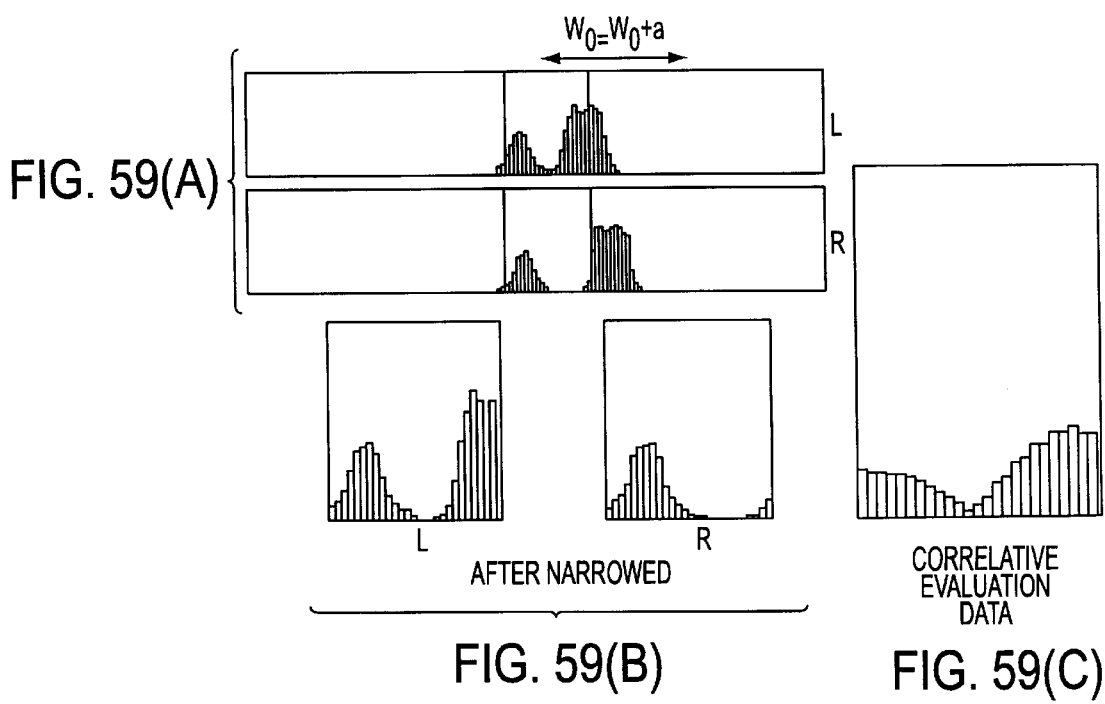

DISTANCE MEASURING APPARATUS

This application is a division of U.S. patent application Ser. No. 08/877,501, filed Jun. 17, 1997, now U.S. Pat. No. 5,923,910 which is a continuation of U.S. patent application Ser. No. 08/605,759, filed Feb. 22, 1996, now abandoned, the contents of which are herein expressly incorporated by reference in their entireties.

This application relates to U.S. Pat. No. 5,051,767 (Date of Patent: Sep. 24, 1991), the disclosure of which is expressly incorporated herein by reference in its entirety.

BACKGROUND OF THE INVENTION

1. Field of the Invention

The present invention relates to a distance measuring apparatus, and more particularly, to a passive distance measuring apparatus which does not emit light, such as infrared light, but instead utilizes ambient light to measure a subject distance and which can be used in, for example, a camera.

2. Description of Related Art

Some lens-shutter type cameras are provided with an autofocusing system provided with a passive distance measuring apparatus. This passive distance measuring apparatus includes a pair of image forming lenses (i.e., distance measurement optical system) and a pair of line sensors or light receiving sensors on which subject images are respectively formed through the pair of image forming lenses so as to calculate a subject distance based on triangulation. In cameras of this type, a photographing optical system, a finder optical system and the distance measurement optical system are provided which are independent of each other. In some cameras of this type, the distance measuring apparatus is constructed as a single unit, i.e., a distance measuring unit consisting of the pair of image forming lenses, the pair of line sensors each comprised of an array of a large number of light receiving elements (i.e., photodiodes) on which a plurality of subject images of a common subject are projected, and an arithmetic operating portion for calculating a subject distance based on triangulation, in accordance with the data outputted from the pair of line sensors. In the distance measuring unit, the optical axis of the distance measurement optical system does not coincide with either the optical axis of the photographing optical system nor the optical axis of the finder optical system.

In conventional cameras of this type, in the case where the photographing optical system is a zoom lens and the finder optical system is a zoom finder whose magnification varies in accordance with the varied focal length of the zoom lens, the relationship among the finder view formed through the finder optical system, the AF frame which is observed in the finder view and the distance measuring unit will now be described.

When zooming is effected towards the telephoto extremity, a subject image observed in the finder view is magnified due to a variation in the magnification of the zoom finder. However, the distance measuring unit always receives on its pair of line sensors subject images of constant magnification due to the magnification of the pair of image forming lenses of the distance measuring unit being fixed, and not varied in accordance with the varied focal length of either the zoom lenses or the zoom finder, and furthermore, the size of the AF frame does not change in the finder view. Due to this, on the telephoto extremity side, the focus measuring area indicated by the AF frame, superimposed on a magnified or close-up subject image in the finder view, becomes smaller than the actual focus measuring area determined by the light receiving area of each line sensor in the distance measuring unit.

Accordingly, there is a difference in size between the AF frame in the finder view and the light receiving area of each line sensor in the distance measuring unit. Due to this difference, in conventional cameras of this type, it is often the case that a subject, or subjects, observed out of the AF frame, but close to the AF frame, are sometimes erroneously brought into focus through the distance measuring unit as a main subject or subjects, especially when the zoom lens is on the telephoto side. As a result, the main subject is blurry in the resulting picture.

Furthermore, in conventional cameras of the type in which the optical axis of the distance measurement optical system of the distance measuring unit is not aligned with the optical axis of the photographing optical system nor the finder optical system, the optical axis of the distance measurement optical system in the distance measuring unit and the optical axis of the photographing lens are not always arranged to be precisely parallel to each other in an assembling process. If so, a common subject may not always be captured at the same time by both the distance measuring optical system; in the distance measuring unit, and the photographing lens. It is not necessary to adjust the position of the distance measuring unit in the case where a deviation from an optimum arrangement between the optical axis of the distance measurement optical system in the distance measuring unit and the optical axis of the photographing lens is small, i.e., within an acceptable limit. However, if the deviation falls outside the acceptable limit, it is necessary to adjust the distance measuring unit by moving or swinging it so that both the optical axes may be placed parallel to each other to eliminate the deviation. In an adjustment of this kind, the distance measuring unit is moved or swung mechanically relative to the camera body.

After the distance measuring unit has been moved or swung for adjustment, data outputted from the distance measuring unit is checked to find out if it corresponds to predetermined reference data. If the data does not correspond to the reference data, the distance measuring unit is readjusted. Therefore, the adjusting operation, in which the distance measuring unit is firstly moved and data is subsequently checked, has to be repeated until such a time that the checked data corresponds to the predetermined reference data, thus resulting in a troublesome, time consuming operation.

Furthermore, in conventional cameras where the camera has a macro photographing mode for close-up photography in which the optical axis of the distance measurement optical system of the distance measuring unit is not aligned with the optical axis of the photographing optical system nor the finder optical system, such that the optical axis of the distance measurement optical system of the distance measuring unit deviates from that of the photographing lens by a large distance in left and right directions of the camera, a deviation occurs between the two positions. In other words, the position of a light receiving area on the line sensor on which subject images are projected in regular photography where a distance of a subject located on the optical axis of the photographing lens beyond a predetermined distance from the camera is measured, and another position of a light receiving area on the line sensor on which subject images are projected in macro photography for a close-up where a distance of a subject close to the camera is measured within a certain distance range. As a result, the AF frame in the finder view and the light receiving area of each line sensor of the distance measuring unit do not correspond to each other in macro photography, thereby the subject distance cannot be precisely measured.

In a known lens-shutter type camera which has an auto-focusing system provided with a distance measuring apparatus including a pair of image forming lenses, a pair of left and right line sensors each comprised of an array of a large number of light receiving elements used to define a single light receiving area, and an arithmetic operating portion for calculating a subject distance based on triangulation in accordance with the data outputted from the pair of line sensors, so that the subject distance can be calculated. However, in the measurement of the subject distance using one light receiving area at each line sensor, as mentioned above, there is only one measurement of the subject distance to be effected, and hence, if no optimum value is obtained by the single measurement or calculation, no focusing can be carried out, thus leading to a missed photographic opportunity.

To solve this problem, it is also known to divide the light receiving elements of each line sensor into a plurality of blocks or groups (i.e., a plurality of light receiving areas), so that the subject distance can be calculated based on sensor data obtained from the pairs of corresponding light receiving areas of the line sensors. However, in this solution, since a plurality of measurements obtained, based on the sensor data supplied from each pair of light receiving areas, are compared to detect the largest value corresponding to the closest distance, so that the focusing can be effected in accordance with the detected largest value, the comparison operation must be carried out for each measurement, contrary to a fast photographing operation.

In a conventional distance measuring apparatus in known cameras, the subject light is split into two halves by a beam splitting optical system. The two halves are converged onto, and received by, respective left and right line sensors. Each line sensor respectively converts the receiving subject light into electrical image signals which are used for calculation. Namely, for example, a correlativity (degree of coincidence) of the subject image data corresponding to the light receiving areas of the left and right line sensors is evaluated based on the image data at difference light receiving areas. When a high degree of coincidence is obtained, position data of the light receiving areas corresponding thereto is detected to calculate a distance between the left and right subject images, based on the position data, and subsequently, the subject distance is calculated, using the calculated distance between the left and right subject images.

However, under conditions having a harmful influence, such as a backlit condition, the amount of light to be received by the left line sensor can be remarkably different from the amount of light to be received by the right light sensor. If this difference occurs, the reference level of image data of the left line sensor (left image data) is different from that of the image data of the right line sensor (right image data), and hence, the degree of coincidence decreases. Consequently, it is judged that the subject distance cannot be measured or the subject distance is incorrectly measured. In addition, it is difficult to distinguish the incorrect measurement from that caused by the existence of images of subjects at far and close distances in a light receiving area. Moreover, in some cases, even when a correct measurement has been obtained, the apparatus judges that no distance can be measured.

Furthermore, in a conventional distance measuring apparatus, if the contrast of a subject is low, or if images of subjects at a close distance and at a far distance coexist in a light receiving area, or in the case of a succession of subjects having a repetitive pattern across the light receiving area, no subject distance can be measured. To minimize the occurrence of a subject distance not being able to be measured, a multiple measurement type distance measuring unit is known in which subjects contained in a plurality of light receiving areas can be measured.

However, in a conventional multiple measurement type distance measuring apparatus, the angle of view, i.e., the number of light receiving elements of each line sensor that are used to measure the subject distance for each light receiving area is fixed. If the angle of view is large, i.e., the number of light receiving elements in each light receiving area is large, the subject can be measured in a wide range. Accordingly, the probability that no subject distance can be measured for a subject having a low contrast can be reduced, but the probability that images of subjects at a close distance and at a far distance coexist in a common light receiving area is increased. Conversely, if the angle of view is small, i.e., the number of light receiving elements in each light receiving area is small, the probability that images of subjects at a close distance and at a far distance coexist in a common light receiving area is reduced, but the subject is measured in a narrow range, and accordingly, the probability that no subject distance can be measured for a subject having a low contrast is increased.

Also, in the known multiple measurement type distance measuring apparatus mentioned above, one measurement which meets predetermined requirements is selected from a number of measurements. In an apparatus of this type, the reliability and validity of the measurements are judged relying only upon a single predetermined reference level (judgement level). Namely, if the reference level (judgement level) is high, reliability is increased, but the probability that the measurements do not meet the high reference level increases. Hence, there is likely to be a condition such that no subject distance can be measured. Conversely, if the reference level is low, reliability is reduced, thus resulting in an increase in the occurrence of incorrect measurements.

Moreover, in conventional cameras, it is necessary to measure rays of light at a plurality of light receiving areas in order to judge whether there is a backlit state, through the functions of the camera. To this end, it is necessary to provide a plurality of photosensors which detect rays in the light receiving areas or to use a split-type photosensor.

SUMMARY OF THE INVENTION

One object of the present invention is to provide a passive distance measuring apparatus for a camera that can minimize the chances of the distance of a subject, that a photographer does not intend to photograph, being mistakenly measured as the distance of a main subject, in the case where the photographing lens of the camera is a variable focal length lens or a zoom lens.

Another object of the present invention is to provide a passive distance measuring apparatus for a camera that makes it possible to simplify the adjusting operation in which the position of the optical axis of the distance measurement optical system of the distance measuring unit is adjusted with respect to the position of the optical axis of the photographing lens.

Yet another object of the present invention is to provide a passive distance measuring apparatus for a camera that is capable of measuring a subject distance precisely in macro photography, in the case where the optical axis of the distance measurement optical system of the distance measuring unit deviates from that of the photographing lens by a large distance in left and right direction of the camera.

Yet another object of the present invention is to provide a passive distance measuring apparatus for a camera in which not only can correct distance measurement be carried out but also a subject distance can be detected quickly, thus leading to a fast photographing operation.

Still another object of the present invention is to provide a passive distance measuring apparatus in which an occurrence of a measurement not being able to be taken or of an incorrect measurement being taken, can be reduced.

Another object of the present invention is to provide a passive distance measuring apparatus in which problems which would be caused when the contrast of a subject is low or where there are images of subjects at both a far distance and at a close distance in a common light receiving area can be minimized.

Still another object of the present invention is to provide a multiple measurement type passive distance measuring apparatus which has a high reliability and in which an occurrence of a measurement not being able to be taken tends not to occur.

Another object of the present invention is to provide a multiple measurement type distance measuring apparatus which can also be used as a backlit-state detecting apparatus.

To achieve the above first object mentioned above, according to the first aspect of the present invention, there is provided a distance measuring apparatus in a lens-shutter type camera provided with a photographic lens, where a focal length of the photographic lens being variable. The distance measuring device includes: a pair of image forming lenses each forming a subject image, a pair of line sensors on which the subject images are respectively formed through the pair of image forming lenses, the pair of line sensors each having a plurality of light receiving elements, a plurality of light receiving areas formed correspondingly on each of the pair of line sensors. The plurality of light receiving areas each include a predetermined number of the plurality of light receiving elements, wherein the plurality of light receiving areas respectively receive different areas of a corresponding one of the subject images formed through the pair of image forming lenses. Each adjacent pair of light receiving areas of the plurality of light receiving areas overlap each other. The distance measuring unit also includes a device for detecting a current focal length of the photographic lens, and a device for shifting at least one of the plurality of light receiving areas on each of the pair of line sensors in accordance with the current focal length detected by the detecting device. Each light receiving element included in the at least one of the plurality of light receiving areas shifted by the shifting device is used to convert received light into an electrical signal which is integrated to output image data.

With this structure, the light receiving area on each of the pair of line sensors can be varied or adjusted so as to correspond to a focus measuring area which is determined by an AF frame seen through the finder provided in the camera. As a result, a subject(s) seen within the AF frame can be precisely and reliably focused. Furthermore, the chances of the distance of a subject that a photographer does not intend to photograph, being mistakenly measured as the distance of a main subject can be greatly reduced.

Preferably, the pair of line sensors each has a size covering a maximum angle of view of the photographing lens.

Preferably, the distance measuring apparatus further includes device for storing information of the current focal length detected by the detecting device, the shifting device shifting the at least one of the plurality of light receiving areas in accordance with the information.

Preferably, the storing device stores the information in one of a plurality of sections in accordance with the length of the current focal length detected by the detecting device, the plurality of sections corresponding to a focal length variable range of the photographing lens.

Preferably, the shifting device shifts the at least one of the plurality of light receiving areas in a manner such that the at least one of the plurality of light receiving areas approaches a corresponding center of each of the pair of line sensors as the current focal length detected by the detecting device increases.

Preferably, the plurality of light receiving areas include a center light receiving area and at least two light receiving areas, the center light receiving area being located between the two light receiving areas, wherein the shifting device shifts the at least two light receiving areas in a manner such that the at least two light receiving areas approach a center of the center light receiving area as the current focal length detected by the detecting device increases.

Preferably, the center light receiving area is fixed on each of the pair of line sensors.

Preferably, the shifting device includes device for storing a plurality of predetermined positional data each representing a specific pattern of arrangement of the plurality of light receiving areas on each of the pair of line sensors, wherein the shifting device selects one of the plurality of predetermined positional data in accordance with the current focal length detected by the detecting device and shifts the at least one of the plurality of light receiving areas on each of the pair of line sensors according to the selected one of the plurality of predetermined positional data.

According to the present invention, the photographic lens may be a zoom lens.

Preferably, each of the plurality of light receiving elements includes a photodiode.

To achieve the second object mentioned above, according to a second aspect of the present invention, there is provided a distance measuring apparatus in a lens-shutter type camera provided with a photographic lens, wherein a focal length of the photographic lens is variable. The distance measuring device includes: a distance measuring unit fixed to a camera body of the camera, the distance measuring unit including a pair of image forming lenses and each forming a subject image and a pair of line sensors on which the subject images are respectively formed through the pair of image forming lenses, the pair of line sensors each having a plurality of light receiving elements each capable of converting received light into an electrical signal. The optical axes of the pair of image forming lenses are apart from an optical axis of the photographic lens. The distance measuring device also includes a device for storing predetermined correction data corresponding to an amount of parallax occurring between the optical axes of the pair of image forming lenses and the optical axis of the photographic lens, a device for selecting a group of light receiving elements from the plurality of light receiving elements in accordance with the predetermined correction data, only light receiving elements of the group being actuated to each generate the electrical signal and a device for calculating a subject distance value, using subject image data made by the electrical signals generated through the light receiving elements of the group.

With this structure, even if parallax of an unacceptable degree exists between the distance measuring unit and the photographic lens, a precise subject distance measurement can be achieved through the distance measuring unit since only those light receiving elements on each of the pair of line sensors, which are selected by the selecting device in accordance with the predetermined correction data, are used to generate electrical signals which are used by the calculating device to calculate a subject distance value.

In other words, even if the distance measuring unit is fixed to the camera body, a precise subject distance measurement can be achieved through the distance measuring unit even with parallax existing, without adjusting the distance measuring unit, i.e., by actually moving it relative to the camera body, to reduce the influence of parallax. This is due to the fact that only those light receiving elements on each of the pair of line sensors, which are selected by the selecting means in accordance with the predetermined correction data, are used to generate electrical signals which are used by the calculating device to calculate a subject distance value.

The predetermined correction data is predetermined and stored in the storing device during a manufacturing process.

Preferably, the predetermined correction data is stored in a memory provided in the camera. The memory may be a ROM.

Preferably, the distance measuring apparatus further includes a plurality of light receiving areas formed correspondingly on each of the pair of line sensors, the plurality of light receiving areas each including a predetermined number of the plurality of light receiving elements, wherein the plurality of light receiving areas respectively receive different areas of a corresponding one of the subject images formed through the pair of image forming lenses, and wherein the selecting means includes means for shifting each of the plurality of light receiving areas in a common direction by an amount corresponding to the predetermined correction data. Further a plurality of light receiving elements which are included in the plurality of light receiving areas once having been shifted by the shifting device, are used for generating the electrical signals.

Preferably, each adjacent pair of light receiving areas of the plurality of light receiving areas overlap each other.

According to the present invention, the photographic lens may be a zoom lens.

To achieve the third object mentioned above, according to a third aspect of the present invention, there is provided a distance measuring apparatus in a lens-shutter type camera provided with a photographic lens, wherein a focal length of the photographic lens is variable, the camera having a regular photography mode in which a subject located beyond a predetermined distance from the camera is to be photographed and a macro photography mode in which a subject at a close distance to the camera within a predetermined range is to be photographed. The distance measuring device includes: a distance measuring unit fixed to a camera body of the camera which has a pair of image forming lenses each forming a subject image and a pair of line sensors on which the subject images are respectively formed through the pair of image forming lenses. The pair of line sensors each has a plurality of light receiving elements each capable of converting received light into an electrical signal, wherein optical axes of the pair of image forming lenses are apart from an optical axis of the photographic lens. The distance measuring apparatus also includes a device for storing predetermined correction data corresponding to an amount of deviation between a first group of light receiving elements of the plurality of light receiving elements, where a subject image of a subject located beyond the predetermined distance being incident upon the first group in the regular photography mode, and a second group of light receiving elements of the plurality of light receiving elements, where the subject image being incident upon the second group in the macro photography mode, a device for selecting a group of light receiving elements from the plurality of light receiving elements in accordance with the predetermined correction data, only light receiving elements of the group being actuated to each generate the electrical signal, and a device for calculating a subject distance value, using subject image data made by the electrical signals generated through the light receiving elements of the group.

With this structure, even if the parallax between the distance measuring unit and the photographic lens increases when in the macro photography mode, a precise subject distance measurement can still be carried out through the distance measuring unit since the first and second groups of light receiving elements are selectively used in the regular photography mode and in the macro photography mode, respectively.

Preferably, the predetermined correction data is stored in a memory provided in the camera. The memory may be a ROM.

Preferably, the distance measuring apparatus further includes a plurality of light receiving areas formed correspondingly on each of the pair of line sensors, the plurality of light receiving areas each including a predetermined number of the plurality of light receiving elements, wherein the plurality of light receiving areas respectively receive different areas of a corresponding one of the subject images formed through the pair of image forming lenses. The selecting device includes device for shifting each of the plurality of light receiving areas in a common direction by an amount corresponding to the predetermined correction data, and further wherein a plurality of light receiving elements included in the plurality of light receiving areas, having been shifted by the shifting device, are used for generating the electrical signals.

Preferably, each adjacent pair of light receiving areas of the plurality of light receiving areas overlap each other.

Preferably, the photographic lens may be a zoom lens.

Preferably, the distance measuring apparatus further includes means for switching from the regular photography mode to the macro photography mode, wherein the selecting device starts operating when the switching device switches from the regular photography mode to the macro photography mode.

To achieve the above fourth object mentioned above, according to the fourth aspect of the present invention, there is provided a distance measuring apparatus in a camera provided with a photographic lens, wherein a focal length of the photographic lens being variable. The distance measuring device includes: a pair of image forming lenses each forming a subject image, a pair of line sensors on which the subject images are respectively formed through the pair of image forming lenses, the pair of line sensors each having a plurality of light receiving elements each capable of converting received light into an electrical signal, and a plurality of light receiving areas formed correspondingly on each of the pair of line sensors, the plurality of light receiving areas each including a predetermined number of light receiving elements of the plurality of light receiving elements. The plurality of light receiving areas respectively receive different areas of a corresponding one of the subject images formed through the pair of image forming lenses. Also included is a device for calculating, for each of the plurality of light receiving areas, a value corresponding to a subject distance, using the electrical signals generated through light receiving elements included in each of the plurality of light receiving areas, a device means for judging whether or not there is reliability in each of the values in a predetermined order, and a device and means for deciding to adopt one of the values as an effective value, the one of the values being firstly judged by the judging device to have reliability.

With this structure, even if the value, for one light receiving area in the plurality of light receiving areas, which is to be firstly judged by the judging device is judged to be defective, another value of another light receiving area is immediately adopted as an effective value in the focusing operation. Accordingly, not only can correct focusing be carried out but also a subject distance value can be detected quickly, thus leading to a fast photographing operation.

Preferably, each adjacent pair of light receiving areas of the plurality of light receiving areas overlap each other.

Preferably, the plurality of light receiving areas include first, second and third light receiving areas, the first light receiving area being located between the second and third light receiving areas at a substantial center of each of the pair of line sensors, wherein the one end and the other end of the first light receiving area overlap the first and second light receiving areas, respectively.

Preferably, the judging device judges whether or not there is reliability in the value of the first light receiving area, in the value of the second light receiving area and in the value of the third light receiving area in respective order.

Preferably, the plurality of light receiving areas further include fourth and fifth light receiving areas which overlap the second and third light receiving areas, respectively, wherein neither of the fourth or fifth light receiving area overlaps the center light receiving area.

The camera may have a Spot AF mode in which only the first, second and third light receiving areas are selectively actuated and a Multi-AF mode in which all the first, second, third, fourth and fifth light receiving areas are selectively actuated, wherein the distance measuring apparatus further includes a device for setting the Multi-AF mode or the Spot AF mode.

Preferably, the judging device judges whether or not there is reliability in the value of the first light receiving area, in the value of the second light receiving area and in the value of the third light receiving area in respective order when the setting device sets the Spot AF mode, wherein the judging device judges whether or not each of the values of the first, second, third, fourth and fifth light receiving areas is reliable when the setting device sets the Multi-AF mode, and further wherein the deciding device adopts one of the values as an effective value, the one of the values having been judged by the judging device to have reliability and to be smaller or greater than any other of the values.

According to the fourth aspect of the present invention, there may be provided a distance measuring apparatus of a camera having a variable focal length photographing lens, a Multi-AF mode and a Spot AF mode. The distance measuring apparatus includes: a pair of image forming lenses each forming a subject image, a pair of line sensors on which the subject images are respectively formed through the pair of image forming lenses, the pair of line sensors each having a plurality of light receiving elements each capable of converting received light into an electrical signal, and a plurality of light receiving areas formed correspondingly on each of the pair of line sensors, the plurality of light receiving areas each including a predetermined number of light receiving elements of the plurality of light receiving elements. The plurality of light receiving areas respectively receive different areas of a corresponding one of the subject images formed through the pair of image forming lenses. The apparatus also includes a device for calculating, for each of the plurality of light receiving areas, a value corresponding to a subject distance, using the electrical signals generated through light receiving elements included in each of the plurality of light receiving areas, a device for judging whether or not there is reliability in each of the values in a predetermined order, and a device for deciding to adopt one of the values as an effective value in the Spot AF mode, the one of the values having been firstly judged by the judging means to have reliability. The camera may be a lens-shutter type camera.

To achieve the above fifth object mentioned above, according to the fifth aspect of the present invention, there is provided a distance measuring apparatus which includes; a pair of image forming lenses each forming a subject image, and a pair of line sensors on which the subject images are respectively formed through the pair of image forming lenses. The pair of line sensors each have a plurality of light receiving elements each converting received light into an electrical signal which is integrated to output image data for each of the plurality of light receiving elements, so that a group of image data is obtained for each of the pair of line sensors, and wherein the image data contains at least a brightness value. The apparatus further includes a device for detecting specific image data from the group of image data for each of the pair of line sensors, the specific image data relating to a greatest brightness value, and a device for calculating a difference between the greatest brightness value for one of the pair of line sensors and the greatest brightness value for the other of the pair of line sensors and for correcting each of all the output image data in the group of image data of one of the pair of line sensors in accordance with the difference.

With this structure, the image data of one of the line sensors can be corrected in accordance with the above calculated difference. Therefore, even if there is a considerable difference in the quantity of light received by the line sensors, this difference can be absorbed or substantially cancelled, and hence, a precise distance measuring operation can be achieved.

The output image data may correspond to a time value starting from a moment the electrical signal starts to be integrated until a moment an integrated value of the electrical signal reaches a predetermined value, and the specific image data corresponds to a minimum time value in all time values to which all image data of the group of image data correspond. In this case, the calculating and correcting device may subtract the minimum time value at one of the line sensors from the minimum time value at the other of the line sensors to thereby obtain a difference therebetween. The calculating and correcting device further subtracts the difference from each of all the time values of the other of the line sensors in the case where the difference is a positive value or subtracts an absolute value of the difference from each of all the time values of the one of the line sensors in the case where the difference is a negative value.

Preferably, the distance measuring apparatus further includes a device for calculating a subject distance, using each of all the corrected output image data.

The detecting device, the calculating and correcting device and the calculating device may be all provided in a single microcomputer.

The distance measuring apparatus may further include a distance measuring unit provided in a camera, the distance measuring unit including the pair of image forming lenses and the pair of line sensors.

The distance measuring apparatus may further include a plurality of light receiving areas formed correspondingly on each of the pair of line sensors, the plurality of light receiving areas each including a predetermined number of light receiving elements of the plurality of light receiving elements, wherein the plurality of light receiving areas respectively receive different areas of a corresponding one of the subject images formed through the pair of image forming lenses.

To achieve the above sixth object mentioned above, according to the sixth aspect of the present invention, there is provided a distance measuring apparatus which includes; a pair of image forming lenses each forming a subject image, and a pair of line sensors on which the subject images are respectively formed through the pair of image forming lenses. The pair of line sensors each have a plurality of light receiving elements each converting received light into an electrical signal which is integrated to output image data. The apparatus also includes a plurality of light receiving areas formed correspondingly on each of the pair of line sensors, the plurality of light receiving areas each including a predetermined number of light receiving elements of the plurality of light receiving elements, wherein the plurality of light receiving areas respectively receive different areas of a corresponding one of the subject images formed through the pair of image forming lenses, a device for detecting a level of a contrast of image data for each of the plurality of light receiving areas, the image data being output from light receiving elements in each of the plurality of light receiving areas, and device for adjusting a size of at least one of the plurality of light receiving areas in accordance with the detected contrast level.

With this structure, since the size of at least one of the plurality of light receiving areas can be adjusted, i.e., enlarged or narrowed, in accordance with the detected contrast level. If the contrast of a subject image is detected to be low, the chances of a subject image existing having a high contrast in the enlarged light receiving area are increased in the case where the adjusting device enlarges the size of a light receiving area when the detected contrast level thereof is low. Therefore, the appropriate correlative evaluation data is obtained and the possibility of obtaining an accurate subject image distance value increases.

In some cases a valid subject image distance value cannot be obtained even though the detected contrast of a subject image is high enough. This happens mainly because subject images at near distance and far distance coexist within the same light receiving area. Even in such a case, with the above structure according to the sixth aspect of the present invention, the chances of obtaining a valid subject image distance value are increased in the case where the adjusting device narrows the size of a light receiving area when a valid subject image distance value cannot be obtained even through the detected contrast level of the subject image distance value in the light receiving area is high enough.

Preferably, the adjusting device enlarges the at least one of the plurality of light receiving areas in the case where the detected contrast level is lower than a predetermined level.

Preferably, the distance measuring apparatus further includes device for calculating a subject image distance value, using the image data from each of the light receiving areas, wherein the adjusting device operates only when the calculated subject image distance value is invalid.

Preferably, the adjusting device narrows the at least one of the plurality of light receiving areas in the case where the detected contrast level is equal to or higher than the predetermined level.

Preferably, each adjacent pair of light receiving areas of the plurality of light receiving areas overlap each other.

The distance measuring apparatus may further include a distance measuring unit provided in a camera, the distance measuring unit including the pair of image forming lenses and the pair of line sensors.

According to the sixth aspect of the present invention, there may be provided a distance measuring apparatus which includes a pair of image forming lenses each forming a subject image, a pair of line sensors on which the subject images are respectively formed through the pair of image forming lenses, wherein the pair of line sensors each have a plurality of light receiving elements each converting received light into an electrical signal which is integrated to output image data, and a plurality of light receiving areas formed correspondingly on each of the pair of line sensors, the plurality of light receiving areas each including a predetermined number of light receiving elements of the plurality of light receiving elements. The plurality of light receiving areas respectively receive different areas of a corresponding one of the subject images formed through the pair of image forming lenses. The apparatus further includes a device for detecting a correlativity between first image data output from light receiving elements in one of the plurality of light receiving areas on one of the pair of line sensors and second image data output from light receiving elements of a corresponding light receiving area on the other of the pair of line sensors, and a device for narrowing a size of both the one of the plurality of light receiving areas and the other of the plurality of light receiving areas in the case where a degree of the correlativity is below a predetermined degree. With this structure, since the size of corresponding two light receiving areas are narrowed in the case where a degree of the correlativity therebetween is below a predetermined degree, even if subject images at near distance and far distance coexist within a light receiving area or a subject image having a repetitive pattern exists within the light receiving area, the appropriate correlative evaluation data is obtained and the possibility of obtaining an accurate subject image distance value increases.

Preferably, each adjacent pair of light receiving areas of the plurality of light receiving areas overlap each other.

The distance measuring apparatus may further include a distance measuring unit provided in a camera, the distance measuring unit including the pair of image forming lenses and the pair of line sensors.

To achieve the above seventh object mentioned above, according to the seventh aspect of the present invention, there is provided a distance measuring apparatus which includes; a pair of image forming lenses each forming a subject image, a pair of line sensors on which the subject images are respectively formed through the pair of image forming lenses, wherein the pair of line sensors each have a plurality of light receiving elements which convert received light into an electrical signal which is integrated to output image data for each of the plurality of light receiving elements, and a plurality of light receiving areas formed correspondingly on each of the pair of line sensors, the plurality of light receiving areas each include a predetermined number of light receiving elements of the plurality of light receiving elements. The plurality of light receiving areas respectively receive different areas of a corresponding one of the subject images formed through the pair of image forming lenses. The apparatus further includes a device for calculating a distance value for each of the plurality of light receiving areas in accordance with image data output from light receiving elements in the each of the plurality of light receiving areas, and a device for judging, for each of the plurality of light receiving areas, whether or not image data is reliable. The image data output from the predetermined light receiving elements corresponds to each of the plurality of light receiving areas, wherein the judging device includes at least a first judging level and a lower second judging level, and wherein the image data is firstly judged at the first judging level and is then judged at the lower second judging level if none of the image data exceeds the first judging level. Also included is a device for selecting one of the distance values calculated by the calculating means, in accordance with respective image data, the respective image data having been judged by the judging means to be reliable.

With this structure, the chances of having a focusing error occurring can be greatly reduced while maintaining distance value reliability since the image data is firstly judged at one judging level, i.e., the first judging level, then judged again at another lower judging level, i.e., the second judging level, if none of the image data exceeds the first judging level.

Preferably, the calculating device calculates each distance value in accordance with first image data output from light receiving elements of one of the plurality of light receiving areas on one of the pair of line sensors and second image data output from light receiving elements of a corresponding light receiving area on the other of the pair of line sensors.

Preferably, the distance value may corresponds to a distance between the first image data and the second image data.

The selected distance value may be greater than any other of the distance values.

Preferably, the calculating device calculates correlative data between one of the plurality of light receiving areas on one of the pair of line sensors and a corresponding light receiving area on the other of the pair of line sensors by way of shifting, step by step, both of the corresponding light receiving areas by a predetermined amount, and wherein the calculated correlative data is associated with the plurality of different reference judging levels.

Preferably, each adjacent pair of light receiving areas of the plurality of light receiving areas overlap each other.

The distance measuring apparatus may further include a distance measuring unit provided in a camera, the distance measuring unit including the pair of image forming lenses and the pair of line sensors.

To achieve the above eighth object mentioned above, according to the eighth aspect of the present invention, there is provided a distance measuring apparatus of a camera which includes; a pair of image forming lenses each forming a subject image, a pair of line sensors on which the subject images are respectively formed through the pair of image forming lenses, wherein the pair of line sensors each have a plurality of light receiving elements each converting received light into an electrical signal representing a brightness value, so that subject distances of different areas of a common subject image can be measured in accordance with the converted electrical signals. The apparatus also includes a device for photometering an average brightness value of the common subject image, and device for judging whether or not a backlit-state exists, wherein the judging device detects a maximum brightness value from all the brightness values, calculates an average brightness value from the brightness values for one of the pair of line sensors, calculates a first difference between the maximum brightness value and the average brightness value, compares the first difference with a first predetermined reference value and judges that the backlit-state exists in the case where the first difference is greater than the first predetermined reference value.

With this structure, since the outputs, i.e., electrical signals, of the pair of line sensors can also be used for the judging device to judge whether or not a backlit-state exists, it is no longer necessary to provide a plurality of photosensors, a split-type photosensor or the like used exclusively for detecting a backlit state.

Preferably, the judging device further calculates a sub-average brightness value from the brightness values for each of the different areas, calculates a first difference between one of the sub-average brightness values and another of the sub-average brightness values, a second difference between the one of the sub-average brightness values and still another of the sub-average brightness values and a third difference between the still another of the sub-average brightness values and the another of the sub-average brightness values, selects an intermediate value from among absolute values of the first, second and third differences, compares the intermediate value with a second predetermined reference value and judges that the backlit-state exists in the case where the intermediate value is greater than the second predetermined reference value.

The distance measuring apparatus may further include a distance measuring unit provided in a camera, the distance measuring unit including the pair of image forming lenses and the pair of line sensors.

According to the eighth aspect of the present invention, there may be provided a camera having a distance measuring apparatus, wherein the distance measuring apparatus includes; a pair of image forming lenses each forming a subject image, and a pair of line sensors on which the subject images are respectively formed through the pair of image forming lenses. The pair of line sensors each have a plurality of light receiving elements each converting received light into an electrical signal representing a brightness value, so that subject distances of different areas of a common subject image can be measured in accordance with the converted electrical signals. The camera includes a device for photometering an average brightness value of the common subject image, and a device for judging whether or not a backlit-state exists, wherein the judging device detects a maximum brightness value from all the brightness values, calculates an average brightness value from the brightness values for one of the pair of line sensors, calculates a first difference between the maximum brightness value and the average brightness value, compares the first difference with a first predetermined reference value and judges that the backlit-state exists in the case where the first difference is greater than the first predetermined reference value.

Preferably, the camera further includes a strobe, wherein the judging device actuates the strobe the prepare for emitting light when judging that the backlit-state exists.

Preferably, the judging device corrects an aperture value in accordance with the first difference when judging that the backlit-state exists.

Preferably, the judging device further calculates a sub-average brightness value of the brightness values for each of the different areas, calculates a first difference between one of the sub-average brightness values and another of the sub-average brightness values, a second difference between the one of the sub-average brightness values and still another of the sub-average brightness values and a third difference between the still another of the sub-average brightness values and the another of the sub-average brightness values, selects an intermediate value from among absolute value of the first, second and third differences, compares the intermediate value with a second predetermined reference value and judges that the backlit-state exists in the case where the intermediate value is greater than the second predetermined reference value.

Preferably, the camera may further include a strobe, wherein the judging device actuates the strobe to prepare for emitting light when judging that the backlit-state exists.

Preferably, the judging device corrects an aperture value in accordance with the first difference when judging that the backlit-state exists.

The camera may further include a distance measuring unit, the distance measuring unit including the pair of image forming lenses and the pair of line sensors.

The present disclosure relates to subject matter contained in Japanese patent applications No. 7-34064 (filed on Feb. 22, 1995), No. 7-34065 (filed on Feb. 22, 1995) No. 7-34066 (filed on Feb. 22, 1995), No. 7-62254 (filed on Mar. 22, 1995), No. 7-87124 (filed on Apr. 12, 1995), No. 7-89645 (filed on Apr. 14, 1995), No. 7-128670 (filed on May 26, 1995) and No. 7-128671 (filed on May 26, 1995) which are expressly incorporated herein by reference in their entireties.

BRIEF DESCRIPTION OF THE DRAWINGS

The invention will be described below in detail with reference to the accompanying drawings, in which:

FIGS. 9A, B, C, and D represent a schematic view showing variations in the light receiving areas according to a variation in the focal length;

FIG. 10 shows AF frames provided in the finder of an embodiment of a camera to which a distance measuring apparatus according to a first aspect of the present invention is applied;

FIG. 18 shows AF frames provided in the finder of an embodiment of a camera to which a distance measuring apparatus according to the second, third or fourth aspect of the present invention is applied;

FIGS. 21A and B show a line sensor having additional light receiving elements corresponding to a maximum parallax adjusting amount in the camera shown in FIG. 19;

FIGS. 45A, B, and C show graphs of image data, image data of light receiving areas, and evaluation values thereof when the amount of light received by one line sensor of a distance measuring unit is imbalanced with that received by the other line sensor in a camera to which a distance measuring apparatus according to the fifth aspect of the present invention is applied;

FIGS. 58(a), 58(b), 58(c), 58(A), 58(B) and 58(C) show graphs of image data and evaluation data thereof according to the prior art, and image data and evaluation values thereof according to the present invention, in a camera to which a distance measuring apparatus according to the sixth aspect of the present invention is applied, when the light receiving areas of the left and right line sensors in the distance measuring unit are at a low contrast;

FIGS. 59(a), 59(b), 59(c), 59(A), 59(B) and 59(C) show graphs of image data and evaluation data thereof according to the prior art, and image data and evaluation values thereof according to the present invention, in a camera to which a distance measuring apparatus according to the sixth aspect of the present invention is applied, when there are images of subjects at close distance and far distance in the same light receiving area of the left and right line sensors in the distance measuring unit;

DESCRIPTION OF THE PREFERRED EMBODIMENT

An embodiment (i.e., a first embodiment) of a camera to which a distance measuring apparatus according to a first aspect of the present invention is applied, will be discussed below with reference to FIGS. 1 through 17. In the illustrated embodiment, a camera 11 is a lens-shutter type camera provided with a distance measuring unit 18. In the camera 11, the optical axis of the distance measurement optical system in the distance measuring unit 18 is not coincident with either the optical axis of the photographing optical system or the optical axis of the finder optical system.

Figure 1:
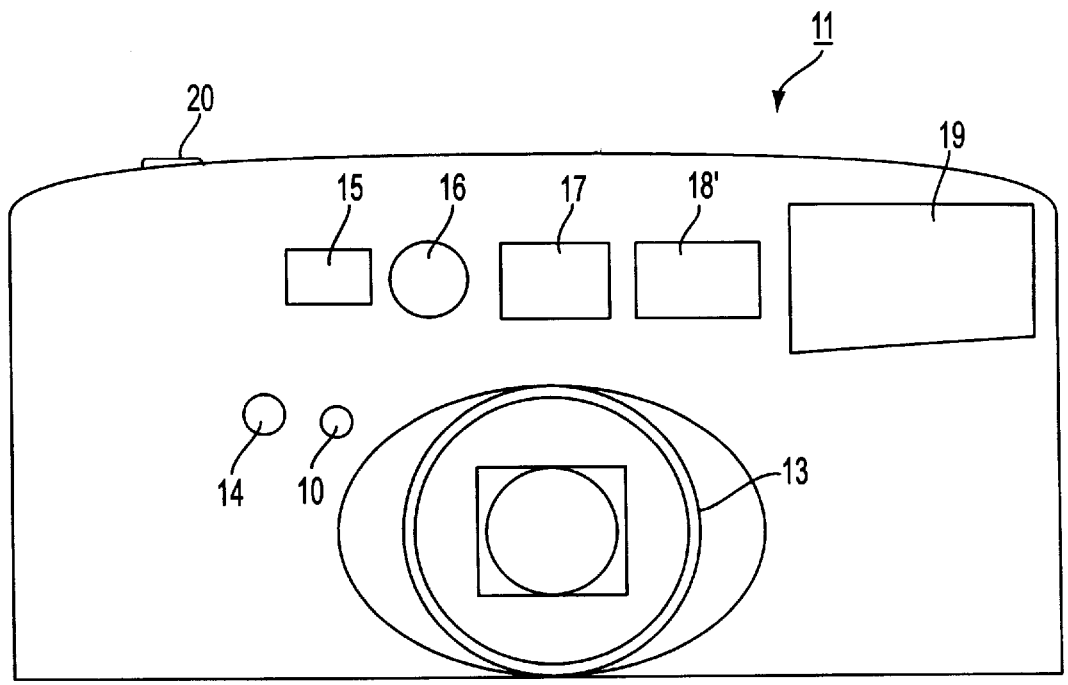
FIG. 1 is a front elevational view of a camera having a distance measuring apparatus according to a first, second, third or fourth aspect of the present invention.

The camera 11 is provided on its front, as shown in FIG. 1, with a photographing lens (i.e., photographing optical system) 13 having an electrically-driven zoom lens, a remote-control light receiving portion 14, a light emitter 10 for indicating that a self-timer is in operation, a light receiving window 15, an AF auxiliary light emitter 16, a finder objective window 17, a light receiving window 18' and a strobe emitter 19. Behind the light receiving window 18' are placed a pair of image forming lenses (i.e., distance measurement optical system) 25 and 26 of the distance measuring unit 18.

Figure 2:
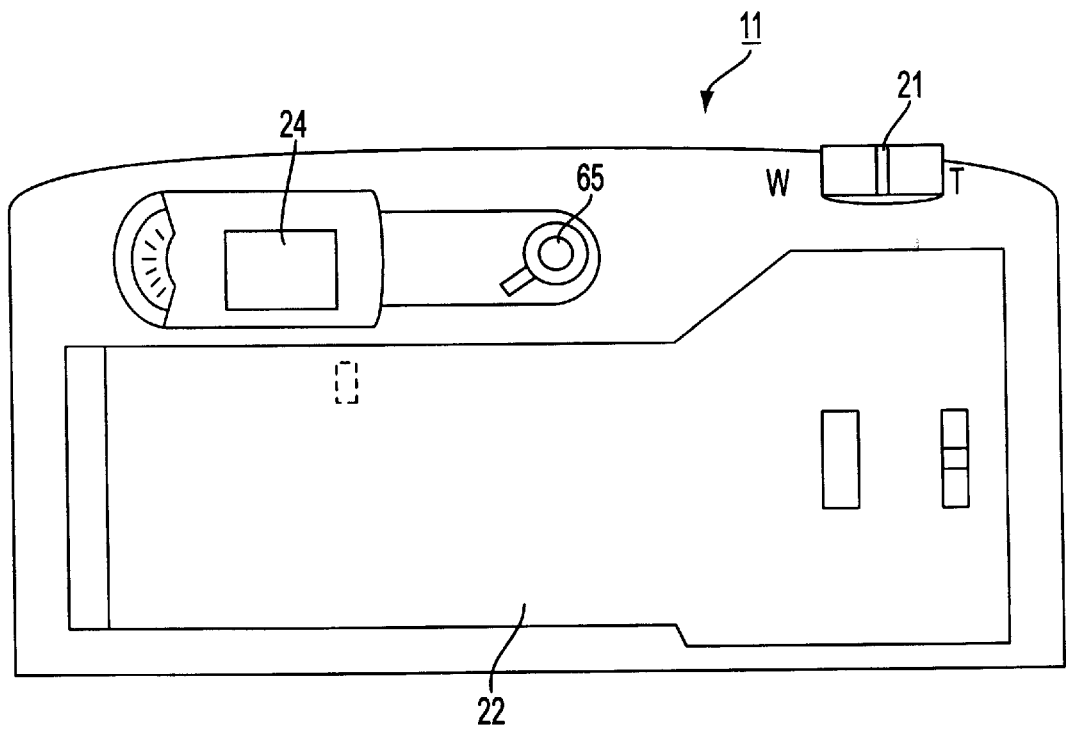
FIG. 2 is a back view of the camera shown in FIG. 1.

The camera 11 is provided on its back, as shown in FIG. 2, with a finder eyepiece window 24, a main switch 65, a zooming lever 21 and an openable back cover 22. The zooming lever 21 can be moved in either a telephoto direction T, or a wide-angle direction W. When the zooming lever 21 is moved towards a telephoto side or a wide-angle side, the photographing lens 13 is respectively moved in the telephoto direction or the wide-angle direction to perform the zooming operation.

Figure 3:
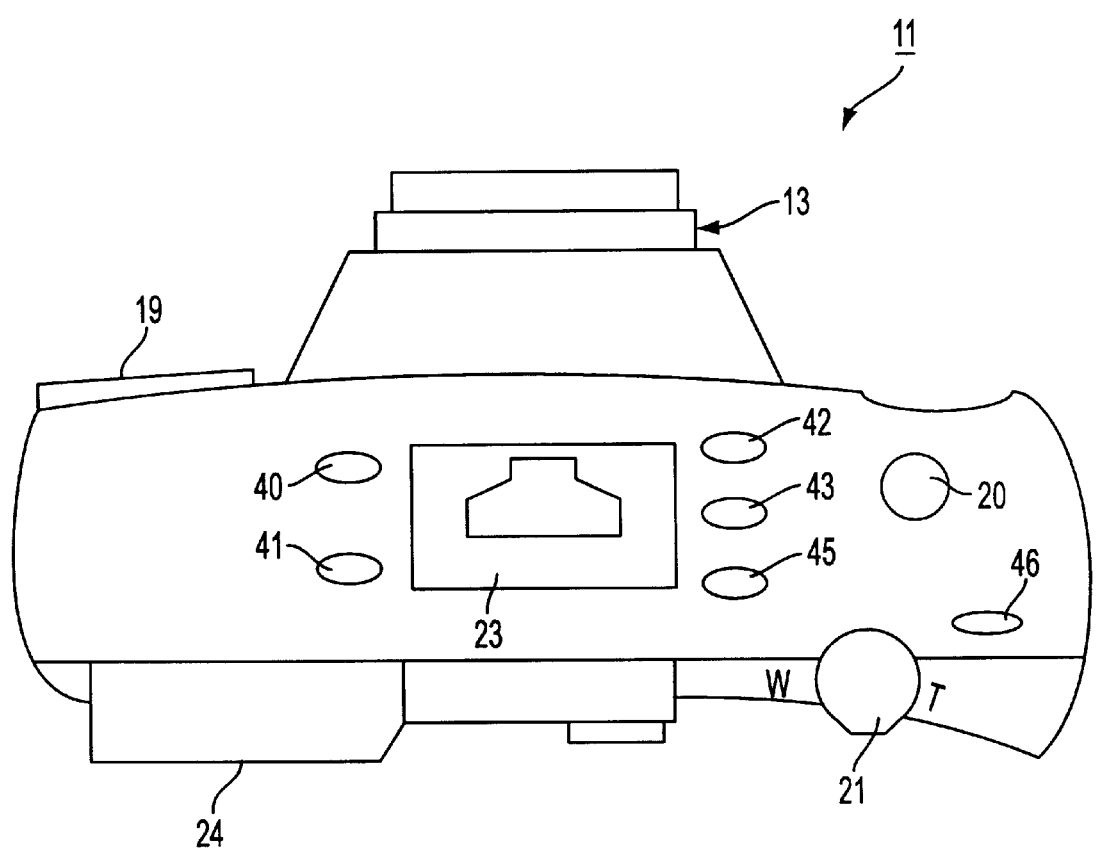
FIG. 3 is a plan view of the camera shown in FIG. 1.

The camera 11 is further provided on its upper side, as shown in FIG. 3, with a release button 20 and an external LCD 23 for indicating various photographic information. A strobe switch 40, a mode selecting switch 41, a date switch 42, a spot AF selecting switch 43 and a drive switch 45 are all provided around the external LCD 23. A macro switch 46 is positioned at the rear of the release button 20. The data switch 42 is used for adjusting the date, altering the date indicating pattern in the external LCD 23 and altering the date exposure pattern on a film. The date altering mode can be selected by continuously depressing the date switch 42 for 3 seconds. By depressing the drive switch 45 the shutter drive mode can be selectively changed to a single-frame mode, a consecutive shooting mode, a self-timer shooting mode, and a bulb mode, etc.

Figure 4:
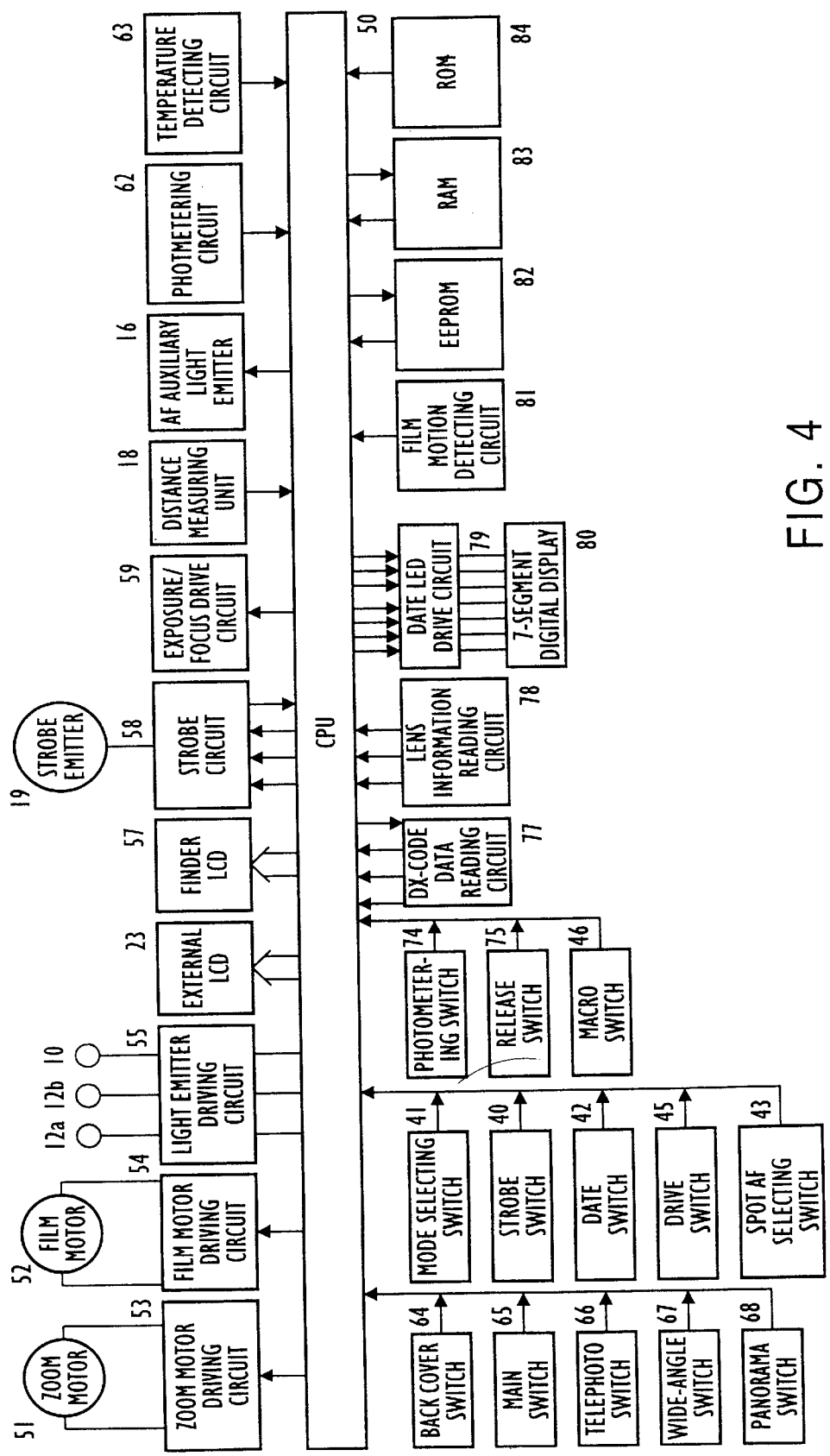
FIG. 4 is a block diagram of a control system of the camera shown in FIG. 1.

The controlling system of the camera 11 will be explained below with reference to FIG. 4.

The camera 11 is provided with a CPU 50 for controlling various kinds of photographing operations. The CPU 50 starts controlling each operation in accordance with a predetermined program stored in an inner memory of the CPU 50.

A zoom motor driving circuit 53, a film motor driving circuit 54 and a light emitter driving circuit 55 are connected to the CPU 50. The zoom motor driving circuit 53 actuates a zoom motor 51 to drive the photographing lens 13. The film motor driving circuit 54 actuates a film motor 52 for winding and rewinding a film. The light emitter driving circuit 55 actuates a red light emitter 12a, a green light emitter 12b and the light emitter 10 to be in ON, OFF or blinked states. The red and green light emitters 12a and 12b are disposed at a position adjacent to a finder view 47 (shown in FIG. 10) in the finder so that red and green lights emitted from the emitters 12a and 12b, respectively, can be observed through the finder. The red light emitter 12a indicates whether a strobe light is now available or not, while the green light emitter 12b indicates whether a subject is in focus or not.

The external LCD 23, a finder LCD 57, a strobe circuit 58 for actuating the strobe emitter 19, the distance measuring unit 18, the AF auxiliary light emitter 16, a photometering circuit 62 and a temperature detecting circuit 63 are connected to the CPU 50. The finder LCD 57 is placed in the finder and is capable of indicating a plurality of focus frames Fa, Fb, Fc and Fd in the finder view 47. The photometering circuit 62 calculates a photometric value in accordance with data detected by a light receiver, e.g., a CdS cell (cadmium sulfide cell), disposed behind the light receiving window 15. The temperature detecting circuit 63 detects the ambient temperature around the camera 11 in accordance with signals outputted from a thermo-sensor, such as a thermistor.

A back cover switch 64, the main switch 65, a telephoto switch 66, a wide-angle switch 67, a panorama switch 68, the strobe switch 40, the mode selecting switch 41, the date switch 42, the spot AF selecting switch 43, the drive switch 45, a photometering switch 74, a release switch 75 and the macro switch 46 are connected to the CPU 50.

The mode selecting switch 41 is used to select a desired photographing mode from among a plurality of predetermined photographing modes. The predetermined photographing modes include a Multi-AF mode and a Spot AF mode. The mode selecting switch 41 can also select a strobe prohibition mode. The photometering switch 74 is turned ON when the release button 20 is half-depressed and the release switch 75 is turned ON when the release button 20 is fully depressed.

A DX-code data reading circuit 77, a lens information reading circuit 78, a date LED drive circuit 79, a film motion detecting circuit 81, an EEPROM 82, a RAM 83 and a ROM 84 are connected to the CPU 50. The DX-code data reading circuit 77 reads ISO speed information printed on a film patrone through DX-code contact pins (not shown). The lens information reading circuit 78 reads zoom information concerning the photographing lens 13. The date LED drive circuit 79 actuates a 7-segment digital display 80, to expose date or time information in accordance with the operation of the date switch 42.

Figure 5:
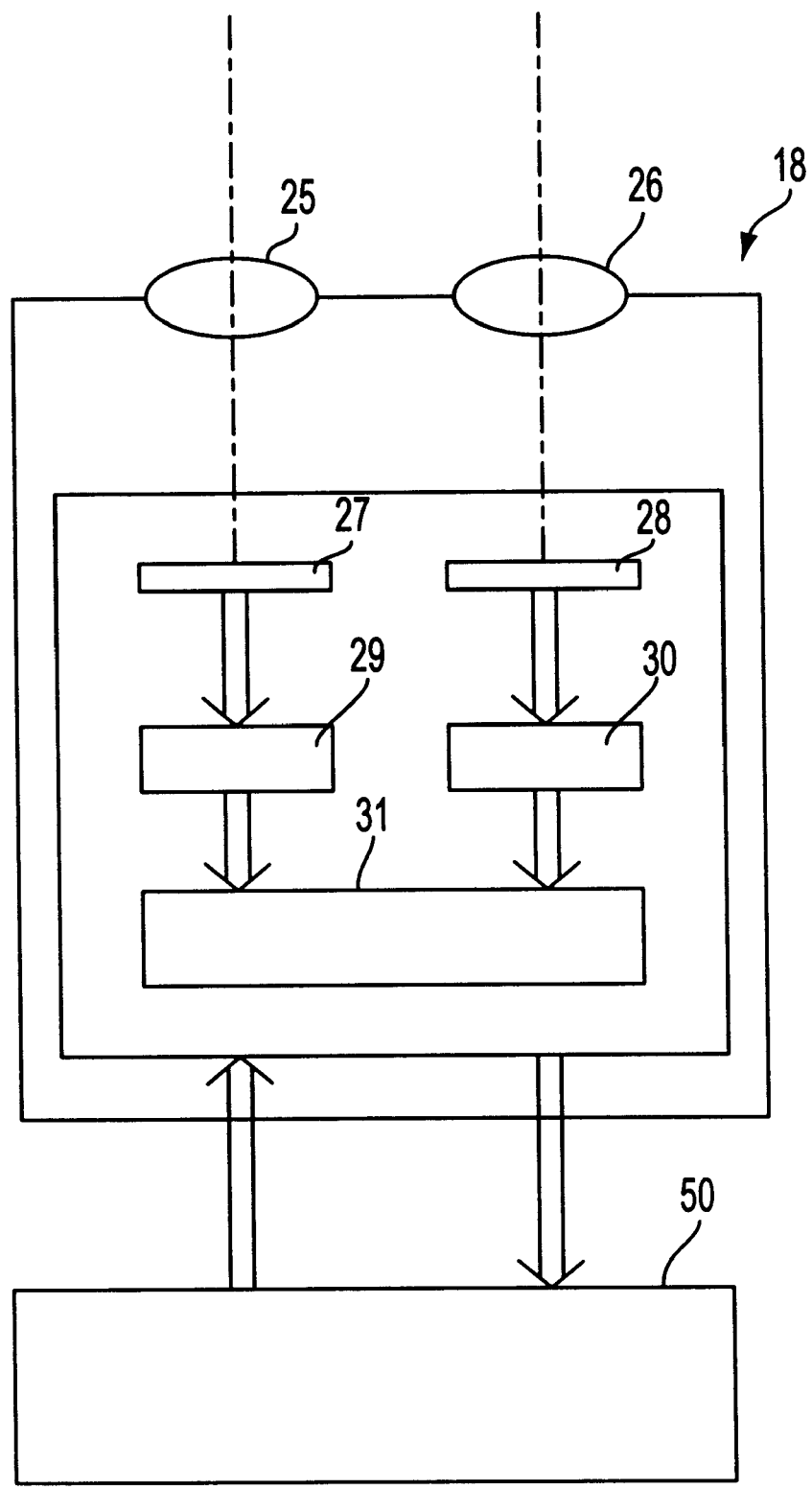
FIG. 5 is a schematic view of an internal structure of a distance measuring unit of the camera shown in FIG. 1.

As shown in FIG. 5, the distance measuring unit 18 is provided with the pair of image forming lenses 25 and 26, and a pair of line sensors 27 and 28. The pair of image forming lenses 25 and 26 are disposed such that they are apart from each other by a distance equal to the base length. The subject images of a common subject are formed on each of the pair of line sensors 27 and 28 through the pair of image forming lenses 25 and 26, respectively. The pair of line sensors 27 and 28 have the same shape and each is provided with a plurality of light receiving elements (i.e., photodiodes) aligned in left and right directions of the camera 11, so as to cover the maximum angle of view of the photographing lens 13.

A general method for measuring a subject distance through a pair of line sensors 27' and 28' based on triangulation will be explained below with reference to FIG. 6.

Figure 6:
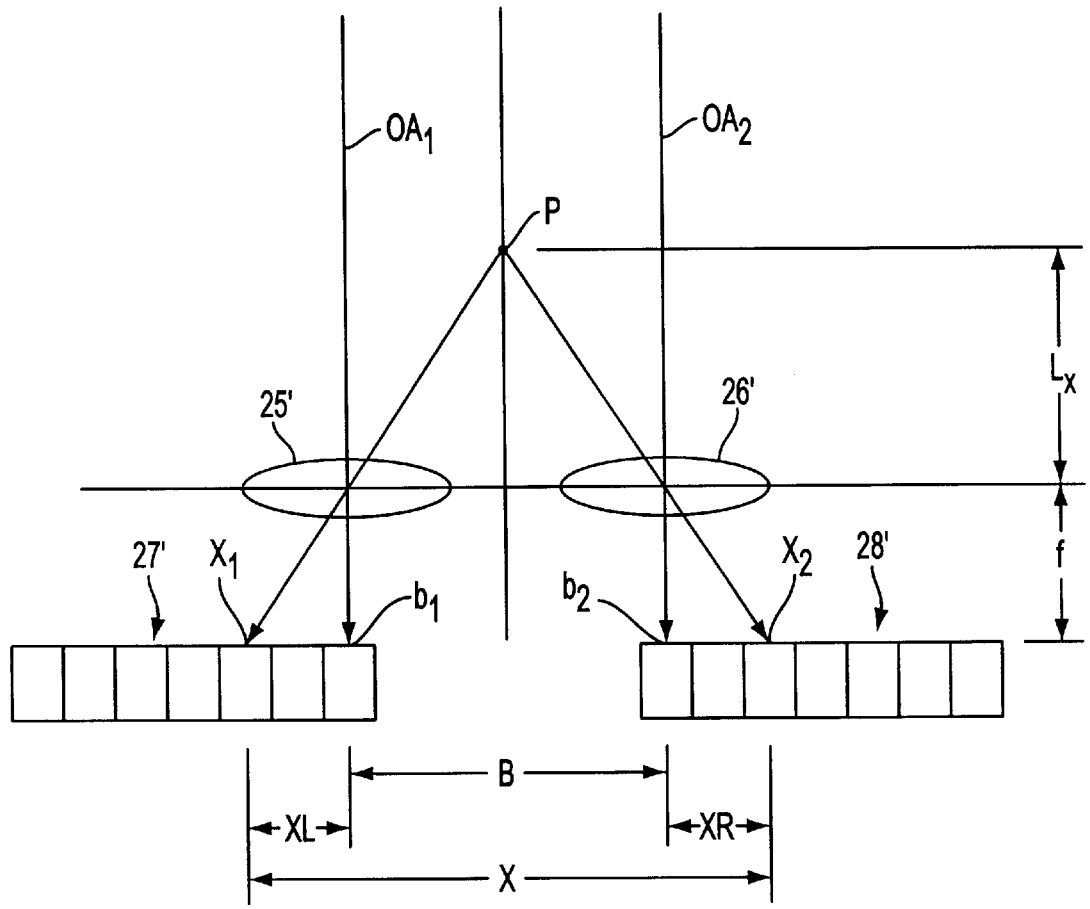
FIG. 6 shows a general method for measuring a subject distance through a pair of line sensors based on triangulation.

In FIG. 6, "f" presents the focal length of the image forming lenses 25' and 26'. "$OA_1$" and "$OA_2$" represent the optical axes of the image forming lenses 25' and 26', respectively, which are disposed parallel to each other and apart from each other by a distance "B". "b$_1$" and "b$_2$" represent the points of incidence of the optical axes OA$_1$ and OA$_2$ upon the line sensors 27' and 28', respectively. Accordingly, the distance between the incident points b$_1$ and b$_2$ is the base length which is equal to the distance B. "P" represents a subject and "Lx" represents the distance from the subject P to the pair of image forming lenses 25' and 26'. Here, for the purpose of illustration, the subject P is regarded as a mere point having no length or width. It is assumed that images of the subject P, located at the subject distance Lx, are respectively formed at the points X$_1$ and X$_2$ on the line sensors 27' and 28' by the respective image forming lenses 25' and 26', and that the distance between the image points X$_1$ and X$_2$ is "x". It is also assumed that the distance between the points b1 and X$_1$ is XL, and the distance between the points b2 and X$_2$ is XR. Accordingly, the following relation can be obtained:

B:(XL+XR)=Lx:f

The subject distance LX is given by:

$$Lx = B \times f / (XL + XR)$$
$$= B \times f / (x - B)$$

In the illustrated embodiment, the focal length f of the image forming lenses 25' and 26' and the distance therebetween, i.e., the base length B, are fixed values. Consequently, the subject distance Lx can be obtained by calculating the distance XL and XR or the distance x. In this embodiment, the image points X$_1$ and X$_2$ are detected to obtain the distance x to thereby obtain the subject distance Lx.

In general, a subject to be photographed is not merely a point and hence the subject images to be formed on the line sensors 27' and 28' are two dimensional. Therefore, the image points X$_1$ and X$_2$ cannot be directly detected.

To solve this, a predetermined number of light receiving elements (e.g. 1 or 2 elements) of the line sensor 27' are compared with the same number of light receiving elements of the line sensor 28'. This comparison is repeatedly carried out while relatively changing the light receiving elements to be compared. When the highest degree of coincidence of the distribution of the quantity of light defined by the light receiving elements between the line sensors 27' and 28' is obtained, the distance between the light receiving elements is determined to be the image distance x.

A plurality of light receiving areas are designated correspondingly on each of the pair of line sensors 27 and 28. Each light receiving area includes a predetermined number of light receiving elements.

The CPU 50 shifts or varies the plurality of light receiving areas to be used on each of the line sensors 27, 28, in accordance with data regarding focal length range information outputted from the RAM 83. This focal length range information is stored in the RAM 83 when zooming is effected in accordance with the information outputted from the lens information reading circuit 78. The four predetermined sets of positions (a), (b), (c) and (d) as shown in FIG. 9 are each stored in the ROM 84.

Figure 8:
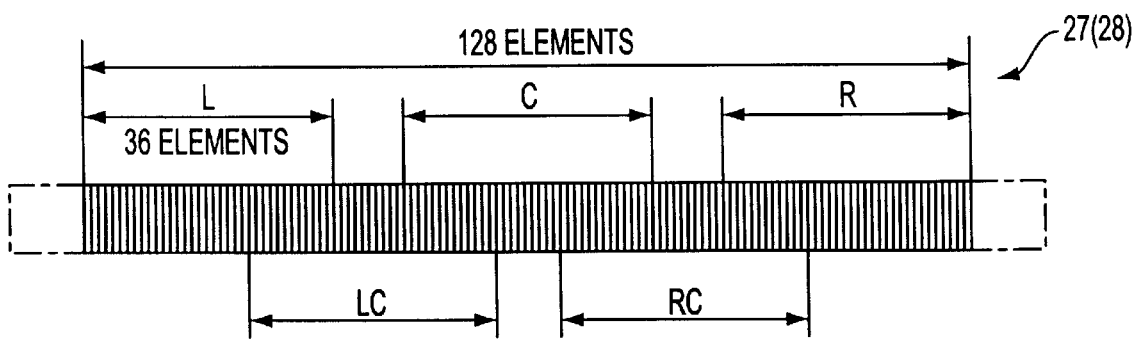
FIG. 8 is a schematic view showing light receiving areas of a line sensor used in the distance measuring unit shown in FIG. 7.

More specifically, each line sensor 27, 28 includes at least 128 light receiving elements aligned side by side. As shown in FIG. 8, each line sensor has five light receiving areas, namely, a center light receiving area C (i.e., first light receiving area), a light receiving area LC (i.e., second light receiving area), a light receiving area RC (i.e., third light receiving area), a left light receiving area L (i.e., fourth light receiving area) and a right light receiving area R (i.e., fifth light receiving area). Each of the five light receiving areas C, LC, RC, L and R include 36 light receiving elements. The light receiving area LC overlaps the right portion of the left light receiving area L by 13 light receiving elements and the left portion of the center light receiving area C by 13 light receiving elements. Likewise, the light receiving area RC overlaps the right portion of the center light receiving area C by 13 light receiving elements and the left portion of the right light receiving area R by 13 light receiving elements.

Figure 7:
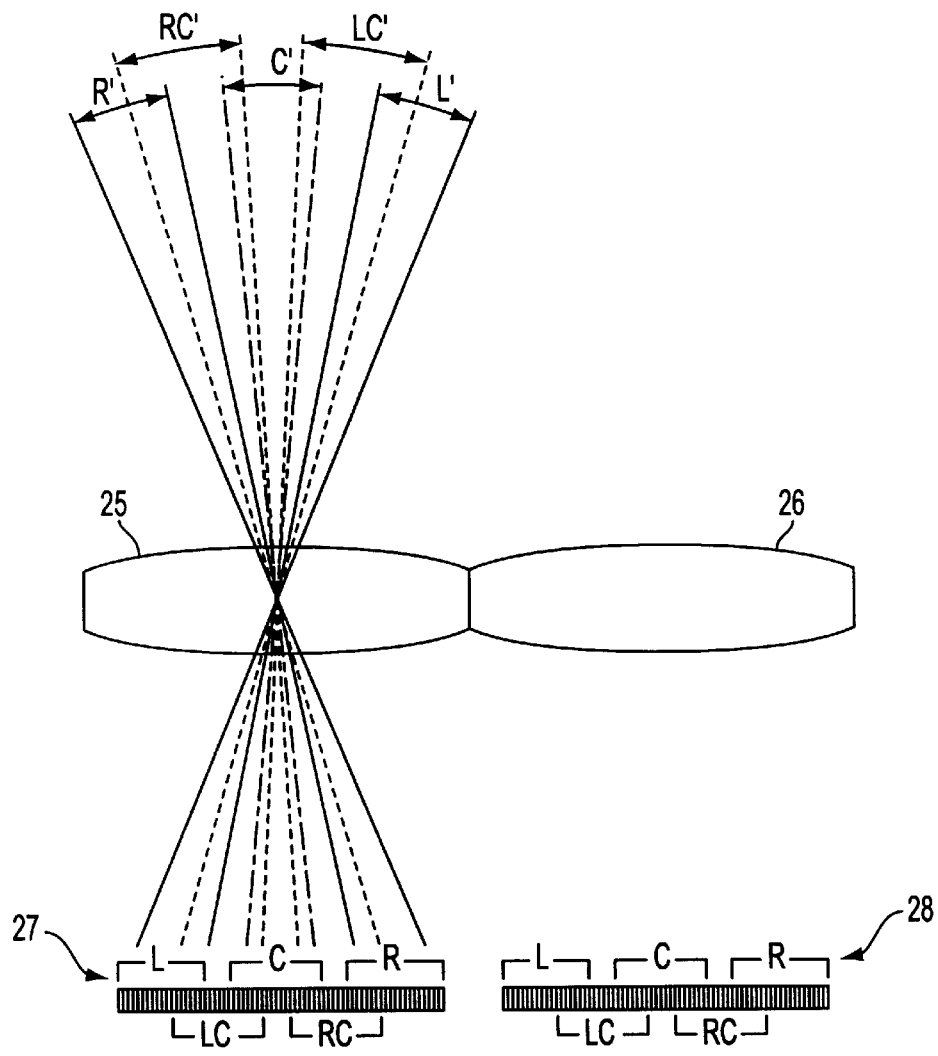
FIG. 7 is a schematic view of a distance measuring unit in the camera shown in FIGS. 1 through 3.

The reason why such a structure, in which two adjacent light receiving area overlap each other by a predetermined amount, is adopted is that distance information cannot be obtained in a case where the contrasts of a subject are formed only on the borders between light receiving areas, since the contrast is not detected at either light receiving area. As shown in FIG. 7, the light receiving area C, L, R, LC and RC correspond to subject light receivable ranges C', L', R', LC' and RC', respectively. In practice, each line sensor 27, 28 is comprised of more than 128 light receiving elements so that each of the left and right edges of the line sensor may have a margin.

The method for measuring a subject distance by selectively utilizing the light receiving areas C, L, R, LC and RC of the pair of line sensors 27 and 28 is hereinafter referred to as "Multi-AF".

The method for measuring a subject distance by selectively utilizing the light receiving areas C, LC and RC of the pair of line sensors 27 and 28 is hereinafter referred to as "Spot AF".

A plurality of images of a common subject are formed on each of the pair of line sensors 27 and 28 at different areas thereon through respective image forming lenses 25 and 26. The amount of light, which is received by each line sensor 27, 28 and stored as electric charge therein, is converted into electric signals, and these electric signals are sent to the CPU 50 through a corresponding quantizing portion 29, 30 and an arithmetic operating portion 31 disposed in the distance measurement unit 18.

More specifically, a comparator and a latch circuit, included in the corresponding quantizing portion 29 or 30, are connected to each light receiving element, and the electric charge accumulated in each light receiving element is quantized through the corresponding comparator and latch circuit. The quantized data of each line sensor 27, 28 is sent to the CPU 50 in serial order through the arithmetic operating portion 31. Amongst all the sensor data obtained from all of the light receiving elements on each line sensor 27, 28, the CPU 50 can only select a part of all the sensor data correspondingly from each line sensor 27, 28 and use only this selected sensor data for a distance measuring operation.

When the Multi-AF mode is selected by the mode selecting switch 41, the CPU 50 selects one of the four patterns of positions (a), (b), (c) or (d) (FIG. 9) corresponding to the focal length range information of the photographing lens 13 stored in the RAM 83, in accordance with the position data of the light receiving areas read from the ROM 84. Thereafter, the CPU 50 receives the small sets of signals (i.e., distance information) of the selected pattern of positions (a), (b), (c) or (d) from the arithmetic operating portion 31 and calculates a subject distance according to the signals to thereby obtain a displacement of the focusing lens. The focusing lens is driven to a point corresponding to the displacement thus obtained, by an exposure/focus drive circuit 59.

In the case when the Multi-AF mode is selected by the mode selecting switch 41, the focal length variable range (i.e., zooming range) of the photographing lens 13 is divided into four ranges, namely, first, second, third and fourth ranges, in respective order from the wide-angle extremity to the telephoto extremity. The control of the camera 11 varies the positions of the light receiving areas L, R, LC and RC relative to the position of the center light receiving area C in such a manner as shown in FIG. 9, in accordance with a variation of focal length due to the zooming operation. Namely, the CPU 50 selects one of the predetermined patterns of positions of light receiving areas on each line sensor 27, 28, i.e., the patterns of positions (a), (b), (c) and (d), according to the data regarding focal length range information stored in RAM 83, when a focal length is varied in the zooming operation. Although the positions of the light receiving areas L, R, LC and RC shift relative to the position of the center light receiving area C when one pattern of positions (a), (b), (c) or (d) is changed to another pattern, each light receiving area is always comprised of 36 light receiving elements.

As shown in FIG. 10, the finder LCD 57 of the camera 11 is provided with four AF frames Fa, Fb, Fc and Fd, each of different sizes, which respectively correspond to the patterns of positions (a), (b), (c) and (d) shown in FIG. 9. The four AF frames can be seen in the finder view 47. Each AF frame (i.e., measurement zone) consists of a pair of left and right parenthesis-like LCD segments. Only the AF frame Fa is activated, i.e., becomes visible, when the pattern of positions (a) is selected, and, the photographing lens 13 is at the wide-angle extremity. Likewise, only the AF frame Fd is activated, i.e., becomes visible, when the pattern of positions (d) is selected, and, the photographing lens 13 is at the telephoto extremity. When zooming is effected from the wide-angle extremity to the telephoto extremity, the effective pattern of positions changes from (a) to (d) and the activated AF frame shifts from Fa to Fd. Accordingly, in the camera 11, the AF frame or measurement zone is wide at the telephoto side and is narrow at the wide-angle side in accordance with a variation in the focal length of the photographing lens 13. With this structure, the large difference in size between the actual light receiving range and the AF frame is almost completely reduced, and the photographer can thus visually confirm the actual size of the light receiving range at a current selected focal length.

The operation of the camera 11 having the above mentioned circuit structure will be hereinafter discussed in reference to the flow charts shown in FIGS. 11 to 17. The operation of the camera 11 is carried out by the CPU 50 in accordance with predetermined programs stored in the ROM 84.

Figure 11:
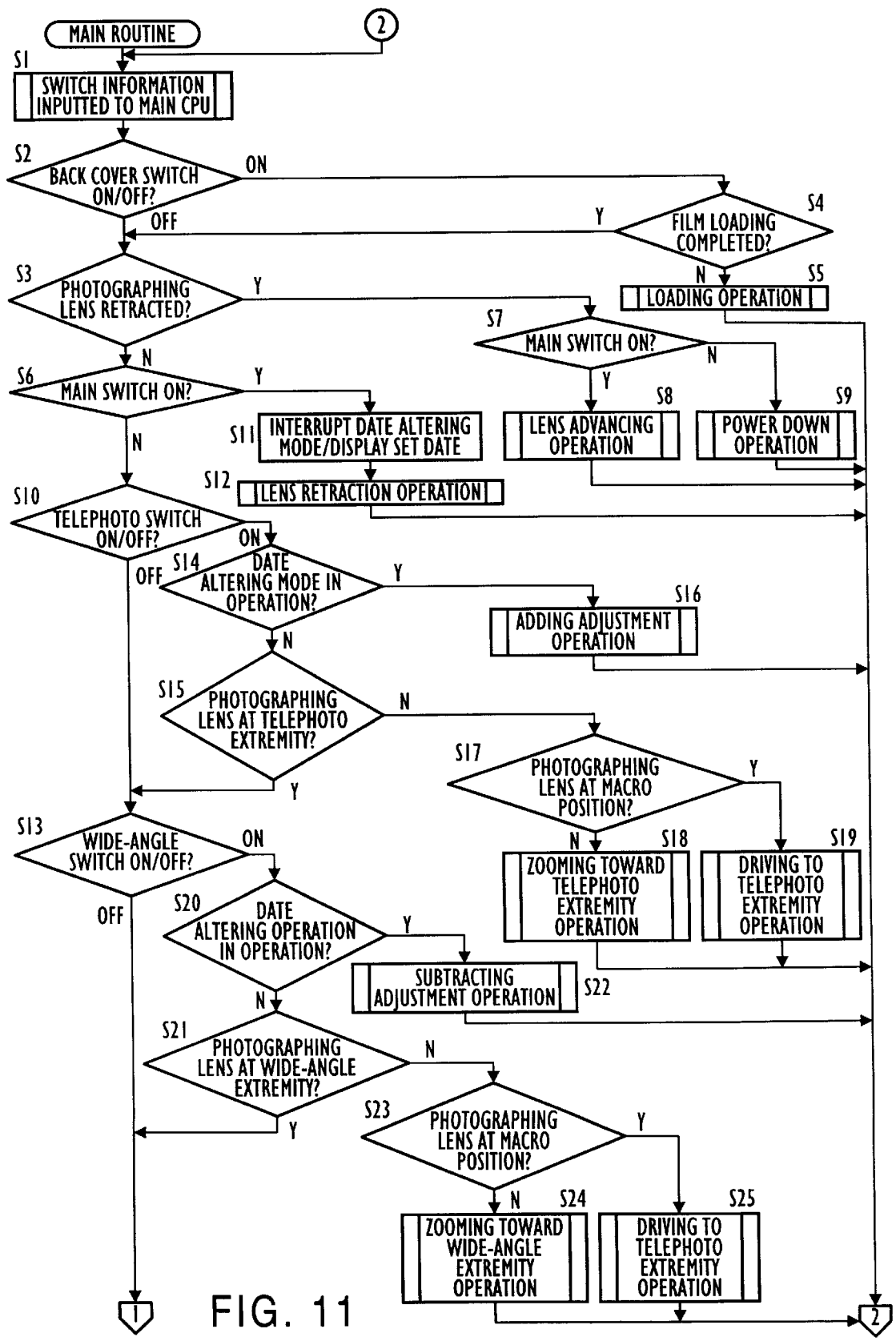
FIGS. 11, 12 and 13 are flow charts of the main operations of a camera to which a distance measuring apparatus according to the first, second, third or fourth embodiment of the present invention is applied.

When the main switch 65 is turned ON to supply electricity to each circuit, the control enters into the main routine shown in FIG. 11. In this main routine, switch information, such as ON/OFF state information, is inputted to the main CPU 50 from each of all the switches connected to the CPU 50, such as the photometering switch 74, at Step S1. Thereafter, the ON/OFF state of the back cover switch 64 is checked at Step S2. If it is determined that the back cover switch 64 is OFF, it is judged that the back cover 22 is closed and the control proceeds to Step S3. Conversely, if it is checked that the back cover switch 64 is ON, it is judged that the back cover 22 is open and the control proceeds to Step S4. At Step S4 it is checked whether or not a film loading operation has completed. The control proceeds to Step S3 if it is checked that the film loading operation has been completed. If not, the control proceeds to a subroutine labeled "Loading Operation" at Step S5 to carry out the film loading operation.

At Step S3, it is checked whether or not the photographing lens 13 is positioned at its lens retracted position in accordance with the zoom information read from the lens information reading circuit 78. The control proceeds to Step S7 where it is checked if the photographing lens 13 is placed at its lens retracted position, or if not control proceeds to Step S6. At Step S7, it is checked if the main switch 65 is turned ON from its OFF state, and if it is turned ON the control proceeds to a subroutine labeled "Lens Advancing Operation" at Step S8, in which the photographing lens 13 is advanced by a small amount from its retracted position to an initial position corresponding to the wide-angle extremity. If the main switch 65 is not turned ON at Step S7, the control proceeds to a subroutine labeled "Power Down Operation" at Step S9.

At Step S6 it is checked if the main switch 65 is turned ON from its OFF state. If the main switch 65 is turned ON, it is judged that the camera 11 has just been activated and the control proceeds to Step S11 to interrupt the date altering mode, if the date altering mode is in operation, and to display the newly inputted date on the external LCD 23. At Step S11, if the date altering mode is not in operation, the date which was previously set is displayed on the external LCD 23. Thereafter, the control proceeds to a subroutine labeled "Lens Retraction Operation" at Step S12. At Step S6 if it is judged that the main switch 65 is not turned ON from its OFF state, the control proceeds to Step S10 to check the state of the telephoto switch 66, i.e., turned ON to OFF. If it is checked that the telephoto switch 66 is turned ON at Step S10, it is then checked whether or not the data altering mode is in operation at Step S14. If it is determined that the telephoto switch 66 is not operated at Step S10, the control proceeds to Step S13.

Figure 13:
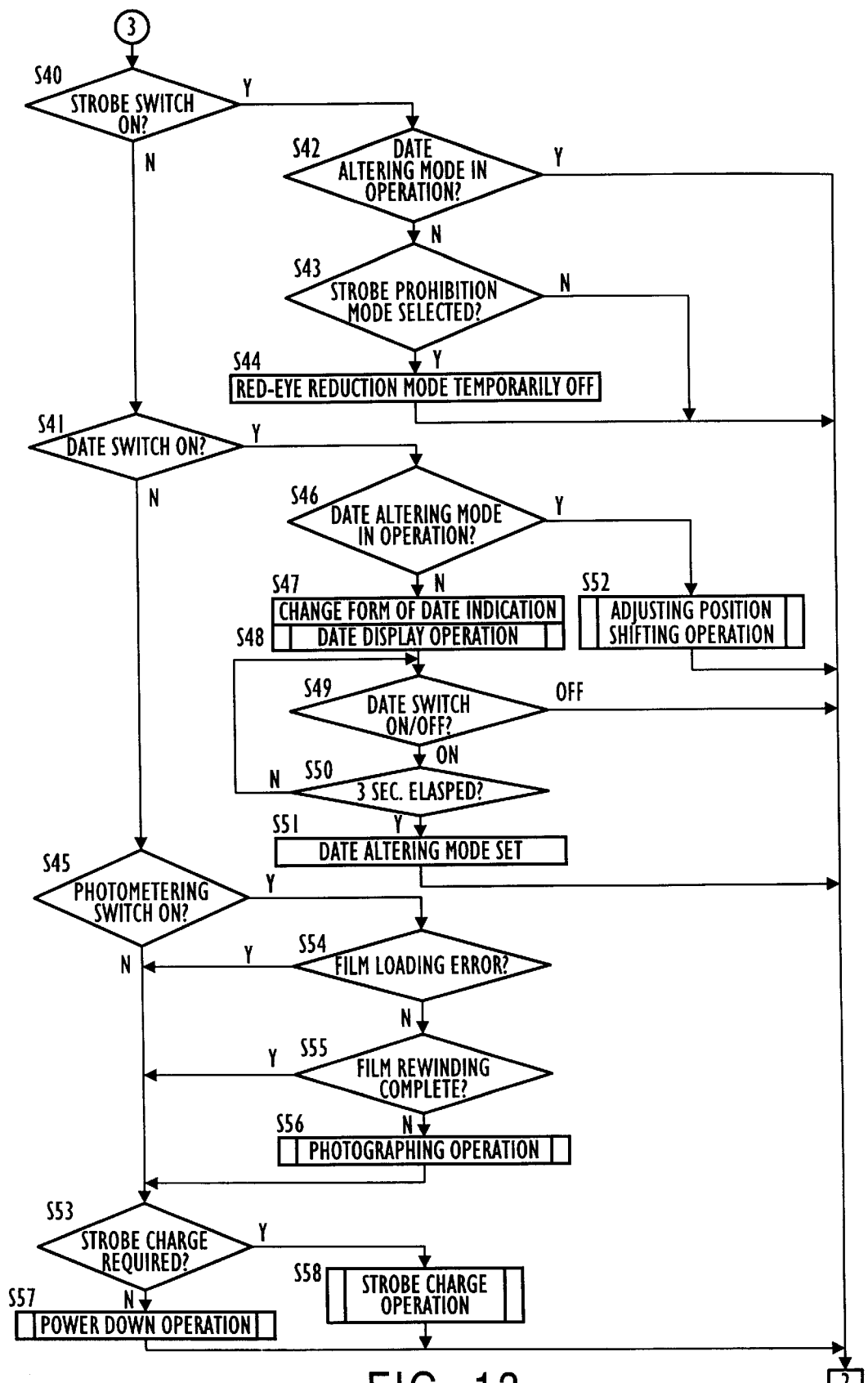

If it is determined that the date altering mode is not in operation at Step S14, the control proceeds to Step S15 to check if the photographing lens 13 is positioned at its telephoto extremity. If it is determined that the date altering mode is in operation at Step S14, the control proceeds to a subroutine labeled "Adding Adjustment Operation" at Step S16. The subroutine "Adding Adjustment Operation" is provided to adjust the date or time displayed on the external LCD 23 in the date altering mode, by increasing the day, month, year, hour or minute which is selected to be adjusted through a subroutine labeled "Adjusting Position Shifting Operation" at Step S52 (FIG. 13).

At Step S15 if it is determined that the photographing lens 13 is positioned at its telephoto extremity, the control proceeds to Step S13 to check if the wide-angle switch 67 is operated, i.e., turned ON or OFF. Conversely, if at Step S15 the photographing lens 13 is not positioned at its telephoto extremity, the control proceeds to Step S17 to check whether or not the photographing lens 13 is positioned at its macro position, in accordance with the zoom information read out from the lens information reading circuit 78.

If it is determined that the photographing lens 13 is positioned at its macro position at Step S17, the control proceeds to a subroutine labeled "Driving to Telephoto Extremity Operation" at Step S19 to move the photographing lens 13 from the macro position to the telephoto extremity. Conversely, if the photographing lens 13 is not positioned at its macro position at Step S17, the control proceeds to a subroutine labeled "Zooming toward Telephoto Extremity Operation" at Step S18 to move the photographing lens 13 from its current position towards the telephoto extremity.

At Step S13, if it is determined that the wide-angle switch 67 is turned ON, the control proceeds to Step S20 to check if the date altering mode is in operation, or to Step S26 if it is checked that the wide-angle switch 67 is turned OFF.

If it is determined that the date altering mode is in operation at Step S20, the control proceeds to a subroutine labeled "Subtracting Adjustment Operation" at Step S22. If the date altering mode is not in operation, it is then checked whether the photographing lens 13 is positioned at its wide-angle extremity at Step S21. The subroutine "Subtracting Adjustment Operation" at Step S22 is to adjust the date or time displayed on the external LCD 23 in the date altering mode, by decreasing the number of day, month, year, hour or minute which is selected to be adjusted through the subroutine "Adjusting Position Shifting Operation" at Step S52.

At Step S21 if the photographing lens 13 is positioned at its wide-angle extremity, the control then proceeds to Step S26, or to Step S23 if not.

At Step S23 it is checked if the photographing lens 13 is positioned at its macro position. If the photographing lens 13 is positioned at its macro position the control proceeds to a subroutine labeled "Driving to Telephoto Extremity Operation" at Step S25 to move the photographing lens 13 from the macro position to the telephoto extremity. If the photographing lens 13 is not at its macro position at Step S23, the control proceeds to a subroutine labeled "Zooming toward Wide-Angle Extremity Operation" at Step S24, to move the photographing lens 13 from its current position towards the wide-angle extremity.

At Step S26 (FIG. 12) it is checked whether or not the macro switch 46 is turned ON. If it is determined that the macro switch 46 is turned ON, the control proceeds to Step S28 to check if the photographing lens 13 is positioned at its macro position, or to Step S27 if it is determined that the macro switch 46 is turned OFF.

At Step S28 if it is determined that the photographing lens 13 is positioned at its macro position, the control proceeds to Step S27. Conversely, if the photographing lens 13 is not positioned at its macro position control proceeds to a subroutine labeled "Driving to Macro Position Operation" at Step S29, to move the photographing lens 13 to its macro position.

At Step S27 it is checked if the drive switch 45 is turned ON from its OFF state, and the control proceeds to Step S31 if turned ON, or to Step S30 if not.

At Step S31 if it is determined that the date altering mode is in operation control returns to Step S1. If the date altering mode is not in operation control proceeds to a subroutine labeled "Shutter Drive Setting Operation" at Step S32.

After completing the subroutine "Shutter Drive Setting Operation", the control proceeds to Step S33 to check if the drive switch 45 is turned ON or OFF. The control returns to Step S1 if the drive switch 45 is turned OFF. If it is determined that the drive switch 45 is turned ON, a timer provided in the CPU 50 starts and the control proceeds to Step S34. The timer continues to count while the drive switch 45 is depressed, i.e., keeps its ON state, but is reset if the drive switch 45 is turned OFF.

At Step S34, it is checked if three seconds has elapsed since the timer started. If three seconds has already elapsed, the control proceeds to Step S35 to check if the release switch 75 is turned ON. If three seconds has not yet elapsed, the control goes back to Step S33.

At Step S35, if it is determined that the release switch 75 is turned ON, the control proceeds to a subroutine labeled "Drive Lens to Wide-Angle Extremity Operation" at Step S36, and thereafter, further proceeds to a subroutine labeled "Rewind Operation" at Step S37 to rewind the film. Thereafter, the control returns to Step S1. If it is determined that the release switch 75 is turned OFF at Step S35, control returns to Step S33.

At Step S30 it is checked whether the mode selecting switch 41 is turned ON from its OFF state, and the control proceeds to Step S38 if it is turned ON, or to Step S40 if not.

At Step S38 it is checked whether or not the date altering mode is in operation, and the control returns to Step S1 if the date altering mode is in operation, or to a subroutine labeled "Mode Setting Operation" at Step S39, if the date altering mode is not in operation. In the subroutine "Mode Setting Operation", the aforementioned Spot AF or Multi-AF can be set as the subject distance measuring mode. At Step S40 (FIG. 13) it is checked if the strobe switch 40 is turned ON from its OFF state. The control proceeds to Step S42 if turned ON, or to Step S41 if not.

At Step S42 it is checked if the date altering mode is in operation. The control returns to Step S1 if the date altering mode is in operation, or to Step S43 if not in operation. At Step S43 it is checked if the strobe prohibition mode is selected by the mode selecting switch 41 and in operation. The control proceeds to Step S44 if in operation, or returns to Step S1 if not in operation.

At Step S44, if a red-eye reduction mode is turned ON, it is temporarily turned OFF while the strobe prohibition mode is in operation. After the strobe prohibition mode has been cancelled, the red-eye reduction mode returns.

At Step S41, it is checked if the date switch 42 is turned ON from its OFF state, and the control proceeds to Step S46 if turned ON, or to Step S45 if not.

In the date altering mode, when the external LCD 23 indicates the date, for example "95 2 3" (i.e., 1995, Feb. 3rd), when one of the numerals blinks, i.e., "95", "2" or "3", this indicates that the number blinking is presently adjustable. The blinking number can be increased or decreased by respectively operating the zooming switch 21 in the telephoto direction T (i.e., in the right hand direction) or the wide-angle direction W (i.e., in the left hand direction). With each depression of the data switch 42 (or when it is turned ON), the number currently blinking changes to the next number on the right, in the order "95", "2", "3", "95", "2", "3", etc.

At Step S46 it is checked if the date altering mode is in operation, and if in operation, the control then proceeds to a subroutine labeled "Adjusting Position Shifting Operation" at Step S52, at which the number currently blinking in the external LCD 23 changes or shifts to the next number on the right. The control returns to Step S1 after the completion of Step S52.

If the date altering mode is not in operation at Step S46, the control proceeds to Step S47 to change the previously selected form of date indication, displayed on the external LCD 23, to another form of date indication. Here, it should be noted that there are various forms for indicating the date. For instance, supposing that the date in Feb. 3, 1996, and that the time is nine o'clock and twenty five minutes (am). This information can be indicated on the external LCD 23 in any of the following five forms: 1st Form "2 3 96" (i.e., month, day, year); 2nd Form "3 2 96" (i.e., day, month, year); 3rd Form "96 2 3" (i.e., year, month, day); 4th Form "3 09:25" (i.e., day, hour, minute); or, 5th Form "-- -- --" (i.e., no date information is exposed on the film). Accordingly, when the date altering mode is not operated, the previously selected date indication form is changed to another indication form each time the data switch 42 is depressed.

After Step S47 the control proceeds to a subroutine labeled "Date Display Operation" at Step S48 to indicate the current date information in the selected indication form.

When Step S47 has completed, the control proceeds to Step S49 to check the ON/OFF state of the date switch 42. The control returns to Step S1 if the date switch 42 is turned OFF. If the date switch 42 is turned ON, a timer provided in the CPU 50 starts and the control proceeds to Step S50. The timer continues to count while the date switch 42 is depressed, i.e., keeps its ON state, and is reset when the date switch 42 is turned OFF.

At Step S50, it is checked if three seconds has elapsed since the timer started. If three seconds has already elapsed, the control proceeds to Step S51 to enter the date altering mode, in which any one of the above-mentioned date indication forms could be indicated on the external LCD 23, e.g., the 3rd Form "96 2 3". Since three seconds has elapsed the first numeral on the left of the date indicated i.e. "96", starts blinking, thereafter, the control returns to Step S1. If three seconds has not yet elapsed, the control returns to Step S49.

At Step S45 it is checked if the photometering switch 74 is turned ON from its OFF state, and the control proceeds to Step S54 if it is turned ON, or to Step S53 if not.

At Step S54 it is checked if a film loading error is detected, and the control proceeds to Step S53 if it is detected, or if no error is detected to Step S55 to check if the film rewinding has completed. The control proceeds to Step S53 if it is judged that the film rewinding has already completed at Step S55, or to a subroutine labelled "Photographing Operation" at Step S56 (FIGS. 14 and 15), if the film rewinding has not completed. After completing the subroutine "Photographing Operation", the control proceeds to Step S53.

At Step S53 it is checked whether or not there is a strobe charge requirement, and the control proceeds to a subroutine labelled "Strobe Charge Operation" at Step S58 if a strobe charge is required, or to a subroutine labelled "Power Down Operation" at Step S57 if Strobe Charging is not required.

Figure 14:
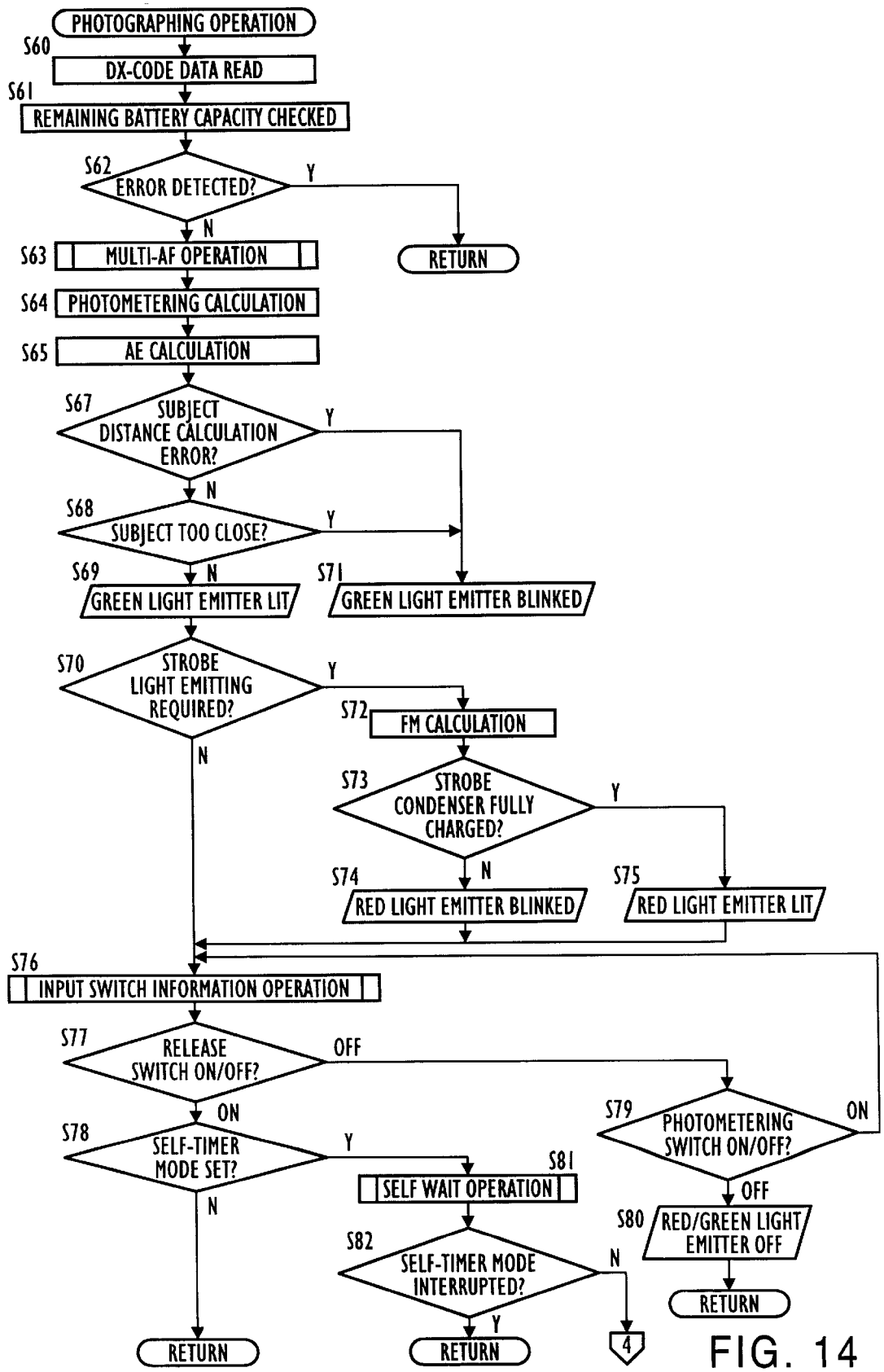
FIGS. 14 and 15 are flow charts showing a "Photographing Operation" subroutine for a photographing operation in a camera to which a distance measuring apparatus according to the first aspect of the present invention is applied.
Figure 15:
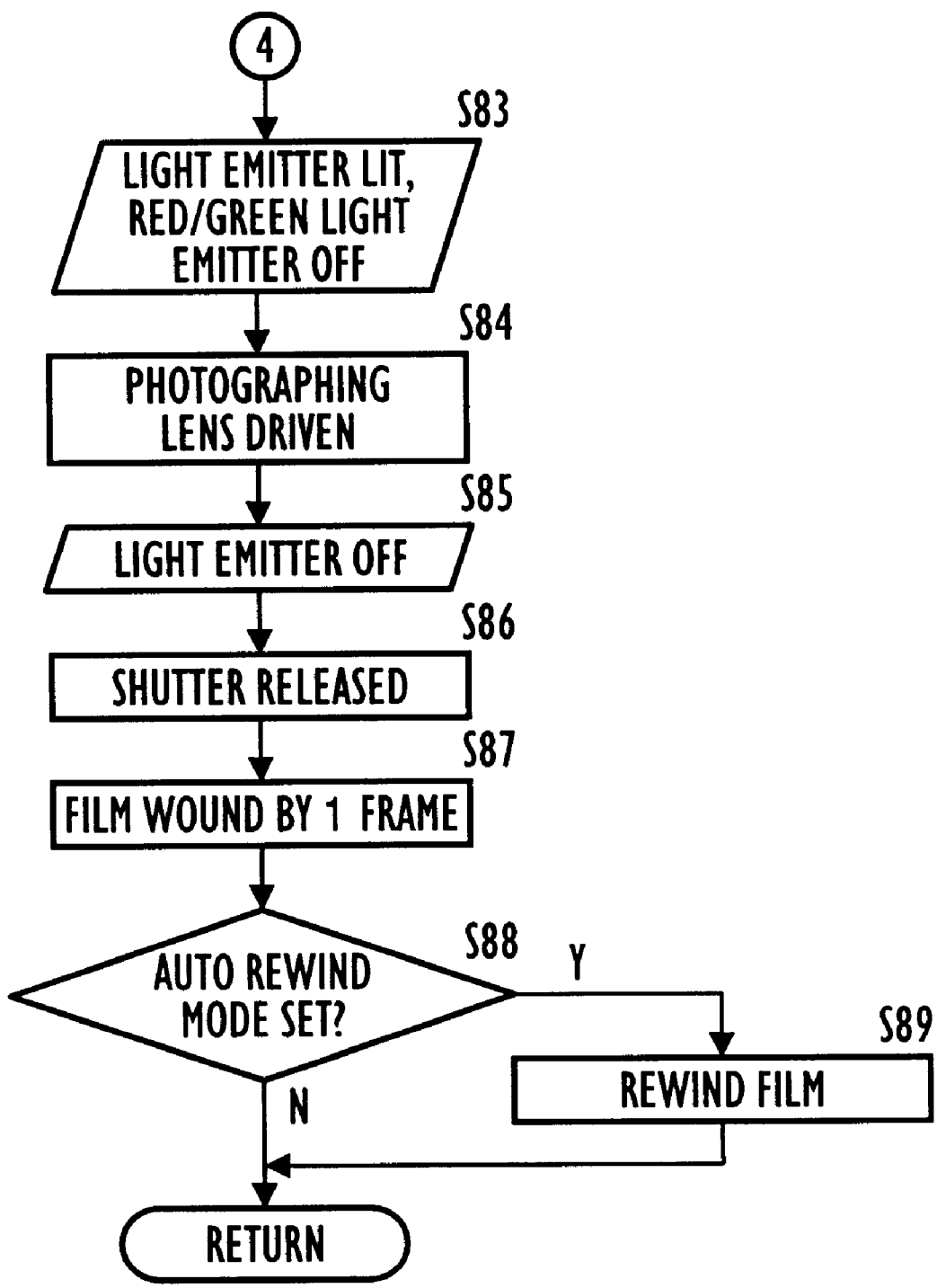

FIGS. 14 and 15 show the subroutine "Photographing Operation" at Step S56. In this subroutine, firstly, the ISO film speed printed on the loaded film patrone is read through the DX-code data reading circuit 77 at Step S60. Thereafter, the remaining capacity of the battery is checked at Step S61. At Step S62 it is checked if there is any error detected at Step S60 or Step S61, and the control returns if any error is detected, or proceeds to a subroutine labelled "Multi-AF Operation" at Step S63 if there is no error. After the completion of Step S63 a predetermined photometering calculation is performed by the photometering circuit 62 at Step S64, and subsequently, a predetermined AE calculation is performed at Step S65.

At Step S67 it is checked whether or not the subject distance value usable for photography has been calculated (i.e., it is checked if there is any error in the subject distance calculation), and the control proceeds to Step S71 if it is judged that the subject distance value usable for photography has not been calculated (i.e., there is no subject distance value calculated), or to Step S68 if it is judged that the subject distance value usable for photography has been calculated (i.e., there is a subject distance value calculated).

At Step S71 the green light emitter 12*b* is blinked so as to inform the photographer that an in-focus state cannot be obtained. At Step S68 it is checked whether or not a subject to be photographed is located too close to the camera 11 to be in-focus, and the control proceeds to Step S71 if the subject is too close, or to Step S69 if not. At Step S69 the green light emitter 12*b* is lit to inform the photographer that the subject to be photographed is now in focus.

At Step S70 it is checked if there is a strobe light emitting requirement, and the control proceeds to Step S72 if there is a requirement, or to Step S76 if no requirement exists. At Step S72 an FM (Flashmatic) calculation is performed, and subsequently, it is checked if the strobe condenser is fully charged at Step S73. The control proceeds to Step S75 if the strobe condenser is fully charged, or to Step S74 if not fully charged. At Step S75 the red light emitter 12*a* is lit to inform the photographer that the strobe is ready to fire. At Step S74 the red light emitter 12*a* is blinked to inform the photographer that the strobe is not yet ready to fire.

Step S76 is a subroutine labelled "Input Switch Information Operation", where the CPU 50 inputs switch information regarding each switch. After Step S76 the control proceeds to Step S77 to check the ON/OFF state of the release switch 75, and subsequently, the control proceeds to Step S78 if the release switch is turned ON, or to Step S79 if it is turned OFF.

At Step S79 the ON/OFF state of the photometering switch 74 is checked, and the control returns to Step S76 if the photometering switch 74 is turned ON, or proceeds to Step S80 if it is turned OFF. At Step S80 the red light emitter 12*a* or the green light emitter 12*b*, which is either lit or is blinking, is turned OFF.

At Step S78 it is checked if a self-timer mode has been set by the drive switch 45, and the control proceeds to a subroutine labelled "Self Wait Operation" at Step S81 if the self-timer mode has been set, or the control returns if it is not set. The subroutine "Self Wait Operation" is to release a shutter when a predetermined time (e.g., seven seconds) has elapsed since the release button 20 has been fully depressed. After Step S81 the control proceeds to Step S82 to check if the self-timer mode is interrupted while being in operation, and the control returns if it has been interrupted, or proceeds to Step S83 if not.

At Step S83 (FIG. 15) the light emitter 10 is lit and the green light emitter 12*b* and/or red light emitter 12*a* are turned OFF. Thereafter, the focusing lens of the photographing lens 13 is driven for focusing at Step S84, and subsequently, the light emitter 10 is turned OFF at Step S85. The shutter is then released at Step S86, and after completion, the film is wound forward by one picture frame at Step S87.

After Step S87, it is checked at Step S88 if the auto rewind mode has been set, and the control proceeds to Step S89 to rewind the film if the auto rewind mode has been set, or the control returns if it has not been set. The auto rewind mode can be selectively set or reset by pressing an auto rewind mode setting button (not shown) provided on the camera body. In the auto rewind mode, the film rewinding operation starts immediately after the last picture frame of the film has been exposed.

Figure 16:
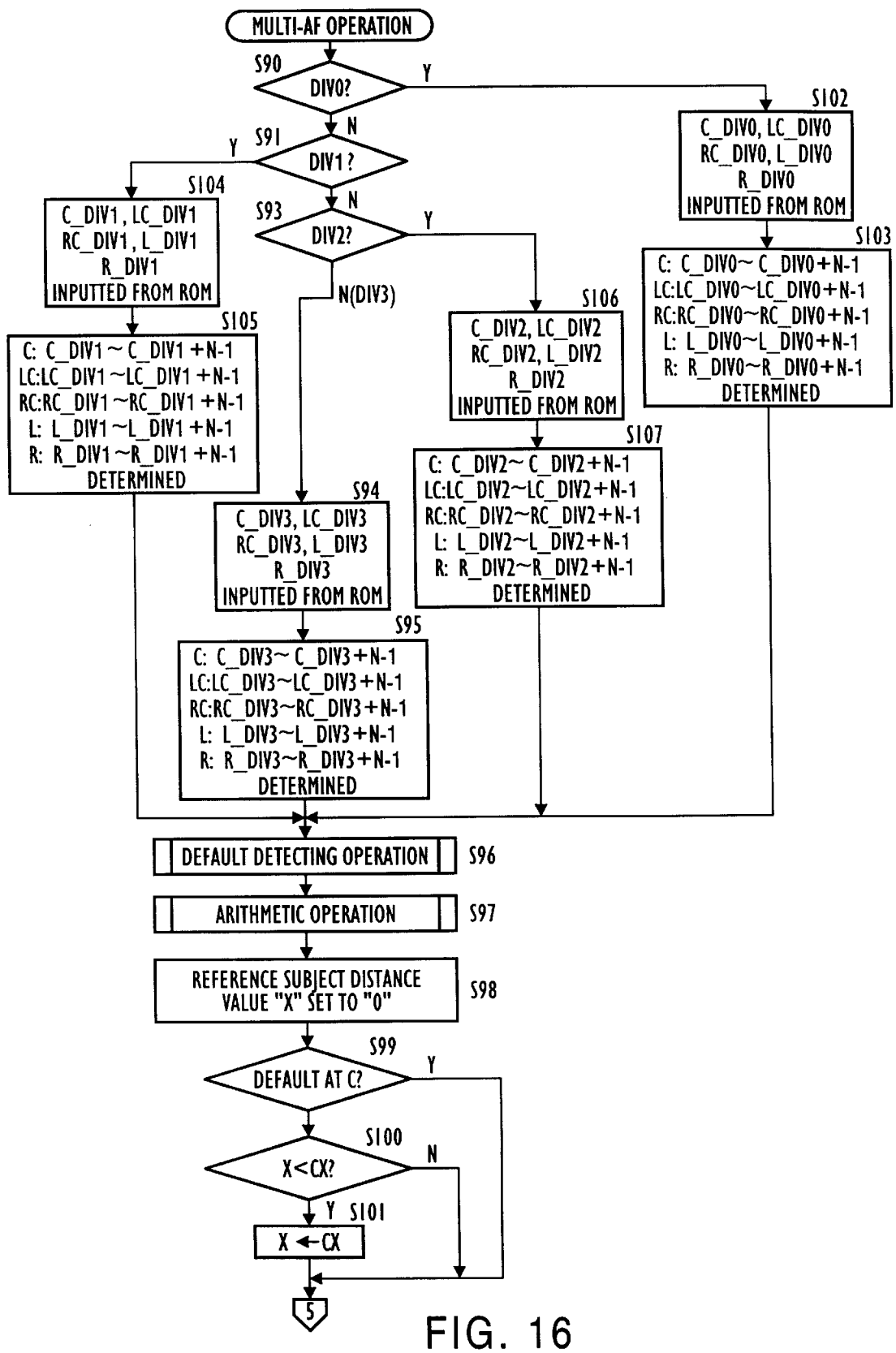
FIGS. 16 and 17 are flow charts showing a "Multi-AF Operation" subroutine for a Multi-AF operation in a camera to which a distance measuring apparatus according to the first, third or fourth aspect of the present invention is applied.
Figure 17:
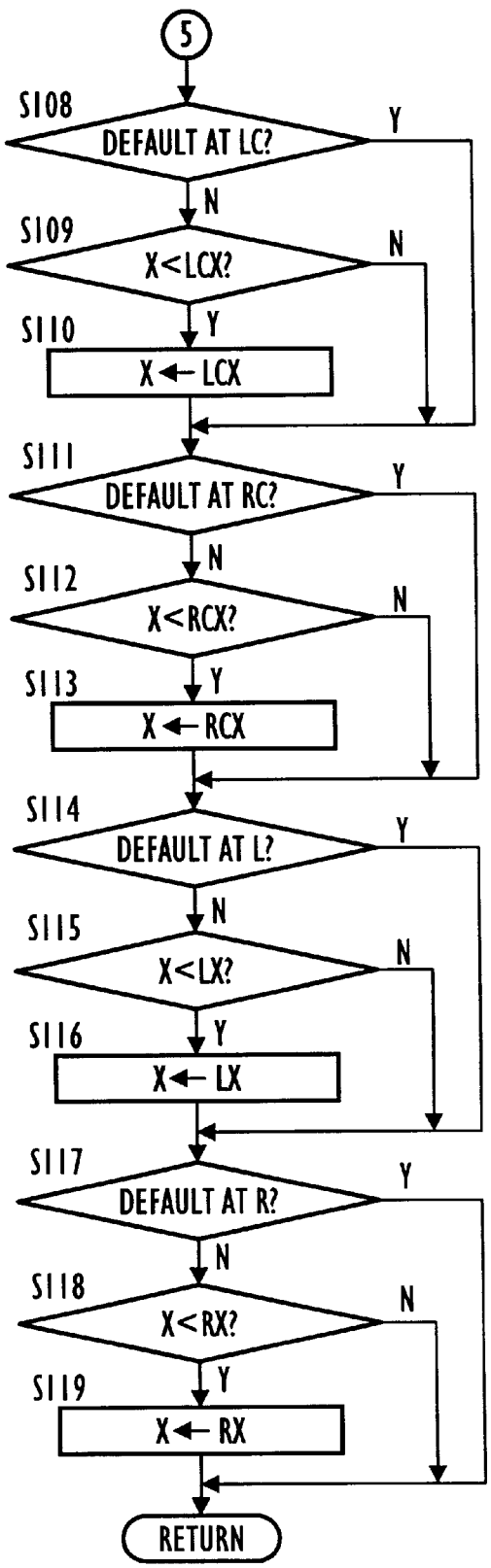

FIGS. 16 and 17 show the subroutine "Multi-AF Operation" which is called at Step S63 in FIG. 14.

Four sensor start numbers, i.e., DIV 0, DIV 1, DIV 2 and DIV 3, which respectively correspond to the first, second, third and fourth ranges of the zooming range of the photographing lens 13, each determine the position of each of the light receiving areas C, L, R, LC and RC, and are stored in the RAM 83 in accordance with the information read out from the lens information reading circuit 78 when the zooming operation or the macro operation is performed in accordance with the operation at Step S10, S13 or S26.

In the subroutine "Multi-AF Operation" at Step S63, under the condition that one effective set of the light receiving areas C, L, R, LC and RC having one of the four predetermined sets of positions (a), (b), (c) and (d) (FIG. 9), has been already selected or determined in accordance with the data of the above mentioned four sensor start numbers and the four predetermined sets of positions (a), (b), (c) and (d) stored in the ROM 84, it is checked whether or not there is a default (i.e., the state in which a subject distance value cannot be measured) at any of the light receiving areas C, L, R, LC and RC, and among the subject, distance values obtained with the light receiving areas each having no default, one subject distance value which is within a predetermined focus-capable distance range and closest to the camera 11 is selected to be used for focusing.

In the subroutine "Multi-AF Operation" at Step S63, firstly, the sensor start number currently stored in the RAM 83 is read out from the RAM 83 and it is checked if the read sensor start number is "DIV 0" or not at Step S90. The control proceeds to Step S102 if it is judged that the read sensor start number is "DIV 0". At Step S102, the CPU 50 inputs, from the ROM 84, the information regarding the read sensor start number "DIV 0", i.e., "C_DIV 0", "L_DIV 0", "R DIV 0", "LC_DIV 0" and "RC_DIV 0", whose respective positions are shown in FIG. 9 (*a*).

Each positional information "C_DIV 0", "L_DIV 0", "R DIV 0", "LC_DIV 0" and "RC_DIV 0" represents the position of the light receiving element positioned at one end (the right end in FIG. 9) of the corresponding light receiving area, which consists of 36 light receiving elements.

At Step S103, the effective positions of the light receiving areas C, L, R, LC and RC are each determined in accordance with the above mentioned information "C_DIV 0", "L_DIV 0", "R_DIV 0", "LC_DIV 0" and "RC_DIV 0", respectively, in the following manner.

The range of the center light receiving area C is determined by the width from the right end, i.e., the position "C_DIV 0", to the left end. The position of the left end is determined by the amount "C_DIV 0"+(N−1), i.e., "1+(N−1)". Here, "N" represents the predetermined number of light receiving elements of which each of the light receiving areas C, L, R, LC and RC consists, i.e., 36 in this embodiment. The center light receiving area C can be expressed in the range defined by "C_DIV 0"~"C_DIV 0"+(N−1). The rest of the light receiving areas L, R, LC and RC are each determined in a similar manner.

The left light receiving area L is determined such that it ranges from the right end thereof, i.e., the position of "L_DIV 0", to the left end thereof by the amount "L_DIV 0"+(N−1), i.e., "1+(N−1)".

The right light receiving area R is determined such that it ranges from the right end thereof, i.e., the position of "R_DIV 0", to the left end thereof by the amount "R_DIV 0"+(N−1), i.e., "1+(N−1)".

The light receiving area LC is determined such that it ranges from the right end thereof, i.e., the position of "LC_DIV 0", to the left end thereof by the amount "LC_DIV 0"+(N−1), i.e., "1+(N−1)".

The light receiving area RC is determined such that it ranges from the right end thereof, i.e., the position of "RC_DIV 0", to the left end thereof by the amount "RC_DIV 0"+(N−1), i.e., "1+(N−1)".

The arithmetic operating portion 31 provided in the distance measurement unit 18 sends to the CPU 50, in sequence, the sensor data that is outputted from each of the light receiving elements located on each of the light receiving areas C, L, R, LC and RC, in accordance with the signals outputted from the main CPU 50. For instance, in the case when it is necessary for the main CPU 50 to receive a series of sensor data from the right light receiving area R ranging from the 9th light receiving element (counted from the right end of the total 128 light receiving elements) to the left end of the right light receiving area R, the arithmetic operating portion 31 sends in sequence the sensor data outputted from each of the 36 light receiving elements ranging from the above mentioned 9th light receiving element to the 44th light receiving element (i.e., 9+(36−1).

After Step S103, the control proceeds to a subroutine labelled "Default Detecting Operation" at Step S96 in which it is checked whether there is a default at each of the light receiving areas C, L, R, LC and RC in accordance with the inputted sensor data.

At Step S90, if it is judged that the read sensor start number is not "DIV 0", the control proceeds to Step S91 to check if the read sensor start number is "DIV 1". If it is judged that the read sensor start number is "DIV 1", the control proceeds to Step S104. At Step S104, the CPU 50 inputs from the ROM 84, the positional information regarding the read sensor start number "DIV 1", i.e., "C DIV 1", "L_DIV 1", "R_DIV 1", "LC_DIV 1" and "RC_DIV 1", whose respective positions are shown in FIG. 9 (*b*).

Thereafter, at Step S105, the effective positions of the light receiving areas C, L, R, LC and RC are each determined in accordance with the above mentioned information "C_DIV 1", "L_DIV 1", "R_DIV 1", "LC_DIV 1" and "RC_DIV 1", respectively, in the following manner.

The range of the center light receiving area C is determined by the width from the right end, i.e., the position of "C_DIV 1", to the left end. The position of the left end is determined by the amount "C_DIV 1"+(N−1), i.e., "1+(N−1)". The center light receiving area C can be expressed in the range defined by "C_DIV 1"~"C_DIV 1"+(N−1). The rest of the light receiving areas L, R, LC and RC are each determined in a similar manner.

The left light receiving area L is determined such that it ranges from the right end thereof, i.e., the position of "L_DIV 1", to the left end thereof by the amount "L_DIV 1"+(N−1), i.e., "1+(N−1)".

The right light receiving area R is determined such that it ranges from the right end thereof, i.e., the position of "R_DIV 1", to the left end thereof by the amount "R_DIV 1"+(N−1), i.e., "1+(N−1)".

The light receiving area LC is determined such that it ranges from the right end thereof, i.e., the position of "LC_DIV 1", to the left end thereof by the amount "LC_DIV 1"+,(N−1), i.e., "1+(N−1)".

The light receiving area RC is determined such that it ranges from the right end thereof, i.e., the position of "RC_DIV 1", to the left end thereof by the amount "RC_DIV 1"+(N−1), i.e., "1+(N−1)".

After Step S105 the control proceeds to the subroutine "Default Detecting Operation" at Step S96.

At Step S91, if it is judged that the read sensor start number is not "DIV 1", the control proceeds to Step S93 to check if the read sensor start number is "DIV 2". If it is judged that the read sensor start number is "DIV 2", the control proceeds to Step S106. At Step S106, the CPU 50 inputs, from the ROM 84, the positional information regarding the read sensor start number "DIV 2", i.e., "C DIV 2", "L_DIV 2", "R_DIV 2", "LC_DIV 2" and "RC_DIV 2", whose respective positions are shown in FIG. 9 (c).

Thereafter, at Step S107, the effective positions of the light receiving areas C, L, R, LC and RC are each determined in accordance with the above mentioned information "C_DIV 2", "L_DIV 2", "R_DIV 2", "LC_DIV 2" and "RC_DIV 2", respectively, in the following manner.

That is, the center light receiving area C is determined by the width from the right end, i.e., the position of "C_DIV 2", to the left end. The position of the left end is determined by the amount "C_DIV 2"+(N−1), i.e., "1+(N−1)". The center light receiving area C can be expressed in the range defined by "C_DIV 2"~"C_DIV 2"+(N−1). The rest of the light receiving areas L, R, LC and RC are each determined in a similar manner, as follows.

The left light receiving area L is determined such that it ranges from the right end thereof, i.e., the position of "L_DIV 2", to the left end thereof by the amount "L_DIV 2"+(N−1), i.e., "1+(N−1)".

The right light receiving area R is determined such that it ranges from the right end thereof, i.e., the position of "R_DIV 2", to the left end thereof by the amount "R_DIV 2"+(N−1), i.e., "1+(N−1)".

The light receiving area LC is determined such that it ranges from the right end thereof, i.e., the position of "LC_DIV 2", to the left end thereof by the amount "LC_DIV 2"+(N−1), i.e., "1+(N−1)".

The light receiving area RC is determined such that it ranges from the right end thereof, i.e., the position of "RC_DIV 2", to the left end thereof by the amount "RC_DIV 2"+(N−1), i.e., "1+(N−1)".

After Step S107 the control proceeds to the subroutine "Default Detecting Operation" at Step S96.

At Step S93, if it is judged that the read sensor start number is not "DIV 2", the control proceeds to Step S94. At Step S94, the CPU 50 inputs, from the ROM 84, the positional information regarding the read sensor start number "DIV 3", i.e., "C_DIV 3", "L_DIV 3", "R_DIV 3", "LC DIV 3" and "RC_DIV 3", whose respective positions are shown in FIG. 9 (d).

Thereafter, at Step S95, the effective positions of the light receiving areas C, L, R, LC and RC are each determined in accordance with the above mentioned information "C_DIV 3", "L_DIV 3", "R_DIV 3", "LC_DIV 3" and "RC_DIV 3", respectively, in the following manner.

The range of the center light receiving area C is determined by the width from the right end, i.e., the position of "C_DIV 3", to the left end. The position of the left end is determined by the amount "C_DIV 3"+(N−1), i.e., "1+(N−1)". The center light receiving area C can be expressed in the range defined by "C_DIV 3"~"C_DIV 3"+(N−1). The rest of the light receiving areas L, R, LC and RC are each determined in a similar manner as follows.

The left light receiving area L is determined such that it ranges from the right end thereof, i.e., the position of "L_DIV 3", to the left end thereof by the amount "L_DIV 3"+(N−1), i.e., "1+(N−1)".

The right light receiving area R is determined such that it ranges from the right end thereof, i.e., the position of "R_DIV 3", to the left end thereof by the amount "R_DIV 3"+(N−1), i.e., "1+(N−1)".

The light receiving area LC is determined such that it ranges from the right end thereof, i.e., the position of "LC_DIV 3", to the left end thereof by the amount "LC_DIV 3"+(N−1), i.e., "1+(N−1)".

The light receiving area RC is determined such that it ranges from the right end thereof, i.e., the position of "RC_DIV 3", to the left end thereof by the amount "RC_DIV 3"+(N−1), i.e., "1+(N−1)".

After Step S95 the control proceeds to the subroutine "Default Detecting Operation" at Step S96.

It should be noted here, as shown in FIG. 9, the photographing lens is moved from the wide-angle extremity to the telephoto extremity, and the position of light receiving area C does not change at all. However, the positions of the light receiving areas L, LC, RC and R gradually shift toward a more central position, i.e., the number of overlapped light receiving elements increases. Note, however, that each light receiving area always consists of 36 light receiving elements.

In the subroutine "Default Detecting Operation" at Step S96, it is checked whether there is a default at each of the light receiving areas C, L, R, LC and RC, determined in accordance with the inputted sensor data, i.e., in accordance with the selected focal length of the photographing lens 13. In accordance with the result of this checking, a flag is set to correspond to each of the determined light receiving areas having no default. For instance, in the case where the light receiving areas LC and RC each have a default detected while the light receiving areas C, L and R each have no default detected, flags are respectively set corresponding to the light receiving areas C, L and R.

After Step S96 the control proceeds to a subroutine labelled "Arithmetic Operation" at Step S97. Here a subject distance value is calculated for each of the light receiving areas C, L, R, LC and RC, based on triangulation as explained above with reference to FIG. 6. Note that "subject distance value" is a value corresponding to the distance of "x−B" (i.e., the distance "x" minus the distance "B") shown in FIG. 6. The calculated subject distance values for each of the light receiving areas C, L, R, LC and RC are respectively CX, LX, RX, LCX and RCX. The larger the subject distance value CX, LX, RX, LCX or RCX is, the closer the corresponding subject to be photographed is located to the camera 11.

After Step S97 the control proceeds to Step S98. At Step S98, the reference subject distance value "X" is set "0" (zero) as an initial value.

Thereafter, at Step S99 it is checked if there is a default at the light receiving area C. Here it is checked whether a flag is set to correspond to the light receiving area C. The control proceeds to Step S100 if there is no default at the light receiving area C, or to Step S108 if there is a default at the light receiving area C.

At Step S100, it is checked if the subject distance value CX is larger than the reference subject distance value "X", and the control proceeds to Step S108 if the subject distance value CX is equal to or less than the reference subject distance value "X", or to Step S101 if the subject distance value CX is greater than the reference subject distance value "X". At Step S101, the reference subject distance value "X" is replaced by the subject distance value CX.

From Step S108 to S119, similar operations to those of Steps S99, S100 and S101 are performed for each of the remaining light receiving areas L, R, LC and RC.

That is, at Step S108 it is checked if there is a default at the light receiving area LC by checking if there is a flag set corresponding to the light receiving area LC, and the control proceeds to Step S109 if there is no default at the light receiving area LC, or to Step S111 if there is a default at the light receiving area LC.

At Step S109, it is checked if the subject distance value LCX is greater than the reference subject distance value "X", and the control proceeds to Step S111 if the subject distance value LCX is equal to or less than the reference subject distance value "X", or to Step S110 if the subject distance value LCX is greater than the reference subject distance value "X". At Step S110, the reference subject distance value "X" is replaced by the subject distance value LCX.

At Step S111 it is checked if there is a default at the light receiving area RC. Here it is checked whether a flag is set to correspond to the light receiving area RC, and the control proceeds to Step S112 if there is no default at the light receiving area RC, or to Step S114 if there is a default at the light receiving area RC.

At Step S112, it is checked if the subject distance value RCX is greater than the reference subject distance value "X", and the control proceeds to Step S114 if the subject distance value LCX is equal to or less than the reference subject distance value "X", or to Step S113 if the subject distance value RCX is greater than the reference subject distance value "X". At Step S113, the reference subject distance value "X" is replaced by the subject distance value RCX.

At Step S114 it is checked if there is a default at the light receiving area L by checking if a flag is set to correspond to the light receiving area L, and the control proceeds to Step S115 if there is no default at the light receiving area L, or to Step S117 if there is a default at the light receiving area L.

At Step S115, it is checked if the subject distance value LX is greater than the reference subject distance value "X", and the control proceeds to Step S117 if the subject distance value LX is equal to or less than the reference subject distance value "X", or to Step S116 if the subject distance value LX is greater than the reference subject distance value "X". At Step S116, the reference subject distance value "X" is replaced by the subject distance value LX.

At Step S117 it is determined if there is a default at the light receiving area R by checking if a flag is set corresponding to the light receiving area R. The control proceeds to Step S118 if there is no default at the light receiving area R, or the control returns to the calling routine if there is a default at the light receiving area R.

At Step S118, it is checked if the subject distance value RX is greater than the reference subject distance value "X", and the control returns if the subject distance value RX is equal to or less than the reference subject distance value "X", or to Step S119 if the subject distance value RX is greater than the reference subject distance value "X". At Step S119, the reference subject distance value "X" is replaced by the subject distance value RX.

According to the operations from Step S99 to Step S119, a certain value is obtained as the reference subject distance value "X". At Step S67 it is checked whether this obtained value is greater than "0" (zero). If the value is equal to or less than "0", it represents that a subject distance value usable for photography has not been calculated (i.e., an in-focus state cannot be obtained). In this case, the control proceeds to Step S71 to make the green light emitter 12b blink so as to inform the photographer that an in-focus state cannot be obtained.

Conversely at Step S67, when the obtained value is greater than "0", it represents that a subject distance value usable for photography has been calculated (i.e., an in-focus state has been obtained). In this case, the control proceeds to Step S68 to check whether or not a subject to be photographed is located too close to the camera 11 to be in-focus, and the control proceeds to Step S71 to make the green light emitter 12b blink if the subject is too close. If the subject is located at a distance where an in-focus state can be achieved, control proceeds to Step S69 and the green light emitter 12b is lit.

As can be understood from the foregoing, in the first embodiment of camera 11 having a distance measuring apparatus to which the first aspect of the present invention is applied, the actual light receiving area on each of the line sensors 27 and 28 is varied or adjusted in accordance with the variation in size of the AF frame in the finder view 47. Thus, according to the first embodiment the subject or subjects seen within th AF frame Fa, Fb, Fc or Fd is precisely focused in a reliable manner, and the chances of the distance of a subject, that a photographer does not intend to photograph, being mistakenly measured as the distance of a main subject are greatly reduced.

In the above first embodiment, the photographing optical system of the camera 11 is comprised of a zoom lens (i.e., the photographing lens 13). However, instead of a zoom lens, the camera 11 may be provided with a lens whose focal length can be selected from one of several predetermined focal lengths, e.g., a focal length selected from 38 mm, 50 mm or 70 mm. In this case, the number of predetermined sets of positions of the light receiving areas will correspond to the number of predetermined focal lengths (i.e., if there are three predetermined focal lengths, there will be three predetermined sets of positions), and there predetermined sets of positions may be prestored in the ROM 84, and one of the predetermined sets of positions may be selected to correspond to the selected, one of the focal lengths.

As can be seen from the foregoing, according to the camera having a distance measuring apparatus to which the first aspect of the present invention is applied, since the actual light receiving area on each of the pair of line sensors, is varied or adjusted in accordance with the variation in size of the AF frame seen in the finder view, a subject(s) seen within the AF frame is precisely and reliably focused, and furthermore, the chances of the distance of a subject, that a photographer does not intend to photograph, being mistakenly measured as the distance of a main subject are greatly reduced.

Another embodiment (i.e., a second embodiment) of a camera to which a distance measuring apparatus according to a second aspect of the present invention is applied will be discussed below. The camera of the second embodiment is similar to the camera of the first embodiment to which the first aspect of the present invention is applied, except in several respects. In the following discussion only that structure unique to the second embodiment will be discussed. The camera of the second embodiment will be explained below with reference to FIGS. 1~9, 11~13, 15, and 18~25.

Although the finder LCD 57 of the camera 11 of the first embodiment is capable of indicating only the AF frame Fa, Fb, Fc and Fd, as shown in FIG. 10, the finder LCD 57 of the camera 11 of the second embodiment is capable of further indicating, inside the AF frame Fa, four additional AF frames fa, fb, fc and fd (FIG. 18). As has already been mentioned before, the method for measuring a subject distance by selectively utilizing the light receiving areas C, LC and RC of the pair of line sensors 27 and 28 is referred to as "Spot AF". The AF frames fa, fb, fc and fd are effectively utilized when this "Spot AF" is carried out. This will be explained below.

When the Multi-AF mode is in operation, the activated AF frame shifts from Fa to Fd when the effective pattern of positions of the light receiving areas C, L, R, LC and RC changes from (a) to (d), as shown in FIG. 9. When the Spot AF mode is in operation, the activated AF frame shifts from fa to fd when the effective pattern of positions of the light receiving areas C, LC and RC changes from (a) to (d). With this structure, in either Multi-AF mode or Spot AF mode, the large difference in size between the actual light receiving range and the AF frame is almost completely reduced, and the photographer can thus visually confirm the actual size of the light receiving range at a currently selected focal length.

The main feature of the camera 11 of the second embodiment, that of adjusting parallax occurring between the distance measuring unit 18 and the photographing lens 13, will be explained below with reference to FIGS. 19 to 21.

In an ideal configuration, each optical axis of the pair of image forming lenses 25 and 26 of the distance measuring unit 18 is parallel to the optical axis O of the photographing lens 13, so as not to have a substantial parallax occurring between the distance measuring unit 18 and the photographing lens 13. In FIG. 19, the optical axes of the pair of image forming lenses 25 and 26 are shown as a single optical axis "$o_1$" for the purpose of illustration. However, in practice, it is often the case that the optical axis "$o_1$" is not precisely set parallel to the optical axis O of the photographing lens 13 and is thus off-set with respect thereto, due to, for example, a slight variation in size of each member or element of the camera 11. In FIG. 19, an optical axis "$o_1$" shown with short dotted lines, illustrates such an off-set optical axis.

According to the distance measuring apparatus to which the second aspect of the present invention is applied, the amount of parallax between the distance measuring unit 18 and the photographing lens 13 is measured and stored in the ROM 84, during the manufacturing process, as data peculiar to the camera 11. The CPU 50 selects, in accordance with the data stored in the ROM 84, a group of light receiving elements (i.e., photodiodes) to be used for the subject distance calculating operation from a large number of light receiving elements provided on each of the line sensors 27 and 28, to thereby adjust the parallax between the distance measuring unit 18 and the photographing lens 13 without actually moving the distance measuring unit 18 relative to the camera body. The details of this will be explained below.

Figure 19:
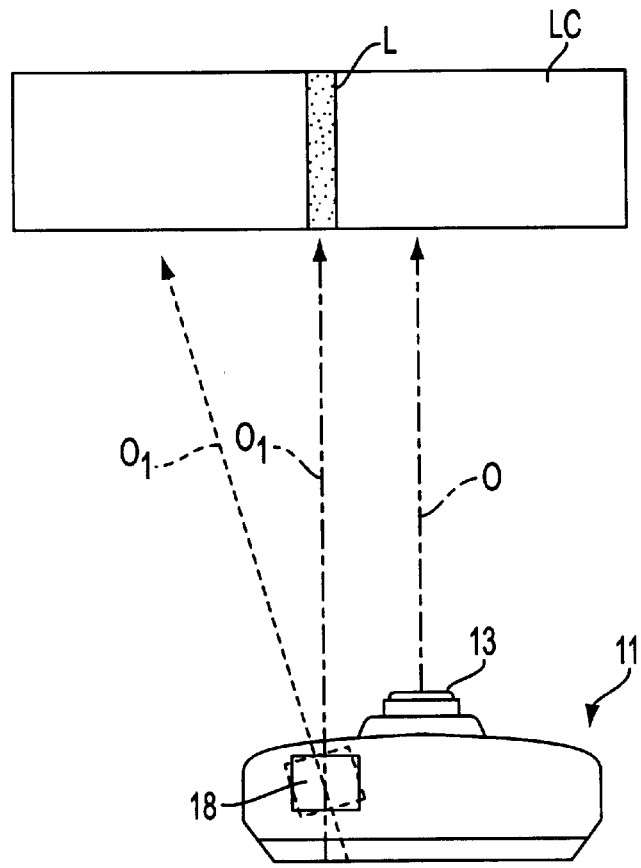
FIG. 19 is a schematic view showing a deviation of an optical axis of the distance measurement optical system of the distance measuring unit in a camera to which a distance measuring apparatus according to a second aspect of the present invention is applied.
Figure 20:
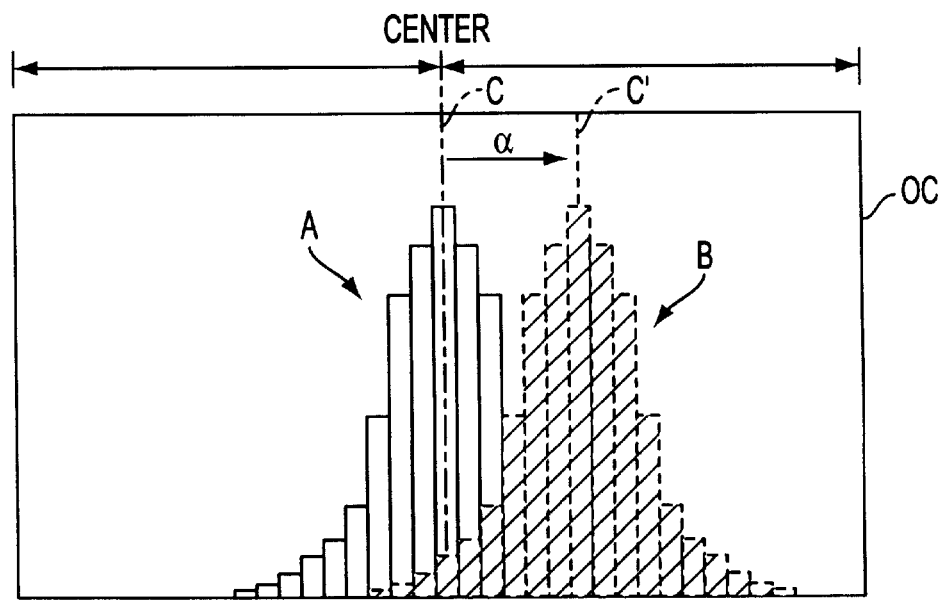
FIG. 20 is a diagram of output data of a distance measuring unit when the optical axis of the distance measurement optical system of the distance measuring unit is deviated from a reference optical axis in the camera shown in FIG. 19.

As shown in FIG. 20, light data received is outputted as data "A" in the center of an output chart OC, in the case where the optical axis "$o_1$" of the distance measuring unit 18 is parallel to the optical axis O of the photographing lens 13. However, in many cases, the same received light data is outputted as data "B", which is shifted from the center of the output chart OC due to the optical axis "$o_1$" being somewhat deviated from and off-set with respect to the optical axis O of the photographing lens 13, as illustrated in FIG. 19 by "$o_1$" having short dotted lines.

In the distance measuring apparatus to which the second aspect of the present invention is applied, the amount of parallax between the distance measuring unit 18 and the photographing lens 13 is regarded as the amount data "B" deviates from data "A", i.e., the deviation amount corresponding to the number of light receiving elements by which the light receiving areas outputting data "B" deviates from the light receiving areas outputting data "A", in the horizontal direction of the camera 11. This deviation amount is stored as data in the ROM 84 as a parallax adjusting amount α, and a subject distance measurement is carried out with the light receiving areas to be used on each of the line sensors 27 and 28 being shifted by the parallax adjusting amount α. In other words, a subject distance measurement is carried out under the condition that the center of each of the line sensors 27 and 28, which is to be generally located to correspond to the center C of the output chart OC, is shifted to correspond to the position C' which is shifted from the center C by the parallax adjusting amount α. The parallax adjusting amount α may be positive (+α) or negative (−α), according to the direction of deviation, i.e., when the light receiving areas outputting data "B" deviates from the light receiving areas outputting data "A" in one direction (e.g., in the right direction of FIG. 20) or in the other direction (e.g., in the left direction of FIG. 20), respectively.

The parallax adjusting amount α is measured during the manufacture of the camera 11 with a line chart LC, such as shown in FIG. 19. As shown in FIG. 19, when the parallax adjusting amount α is measured, the camera 11 is placed to face in the direction of the line chart LC in such a manner that the ideal optical axis "$o_1$", parallel to the optical axis O of the photographing lens 13, of the distance measuring unit 18 is aligned with a vertical center line L printed on the line chart LC.

In order to realize a correction of parallax between the distance measuring unit 18 and the photographing lens 13, since the effective light receiving areas C, L, R, LC and RC need to be shifted together in the right or left direction with respect to the center of each line sensor 27, 28, each line sensor 27, 28 is comprised of more than 128 light receiving elements, that is, in addition to the 128 light receiving elements provided in the center, a predetermined number of light receiving elements are added on each of the right and left edges of each line sensor 27, 28. For instance, each line sensor 27, 28 may be comprised of more than 148 light receiving elements. In this particular case, it will be understood that ten light receiving elements are added on each of the right and left edges of each line sensor 27, 28. The number of light receiving elements added on each of the right and left edges of each line sensor 27, 28 is predetermined so as to correspond to a maximum parallax adjusting amount $\pm\alpha_{max}$. In other words, the number of light receiving elements added on the left edge of each line sensor 27, 28 corresponds to a maximum parallax adjusting amount −α, and the number of light receiving elements added on the right edge of each line sensor 27, 28 corresponds to a maximum parallax adjusting amount +α.

FIGS. 21 (a), (b) each show line sensor 27 or 28 of the distance measuring unit 18 provided in the camera 11 to which the second aspect of the present invention is applied. In FIG. 21 (a), the oblique-lined portion on each of the right and left edges of the line sensor shows the additional light receiving elements, the number of which corresponds to the above mentioned maximum parallax adjusting amount $\pm\alpha_{max}$.

Figure 12:
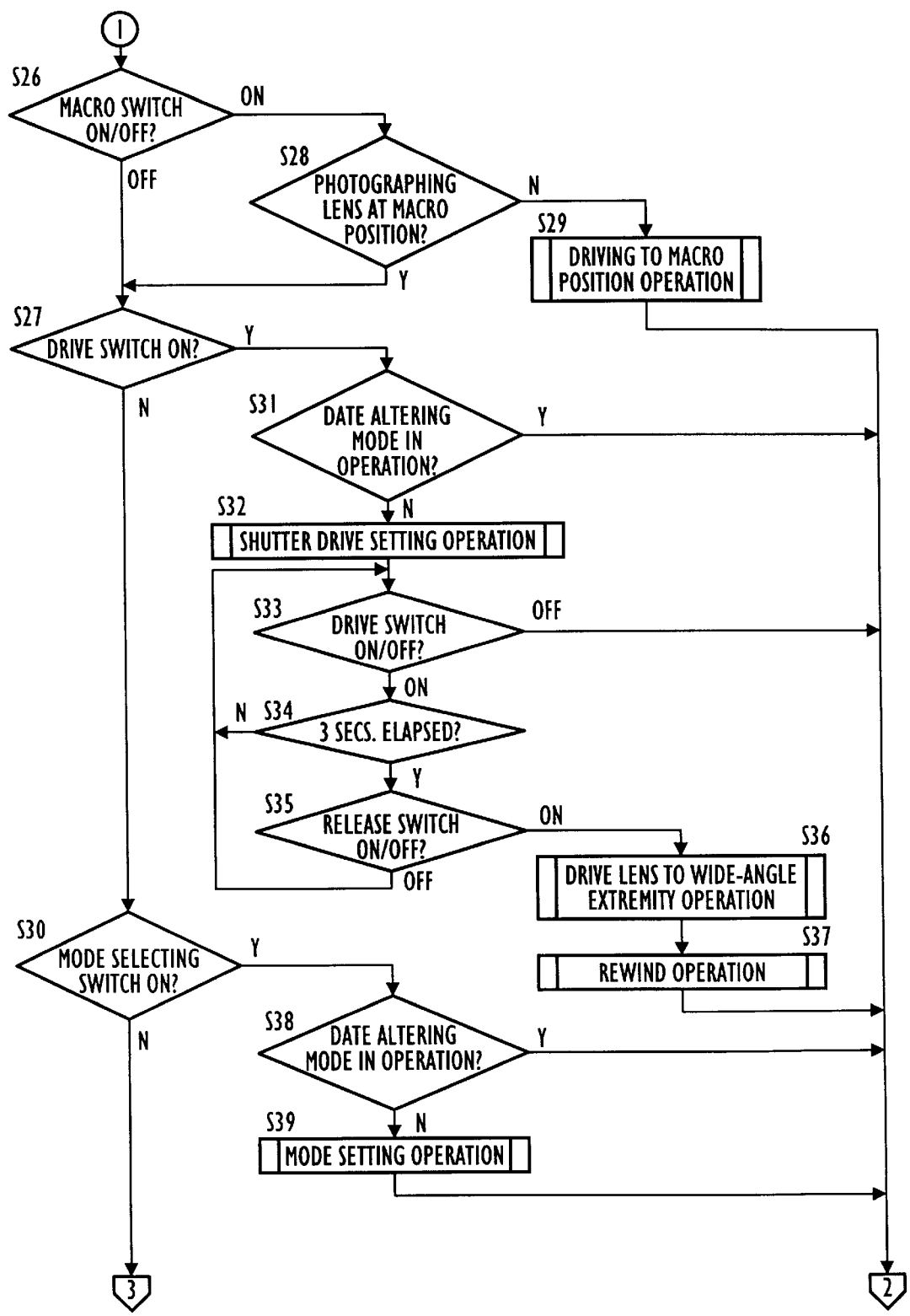

The operation of the camera 11 of the second embodiment having the above mentioned circuit structure will be hereinafter discussed. The main routine performed by the CPU 50 is the same as that of the camera 11 of the first embodiment which is shown in FIGS. 11 to 13.

Figure 22:
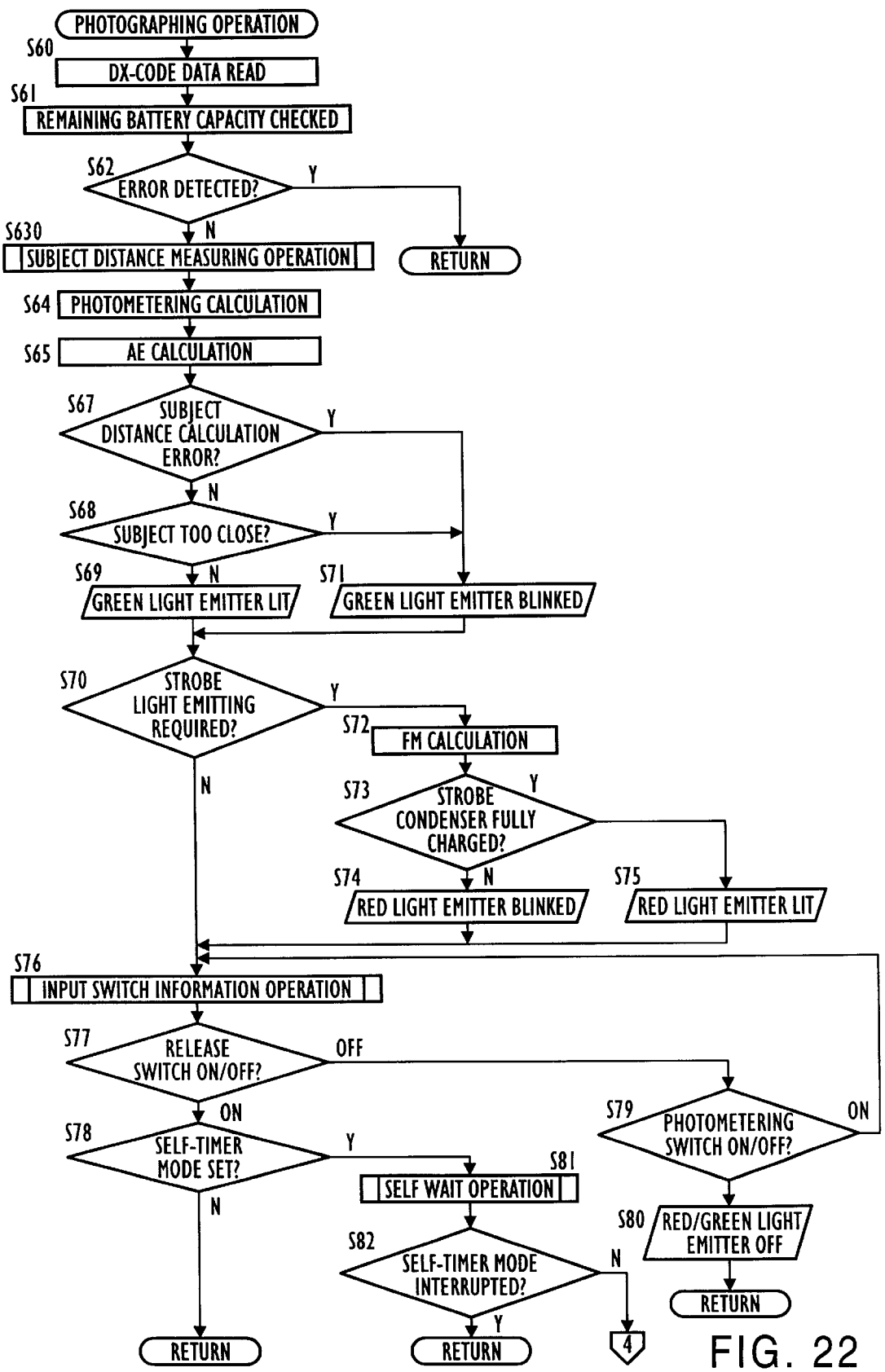
FIG. 22 is a flow chart showing a "Photographing Operation" subroutine for a photographing operation in a camera to which a distance measuring apparatus according to the second or fourth aspect of the present invention is applied.
Figure 23:
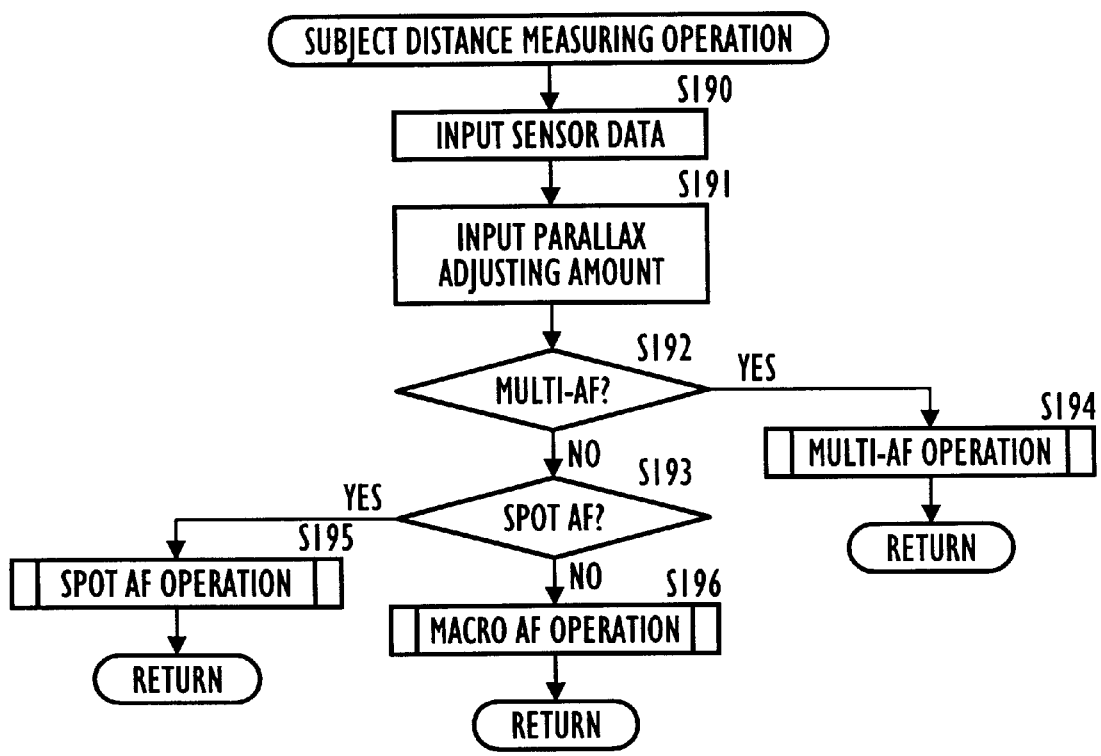
FIG. 23 is a flow chart showing a "Subject Distance Measuring Operation" subroutine for a camera to which a distance measuring apparatus according to the second aspect of the present invention is applied.

FIG. 22 shows a "Photographing Operation" subroutine of the camera 11 of the second embodiment. This subroutine is the same as that of the camera 11 of the first embodiment shown in FIG. 14, except that this second embodiment has a subroutine labelled "Subject Distance Measuring Operation" at Step S630 before Step S64 instead of the subroutine "Multi-AF Operation" in the first embodiment. Accordingly, in the second embodiment, when it is checked that there is no error at Step S62, the control proceeds to the subroutine "Subject Distance Measuring Operation" at Step S630. This subroutine is shown in FIG. 23.

At Step S190, the CPU 50 inputs the sensor data outputted from the distance measuring unit 18, and subsequently, the CPU 50 inputs the parallax adjusting amount +α or −α, stored in the ROM 84 during manufacturing at Step S191. Thereafter, it is checked at Step S192 whether or not the Multi-AF mode is selected, and the control proceeds to a subroutine labelled "Multi-AF Operation" at Step S194 if the Multi-AF mode is selected, or to Step S193 if not selected.

At Step S193 it is checked whether or not the Spot AF mode is selected, and the control proceeds to a subroutine labelled "Spot AF Operation" at Step S195 if the Spot AF mode is selected, or to a subroutine labelled "Macro AF Operation" at Step S196 if not selected.

Figure 24:
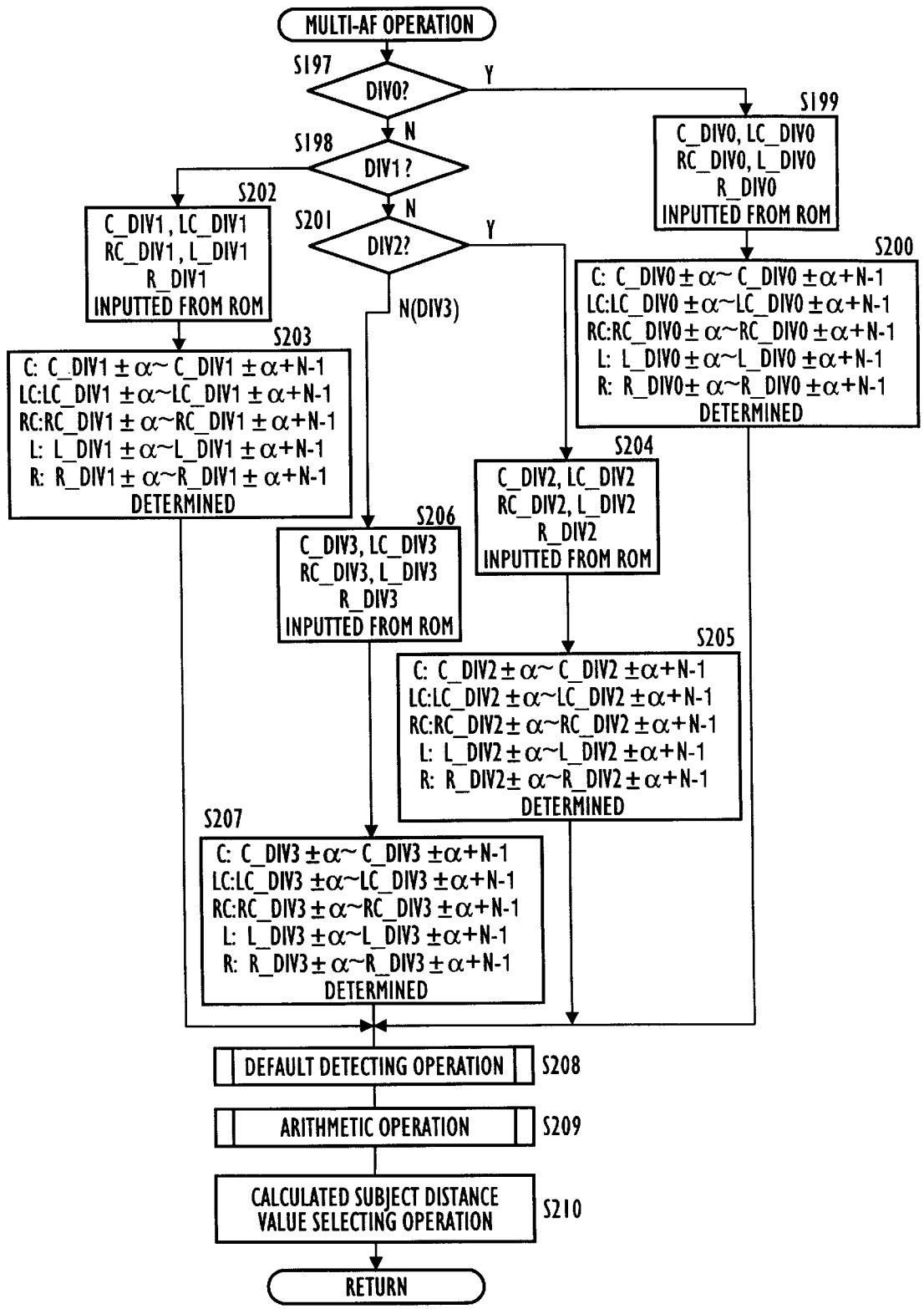
FIG. 24 is a flow chart showing a "Multi-AF Operation" subroutine for a Multi-AF operation in a camera to which a distance measuring apparatus according to the second aspect of the present invention is applied.

FIG. 24 shows the subroutine "Multi-AF Operation" at Step S194.

The four sensor start numbers, i.e., DIV 0, DIV 1, DIV 2 and DIV 3, which respectively correspond to the first, second, third and fourth ranges of the zooming range of the photographing lens 13, each determine the position of each of the light receiving areas C, L, R, LC and RC, and are stored in the RAM 83, in accordance with the information read out from the lens information reading circuit 78 when the zooming operation or the macro operation is performed in accordance with the operation at Step S10, S13 or S26.

In the subroutine "Multi-AF Operation" at Step S194, under the condition that one set of the light receiving areas C, L, R, LC and RC to be used, which has one of the four predetermined sets of positions (a), (b), (c) and (d) (FIG. 9), has already been selected or determined in accordance with the data of the above mentioned four sensor start numbers and the four predetermined sets of positions (a), (b), (c) and (d) stored in the ROM 84, it is checked whether or not there is a default (i.e., the state in which a subject distance value cannot be measured) at any of the light receiving areas C, L, R, LC and RC, and among the subject distance values obtained with the light receiving areas each having no default, one subject distance value which is within a predetermined focus-capable distance range and closest to the camera 11 is selected to be used for focusing.

In the subroutine "Multi-AF Operation" at Step S194, the sensor start number currently stored in the RAM 83 is read and it is checked whether the read sensor start number is "DIV 0" or not at Step S197. The control proceeds to Step S199 if it is judged that the read sensor start number is "DIV 0". At Step S199, the CPU 50 inputs, from the ROM 84, the information regarding the read sensor start number "DIV 0", i.e., "C_DIV 0", "L_DIV 0", "R_DIV 0", "LC_DIV 0" and "RC_DIV 0", whose respective positions are shown in FIG. 9 (a).

Each positional information "C_DIV 0", "L_DIV 0", "R DIV 0", "LC_DIV 0" and "RC_DIV 0" represents the position of the light receiving element positioned at one end (the right end in FIG. 9) of the corresponding light receiving area, which consists of 36 light receiving elements.

At Step S200, the CPU 50 inputs the parallax adjusting amount α stored in the ROM 84 and the positional information "C_DIV 0", "L_DIV 0", "R_DIV 0", "LC_DIV 0" and "RC_DIV 0", having been input at Step S199, are each adjusted in accordance with the input parallax adjusting amount α, and subsequently, the effective positions of the light receiving areas C, L, R, LC and RC are each determined in accordance with the above mentioned adjusted information "C_DIV 0", "L_DIV 0", "R_DIV 0", "LC_DIV 0" and "RC_DIV 0", respectively, in the following manner.

The range of the center light receiving area C is determined by the width from the right end, i.e., the position "C_DIV 0"±α, to the left end. The position of the left end is determined by the amount "C_DIV 0±α+(N−1)", i.e., "1±α+(N−1)". Here, as mentioned previously, "N" represents the predetermined number of light receiving elements of which each of the light receiving areas C, L, R, LC and RC consists, i.e., 36. When the parallax adjusting amount α is a positive value, the value+α is added to the positional information. When the parallax adjusting amount α is a negative value, the value −α is subtracted from the positional information.

The center light receiving area C can be expressed in the range defined by "C_DIV 0±α−C_DIV 0±α+(N−1)". The rest of the light receiving areas L, R, LC and RC are each determined in a similar manner.

The left light receiving area L is determined such that it ranges from the right end thereof, i.e., the position of "L_DIV 0±α", to the left end thereof by the amount "L_DIV 0±α+(N−1)", i.e., "1±α+(N−1)".

The right light receiving area R is determined such that it ranges from the right end thereof, i.e., the position of "R_DIV 0±α", to the left end thereof by the amount "R_DIV 0±α+(N−1)", i.e., "1±α+(N−1)".

The light receiving area LC is determined such that it ranges from the right end thereof, i.e., the position of "LC_DIV 0±α", to the left end thereof by the amount "LC DIV 0±α+(N−1)", i.e., "1±α+(N−1)".

The light receiving area RC is determined such that it ranges from the right end thereof, i.e., the position of "RC_DIV 0±α", to the left end thereof by the amount "RC DIV 0±α+(N−1)", i.e., "1±α+(N−1)".

The arithmetic operating portion 31 provided in the distance measuring unit 18 sends to the CPU 51, in sequence, the sensor data that is outputted from each of the light receiving elements located on each of the light receiving areas C, L, R, LC and RC, in accordance with the signals outputted from the CPU 50. For instance, in the case when it is necessary for the CPU 50 to receive a series of sensor data from the right light receiving area R ranging from the (9±α)th light receiving element (counted from the right end of the total 128 light receiving elements) to the left end of the right light receiving area R, the arithmetic operating portion 31 sends in sequence the sensor data outputted from each of the 36 light receiving elements ranging from the above mentioned (9±α)th light receiving element to the (9±α+35)th light receiving element, i.e., 9±α+(36−1).

After Step S200, the control proceeds to a subroutine labelled "Default Detecting Operation" at Step S208 in which it is checked whether there is a default at each of the light receiving areas C, L, R, LC and RC in accordance with the inputted sensor data.

At Step S197, if it is judged that the read sensor start number is not "DIV 0", the control proceeds to Step S198 to check if the read sensor start number is "DIV 1". If it is judged that the read sensor start number is "DIV 1", the control proceeds to Step S202. At Step S202, the CPU 50 inputs from the ROM 84, the positional information regarding the read sensor start number "DIV 1", i.e., "C DIV 1", "L_DIV 1", "R_DIV 1", "LC_DIV 1" and "RC_DIV 1", whose respective positions are shown in FIG. 9 (b).

Thereafter, at Step S203, the CPU 50 inputs the parallax adjusting amount α stored in the ROM 84 and the positional information "C_DIV 1", "L_DIV 1", "R_DIV 1", "LC DIV 1" and "RC_DIV 1", having been input at Step S202, are each adjusted in accordance with the input parallax adjusting amount α. Subsequently, the effective positions of the light receiving areas C, L, R, LC and RC are each determined in accordance with the above mentioned adjusted information "C_DIV 1", "L_DIV 1", "R_DIV 1", "LC DIV 1" and "RC_DIV 1", respectively, in the following manner.

The range of the center light receiving area C is determined by the width from the right end, i.e., the position "C_DIV 1"±α, to the left end. The position of the left end is determined by the amount "C_DIV 1±α+(N−1)", i.e., "1±α+(N−1)". The center light receiving area C can be expressed in the range defined by "C_DIV 1±α~C_DIV 1±α+(N−1)". The rest of the light receiving areas L, R, LC and RC are each determined in a similar manner.

The left light receiving area L is determined such that it ranges from the right end thereof, i.e., the position of "L_DIV 1±α", to the left end thereof by the amount "L_DIV 1±α+(N−1)", i.e., "1±α+(N−1)".

The right light receiving area R is determined such that it ranges from the right end thereof, i.e., the position of "R_DIV 1±α", to the left end thereof by the amount "R_DIV 1±α+(N−1)", i.e., "1±α+(N−1)".

The light receiving area LC is determined such that it ranges from the right end thereof, i.e., the position of "LC_DIV 1±α", to the left end thereof by the amount "LC_DIV 1±α+(N−1)", i.e., "1±α+(N−1)".

The light receiving area RC is determined such that it ranges from the right end thereof, i.e., the position of "RC_DIV 1±α", to the left end thereof by the amount "RC_DIV 1±α+(N−1)", i.e., "1±α+(N−1)".

After Step S203, the control proceeds to a subroutine labelled "Default Detecting Operation" at Step S208.

At Step S198, if it is judged that the read sensor start number is not "DIV 1", the control proceeds to Step S201 to check if the read sensor start number is "DIV 2". If it is judged that the read sensor start number is "DIV 2", the control proceeds to Step S204. At Step S204, the CPU 50 inputs, from the ROM 84, the positional information regarding the read sensor start number "DIV 2", i.e., "C DIV 2", "L_DIV 2", "R_DIV 2", "LC_DIV 2" and "RC_DIV 2", whose respective positions are shown in FIG. 9 (c).

Thereafter, at Step S205, the CPU 50 inputs the parallax adjusting amount α stored in the ROM 84 and the positional information "C_DIV 2", "L_DIV 2", "R_DIV 2", "LC DIV 2" and "RC_DIV 2" having been input at Step S204 are each adjusted in accordance with the input parallax adjusting amount α. Subsequently, the effective positions of the light receiving areas C, L, R, LC and RC are each determined in accordance with the above mentioned adjusted information "C_DIV 2", "L_DIV 2", "R_DIV 2", "LC DIV 2" and "RC_DIV 2", respectively, in the following manner.

The range of the center light receiving area C is determined by the width from the right end, i.e., the position "C_DIV 2"±α, to the left end. The position of the left end is determined by the amount "C_DIV 2±α+(N−1)", i.e., "1±α+(N−1)". The center light receiving area C can be expressed in the range defined by "C_DIV 2±α~C_DIV 2±α+(N−1)". The rest of the light receiving areas L, R, LC and RC are each determined in a similar manner.

The left light receiving area L is determined such that it ranges from the right end thereof, i.e., the position of "L_DIV 2±α", to the left end thereof by the amount "L_DIV 2±α+(N−1)", i.e., "1±α+(N−1)".

The right light receiving area R is determined such that it ranges from the right end thereof, i.e., the position of "R_DIV 2±α", to the left end thereof by the amount "R_DIV 2±α+(N−1)", i.e., "1±α+(N−1)".

The light receiving area LC is determined such that it ranges from the right end thereof, i.e., the position of "LC_DIV 2±α", to the left end thereof by the amount "LC DIV 2±α+(N−1)", i.e., "1±α+(N−1)".

The light receiving area RC is determined such that it ranges from the right end thereof, i.e., the position of "RC_DIV 2±α", to the left end thereof by the amount "RC DIV 2±α+(N−1)", i.e., "1±α+(N−1)".

After Step S205, the control proceeds to a subroutine labelled "Default Detecting Operation" at Step S208.

At Step S201, if it is judged that the read sensor start number is not "DIV 2", the control proceeds to Step S206. At Step S206, the CPU 50 inputs, from the ROM 84, the positional information regarding the read sensor start number "DIV 3", i.e., "C_DIV 3", "L_DIV 3", "LC DIV 3" and "RC_DIV 3", whose respective positions are shown in FIG. 9 (d).

Thereafter, at Step S207, the CPU 50 inputs the parallax adjusting amount α stored in the ROM 84 and the positional information "C_DIV 3", "L_DIV 3", "R_DIV 3", "LC DIV 3" and "RC_DIV 3", having been input at Step S206, are each adjusted in accordance with the input parallax adjusting amount α. Subsequently, the effective positions of the light receiving areas C, L, R, LC and RC are each determined in accordance with the above mentioned adjusted information "C_DIV 3", "L_DIV 3", "R_DIV 3", "LC DIV 3" and "RC_DIV 3", respectively in the following manner.

The range of the center light receiving area C is determined by the width from the right end, i.e., the position "C_DIV 3"±α, to the left end. The position of the left end is determined by the amount "C_DIV 3±α+(N−1)", i.e., "1±α+(N−1)". The center light receiving area C can be expressed in the range defined by "C_DIV 3±α~C_DIV 3±α+(N−1)". The rest of the light receiving areas L, R, LC and RC are each determined in a similar manner.

The left light receiving area L is determined such that it ranges from the right end thereof, i.e., the position of "L_DIV 3±α", to the left end thereof by the amount "L_DIV 3±α+(N−1)", i.e., "1±α+(N−1)".

The right light receiving area R is determined such that it ranges from the right end thereof, i.e., the position of "R_DIV 3±α", to the left end thereof by the amount "R_DIV 3±α+(N−1)", i.e., "1±α+(N−1)".

The light receiving area LC is determined such that it ranges from the right end thereof, i.e., the position of "LC_DIV 3±α", to the left end thereof by the amount "LC DIV 3±α+(N−1)", i.e., "1±α+(N−1)".

The light receiving area RC is determined such that it ranges from the right end thereof, i.e., the position of "RC_DIV 3±α", to the left end thereof by the amount "RC DIV 3±α+(N−1)", i.e., "1±α+(N−1)".

After Step S207, the control proceeds to a subroutine labelled "Default Detecting Operation" at Step S208.

In the subroutine "Default Detecting Operation" at Step S208, it is checked whether there is a default at each of the light receiving areas C, L, R, LC and RC, determined in accordance with the inputted sensor data, i.e., in accordance with the selected focal length of the photographing lens 13. In accordance with the result of this checking, a flag is set to correspond to each of the determined light receiving areas having no default. For instance, in the case where the light receiving areas LC and RC each have a default detected while the light receiving areas C, L and R each have no default detected, flags are respectively set corresponding to the light receiving areas C, L and R.

After Step S208 the control proceeds to a subroutine labelled "Arithmetic Operation" at Step S209. Here a subject distance value is calculated for each of the light receiving areas C, L, R, LC and RC. The calculated subject distance values for each of the light receiving areas C, L, R, LC and RC are respectively CX, LX, RX, LCX and RCX. The larger the subject distance value CX, LX, RX, LCX or RCX is, the closer the corresponding subject to be photographed is located to the camera 11.

Thereafter, the control proceeds to a subroutine labelled "Calculated Subject Distance Value Selecting Operation" at Step S210. This subroutine includes the same steps as Steps S98 to S119 in the subroutine "Multi-AF Operation" shown in FIGS. 16 and 17. In the subroutine "Calculated Subject Distance Value Selecting Operation", a certain value is obtained as the reference subject distance value "X". After this subroutine is completed the control returns.

Figure 25:
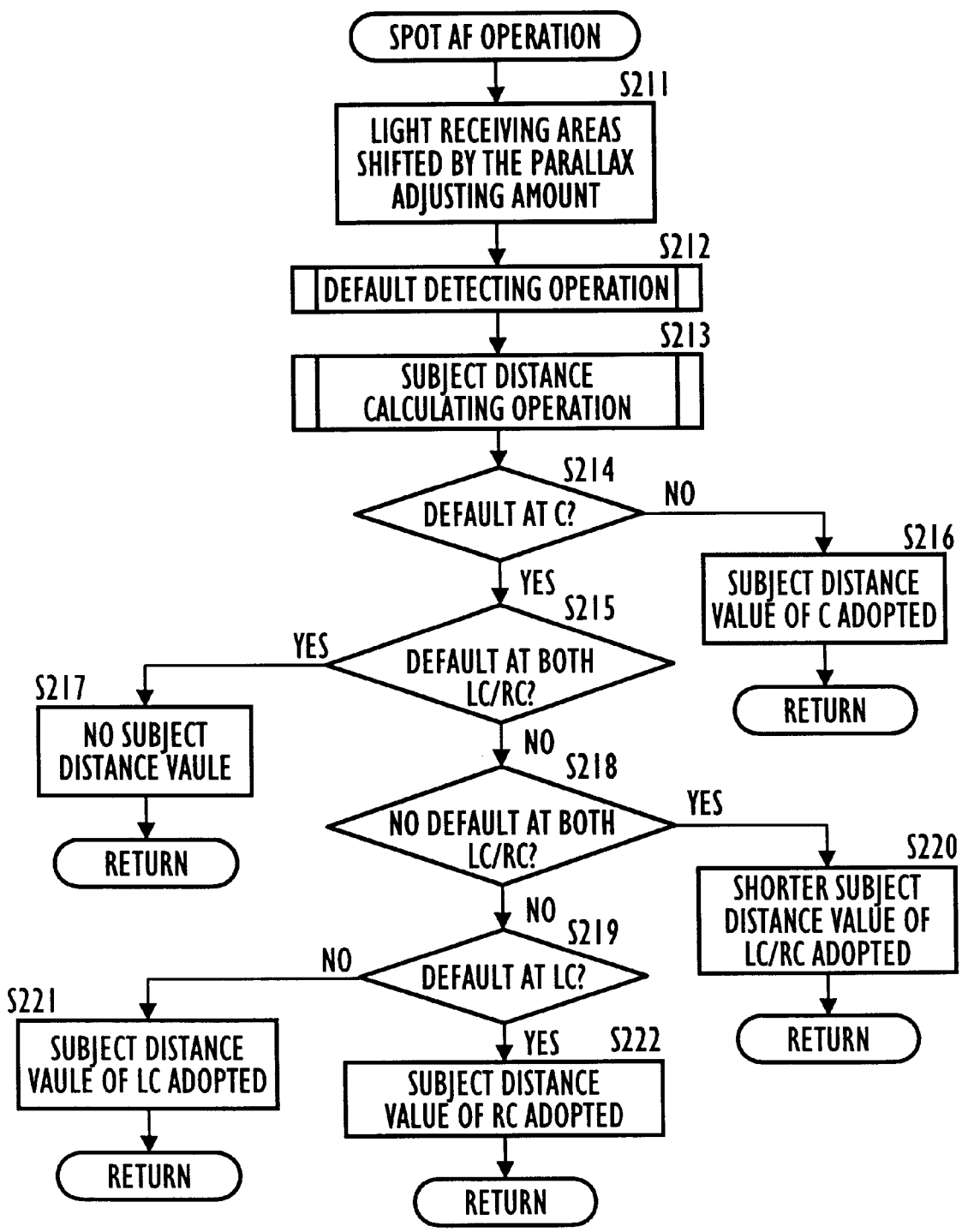
FIG. 25 is a flow chart showing a "Spot AF" subroutine for a spot AF operation in a camera to which a distance measuring apparatus according to the second aspect of the present invention is applied.

The subroutine "Spot AF Operation" at Step S195 will be explained with reference to FIG. 25. In this subroutine, each of the light receiving areas C, L, R, LC and RC, each having been set at respective positions of one of four sets of positions (a), (b), (c) and (d) shown in FIG. 9 in accordance with a set focal length, are shifted by the parallax adjusting amount α, and it is checked whether or not there is a default (i.e., the state in which a subject distance cannot be measured) at any of the light receiving areas C, L, R, LC and RC. Among the subject distance values obtained with the light receiving areas each having no default, one subject distance value, which is within a predetermined focus-capable distance range and closest to the camera 11, is selected to be used for focusing.

When the control enters the subroutine "Spot AF Operation" at Step S195, the light receiving areas C, L, R, LC and RC are each shifted by the parallax adjusting amount α, read out from the ROM 84, and set to be used for Spot AF at Step S211. Thereafter, the control proceeds to a subroutine labelled "Default Detecting Operation" at Step S212 in which it is checked if there is a default at each of the light receiving areas C, LC and RC in accordance with the inputted sensor. Subsequently, the control proceeds to a subroutine labelled "Subject Distance Calculating Operation" at Step S213, in which a subject distance value of each of the light receiving areas C, LC and RC is calculated.

After Step S213, the control proceeds to Step S214 to check if there is a default at the center light receiving area C, and the control proceeds to Step S216 if there is no default, or to Step S215 if there is a default. At Step S216, the subject distance value of the center light receiving area C is adopted as a subject distance value to be used for photographing. At Step S215, it is checked if there is a default at both the light receiving areas LC and RC, and the control proceeds to Step S217 if both light receiving areas have a default, or to Step S218 if not. At Step S217 it is judged that there is no subject distance value, i.e., no subject distance value can be obtained, and the control returns.

At Step S218 it is checked if there is no default at any of the light receiving areas LC and RC, and the control proceeds to Step S220 if there is no default, or to Step S219 if there is a default at either the light receiving area LC or RC. At Step S220, the subject distance value of the light receiving areas LC and RC which is closer to the camera 11 is adopted to be used for photographing.

At Step S219 it is checked if there is a default at the light receiving area LC, and the control proceeds to Step S222 if there is a default, or to Step S221 if there is no default. At Step S222 the subject distance value of the light receiving area RC is adopted as a subject distance value to be used for photographing while the subject distance value of the light receiving area LC is adopted as a subject distance value to be used for photographing, at Step S221. The control returns after the completion of either Step S221 or Step S222.

As can be understood from the foregoing, according to the camera 11 having a distance measuring apparatus to which the second aspect of the present invention is applied, the parallax between the the distance measuring unit 18 and the photographing lens 13 can be adjusted without actually moving the distance measuring unit 18 relative to the camera body for adjustment. Accordingly, the adjusting operations can be simplified.

Another embodiment (i.e., a third embodiment) of a camera to which a distance measuring apparatus according to a third aspect of the present invention is applied will be discussed below. The camera of the third embodiment is similar to the camera of the first and second embodiments, except in several respects, and it is only to these differences that the following discussion will cover. The camera of the third embodiment will be explained below in reference to FIGS. 1~9, 11~13, 15~18, 26~31.

Although the finder LCD 57 of the camera 11 of the first embodiment is capable of indicating only the AF frames Fa, Fb, Fc and Fd, as shown in FIG. 10, the finder LCD 57 of the camera 11 of this third embodiment is the same as that of the camera 11 of the second embodiment, that is, capable of further indicating, inside the AF frame Fa, four additional AF frames fa, fb, fc and fd. The AF frames fa, fb, fc and fd are effectively utilized when the "Spot AF" is carried out. The control of the finder LCD 57 in the Spot AF mode in the camera 11 of this third embodiment is identical to that in the camera 11 of the second embodiment.

The camera 11 includes a macro photography mode (i.e., Macro mode) in addition to a regular photography mode. The Macro mode may be selected by a photographer operating the macro switch 46. In the camera 11 of the third embodiment, the AF frame fd is not only used as an AF frame corresponding to the telephoto extremity in the Spot AF mode, but also an AF frame used in the Macro mode. When the Macro mode is selected, only the AF frame fd is activated to become visible, i.e., turned ON, and the rest of the AF frames Fa, Fb, Fd, Fc, fa, fb and fc are all turned OFF.

It should be noted that the optical axis of the finder provided in the camera 11 has been adjusted to be parallel to the optical axis O of the photographing lens 13, so as not to have a substantial parallax occurring between the finder and the photographing lens 13.

The main feature of the camera 11 of the third embodiment, i.e., for correcting a difference between the position of the AF frame fd in the finder view 47 and the actual light receiving area of each of the line sensors 27 and 28 when the Macro mode is selected, will be explained below.

Figure 26:
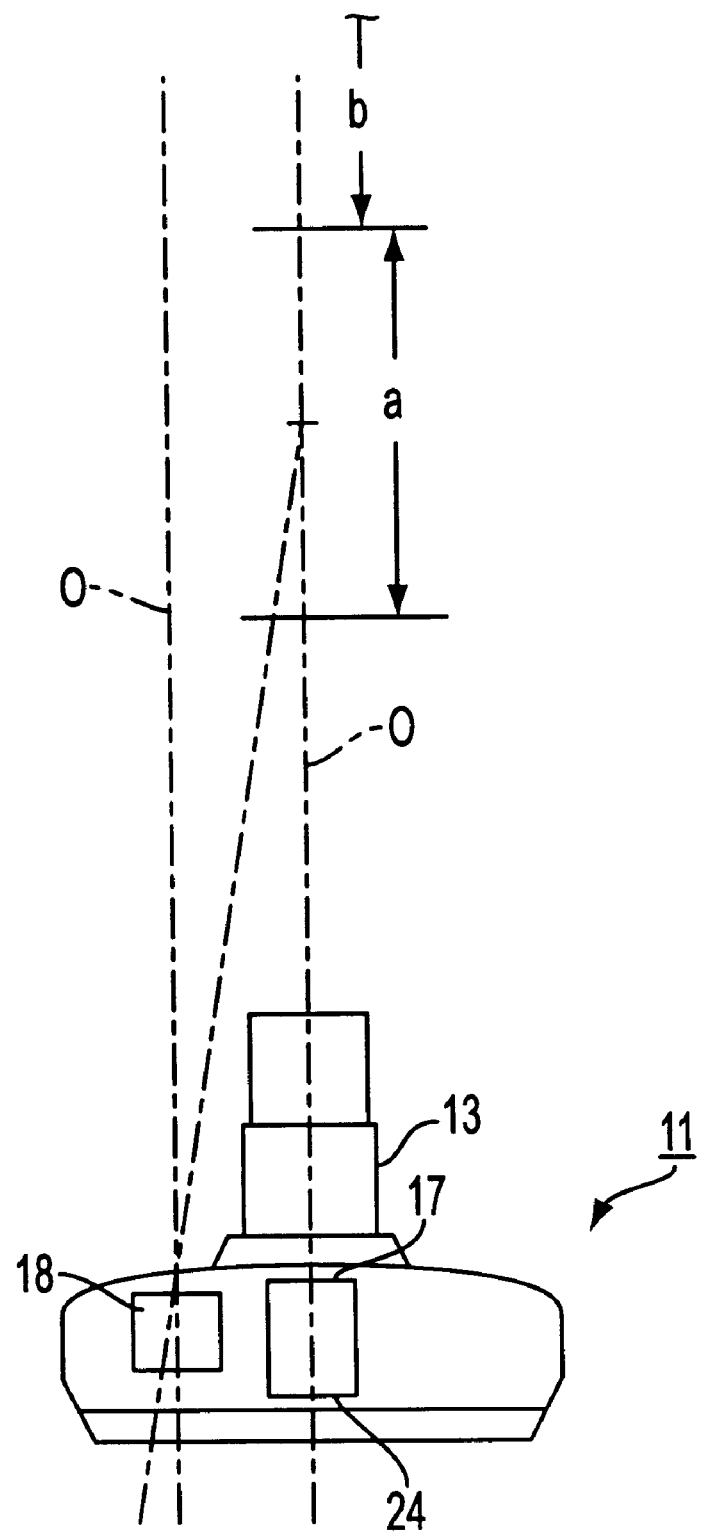
FIG. 26 is a schematic view showing a deviation of an optical axis of a distance measuring unit in a camera to which a distance measuring apparatus according to the third aspect of the present invention is applied, in a macro photographing mode.

The distance measuring unit 18 is generally fixed to the camera 11 so that each optical axis of the pair of image forming lenses 25 and 26 of the distance measuring unit 18 may be parallel to the optical axis O of the photographing lens 13, as shown in FIG. 26. In FIG. 26, the optical axes of the pair of image forming lenses 25 and 26 are shown as a single optical axis "o" for the purpose of illustration. Due to this configuration, a large difference or gap occurs between the position on each of the line sensors 27 and 28 on which the subject light is incident when the subject is located apart from the camera 11 by a predetermined distance, e.g., in a range "b" of the regular photography mode shown in FIG. 26, and when the subject is located quite close to the camera 11, e.g., in a range "a" of the Macro mode shown in FIG. 26. Therefore, in a conventional camera, the position of an AF frame in a finder view and the light receiving area of each of the two line sensors do not properly correspond to each other, especially in the Macro mode.

In order to overcome the aforementioned problem, according to the third aspect of the present invention, the amount of variation or shift of two light receiving areas, i.e., the first light receiving area on each of the line sensors 27 and 28 on which light of the subject located within the range "b" of the regular photography mode is incident and the second light receiving area on each of the line sensors 27 and 28 on which light of the subject located within the range "a" of the Macro mode is incident, is stored in the ROM 84, during manufacturing, as a variation adjusting data (i.e., information C_MAC, LC_MAC, RC_MAC regarding the sensor start number). When the photography mode is changed from the regular photography mode to the Macro mode, a group of light receiving elements (i.e., photodiodes) to be used for macro photography is selected among a large number of light receiving elements in each of the line sensors 27 and 28, in accordance with the variation adjusting data stored in the ROM 84. Namely, when the Macro mode is selected by a photographer using the macro switch 46, the CPU 50 automatically changes the light receiving areas of each line sensor 27, 28 which are used for the regular photography mode to those for the Macro mode, which is illustrated in FIG. 27.

Figure 27:
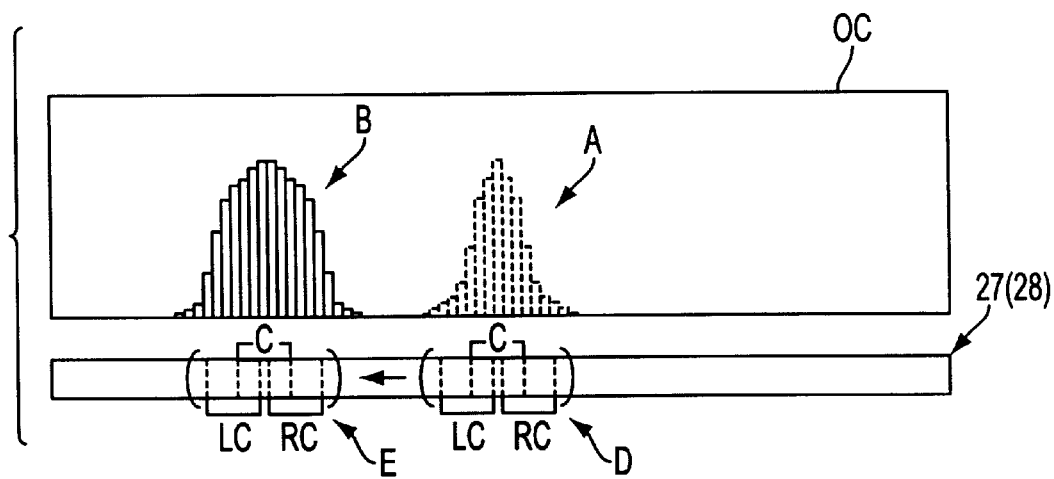
FIG. 27 is a diagram of output data of a distance measuring unit in a normal photographing mode and in a macro photographing mode in the camera shown in FIG. 26.

In the regular photography mode, the light receiving areas C, LC and RC are respectively located at their normal positions as a group of light receiving areas "D" shown in FIG. 27. When the light receiving areas C, LC and RC of the group D receive subject light, the received light data is outputted as data "A" about the center of the output chart OC. However, in the Macro photographing mode, the light receiving areas C, LC and RC are respectively located at a position shifted to the left of the normal position by a predetermined amount, as a group of light receiving areas "E", shown in FIG. 27. The predetermined amount of shift corresponds to the amount of parallax between the optical axis "o" of the line sensors 27, 28 and the optical axis of the photographing lens 13. When the light receiving areas C, LC, RC of the group E receive subject light, the received light data is thus outputted as data "B" at a position shifted to the left of data "A". In other words, as shown in FIG. 28, the center of an effective set of light receiving areas C, LC and RC used for the regular photography mode that is located on a "G" line in the regular photography mode is shifted to the left by a predetermined number of light receiving elements.

Figure 28:
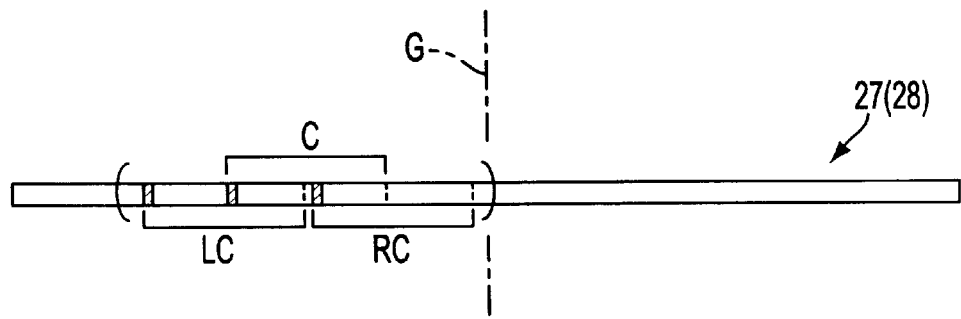
FIG. 28 is a conceptual view of light receiving areas when in a macro photographing mode in the camera shown in FIG. 26.

In either FIG. 27 or 28, only three light receiving areas C, LC and RC are shown on each line sensor 27, 28. This is because Spot AF is performed for measuring a subject distance in the Macro mode, thus the other light receiving areas L and R are not used in the Macro mode.

The operation of the camera 11 of the third embodiment having the above mentioned circuit structure will be hereinafter discussed. The main routine performed by the CPU 50 is the same as that of the camera 11 of the first embodiment which is shown in FIGS. 11 to 13.

Figure 29:
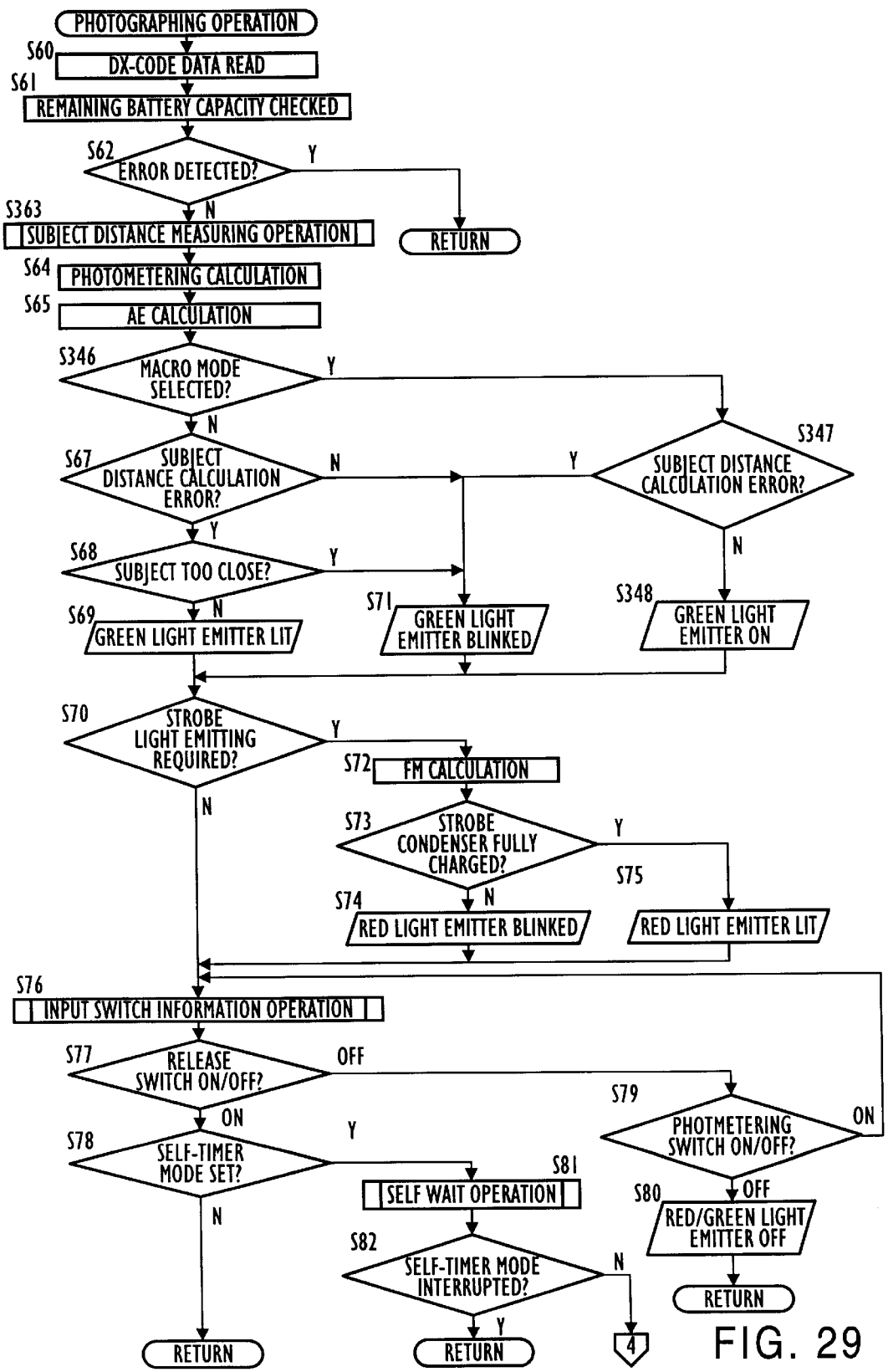
FIG. 29 is a flow chart showing a "Photographing Operation" subroutine for a photographing operation in the camera to which the distance measuring apparatus according to the third aspect of the present invention is applied.

In the camera 11 of the third embodiment, the subroutine "Photographing Operation" of FIG. 14 is replaced by that shown in FIG. 29. Steps common to both flow charts are designated by like numerals and explanations for these steps are omitted (on the whole).

Figure 30:
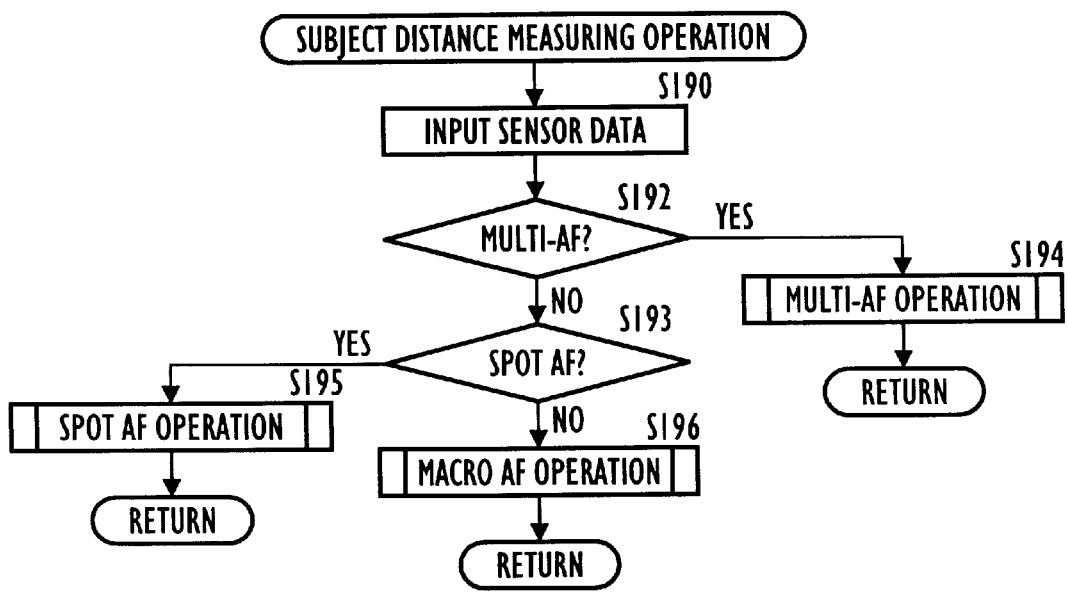
FIG. 30 is a flow chart showing a "Subject Distance Measuring Operation" subroutine for a camera to which a distance measuring apparatus according to the third or fourth aspect of the present invention is applied.

Prior to Step S64 a subroutine labelled "Subject Distance Measuring Operation" is carried out at Step S363. This subroutine is shown in FIG. 30 and is substantially the same as the subroutine "Subject Distance Measuring Operation" of the camera 11 of the second embodiment shown in FIG. 23, except that the subroutine shown in FIG. 30 does not have Step S191. Steps common to both flow charts have like reference numerals and explanations for these steps are omitted. After Step S363, the control proceeds to Step S64, then to Step S65, and subsequently, to Step S346.

At Step S346 it is checked if the Macro mode has been selected, and the control proceeds to Step S347 if the Macro mode has been selected or to Step S67 if it has not. At Step S67 it is checked if a subject distance value which can be used for photographing has been calculated (i.e., if there is any error in the subject distance calculation).

At Step S347 if it is judged that a subject distance value which can be used for photographing has not been calculated (i.e., there is some error in the subject distance calculation), the control proceeds to Step S71 to make the green light emitter 12b blink so as to inform the photographer that an in-focus state cannot be obtained. Conversely, at Step S347 if it is judged that a subject distance value which can be used for photographing has been calculated (i.e., there is no error in the subject distance calculation), the control proceeds to Step S348 to turn the green light emitter 12b ON so as to inform the photographer that an in-focus state has been obtained.

The subroutine "Multi-AF Operation" at Step S194 shown in FIG. 30 is the same as that of the camera 11 of the first embodiment shown in FIGS. 16 and 17. In the subroutine "Multi-AF Operation" at Step S194 shown in FIG. 30, the four sensor start numbers, i.e., DIV 0, DIV 1, DIV 2 and DIV 3, which respectively correspond to the first, second, third and fourth ranges of the zooming range of the photographing lens 13, each determine the position of each of the light receiving areas C, L, R, LC and RC, and are stored in the RAM 83 in accordance with the information read out from the lens information reading circuit 78 when the zooming operation or the macro operation is performed in accordance with the operation at Step S10, S13 or S26.

Figure 31:
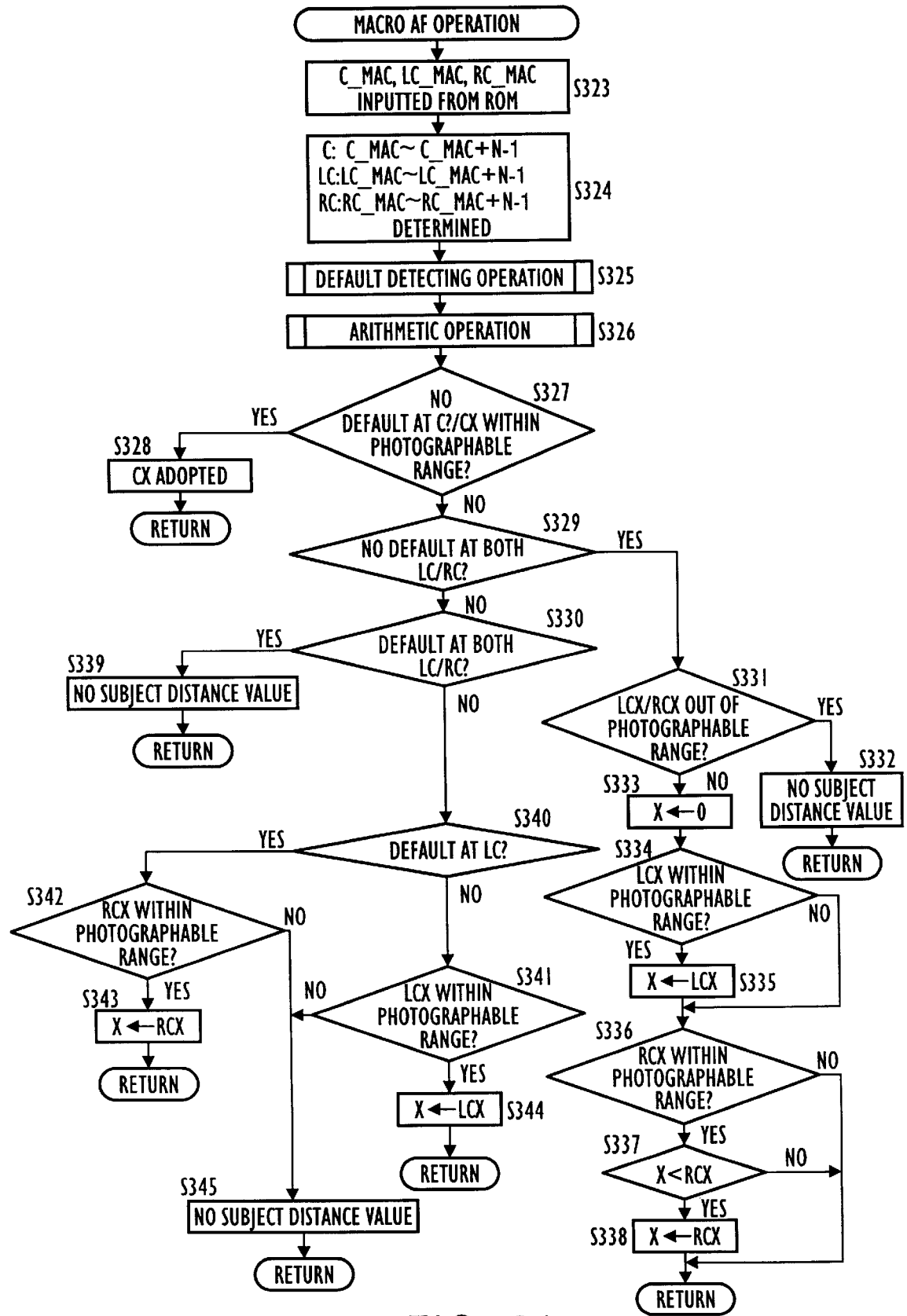
FIG. 31 is a flow chart showing a "Macro AF Operation" subroutine for a macro AF operation in a camera to which a distance measuring apparatus according to the third aspect of the present invention is applied.

The subroutine "Macro AF Operation" at Step S196 shown in FIG. 30 is shown in FIG. 31. This subroutine "Macro AF Operation" will be hereinafter discussed.

In the subroutine "Macro AF Operation", a set of light receiving areas on each line sensor 27, 28 which is used in the regular photography mode is shifted by a predetermined amount for the Macro mode, thereby precise subject distance measuring can be achieved in the Macro mode even when the optical axis "o" of the distance measuring unit 18 is deviated largely from the optical axis "O" of the photographing lens 13 in the horizontal direction of the camera 11.

When the control enters the subroutine "Macro AF Operation" shown in FIG. 31, the CPU 50 inputs, from the ROM 84, the information regarding the read sensor start number, i.e., "C_MAC", "LC_MAC" and "RC_MAC" (i.e., variation adjusting data), at Step S323. Thereafter, at Step S324, the positions of the light receiving areas C, LC and RC are each determined in accordance with the above mentioned information "C_MAC", "LC_MAC" and "RC_MAC", respectively, in the following manner.

The range of the center light receiving area C is determined by the width from the right end, i.e., the position "C_MAC", to the left end. The position of the left end is determined by the amount "C_MAC"+(N−1), i.e., "1+(N−1)". Here, "N" represents the predetermined number of light receiving elements of which each of the light receiving areas C, LC and RC consists, i.e., 36. The center light receiving area C can be expressed in the range defined by "C_MAC"~"C_MAC"+(N−1). The rest of the light receiving areas LC and RC are each determined in a similar manner.

The light receiving area LC is determined such that it ranges from the right end thereof, i.e., the position of "LC_MAC", to the left end thereof by the amount "LC_MAC"+(N−1), i.e., "1+(N−1)".

The light receiving area RC is determined such that it ranges from the right end thereof, i.e., the position of "RC_MAC", to the left end thereof by the amount "RC_MAC"+(N−1), i.e., "1+(N−1)".

After Step S324, control proceeds to a subroutine labelled "Default Detecting Operation" at Step S325. At Step S325 it is checked whether there is a default at each of the light receiving areas C, LC and RC, determined for the Macro mode.

In accordance with the result of this checking at Step S325, a flag is set to correspond to each of the determined light receiving areas having no default. For instance, in the case where the light receiving area LC has a default detected while the light receiving areas C and RC each have no default detected, flags are respectively set corresponding to the light receiving areas C and RC.

After Step S325, the control proceeds to a subroutine labelled "Arithmetic Operation" at Step S326. Here a subject distance value is calculated for each of the light receiving areas C, LC and RC. The calculated subject distance values for each of the light receiving areas C, LC and RC are respectively CX, LCX and RCX. The larger the subject distance value CX, LCX or RCX is, the closer the corresponding subject to be photographed is located to the camera 11.

After the subroutine "Arithmetic Operation" at Step S326, it is judged, in turn, whether there is any default at each of the light receiving areas C, LC and RC determined for the Macro mode, and whether each of the calculated subject distance values CX, LCX and RCX are within a photographable range, e.g., the macro photography range "a" shown in FIG. 26.

Firstly, at Step S327, it is checked whether there is no default at the light receiving area C and whether the calculated subject distance value CX is within the photographable range, and the control proceeds to Step S328 if there is no default at the light receiving area C and the calculated subject distance value CX is within the photographable range. At Step S328 the calculated subject distance value CX is adopted as an effective subject distance value to be used for a focusing operation, and thereafter the control returns to the calling routine. At Step S327, if it is determined that there is a default at the light receiving area C and/or the calculated subject distance value CX is out of the photographable range, the control proceeds to Step S329.

At Step S329 it is checked if there is no default at the light receiving areas LC and RC, and the control proceeds to Step S331 if there is no default, or to Step S330 if there is default at at least one of the light receiving areas LC, RC.

At Step S331 it is checked whether both the calculated subject distance values LCX and RCX are out of the photographable range, and the control proceeds to Step S332 if both are out of the photographable range. At Step S332 it is judged that there is no calculated subject distance value and thereafter the control returns. At Step S331 if either the calculated subject distance value LCX or RCX is within the photographable range, the control proceeds to Step S333 where the reference subject distance value "X" is set to "0" (zero) as an initial value. Thereafter the control proceeds to Step S334.

At Step S334, it is checked if the calculated subject distance value LCX is within the photographable range, and the control proceeds to Step S335 if within the photographable range, or to Step S336 if not. At Step S335 the reference subject distance value "X" is replaced by the calculated subject distance value LCX. Thereafter the control proceeds to Step S336.

At Step S336, it is checked if the calculated subject distance value RCX is within the photographable range, and if so the control proceeds to Step S337, or the control returns if the subject distance is not within the photographable range. At Step S337 it is checked if the calculated subject distance value RCX is larger than the reference subject distance value "X", and if yes, the control proceeds to Step S338, or the control returns if the value of the calculated subject distance value RCX is equal to or smaller than the reference subject distance value "X". At Step S338 the reference subject distance value "X" is replaced by the calculated subject distance value RCX, and thereafter, the control returns.

At Step S330, it is checked if there is a default at both the light receiving areas LC and RC, and if yes, the control proceeds to Step S339, or to Step S340 if not. At Step S339 it is judged that there is no calculated subject distance value and thereafter the control returns.

At Step S340 it is checked if there is a default at the light receiving area LC, and if so, the control proceeds to Step S342, otherwise control proceeds to Step S341. At Step S342 it is checked if the calculated subject distance value RCX is within the photographable range, and the control proceeds to Step S343 if yes, or to Step S345 if not. At Step S343 the reference subject distance value "X" is replaced by the calculated subject distance value RCX. Thereafter the control returns. At Step S345 it is judged that there is no calculated subject distance value and thereafter the control returns.

At Step S341 it is checked if the calculated subject distance value LCX is within the photographable range, and the control proceeds to Step S344 if the value LCX is within this range, or to Step S345 if not. At Step S344 the reference subject distance value "X" is replaced by the calculated subject distance value LCX. Thereafter the control returns.

According to the operations from Step S327 to Step S345, a certain value is obtained as the reference subject distance value "X". At Step S347 shown in FIG. 29 it is checked whether this obtained value is greater than "0" (zero). If the value is equal to or less than "0", it means that a subject distance value usable for a focusing operation has not been calculated (i.e., an in-focus state cannot be obtained). In this case, the control proceeds to Step S71 to make the green light emitter 12b blink so as to inform the photographer that an in-focus state cannot be obtained.

Conversely at Step S347, when the obtained value is greater than "0", it means that a subject distance value usable for a focusing operation has been calculated (i.e., an in-focus state has been obtained). In this case, the control proceeds to Step S348 and the green light emitter 12b is lit so as to inform the photographer that an in-focus state has been obtained.

As can be understood from the foregoing, in the third embodiment of camera 11 having a distance measuring apparatus to which the third aspect of the present invention is applied, when the Macro mode is selected, the actual light receiving area on each of the line sensors 27 and 28 is varied or adjusted to correspond to the AF frame for macro photography in the finder view 47. Thus, according to the third embodiment the subject or subjects seen within the AF frame fd is precisely focused in a reliable manner, and the chances of the distance of a subject, that a photographer does not intend to photograph, being mistakenly measured as the distance of a main subject are greatly reduced.

As can be seen from the foregoing, according to the camera having a distance measuring apparatus to which the third aspect of the present invention is applied, since the light receiving area on each of the pair of line sensors is varied or adjusted to correspond to the macro AF frame seen in the finder view when the Macro mode is selected, a subject or subjects seen within the macro AF frame is precisely and reliably focused, and furthermore, the chance of the distance of a subject, that a photographer does not intend to photograph, being mistakenly measured as the distance of a main subject is greatly reduced.

Another embodiment (i.e., a fourth embodiment) of a camera to which a distance measuring apparatus according to a fourth aspect of the present invention is applied will be discussed below. The camera of the fourth embodiment is similar to the camera of the first embodiment except in several respects. Furthermore, some aspects of the camera of the fourth embodiment are the same as those of the camera of the second or third embodiment. For this reason, only those aspects unique to the camera of the fourth embodiment will be discussed below with reference to FIGS. 1~9, 11~13, 15~18, 22, 30, 32, 33 and 34.

Although the finder LCD 57 of the camera 11 of the first embodiment is capable of indicating only the AF frame Fa, Fb, Fc and Fd, as shown in FIG. 10, the finder LCD 57 of the camera 11 of this fourth embodiment is similar to that of the camera 11 of the second or third embodiment, that is, capable of further indicating, inside the AF frame Fa, four additional AF frames fa, fb, fc and fd. The AF frames fa, fb, fc and fd are effectively utilized when "Spot AF" is carried out. The control of the finder LCD 57 in the Spot AF mode in the camera 11 of the fourth embodiment is identical to that in the camera 11 of the second embodiment.

Figures 32B, 32C:
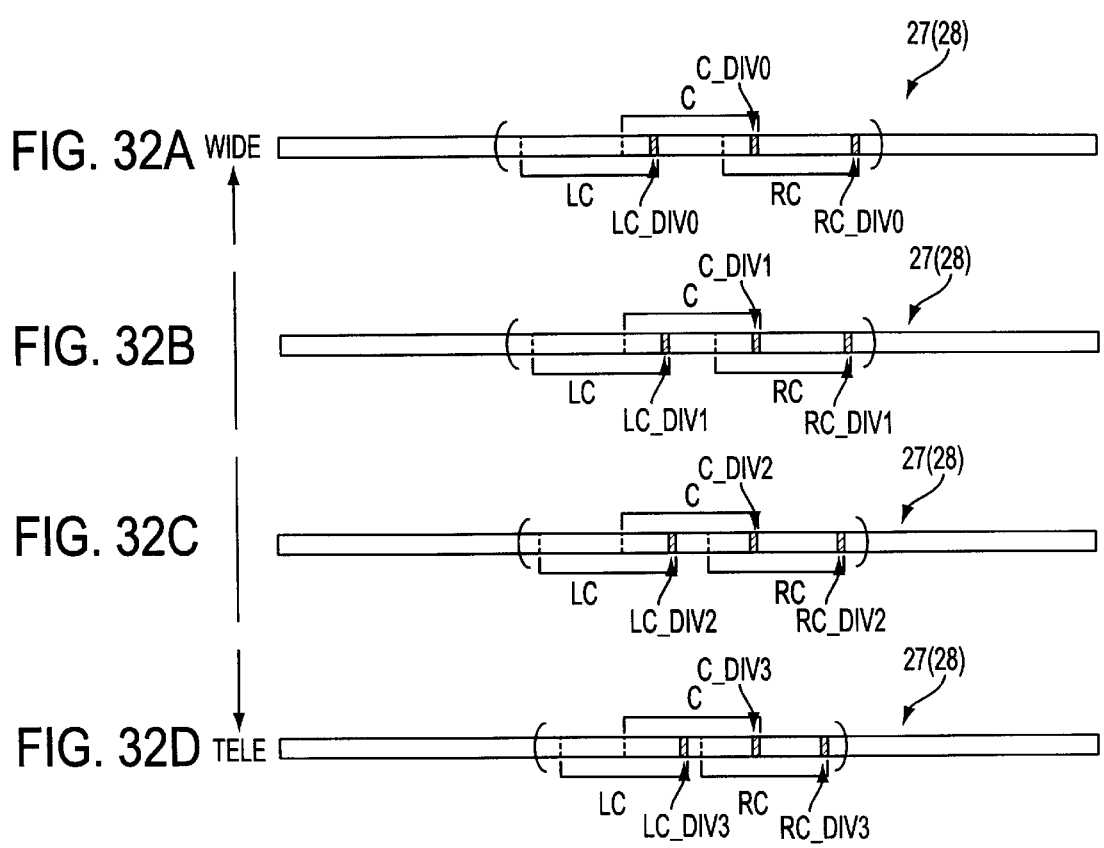
FIGS. 32A, B, C, and D represent a schematic view showing light receiving areas for Spot AF, in a camera to which a distance measuring apparatus according to the fourth aspect of the present invention is applied.

In the camera 11 of the first embodiment, for Multi-AF, the four predetermined sets of positions (a), (b), (c) and (d) as shown in FIG. 9 are each stored in the ROM 84. In the camera 11 of the fourth embodiment, in addition to the four sets of positions of light receiving areas for Multi-AF, another four sets of positions of light receiving areas for Spot AF are each stored in the ROM 84 as four predetermined sets of positions (a), (b), (c) and (d), as shown in FIG. 32.

When the Spot AF mode is selected by the mode selecting switch 41, the CPU 50 selects one of the four sets (patterns) of positions (a), (b), (c) or (d) (FIG. 32) which corresponds to the focal length range information of the photographing lens 13 stored in the RAM 83, in accordance with the position data of the light receiving areas read from the ROM 84. Thereafter, the CPU 50 receives the set of signals (i.e., distance information) of the selected pattern of positions (a), (b), (c) or (d) from the arithmetic operating portion 31 and calculates a subject distance in accordance with the set of signals.

In the camera 11 of the fourth embodiment, in the case when the Spot AF mode is selected by the mode selecting switch 41, in a similar manner to the case when the Multi-AF mode is selected by the mode selecting switch 41, the focal length variable range (i.e., zooming range) of the photographing lens 13 is divided into four ranges, namely, first, second, third and fourth ranges, in respective order from the wide-angle extremity to the telephoto extremity. The control of the camera 11 varies the positions of the light receiving areas LC and RC relative to the position of the center light receiving area C in such a manner as shown in FIG. 32, in accordance with a variation of focal length by the zooming operation. Namely, the CPU 50 selects one of the predetermined patterns of positions of light receiving areas on each line sensor 27, 28, i.e., the patterns of positions (a), (b), (c) or (d) as shown in FIG. 32, in accordance with the data regarding focal length range information stored in RAM 83, when a focal length is varied by the zooming operation. Although the positions of the light receiving areas LC and RC shift relative to the position of the center light receiving area C when one pattern of positions (a), (b), (c) or (d) is changed to another pattern in the Spot AF mode, each light receiving area is always comprised of 36 light receiving elements.

The main feature of the camera 11 of the fourth embodiment, i.e., for evaluating or grading the sensor data outputted from each light receiving area in the case where a subject distance value is measured by using a plurality of light receiving areas, will be explained below.

In the camera 11 of the fourth embodiment, the CPU 50 is provided with three functions for Spot AF. The first function is a subject distance value calculating means to perform a subject distance value calculation for each of the light receiving areas C, LC and RC by using sets of signals inputted from the respective light receiving areas C, LC and RC to thereby obtain respective subject distance values. The second function is a reliability judging means to judge whether there is reliability (i.e., there is no default) in each of the three subject distance values of the respective light receiving areas C, LC and RC in a predetermined order. The third function is a decision means for deciding to adopt the subject distance value of one of the light receiving areas C, LC and RC (firstly judged by the reliability judging means that there is no default), as an effective subject distance value to be used for focusing. The above three functions are performed only when the Spot AF mode is selected.

In the ROM 84, the data is programmed for making the CPU 50 judge whether there is reliability in each of the three subject distance values of the respective light receiving areas C, LC and RC in a predetermined order, i.e., in the order of, firstly, the subject distance value of the light receiving area C, secondly, the subject distance value of the light receiving area LC, and thirdly, the subject distance value of the light receiving area RC. The detail of this control will be discussed later in reference to FIGS. 33 and 34.

Although the CPU 50 operates the above three functions only when the Spot AF mode is selected in the camera 11 of the fourth embodiment, the CPU 50 may operate the above three functions not only in the Spot AF mode, but also in the Multi-AF mode.

In this case, in the Multi-AF mode, the first function is to perform a subject distance value calculation for each of the light receiving areas C, R, L, LC and RC by using sets of signals inputted from light receiving areas C, L, R, LC and RC to obtain respective subject distance values. The second function is to judge, in a predetermined order, whether there is reliability in each of the five subject distance values of the respective light receiving areas C, L, R, LC and RC. The third function is to adopt the subject distance value of one of the light receiving areas C, L, R, LC and RC, that is firstly judged by the reliability judging means to have no default, as an effective subject distance value to be used for focusing. Furthermore, in this optional case, in the ROM 84, the data programmed for making the CPU 50 judge whether there is reliability in each of the five subject distance values of the respective light receiving areas C, L, R, LC and RC in a predetermined order, e.g., in the order of, firstly, the subject distance value of the light receiving area C, secondly, the subject distance value of the light receiving area L, thirdly, the subject distance value of the light receiving area R, fourthly, the subject distance value of the light receiving area LC, and fifthly, the subject distance value of the light receiving area RC.

The operation of the camera 11 of the fourth embodiment, having the above mentioned circuit structure, will be hereinafter discussed. The main routine performed by the CPU 50 is the same as that of the camera 11 of the first embodiment which is shown in FIGS. 11 to 13.

Figure 33:
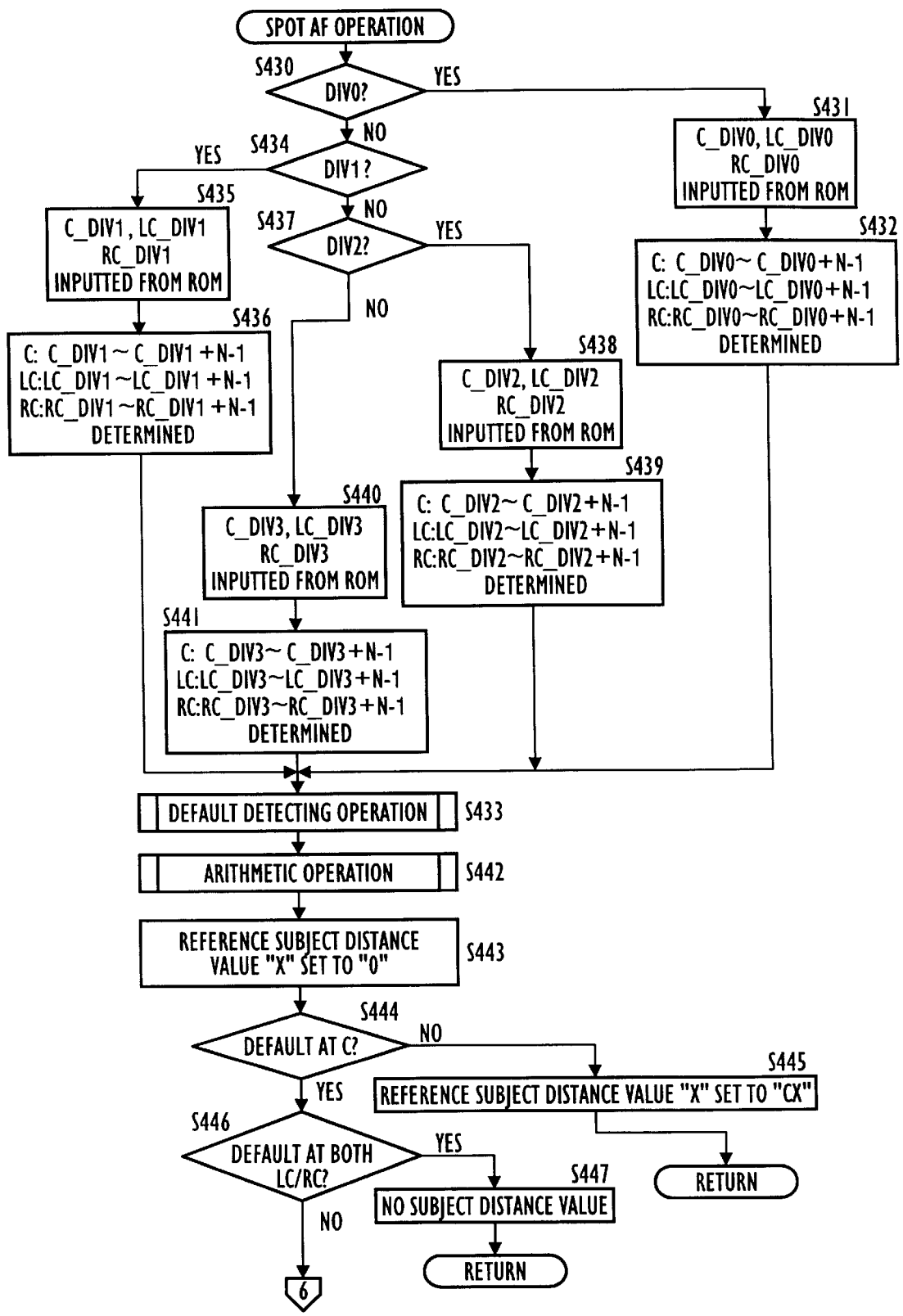
FIGS. 33 and 34 are flow charts showing a "Spot AF Operation" in a camera to which the distance measuring apparatus to which the fourth aspect of the present invention is applied.
Figure 34:
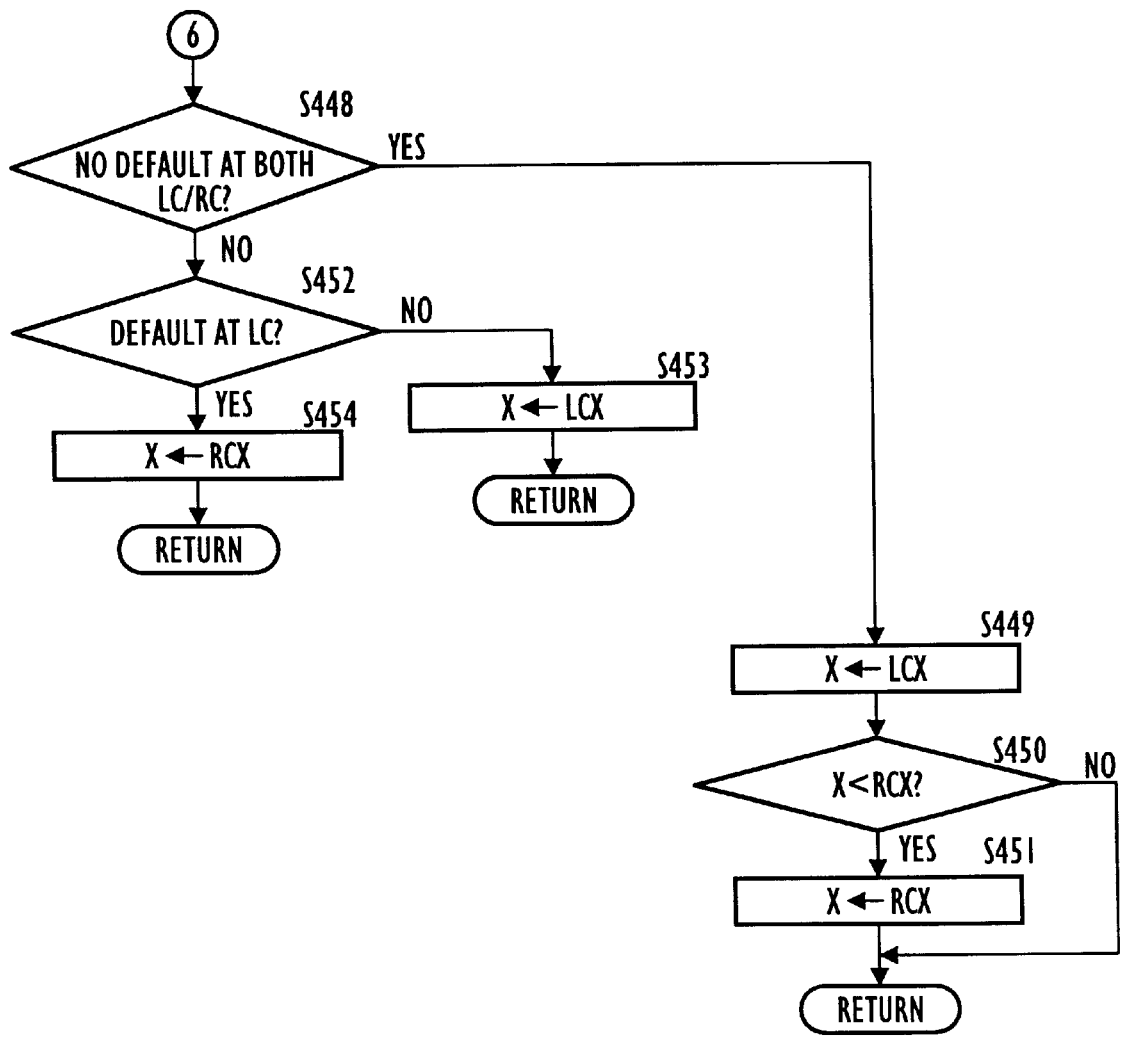

In the camera 11 of the fourth embodiment, in the subroutine "Photographing Operation" at Step S56 in the main routine, the subroutine "Photographing Operation" shown in FIG. 22 in the camera 11 of the second embodiment is performed. Furthermore, in the camera 11 of the fourth embodiment, in the subroutine "Subject Distance Measuring Operation" at Step S630 shown in FIG. 22, the subroutine "Subject Distance Measuring Operation" shown in FIG. 30 in the camera 11 of the third embodiment is performed. Still furthermore, in the camera 11 of the fourth embodiment, in the subroutine "Multi-AF Operation" at Step S194 in the "Subject Distance Measuring Operation" in FIG. 30, the subroutine "Multi-AF Operation" shown in FIGS. 16 and 17 in the camera 11 of the first embodiment is performed. Still furthermore, in the camera 11 of the fourth embodiment, in the subroutine "Spot AF Operation" at Step S195 in the "Subject Distance Measuring Operation" in FIG. 30, the subroutine "Spot AF Operation" shown in FIGS. 33 and 34 is performed.

The subroutine "Spot AF Operation" shown in FIGS. 33 and 34 will be hereinafter explained. In this subroutine, under the condition that one set of the light receiving areas C, LC and RC to be used, which has one of the four predetermined sets of positions (a), (b), (c) and (d) (FIG. 32), has already been selected or determined in accordance with the data of the above mentioned four sensor start numbers and the four predetermined sets of positions (a), (b), (c) and (d) stored in the ROM 84, it is checked whether there is reliability (i.e., there is no default) at each of the light receiving areas C, LC and RC in the above mentioned predetermined order. The subject distance value of one of the light receiving areas C, LC and RC, that is firstly judged to have reliability, is adopted as an effective subject distance value to be used in a focusing operation. In this fourth embodiment, in the Spot AF mode, only the respective subject distance values of the light receiving areas C, LC and RC (not of the light receiving areas L and R), are judged for reliability. The four sensor start numbers, i.e., DIV 0, DIV 1, DIV 2 and DIV 3, which respectively correspond to the first, second, third and fourth ranges of the zooming range of the photographing lens 13, and each determine the position of each of the light receiving areas C, LC and RC in the Spot AF mode, are stored in the RAM 83 in accordance with the information read out from the lens information reading circuit 78 when the zooming operation or the macro operation is performed in accordance with the operation at Step S10, S13 or S26.

In the subroutine "Spot AF Operation" at Step S195, firstly, the sensor start number currently stored in the RAM 83 is read and it is checked if the read sensor start number is "DIV 0" or not at Step S430. The control proceeds to Step S431 if it is judged that the read sensor start number is "DIV 0". At Step S431, the CPU 50 inputs, from the ROM 84, the information regarding the read sensor start number "DIV 0", i.e., "C_DIV 0", "LC_DIV 0" and "RC_DIV 0", whose respective positions are shown in FIG. 32 (a).

Each positional information "C_DIV 0", "LC_DIV 0" and "RC_DIV 0" represents the position of the light receiving element positioned at one end (the right end in FIG. 32) of the corresponding light receiving area, which consists of 36 light receiving elements (i.e., photodiodes).

At Step S432, the positions of the light receiving areas C, LC and RC are each determined in accordance with the above mentioned information "C_DIV 0", "LC_DIV 0" and "RC_DIV 0", respectively, in the following manner.

The range of the center light receiving area C is determined by the width from the right end, i.e., the position "C_DIV 0", to the left end. The position of the left end is determined by the amount "C_DIV 0"+(N–1), i.e., "1+(N–1)". Here, "N" represents the predetermined number of light receiving elements of which each of the light receiving areas C, L, R, LC and RC consists, i.e., 36 in this embodiment. The center light receiving area C can be expressed in the range defined by "C_DIV 0"~"C_DIV 0"+(N–1). The rest of the light receiving areas, LC and RC, are each determined in a similar manner.

The light receiving area LC is determined such that it ranges from the right end thereof, i.e., the position of "LC_DIV 0", to the left end thereof by the amount "LC DIV 0"+(N–1), i.e., "1+(N–1)".

The light receiving area RC is determined such that it ranges from the right end thereof, i.e., the position of "RC_DIV 0", to the left end thereof by the amount "RC_DIV 0"+(N–1), i.e., "1+(N–1)".

The arithmetic operating portion 31 provided in the distance measuring unit 18 sends, in sequence, the sensor data that is outputted from each of the light receiving elements located on each of the light receiving areas C, LC and RC, determined in accordance with the signals outputted from the main CPU 50. For instance, in the case when it is necessary for the main CPU 50 to receive a series of sensor data from the right light receiving area R ranging from the 9th light receiving element (counted from the right end of the total 128 light receiving elements) to the left end of the right light receiving area R, the arithmetic operating portion 31 sends to the CPU 50, in sequence, the sensor data outputted from each of the 36 light receiving elements ranging from the above mentioned 9th light receiving element to the 44th light receiving element (i.e., 9+(36–1)), in accordance with the signals outputted from the main CPU 50.

After Step S432, the control proceeds to a subroutine labelled "Default Detecting Operation" at Step S433 in which it is checked whether there is a default at each of the light receiving areas C, LC and RC in accordance with the inputted sensor data.

At Step S430, if it is judged that the read sensor start number is not "DIV 0", the control proceeds to Step S434 to check if the read sensor start number is "DIV 1". If it is judged that the read sensor start number is "DIV 1", the control proceeds to Step S435. At Step S435, the CPU 50 inputs from the ROM 84, the positional information regarding the read sensor start number "DIV 1", i.e., "C DIV 1", "LC_DIV 1" and "RC_DIV 1", whose respective positions are shown in FIG. 32 (b).

Thereafter, at Step S436, the positions of the light receiving areas C, LC and RC are each determined in accordance with the above mentioned information "C_DIV 1", "LC_DIV 1" and "RC_DIV 1", respectively, in the following manner.

The range of the center light receiving area C is determined by the width from the right end, i.e., the position of "C_DIV 1", to the left end. The position of the left end is determined by the amount "C_DIV 1"+(N−1), i.e., "1+(N−1)". The center light receiving area C can be expressed in the range defined by "C_DIV 1"~"C_DIV 1"+(N−1). The rest of the light receiving areas LC and RC are each determined in a similar manner.

The light receiving area LC is determined such that it ranges from the right end thereof, i.e., the position of "LC_DIV 1", to the left end thereof by the amount "LC_DIV 1"+(N−1), i.e., "1+(N−1)".

The light receiving area RC is determined such that it ranges from the right end thereof, i.e., the position of "RC_DIV 1", to the left end thereof by the amount "RC_DIV 1"+(N−1), i.e., "1+(N−1)".

After Step S436 the control proceeds to the subroutine "Default Detecting Operation" at Step S433.

At Step S434, if it is judged that the read sensor start number is not "DIV 1", the control proceeds to Step S437 to check if the read sensor start number is "DIV 2". If it is judged that the read sensor start number is "DIV 2", the control proceeds to Step S438. At Step S438, the CPU 50 inputs, from the ROM 84, the positional information regarding the read sensor start number "DIV 2", i.e., "C DIV 2", "LC_DIV 2" and "RC_DIV 2", whose respective positions are shown in FIG. 32 (c).

Thereafter, at Step S439, the positions of the light receiving areas C, LC and RC are each determined in accordance with the above mentioned information "C_DIV 2", "LC_DIV 2" and "RC_DIV 2", respectively, in the following manner.

The center light receiving area C is determined by the width from the right end, i.e., the position of "C_DIV 2", to the left end. The position of the left end is determined by the amount "C_DIV 2"+(N−1), i.e., "1+(N−1)". The center light receiving area C can be expressed in the range defined by "C_DIV 2"~"C_DIV 2"+(N−1). The rest of the light receiving areas LC and RC are each determined in a similar manner, as follows.

The light receiving area LC is determined such that it ranges from the right end thereof, i.e., the position of "LC_DIV 2", to the left end thereof by the amount "LC_DIV 2"+(N−1), i.e., "1+(N−1)".

The light receiving area RC is determined such that it ranges from the right end thereof, i.e., the position of "RC_DIV 2", to the left end thereof by the amount "RC_DIV 2"+(N−1), i.e., "1+(N−1)".

After Step S439 the control proceeds to the subroutine "Default Detecting Operation" at Step S433.

At Step S437, if it is judged that the read sensor start number is not "DIV 2", the control proceeds to Step S440. At Step S440, the CPU 50 inputs, from the ROM 84, the positional information regarding the read sensor start number "DIV 3", i.e., "C_DIV 3", "LC_DIV 3" and "RC_DIV 3", whose respective positions are shown in FIG. 32 (d).

Thereafter, at Step S441, the positions of the light receiving areas C, LC and RC are each determined in accordance with the above mentioned information "C_DIV 3", "LC_DIV 3" and "RC_DIV 3", respectively, in the following manner.

The range of the center light receiving area C is determined by the width from the right end, i.e., the position of "C_DIV 3", to the left end. The position of the left end is determined by the amount "C_DIV 3"+(N−1), i.e., "1+(N−1)". The center light receiving area C can be expressed in the range defined by "C_DIV 3"~"C_DIV 3"+(N−1). The rest of the light receiving areas L, R, LC and RC are each determined in a similar manner as follows.

The light receiving area LC is determined such that it ranges from the right end thereof, i.e., the position of "LC_DIV 3", to the left end thereof by the amount "LC_DIV 3"+(N−1), i.e., "1+(N−1)".

The light receiving area RC is determined such that it ranges from the right end thereof, i.e., the position of "RC_DIV 3", to the left end thereof by the amount "RC_DIV 3"+(N−1), i.e., "1+(N−1)".

After Step S441 the control proceeds to the subroutine "Default Detecting Operation" at Step S433.

It should be noted here that, as shown in FIG. 32, as the photographing lens is moved from the wide-angle extremity to the telephoto extremity, the light receiving area C is not shifted at all on each line sensor 27, 28. However, the light receiving areas LC and RC are gradually shifted toward a more central position, i.e., the number of overlapped light receiving element increases. Note, however, that each light receiving area always consists of 36 light receiving elements.

In the subroutine "Default Detecting Operation" at Step S433, it is checked whether there is a default at each of the light receiving areas C, LC and RC, determined in accordance with the inputted sensor data, i.e., in accordance with the selected focal length of the photographing lens 13. In accordance with the result of this checking, a flag is set to correspond to each of the determined light receiving areas having no default. For instance, in the case where the light receiving areas LC and RC each have a default detected while the light receiving area C has no default detected, a flag is set corresponding to the light receiving area C.

After Step S433 the control proceeds to a subroutine labelled "Arithmetic Operation" at Step S442. At Step S442 a subject distance value is calculated for each of the light receiving areas C, LC and RC. The calculated subject distance values for each of the light receiving areas C, LC and RC are respectively CX, LCX and RCX. The larger the subject distance value CX, LCX or RCX is, the closer the corresponding subject to be photographed is located to the camera 11.

After Step S442 the control proceeds to Step S443. At Step S443, the reference subject distance value "X" is set "0" (zero) as an initial value.

Thereafter, at Step S444 it is checked if there is a default at the light receiving area C. Here it is checked whether a flag is set to correspond to the light receiving area C. The control proceeds to Step S445 if there is no default at the light receiving area C, or to Step S446 is there is a default at the light receiving area C. At Step S445, the reference subject distance value "X" is replaced by the value of the subject distance value CX, and thereafter, the control returns.

At Step S446 it is checked if there is a default at both the light receiving areas LC and RC, where it is checked whether a flag is set to correspond to the light receiving area LC and whether a flag is set to correspond to the light receiving area RC. The control proceeds to Step S447 if there is a default at both of the light receiving areas LC, RC, or to Step S448 if there is no default at at least one of the light receiving areas LC, RC.

At Step S447, if it is judged that there is no subject distance value, i.e., no subject distance value could be obtained, and the control returns to enter the subroutine "Photographing Operation" shown in FIG. 22. Thereafter, if it is judged at Step S67 that there is a default, the control proceeds to Step S71 to make the green light emitter 12b blink so as to inform the photographer that an in-focus state cannot be obtained.

At Step S446, if there is no default at at least one of the light receiving areas LC, RC, the control proceeds to Step S448 to check if there is no default at both of the light receiving areas LC, RC, and thereafter, the control proceeds to Step S449 if both light receiving areas LC, RC have no default, or to Step S452 if there is a default at either the light receiving area LC or RC.

At Step S449 the reference subject distance value "X" is replaced by the value of the subject distance value LCX, and thereafter, the control proceeds to Step S450 to check if the calculated subject distance value RCX is greater than the reference subject distance value "X". The control proceeds to Step S451 if the calculated subject distance value RCX is greater than the reference subject distance value "X", or returns if the calculated subject distance value RCX is equal to or smaller than the reference subject distance value "X". In this case when the control returns at Step S450, the subject distance value LCX is used in the focusing operation as the reference subject distance value.

At Step S451 the reference subject distance value "X" is replaced by the subject distance value RCX, and thereafter, the control returns. Consequently, the subject distance value RCX is used in the focusing operation as the reference subject distance value.

At Step S448, if it is judged that there is a default at either light receiving area LC or RC, the control proceeds to Step S452 to check if there is a default at the light receiving area LC. Subsequently, the control proceeds to Step S454 if there is a default at the light receiving area LC, or proceeds to Step S453 if not.

At Step S453 the reference subject distance value "X" is replaced by the subject distance value LCX, and thereafter, the control returns. Consequently, the subject distance value LCX is used for focusing as the reference subject distance value. At Step S454 the reference subject distance value "X" is replaced by the subject distance value RCX, and thereafter, the control returns. Consequently, the subject distance value RCX is used in the focusing operation as the reference subject distance value.

As can be understood from the foregoing, according to the camera 11 having a distance measuring apparatus to which the fourth aspect of the present invention is applied, even if there occurs a default at the center light receiving area C in the Spot mode, the value of the subject distance value of either light receiving area LC or RC is immediately adopted as an effective value in the focusing operation in a prompt manner if there is not a default at at least one of the light receiving areas LC, RC. Accordingly, not only can correct focusing be carried out but also a subject distance value can be detected quickly, thus leading to a fast photographing operation.

The following discussion will be addressed to another embodiment (i.e., a fifth embodiment) of a camera to which a distance measuring apparatus according to a fifth aspect of the present invention is applied with reference to FIGS. 35 through 56.

Figure 35:
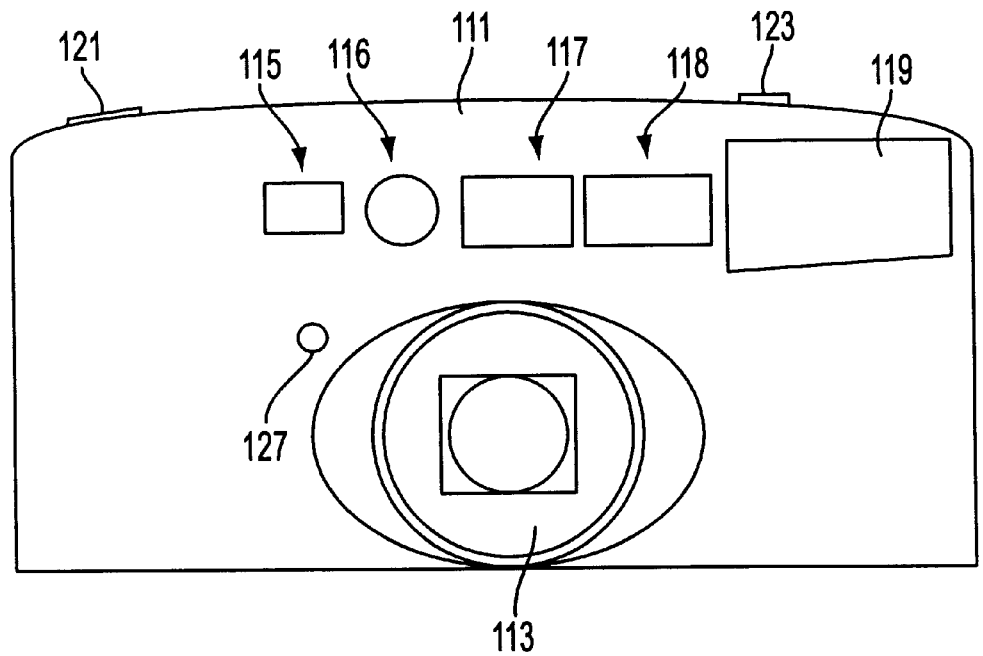
FIG. 35 is a front elevational view of a camera having a distance measuring apparatus according to a fifth, sixth, seventh or eighth aspect of the present invention.
Figure 36:
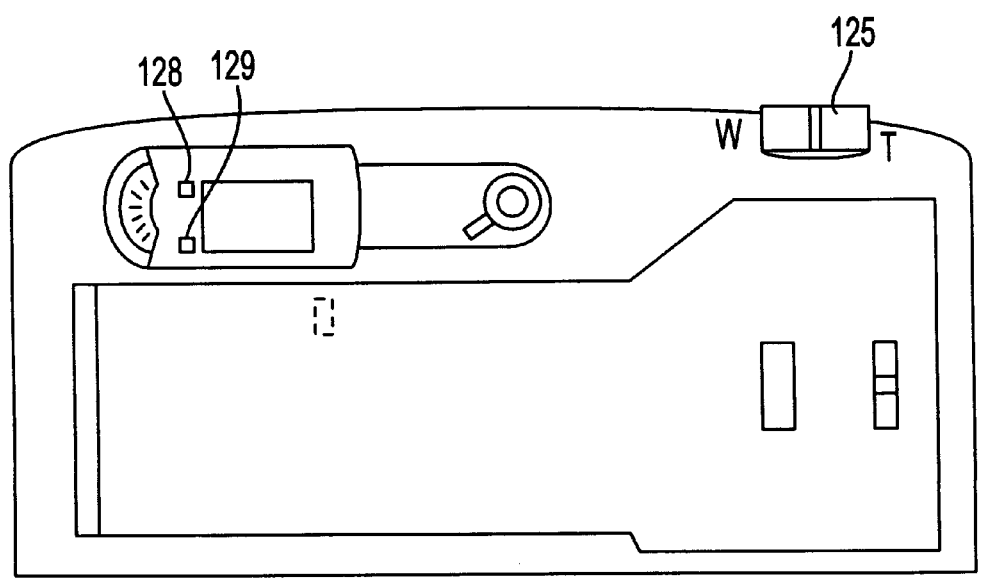
FIG. 36 is a back view of the camera shown in FIG. 35.

FIGS. 35 and 36 respectively show a front elevational view and a back view of a lens-shutter type camera having a strobe incorporated therein, to which the fifth aspect of the present invention is applied. The lens-shutter type camera has a camera body 111 which is provided on the front thereof with a zoom lens 113, a photometering window 115, an AF auxiliary light emitting window 116, a finder window 117, a light receiving window 118 and a strobe light emitter 119. Behind the light receiving window 118 are placed a pair of image forming lenses 152L and 152R of a distance measuring unit 151 (see FIG. 38). The photometering window 115, the AF auxiliary light emitting window 116, the finder window 117, the light receiving window 118 and the strobe light emitter 119 are arranged in this order from the left as viewed in FIG. 35, and are all positioned above the zoom lens 113. There are also provided a photometering sensor, an AF auxiliary light emitting element, a finder optical system and a distance measuring unit 151 which are all within the camera body 111 behind the respective elements 115 through 119, as is well known.

A release button 121 and a strobe button 123 are provided on the upper surface of the camera body 111. The release button 121 is associated with a photometering switch SWS and a release switch SWR, so that when the release button 121 is half-depressed, the photometering switch SWS is turned ON and when the release button 121 is fully depressed, the release switch SWR is turned ON, respectively.

A zoom lever 125 is provided on the upper portion of the back surface of the camera body 111. When the zoom lever 125 is moved toward a telephoto side or a wide-angle side, the zoom lens 113 is respectively moved in the telephoto direction or the wide-angle direction to perform the zooming operation. The zoom lever 125 is associated with a telephoto switch SWTELE and a wide-angle switch SWWIDE, so that when the zoom lever 125 is moved toward the telephoto side or the wide-angle side, the telephoto switch SWTELE or the wide-angle switch SWWIDE is respectively turned ON.

A self-timer light emitter 127 is also provided on the front surface of the camera body 111. The light emitter 127 is adapted not only to indicate that the self-timer is in operation, but also serves as a releasing operation notifying light emitter. Also, a green light emitter 128 and a red light emitter 129 are provided in the vicinity of a viewfinder provided on the back surface of the camera body 111. The green light emitter 128 indicates whether a subject is in-focus or not, while the red light emitter 129 indicates whether a strobe light is available or not.

Figure 37:
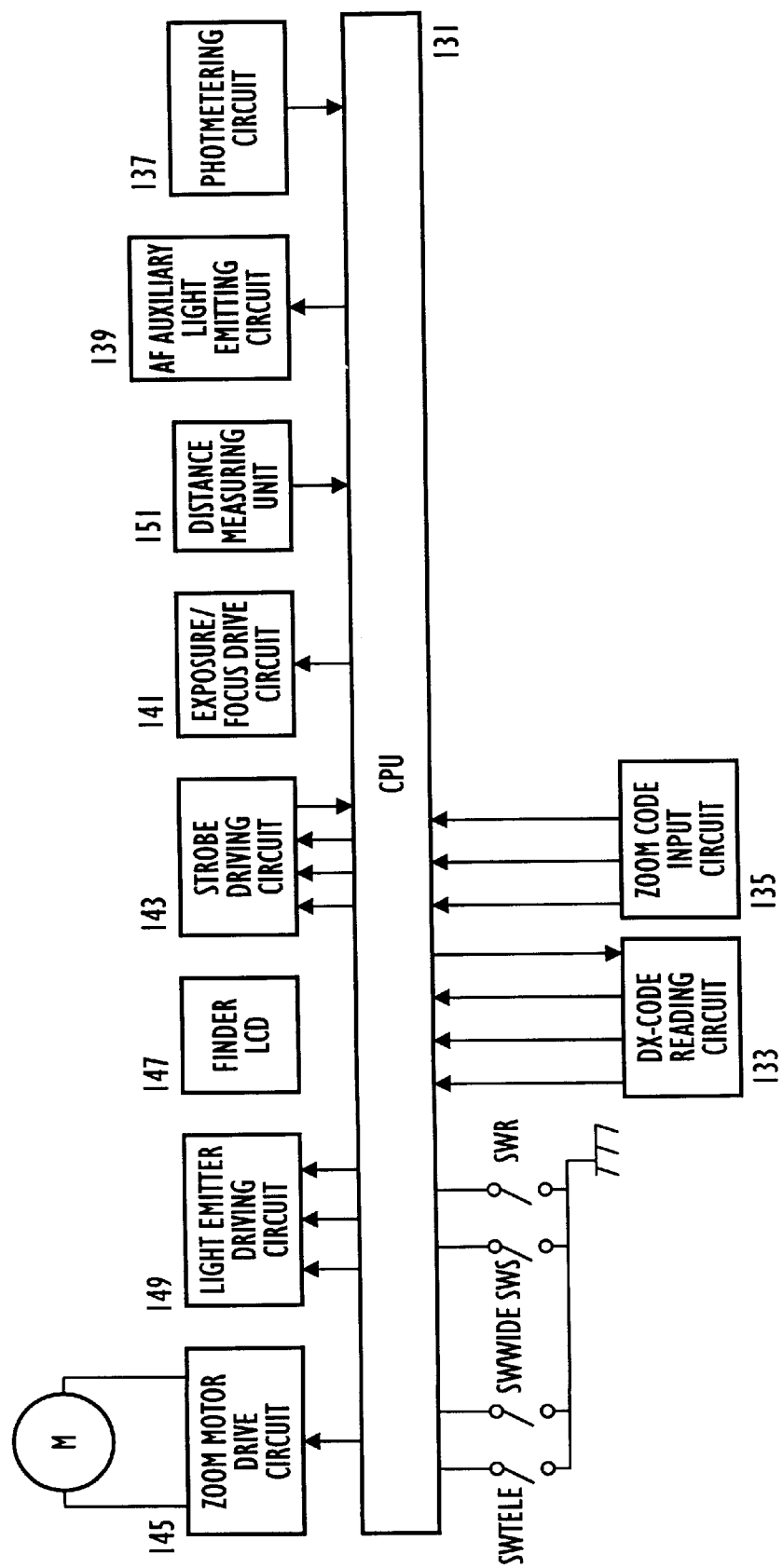
FIG. 37 is a block diagram of the main components of a circuit of the camera shown in FIG. 35.

FIG. 37 shows a block diagram of a circuit of the lens-shutter type camera body shown in FIGS. 35 and 36. A CPU 131 is provided in the camera body 111 and generally controls various photographing operations, such as, an automatic focus control (AF control), an automatic exposure control (AE control), film winding and rewinding operations, etc. The photometering switch SWS, the release switch SWR, the telephoto switch SWTELE and the wide-angle switch SWWIDE, are all connected to the CPU 131. The CPU 131 performs predetermined operations in response to the ON/OFF state of the above switches.

A DX-code reading circuit 133 reads a DX-code printed on a film patrone, corresponding to ISO speed values, through DX-code contact pins (not shown) and outputs the signals read to the CPU 131. A zoom code input circuit 135 detects the current focal length data of the zoom lens 113 through a zoom code plate (not shown) and supplies the detected signals to the CPU 131.

A photometering circuit 137 is provided with a photometering sensor (not shown) which receives subject light incident thereupon through the photometering window 115 and converts the optical signals into photometering signals having an electric current voltage, corresponding to the subject brightness, to supply the same to the CPU 131. The CPU 131 calculates subject brightness (brightness value) Bv in accordance with the photometering signal to obtain an optimum shutter speed (time value) Tv and an optimum aperture value Av in accordance with the subject brightness Bv and the ISO speed value Sv that has been read through and converted by the DX-code reading circuit 113.

The AF auxiliary light emitting circuit 139 actuates an AF auxiliary light emitter (not shown) to illuminate a subject with light having a contrasting pattern, under the control of the CPU 131 when the CPU 131 judges that the subject brightness Bv is low or subject contrast is low.

The distance measuring unit 151 which also functions as a subject distance detecting means, receives light reflected from the subject and produces and outputs a pair of two dimensional image signals, each including several image signals. The image signals are stored in an internal RAM for each image signal unit. The CPU 131 calculates a subject distance in accordance with the pair of image signals stored in the RAM to thereby obtain a displacement of the focusing lens. The focusing lens is driven to a point corresponding to the displacement thus obtained, by an exposure/focus drive circuit 141. A strobe driving circuit 143 actuates the strobe light emitter 119. A finder LCD 147 connected to the CPU 131 and provided in the viewfinder of the camera of this embodiment indicates an AF frame, and various photographing information, etc.

In the camera, the shutter and aperture are driven by the exposure/focus drive circuit 141 in accordance with the shutter speed Tv and the aperture value Av determined by the CPU 131 when the release switch SWR is turned ON.

When the telephoto switch SWTELE or the wide-angle switch SWWIDE are turned ON, the CPU 131 drives a zoom motor M through a zoom motor drive circuit 145 to move the zoom lens 113 towards a respective telephoto or wide-angle extremity. When the main switch of the camera is turned OFF, the zoom motor M moves the lens barrel of the zoom lens 113 to its accomodated position or retracted position, in which the lens barrel is completely retracted into the camera body 111. When the main switch is turned ON, the lens barrel is moved to the wide-angle extremity by the zoom motor M.

The zoom lens 113 has a macro photography function, so that when a macro switch (not shown) is turned ON, the zoom motor M is driven to move the zoom lens 113 to a macro position beyond the telephoto extremity.

The self-timer light emitter 127, the green light emitter 128 and the red light emitter 129, are driven by a light emitter driving circuit 149. A finder LCD 147 is provided in the finder to indicate various photographing information in the finder view.

In addition to the main components of the camera as mentioned above, the camera is also provided with a battery, an indication panel in which various photographing information is indicated, and a film winding and rewinding motor, etc.

Figure 38:
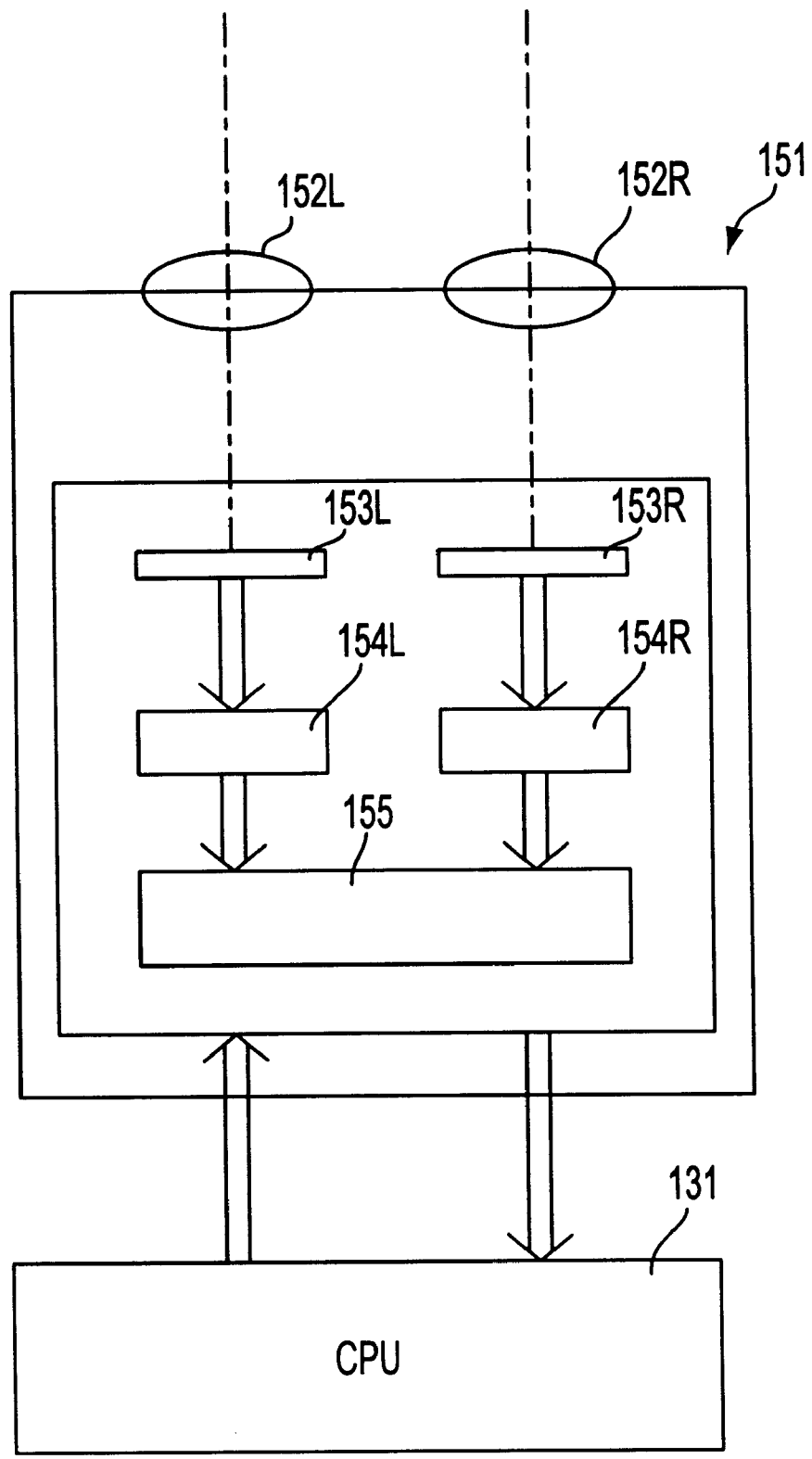
FIG. 38 is a schematic view of an internal structure of a distance measuring unit in the camera shown in FIG. 35.

FIG. 38 shows a block diagram of the distance measuring unit 151, which is comprised of a pair of left and right image forming lenses (condenser lenses) 152L and 152R, a pair of left and right line sensors 153L and 153R, a pair of left and right quantizing portions 154L and 154R, and a controller 155. It should be noted that both the left and right halves of the above are identical and operate in the same fashion.

Subject light received is converged on, or in the vicinity, of the line sensors 153L and 153R by the corresponding image forming lenses 152L and 152R. Photodiodes (light receiving elements) of the line sensors 153L and 153R, that receive the subject light, produce electric signals corresponding to the brightness of the light received, and output the same to the quantizing portions 154L and 154R, respectively. The quantizing portions 154L and 154R integrate the quantity of the light received by the photodiodes (electric signals input thereto) and detect the time at which the integral value has reached a constant value. The detected time is stored. The detected time data reduces as subject image brightness increases.

When all the times are detected and stored as a result of the integral operation of the electric signals by the quantizing portions 154L and 154R, or when a predetermined time elapses before the integral value becomes a predetermined value, the predetermined time is stored as a measurement time for the photodiode in which the integral operation has not completed. Consequently, the memorized measurement time data is successively output to the CPU 131 as image data through a controller 155. The CPU 131 then stores the image data. The measurement time data, i.e., the image data, becomes a small value as the subject image brightness increases.

More specifically, a comparator and a latch circuit, included in the corresponding quantizing portion 154L or 154R, are connected to each light receiving element, and the electric charge accumulated in each light receiving element is quantized through the corresponding comparator and latch circuit. The quantized data of each line sensor 153L, 153R is sent to the CPU 131 in serial order through the controller 155. Amongst all the sensor data obtained from all of the light receiving elements on each line sensor 153L, 153R, the CPU 131 can only select a part of all the sensor data correspondingly from each line sensor 153L, 153R and use only this selected sensor data for a distance measuring operation.

Note that the image data of the photodiodes of the line sensors 153L and 153R will also be referred to as "bit data".

Figure 40:
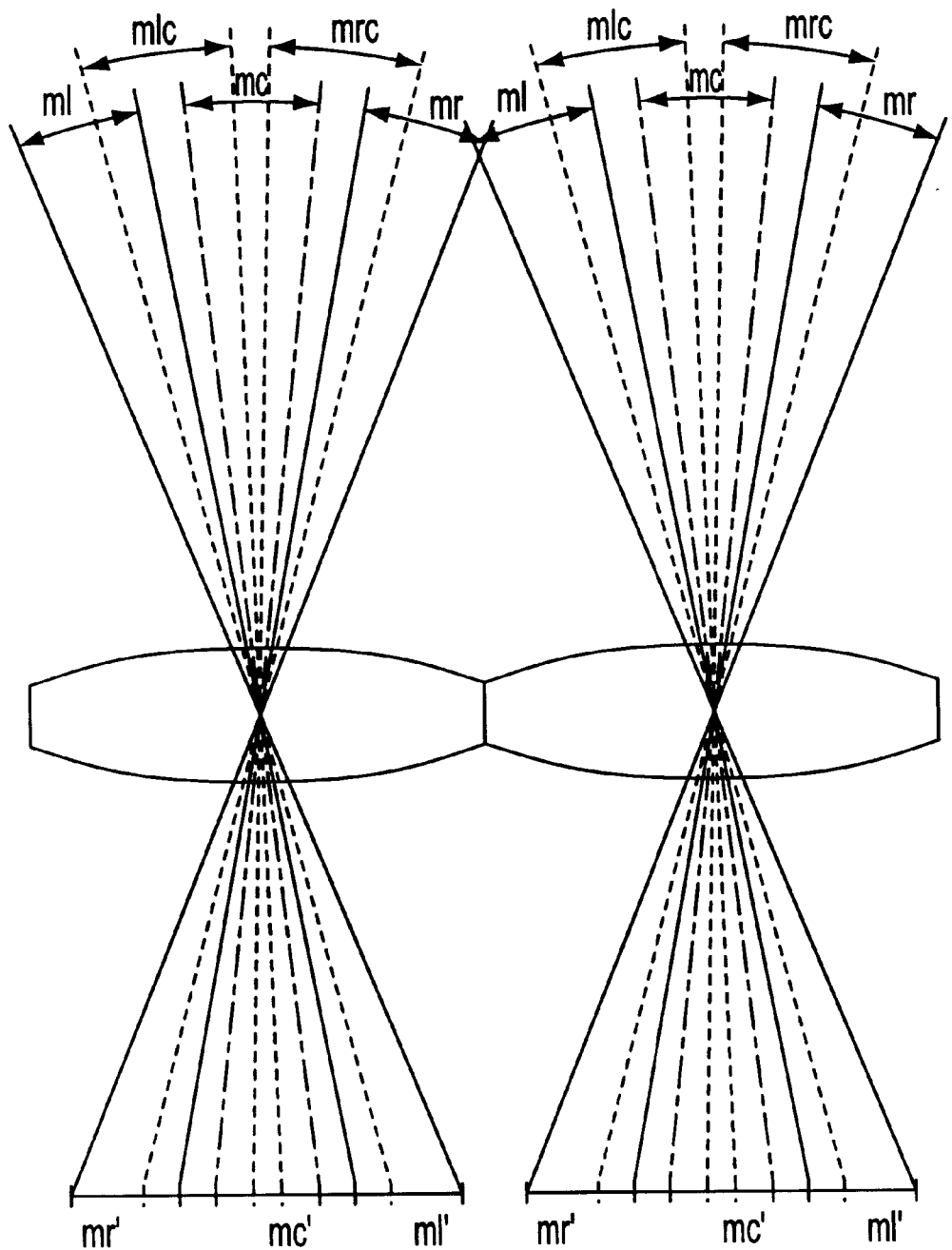
FIG. 40 is a schematic view showing a relationship between light receiving areas used for a multiple measurement and the line sensors in the camera shown in FIG. 35.
Figure 41:
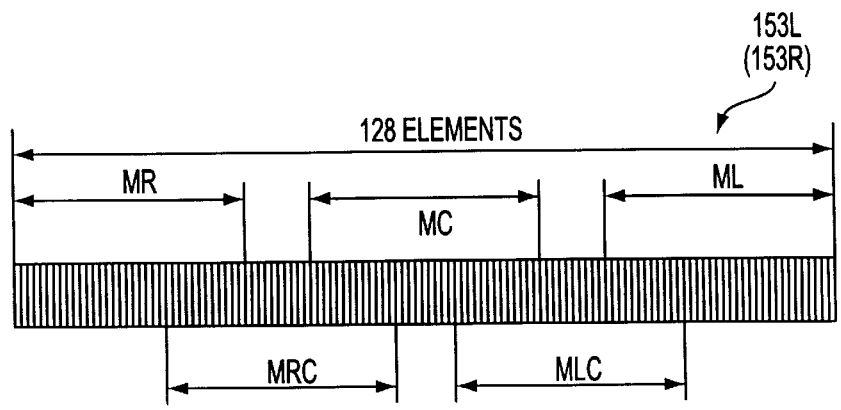
FIG. 41 is a schematic view of light receiving areas of a line sensor in the camera shown in FIG. 35.

FIGS. 40 and 41 show a relationship between the light receiving areas used for a multiple measurement and the line sensors. According to the camera of the fifth aspect of the present invention there are five light receiving areas, namely, a central light receiving area MC, left and right light receiving areas ML and MR on the left and right sides of the central light receiving area MC, and left and right intermediate light receiving areas MLC and MRC provided between the central light receiving area MC and the left and right light receiving areas ML and MR, respectively. Light receiving areas MC, ML, MR, MLC and MRC of the line sensors 153L and 153R correspond to respective subject light receivable ranges mc, ml, mr, mlc and mrc. The line sensors 153L and 153R are each provided with 128 photodiodes which serve as light receiving means. Each light receiving area contains 36 consecutive photodiodes.

Figure 39:
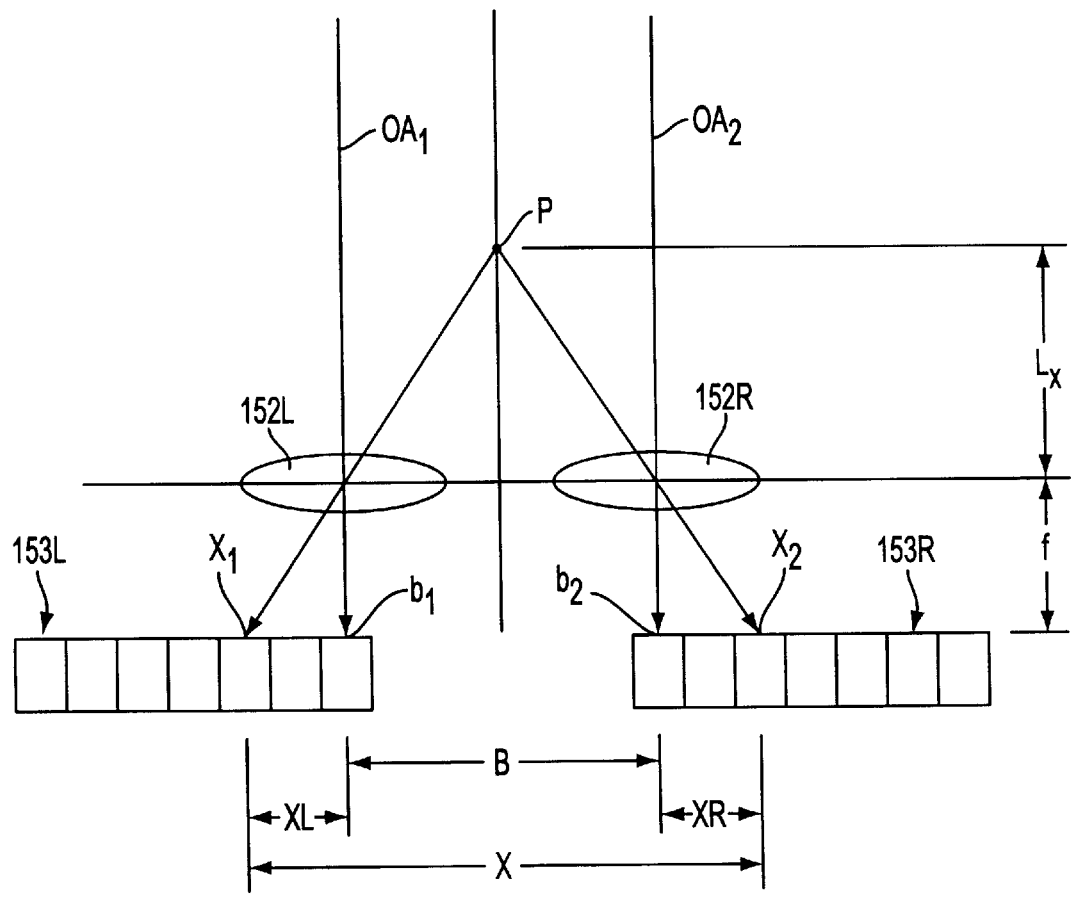
FIG. 39 is an explanatory view of the principle of a measurement by the distance measuring unit, according to the fifth, sixth or seventh aspect of the invention.

FIG. 39 shows the principle of measurement by the distance measuring unit 151. In FIG. 39, "f" presents the focal length of the image forming lenses 152L and 152R. "$OA_1$" and "$OA_2$" represent the optical axes of the image forming lenses 152L and 152R, respectively, which are disposed parallel to each other and apart from each other by a distance "B". "$b_1$" and "$b_2$" represent the points of incidence of the optical axes $OA_1$ and $OA_2$ upon the line sensors 153L and 153R, respectively. Accordingly, the distance between the incident points $b_1$ and $b_2$ is the base length which is equal to the distance B. "P" represents a subject and "Lx" represents the distance from the subject P to the pair of image forming lenses 152L and 152R. Here, for the purpose of illustration, the subject P is regarded as a mere point having no length or width. It is assumed that images of a subject P, located at the subject distance Lx, are respectively formed at the points $X_1$ and $X_2$ on the line sensors 153L and 153R by the respective image forming lenses 152L and 152R, and that the distance between the image points $X_1$ and $X_2$ is x. It is also assumed that the distance between the points b1 and $X_1$ is XL, and the distance between the points b2 and $X_2$ is XR. Accordingly, the following relation can be obtained:

$$B:(XL+XR)=Lx:f$$

The subject distance Lx is given by:

$$Lx = B \times f / (XL + XR)$$
$$= B \times f / (x - B)$$

In the illustrated embodiment, the focal length f of the image forming lenses 152L and 152R and the distance therebetween, i.e., the base length B, are fixed values. Consequently, the subject distance Lx can be obtained by calculating the distances XL and XR or the distance x. In this embodiment, the image points $X_1$ and $X_2$ are detected to obtain the distance x to obtain the subject distance Lx.

In general, a subject to be photographed is not merely a point and hence the subject images to be formed on the line sensors 153L and 153R are two dimensional. Therefore, the image points $X_1$ and $X_2$ cannot be directly detected.

To solve this, a predetermined number of light receiving elements (e.g., 1 or 2 elements) of the line sensor 153L are compared with the same number of light receiving elements of the line sensor 153R. This comparison is repeatedly carried out while relatively changing the light receiving elements to be compared. When the highest degree of coincidence of the distribution of the quantity of light defined by the light receiving elements between the line sensors 152L and 153R is obtained, the distance between the light receiving elements is determined to be the image distance x.

Figure 42:
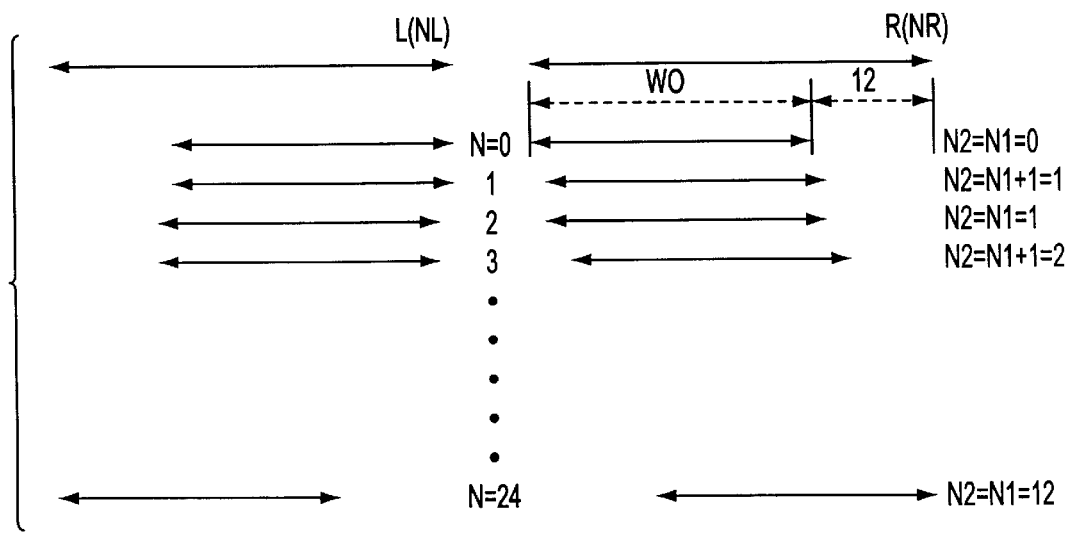
FIG. 42 is a diagram showing a location of photodiodes which are used in an evaluation function operation f(N) in the camera to which a distance measuring apparatus according to the fifth, sixth or seventh aspect of the present invention is applied.

The synopsis of the calculation of the subject distance will be explained below referring to FIG. 42. The addresses of the photodiodes of the left line sensor 153L are L(NL) and the addresses of the photodiodes of the right sensor 153R are R(NR). Assuming that the light receiving areas (image data) to be used for the calculation of the subject distance are selected as shown in FIG. 42, the evaluation function f(N) which represents the degree of coincidence of the image data between the line sensors 153L and 153R is given by the following formula 1:

$$f(N) = f(N1, N2) = \sum_{i=0}^{wo} |L(NL + N1 + i - 1) - R(NR + 11 - N2 + i)|$$

wherein
N2=N1 or N2=N1+1, and
$0 \leq N1+N2 \leq 24$.

In this embodiment, WO is 24, wherein WO stands for the number of bits used in the light receiving area. The correlative evaluation data obtained by the evaluation function f(N) decreases as the degree of coincidence of the image data increases. When the degree of coincidence is highest, the minimum value of the evaluation function f(N) is obtained. The minimum value is given by the following formula:

$$f(N-1) \leq f(N) < f(N+1)$$

Note, when the left and right image data groups are identical, the evaluation function is zero, i.e., f(N)=0. As can be understood from the foregoing, the minimum value of the evaluation function f(N) is obtained by calculating the evaluation function f(N) wherein the light receiving areas to be compared are relatively switched or shifted by one photodiode at each comparison. In general, when the minimum value is obtained, the degree of coincidence becomes highest. The position at which the degree of coincidence becomes highest is determined from a reference position (sensor start address) of each light receiving area.

Figure 43A:
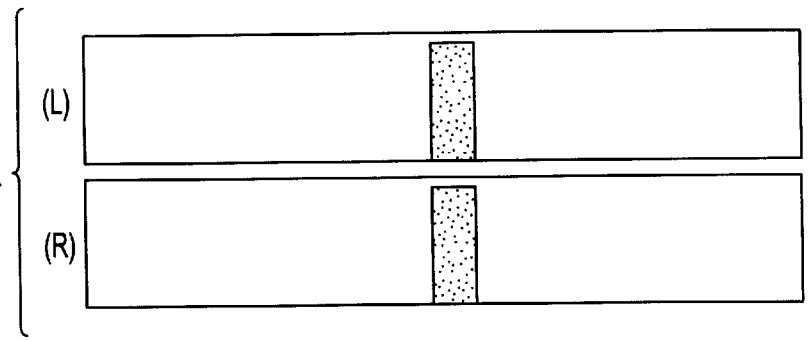
FIGS. 43(A), 43(B) and 43(C) show graphs of image data detected by the distance measuring unit, image data of light receiving areas, and evaluation values thereof in a camera to which a distance measuring apparatus according to the fifth or eighth aspect of the present invention is applied.
Figure 43B:
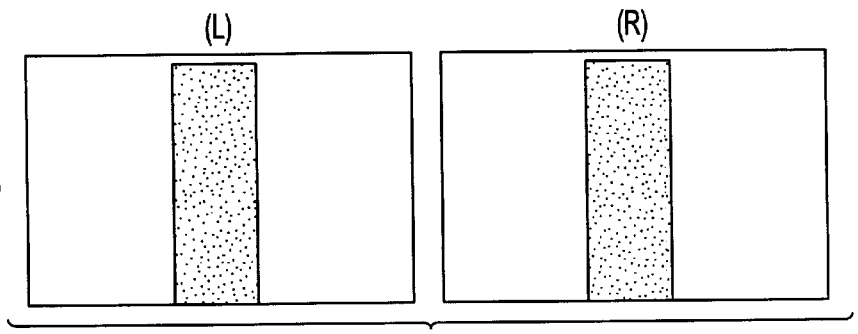
Figure 43C:
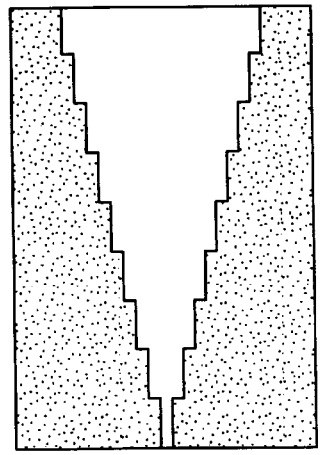
Figure 44A:
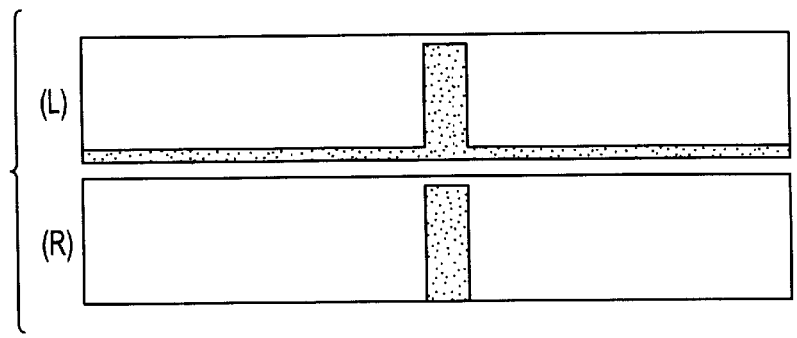
FIGS. 44(A), 44(B) and 44(C) show graphs of conventional image data, image data of light receiving areas, and evaluation values thereof when the amounts of light received by a pair of line sensors of a distance measuring unit are not balanced.
Figure 44B:
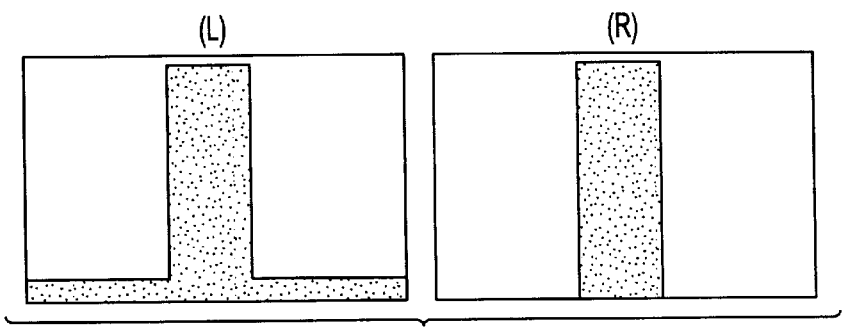
Figure 44C:
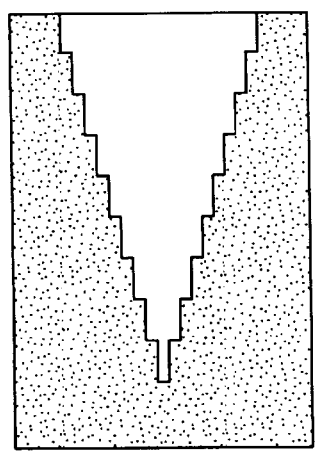

FIGS. 43 through 45 show graphs of exemplary image data detected by the distance measuring unit 151, the image data of the light receiving areas to be used for the calculation of the subject distance and the evaluation function f(N). In these drawings, the ordinate represents the brightness and the abscissa represents the position of the light receiving areas of the line sensors 153L and 153R. In FIGS. 43 through 45, (A) designates the image data of all of the light receiving areas of the line sensors 153L and 153R, (B) the image data of the selected light receiving areas of the line sensors 153L and 153R, (C) the correlative evaluation data, (L) the data on the left line sensor 153L and (R) the data on the right line sensor 153R. Note that in the bar graphs, the brightness increases as the height of the bars or lines decreases. Also, the degree of coincidence becomes high as the height of the bars or lines decreases.

As can be seen in FIG. 43, when there is no difference in the quantity of light to be received by the line sensors 153L and 153R, the minimum value at which the value of the evaluation function f(N) is approximately zero can be obtained. However, as shown in FIG. 44, when there is a difference in the quantity of light between the line sensors 153L and 153R, the minimum value of the evaluation function f(N) is identical to the difference in the quantity of light, and hence the measurement might be judged to be an error.

In the fifth aspect of the invention, even in such a case, an error in the judgement of the measurement does not occur. To this end, as shown in FIG. 45, in the fifth embodiment, the minimum values (brightest image data) among the respective image data obtained from the line sensors 153L and 153R are extracted to obtain a difference therebetween. Thereafter, the difference is subtracted from the respective image data of the brighter light receiving areas to correct the image data, as shown in FIG. 45B. Consequently, the level of the image data is shifted while maintaining the wave shape of the distribution pattern of the quantity of light. The correlative evaluation data at which the peak value is approximately zero can be obtained by calculating the evaluation function f(N) in accordance with the corrected image data.

The operation of the camera mentioned above will be discussed below with reference to the flow charts shown in FIGS. 46 through 56. The operation is carried out by the CPU 131 in accordance with a program stored in the internal ROM of the CPU 131.

Figure 46:
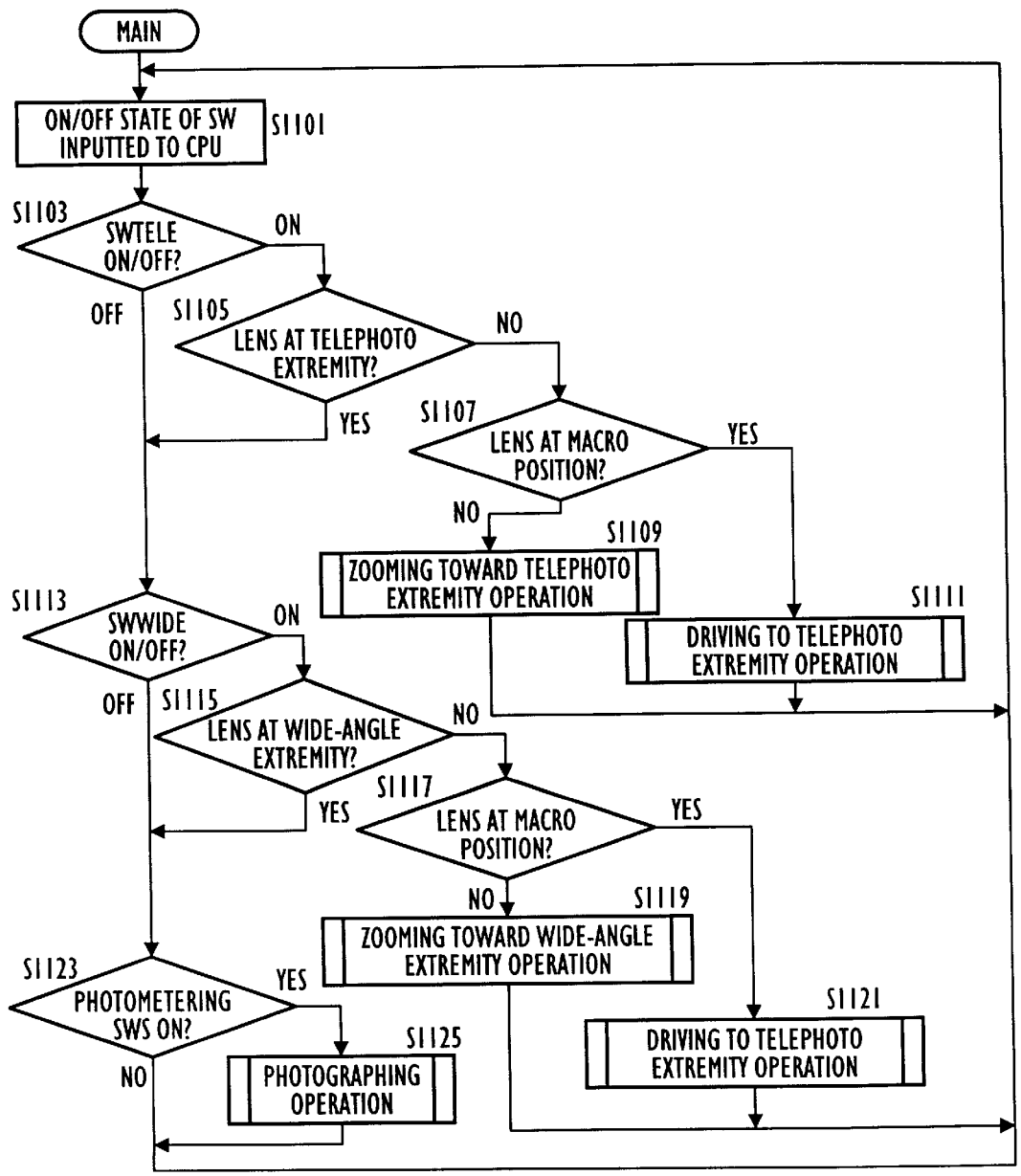
FIG. 46 is a flow chart of the main operations of a camera to which a distance measuring apparatus according to the fifth, sixth, seventh or eighth aspect of the present invention is applied.

When the main switch of the camera is turned ON, the control begins the operation shown in the flow chart of FIG. 46. First, the ON/OFF state of the switches SW is input to the CPU (Step S1101). Thereafter, whether or not the telephoto switch SWTELE and the wide-angle switch SWWIDE are turned ON is checked at Steps S1103, S1113, respectively. If the telephoto switch SWTELE is turned ON, it is then checked whether the zoom lens is at the telephoto extremity (Step S1105). If the zoom lens is at the telephoto extremity, control proceeds to Step S1113. If the zoom lens is not at the telephoto extremity, nor at the macro position (Step S1107), the zoom lens is moved in the telephoto direction by the zoom motor M (Step S1109). Thereafter, the control is returned to Step S1101. If the zoom lens is located at the macro position (Step S1107), the zoom lens 113 is moved to the telephoto extremity (Step S1111). Thereafter, the control is returned to Step S1101.

Note that in the course of the zooming operation in the telephoto direction, the zoom motor M is driven to move the zoom lens 113 towards the telephoto extremity while the telephoto switch SWTELE is ON. If the zoom switch SW is turned OFF or the zoom lens 113 reaches the telephoto extremity, the zoom motor M is stopped. Thereafter, the control is returned to Step S1101.

If the wide-angle switch SWWIDE is turned ON (Step S1113), it is then checked if the zoom lens is at the wide-angle extremity (Step S1115). If the zoom lens is at the wide-angle extremity control proceeds to Step S1123, but if the zoom lens 113 is not at the wide-angle extremity (Step S1115), nor at the macro position (Step S1117), the zooming operation in the wide-angle direction is carried out (Step S1119). Thereafter, the control is returned to Step S1101. If the zoom lens is at the macro position (Step S1117), the zoom lens is moved to the telephoto extremity and the control is returned to Step S1101 (Step S1121).

At Step S1123 it is checked if the photometering switch SWS is switched from OFF to ON. If the photometering switch SWS is ON, control proceeds to a "Photographing Operation" subroutine at Step S1125. Conversely, if the photometering switch SWS is OFF, the control is returned to Step S1101. When the "Photographing Operation" subroutine is complete control returns to Step S1101.

The "Photographing Operation" subroutine will be discussed below with reference to the flow charts shown in FIGS. 47 and 48.

When the control enters this subroutine, the DX-code reading circuit 133 is driven to input the ISO speed information (Step S1201), and thereafter the remaining battery voltage is checked (Step S1203). If the battery voltage is below a predetermined value, the control is returned because there is a possibility that normal photographing operations can not be executed. Namely, the real photographing operation starts when the battery voltage is above a predetermined value (Step S1205).

If the battery voltage is above a predetermined value, the distance measuring unit 151 is driven and the distance data is input to obtain the subject distance (Step S1207). The subject distance is obtained in a "Subject Distance Measuring Operation" subroutine, shown in FIG. 49. Thereafter, the photometering circuit 137 is driven to input the photometering data to thereby obtain the subject brightness, whereby the shutter speed Tv and the aperture value Av can be calculated in accordance with a predetermined "AE Calculating Operation" (Step S1209, Step S1211). Thereafter, whether or not the subject distance data has a default is checked (Step S1213). The subject distance data has a default, i.e., the measurement data is in error, for example when the subject contrast is too low to obtain the defocus amount. In case of a measurement error, the green light emitter 128 is blinked to indicate the measurement error (Steps S1215, S1221). Even if the measurement is not in error, if the subject distance is shorter than the shortest subject distance the green lighter emitter 128 is blinked (Steps S1215, S1217, S1221). If the measurement is neither in error nor the subject distance is shorter than the shortest subject distance, the green light emitter 128 is lit (Steps S1215, S1217, S1219).

After that, whether the strobe light should be emitted is checked (Step S1223). If the strobe light is to be emitted, an FM (flashmatic) operation is carried out to obtain the aperture value Av (Step S1225). When the FM operation has completed, whether or not the strobe charging has completed is checked (Step S1227). If the charging has completed, the red light emitter 129 is lit (Step S1229), while if charging has not completed, the red light emitter 129 is blinked (Step S1231).

Thereafter, the states of the photometering switch SWS and release switch SWR are input (Step S1233). No operation starts until the release switch SWR is turned ON (Steps S1235, S1237). If the photometering switch SWS is turned OFF before the release switch SWR is turned ON, both the green light emitter 128 and the red light emitter 129 are extinguished, and the control is returned (Steps S1237, S1239).

If the release switch SWR is turned ON (Step S1235), the self-timer light emitter 127 is lit to notify that a shutter will soon be released and the green light emitter 128 and the red light emitter 129 are extinguished (Step S1241). After that, the focusing lens is driven (Step 1243) and the self-timer light emitter 127 is extinguished (Step S1245) to perform the exposure operation (Step S1247) and the film winding/rewinding operation (Step S1249). After that, the control is returned to the main routine.

Figure 49:
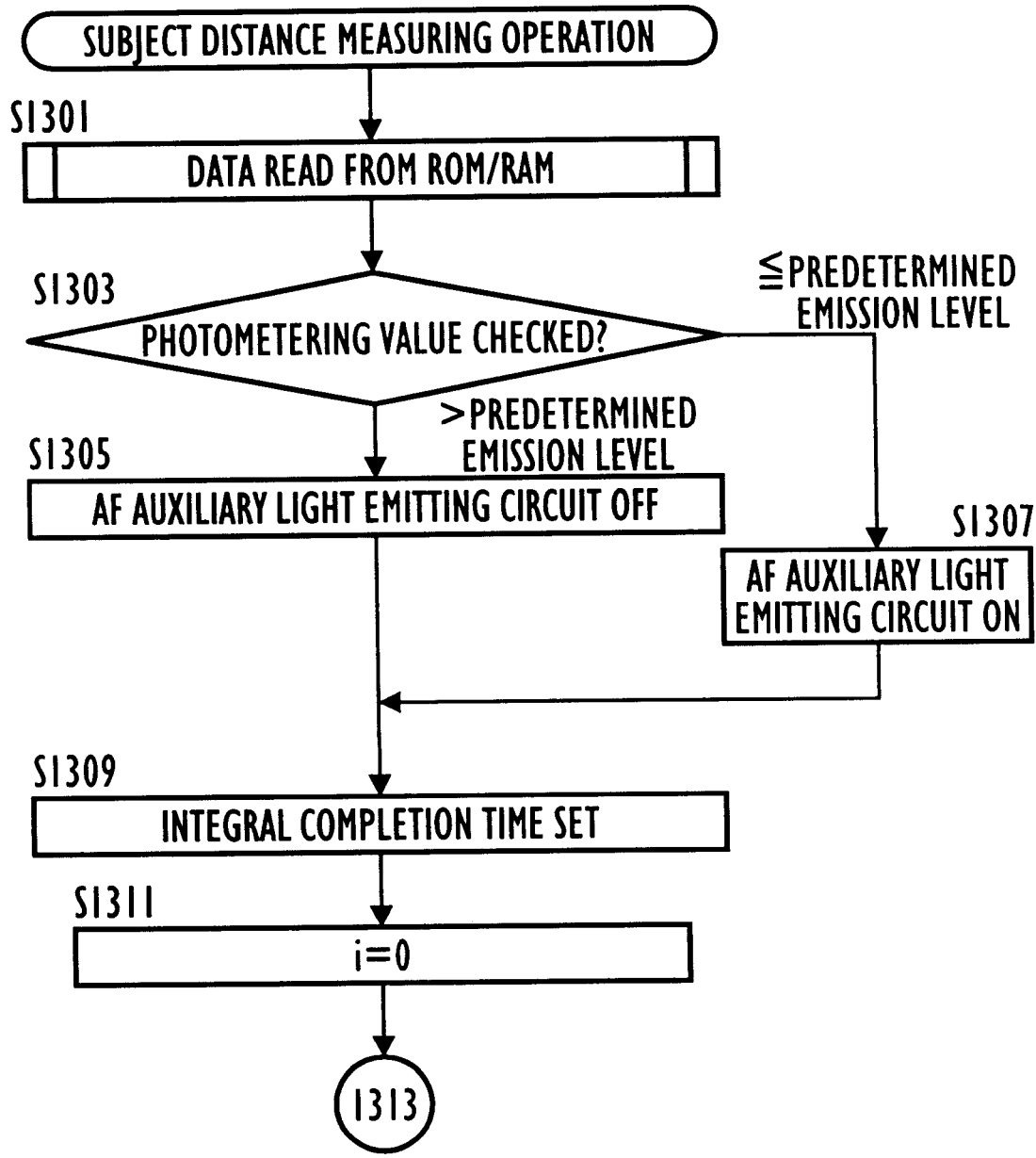
FIGS. 49 and 50 are flow charts showing a "Subject Distance Measuring Operation" subroutine in the photographing operation shown in FIGS. 47 and 48.

FIG. 49 shows the "Subject Distance Measuring Operation" subroutine at Step S1207. In this subroutine, various data, including the photometering value, on the subject distance is read from the ROM and RAM (Step S1301). Thereafter, whether the photometer value is above a predetermined emission level at which the auxiliary light should be emitted is checked (Step S1303). If the value is above the predetermined emission level, the AF auxiliary light emitting circuit 139 is turned OFF (Step S1305). Conversely, if the value is below the predetermined emission level, the AF auxiliary light emitting circuit 139 is activated to commence the emission of the auxiliary light (Step S1307).

The integral completion time is set (Step S1309), and the variable "i", which determines the number of the measuring operations, is set "0" (Step S1311). Thereafter (FIG. 50), the distance measuring unit 151 is reset, i.e., the integral values are swept to start the integral operation of the distance measuring unit 151 (Step S1313). In this embodiment, the distance measuring unit 151 to which the reset signal is supplied from the CPU 131 executes the integral operation. Consequently, the data for each photodiode of the line sensors 153L and 153R is supplied to the CPU 131 which stores the data bits in the RAM.

After the distance measuring unit 151 is reset (Step S1313), the light receiving areas to be used for the calculation of the subject distance are set (Step S1315). Namely, the right line sensor starting address NR and the left line sensor starting address NL are set to commence the reading operation of the image data (Steps S1401, S1403 in FIG. 51). A predetermined number of the image data determined from the addresses of the set light receiving areas are read to perform a "Data Correcting Operation" subroutine (FIG. 52), in which the levels of the image data of the right and left line sensors are made identical (Steps S1317, S1319).

Figure 55:
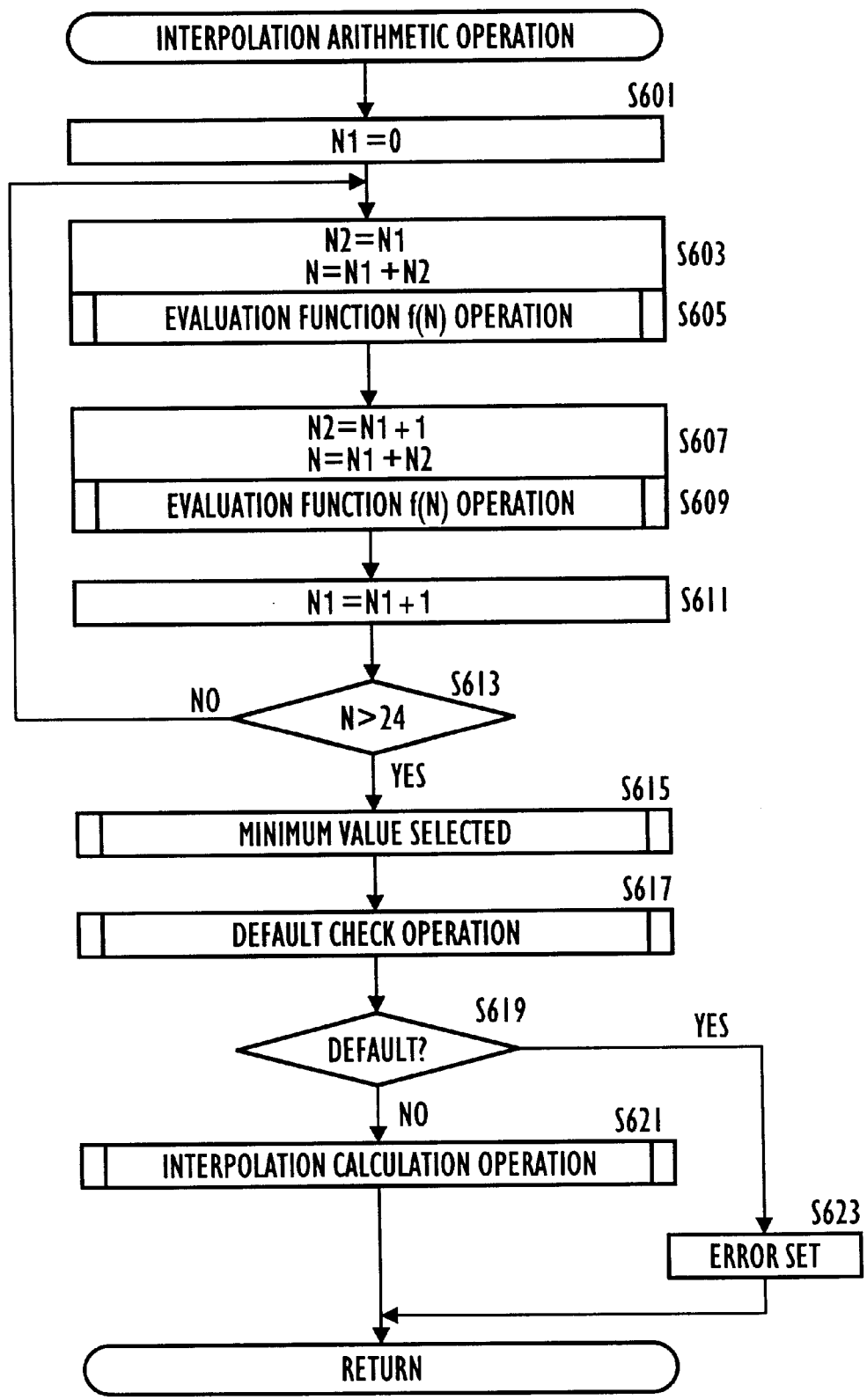
FIG. 55 is a flow chart showing an "Interpolation Arithmetic Operation" subroutine in a camera to which a distance measuring apparatus according to the fifth aspect of the present invention is applied.

Thereafter, at Step S1321, a subroutine "Interpolation Arithmetic Operation" shown in FIG. 55 is carried out so as to obtain, for each line sensor 153L, 153R, the position (i.e., the center position) of a subject image formed on a corresponding line sensor. The subroutine "Interpolation Calculation Operation" of the evaluation function f(N) is included in the subroutine "Interpolation Arithmetic Operation".

The above-mentioned operations at Steps S1315 through S1321 are effected for each of the five light receiving areas MC, ML, MR, MLC and MRC (Steps S1323, S1315 to S1323).

Upon completion of the subroutine "Interpolation Arithmetic Operation" for each light receiving area, a subject image distance value is calculated for each of all the light receiving areas MC, ML, MR, MLC, based on triangulation as explained above with reference to FIG. 39, to thereby obtain five subject image distance values, and subsequently, one of the five subject image distance values is selected, at a subroutine labelled "Subject Image Distance Value Calculating and Selecting Operation", at Step S1325. Note that "subject image distance value" is a value corresponding to the distance of "x–B" (i.e., the distance "x" minus the distance "B") shown in FIG. 39. Therefore, the greater the subject image distance value is, the closer a subject to be photographed is to the camera.

If no correct subject image distance value is obtained, i.e., if all the subject image distance values are in error when the subroutine "Subject Image Distance Value Calculating and Selecting Operation" at Step S1325 is completed, the auxiliary light is emitted once by the AF auxiliary light emitter (not shown), actuated by the AF auxiliary light emitting circuit 139, to again carry out the operations at Steps S1313 through S1325 (Steps S1327, S1329, S1331, S1333 and S1325 through S1325).

If a correct or effective subject image distance value is obtained from at least one light receiving area from the operations at Steps S1313 through S1325, or if the operations at Steps S1313 through S1325 have completed for a second time, it is then checked at Step S1335 whether or not the subject image distance values for all the light receiving areas are in error. If all the values are not in error, i.e., if at least one correct subject image distance value is obtained, that subject image distance value is converted into displacement data (LL) for the focusing lens at Step S1337. Thereafter, the control returns. If it is judged that all the subject image distance values are in error at Step S1335, a measurement error flag is set at Step S1339 and the control returns.

The subroutine "Subject Distance Measuring Operation" will now be described below in more detail with reference to FIGS. 52 through 56.

Figure 52:
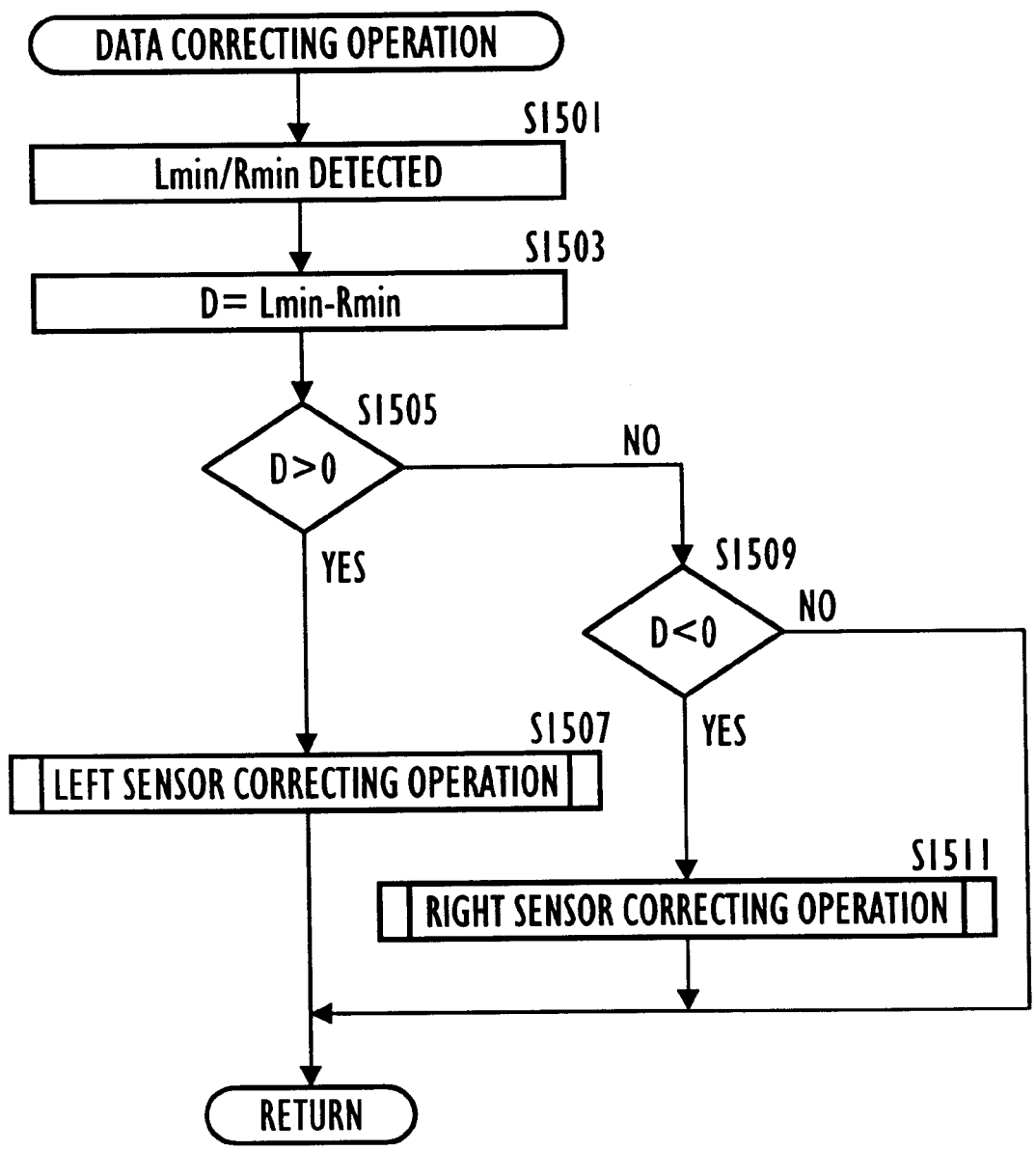
FIG. 52 is a flow chart showing a "Data Correcting Operation" subroutine in the subroutine shown in FIGS. 49 and 50.

FIG. 52 shows the "Data Correcting Operation" subroutine at Step S1319. When the control enters this subroutine, the minimum value Lmin of the image data (left sensor data) of the left line sensor 153L corresponding to the maximum subject brightness, and the minimum value Rmin of the image data (right sensor data) of the right line sensor 153R corresponding to the maximum subject brightness are detected (Step S1501). Thereafter, a difference D, between the minimum values Lmin and Rmin is calculated (Step S1503). If the difference D is larger than 0, i.e., if the minimum value Lmin is larger than the minimum value Rmin, the left line sensor data is corrected (Steps S505, S1507). If the difference D is smaller than 0, i.e., if the minimum value Rmin is larger than the minimum value Lmin, the right line sensor data is corrected (Steps S1505, S1509, S1511). If the difference D is 0, i.e., if the minimum value Lmin is identical to the minimum value Rmin, the control is returned (Steps S505, S509). Namely, the data correction is effected in accordance with a comparison of image data at the brightest points on the left and right line sensors.

Figure 53:
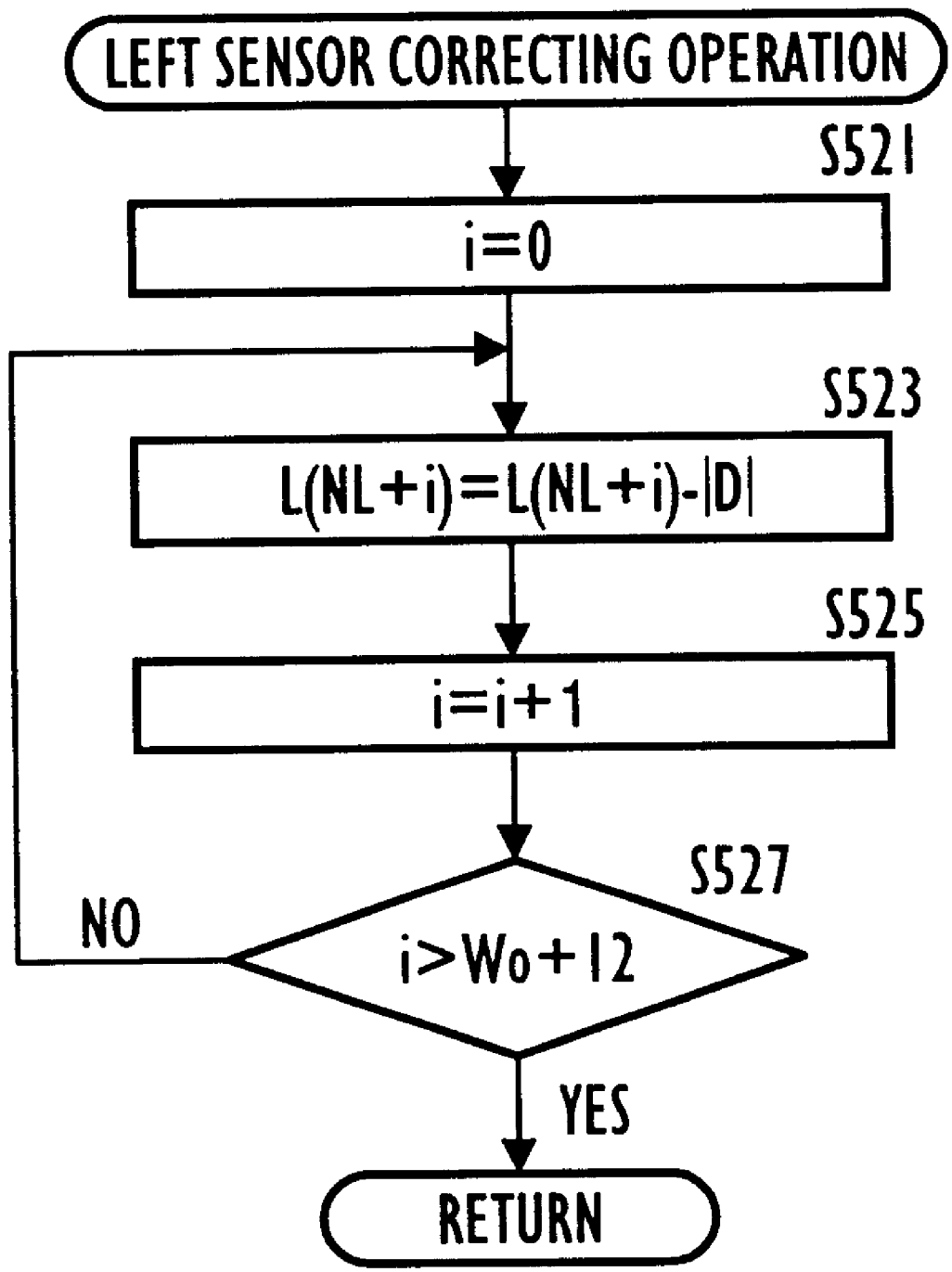
FIGS. 53 and 54 are flow charts showing a "Sensor Correcting Operation" in the subroutine shown in FIG. 52.
Figure 54:
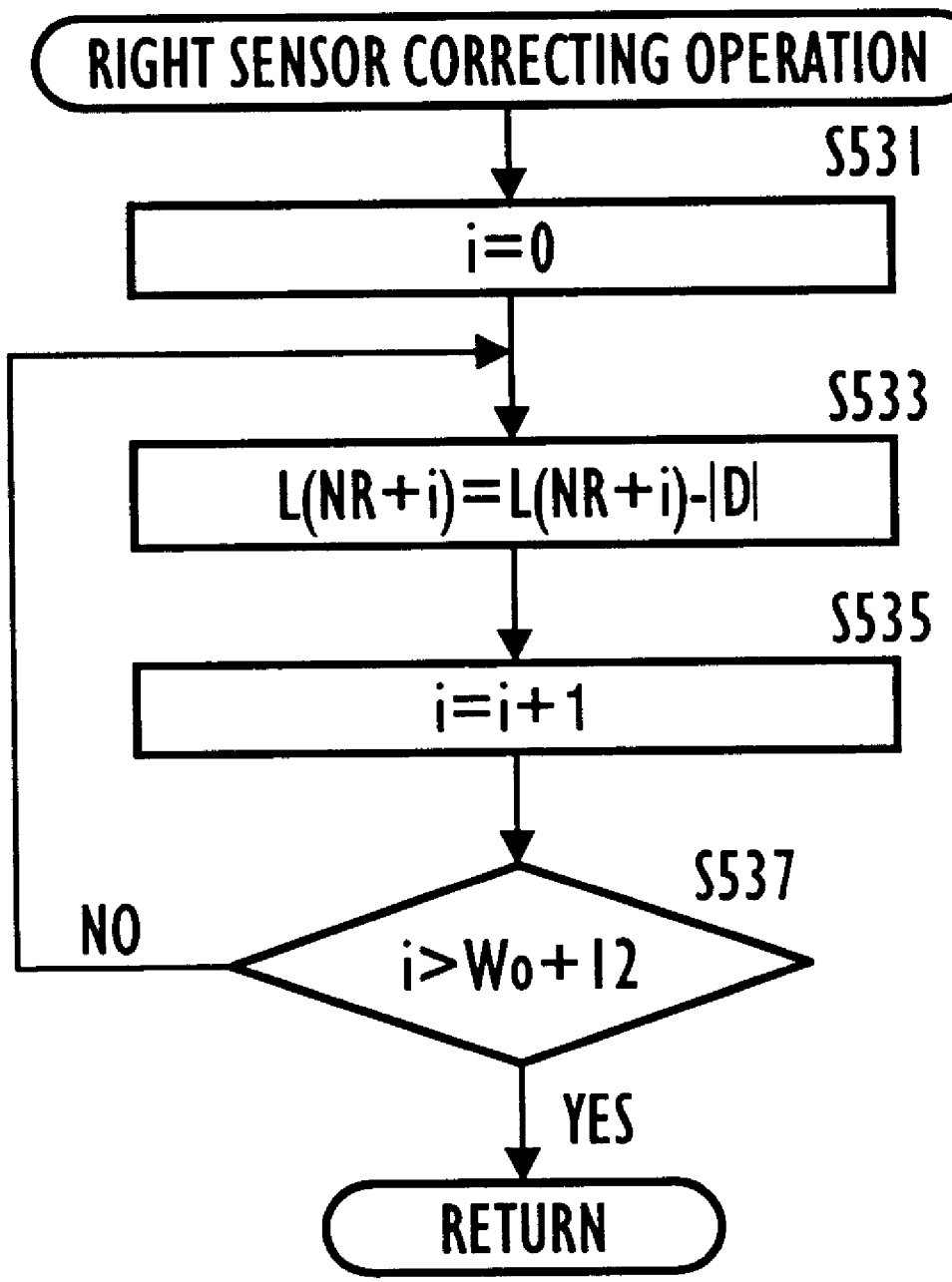

The "Sensor Correcting Operation" subroutine at Steps S507 and S511 will be described below with reference to FIGS. 53 and 54.

In this subroutine, the difference D is added to one of the left or right sensor data whose minimum value is smaller than that of the other sensor data, to make the data levels of the left and right sensor data identical. Upon correction of the left sensor data, the variable "i" is set zero (Step S521). Thereafter, the image data L(NL+i) at the address of (NL+i) is substituted by a value which is obtained by subtracting the difference |D| (absolute value) from the image data L(NL+i) at Step S523, and then, 1 is added to the variable "i" (Step S525). The operations mentioned above are repeated until the variable "i" becomes more than WO (i.e., 24)+12 (Step S527).

Similarly, in the correction of the right sensor data, the variable "i" is set zero (Step S531). Thereafter, the image data R(NR+i) at the address of (NR+i) is substituted by a value which is obtained by subtracting the difference |D| (absolute value) from the image data R(NR+i) at Step S533, and then, 1 is added to the variable "i" (Step S525). The operations mentioned above are repeated until the variable "i" becomes more than WO+12 at Step S537.

As a result of the correction of the left and right sensor data, the difference D therebetween can be subtracted from each piece of image data corresponding to each measuring area to correct the image data.

The "Interpolation Arithmetic Operation" subroutine at Step S1321 will be discussed below with reference to FIG. 55.

In this subroutine, the variable N1 is set at zero (Step S601). Thereafter, the variable N1 is replaced by the variable N2, and the sum of the variables N1 and N2 is replaced by variable N (Step S603) to calculate the evaluation function f(N) at Step S605. Thereafter, the variable N2 is set to equal (N1+1) and the variable N is set to equal (N1+N2), to calculate the evaluation function f(N) at Steps S607 and S609. When the calculation of the evaluation function f(N) has completed, the variable N1 is set to equal (N1+1) at Step S611.

The operations at Steps S603 through S611 are repeated until the variable N becomes 25 . Namely, each operation is repeated by shifting the bit one at a time (Steps S613, S603 through S611).

When twenty five values of the evaluation function f(N) are obtained, the minimum value, i.e., light receiving area corresponding to the highest degree of coincidence of the distribution patterns of the quantity of light, is selected from among the twenty five values (Step S615). Thereafter, whether or not there are a plurality of minimum values (i.e., whether the measurement is defective) is checked. If the measurement is not defective, the "Interpolation Calculation Operation" is carried out and the control is returned (Steps S617, S619, S621). If the measurement is defective, the error bit is set and the control is returned (Steps S617, S619, S623). If the error bit is set, the measurement error operations, such as blinking the green light emitter 28 or a locking of the release, etc., are carried out.

Figure 56:
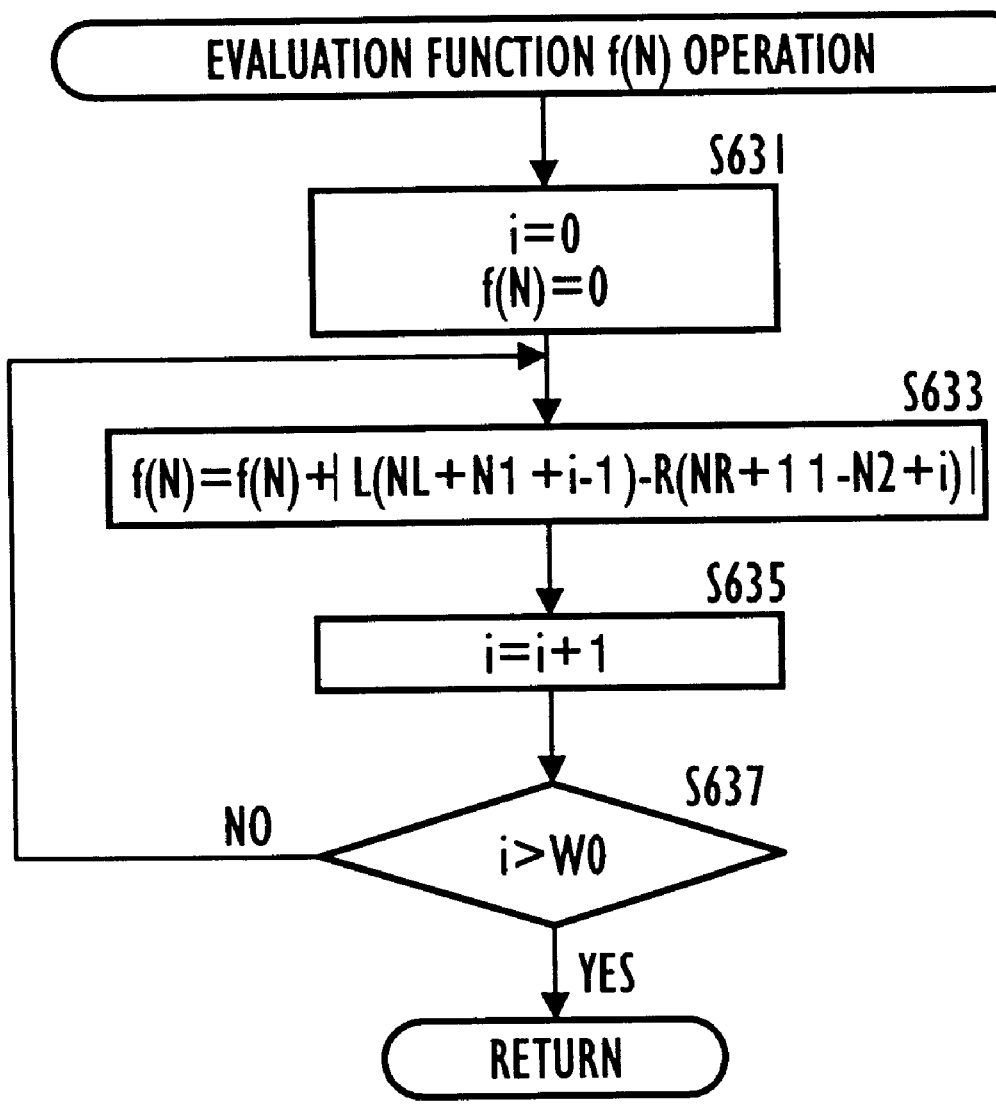
FIG. 56 is a flow chart showing an "Evaluation Function f(N)" subroutine for an operation to calculate an evaluation function f(N) in a camera to which a distance measuring apparatus according to the fifth, sixth or seventh aspect of the present invention is applied.

The "Evaluation Function f(N) Operation" subroutine at Steps S605 and S609 will be discussed below with reference to FIG. 56.

In the calculation of the evaluation function f(N), the sum of the differences between the corresponding bit data of the right and left light receiving areas is obtained for each bit of the light receiving area.

The variable "i" and the evaluation function f(N) are both set zero (Step S631). Thereafter, the values of the evaluation function f(N) are calculated by increasing the value of the variable "i" one by one from zero to WO (Steps S633, S635 and S637). Consequently, data of the evaluation function f(N) is obtained.

In the illustrated embodiment, the right and left light receiving areas are alternately shifted one bit by one bit by the operation shown in FIG. 55. The shifting operation for 12 bits in total take place to obtain twenty five values of the evaluation function f(N). The number of bits to be shifted in one operation and the total number of bits are not limited to those in the illustrated embodiment.

As can be seen from the above discussion, according to the fifth aspect of the present invention, if there is a difference in the quantity of light between the left and right line sensors 153L and 153R, the image data of one of the line sensors is entirely corrected without modifying the wave shape defined by the image data. Thus, even if there is a remarkable difference in the quantity of light between the left and right line sensors, a correct subject image distance value can be obtained.

As may be understood from the foregoing, according to the fifth aspect of the present invention in which the distance measuring apparatus includes a pair of line sensors, image data corresponding to the maximum brightness (maximum brightness equivalent values) in each line sensor is detected from among the image data supplied from the light receiving areas of the line sensors. Thereafter, the difference between the maximum brightness equivalent values is obtained. Consequently, the image data of one of the line sensors is corrected in accordance with the difference data. Therefore, even if there is a considerable difference in the quantity of light received by the line sensors, the difference can be absorbed or cancelled, and hence, a precise automatic focusing operation can be achieved.

Another embodiment (i.e., a sixth embodiment) of a camera to which a distance measuring apparatus according to a sixth aspect of the present invention is applied will be discussed below. The camera of the sixth embodiment is similar to the camera of the fifth embodiment to which the fifth aspect of the present invention is applied, except in several respects. The following explanation will only be directed to that structure unique to the sixth embodiment. The camera of the sixth embodiment will be explained below with reference to FIGS. 35~42, 46~49, 51~54, 56, and 57~63.

Figure 57:
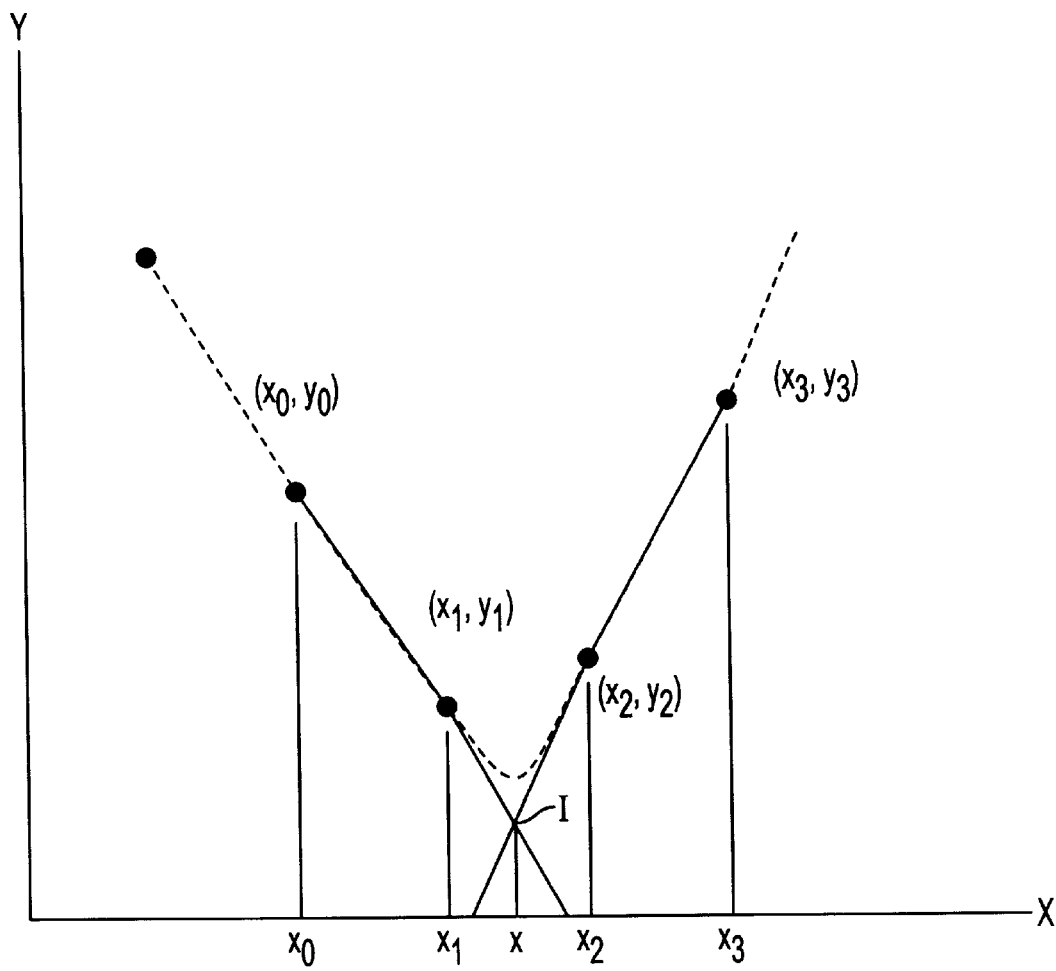
FIG. 57 is an explanatory view to obtain a minimum value of the evaluation function f(N) by interpolation.

Although the minimum value of the evaluation function can be obtained by using the aforementioned evaluation function f(N) at each photodiode (light receiving element) of each line sensor, sometimes the real minimum value exists between two photodiodes (i.e., between the center of one photodiode and the center of an adjacent photodiode). FIG. 57 shows the principle of calculating the minimum value of the evaluation function with the aforementioned evaluation function f(N) by interpolation.

In this interpolative calculation, a section between two photodiodes, in which the real minimum value is considered to exist, is firstly found, and subsequently, two straight lines which intersect in the section found are set. Then, the coordinate point of the intersection of the two straight lines is calculated. In the case shown in FIG. 57, the coordinates (x,y) of the intersection I of the two straight lines is calculated by two straight lines respectively passing through two pairs of points, i.e., the first pair $(x_0, y_0)$ and $(x_1, y_1)$ and the second pair $(x_2, y_2)$ and $(x_3, y_3)$, between which the real minimum value is considered to exist. In FIG. 57, the X-coordinate and the Y-coordinate represent the center of a subject image formed on a light receiving area of a line sensor and the evaluation value, respectively. The X-coordinate of the intersection I "x" represents the center of a specific subject image formed on a light receiving area.

It will be appreciated from FIG. 57 that the steeper the two straight lines are, the more precisely the position of the center "x" can be detected. Namely, the higher the contrast of a subject is, the steeper the two straight lines become and thus the position of the center "x" can be detected more precisely. The lower the contrast of a subject is, the flatter the two straight lines become and thus the detection of the position of the center "x" becomes more imprecise.

Furthermore, in the case where a subject image having a repetitive pattern exists within a light receiving area or in the case where images of near distance subjects and far distance subjects coexist within the light receiving area, more than one minimum value of the evaluation function exists. In such a case, it is impossible to precisely judge which minimum value is the real minimum value.

To solve this problem, according to the distance measuring apparatus to which the sixth aspect of the present invention is applied, the precision of subject distance measuring can be made higher, when the contrast of an image of a subject to be photographed is low, by enlarging the light receiving area in which the contrast is low, in both of the line sensors, i.e., if image contrast is low in MC, for example, MC is enlarged. Similarly, when images of near distance subjects and far distance subjects coexist within a light receiving area, that particular measuring area is narrowed.

FIGS. 58 and 59 show graphs of the image data detected by the distance measuring unit 151, the image data of the light receiving areas to be used for the calculation of the subject image distance value and the evaluation function f(N), by way of example. In these drawings, the ordinate represents the brightness and the abscissa represents the position of the light receiving areas of the line sensors 153L and 153R. In FIGS. 58 and 59, (a) and (A) each designate the image data of all of the light receiving areas of the line sensors 153L and 153R, (b) and (B) the image data of the selected light receiving areas of the line sensors 153L and 153R, (c) and (C) the correlative evaluation data, "L" the data on the left line sensor 153L and "R" the data on the right line sensor 153R. Also in FIGS. 58 and 59, (a), (b) and (c) show the data of the prior art, while (A), (B) and (C) show the data of the sixth embodiment of the present invention. Note that in the bar graphs, the brightness increases as the height of the bars or lines decreases. Also, the degree of coincidence becomes high as the height of the bars or lines decreases.

FIG. 58 shows examples when the contrast within a regular light receiving area is low. In this case, specifically in the case of the prior art of (a), (b) and (c), the minimum value of the correlative evaluation data cannot be accurately derived, thus leading to an error in a subject image distance value measurement. To solve this problem, in the sixth embodiment of the present invention, a light receiving area is enlarged when the contrast of a subject image within that particular light receiving area is low. Thus, in the enlarged light receiving area the chances of a subject image existing having a high contrast are increased. Accordingly, the appropriate correlative evaluation data is obtained and the possibility of obtaining an accurate subject image distance value increases.

FIG. 59 shows examples when images of near distance subjects and far distance subjects coexist within a regular light receiving area. In this case, specifically in the case of the prior art of (a), (b) and (c), the minimum value of the correlative evaluation data cannot be specified since the correlative evaluation data includes a plurality of minimum values, thus leading to an error in a subject image distance value measurement. To solve this problem, in the sixth embodiment of the present invention, a light receiving area, in which images of near distance subjects and far distance subjects coexist, is narrowed thus reducing the number of subject images coexisting within that particular light receiving area. In other words, a subject image coexisting with another subject image within a regular light receiving area is not included in the narrowed light receiving area. Thus, the precision of subject image distance value measuring can be increased.

Note that in the camera of the sixth embodiment to which the sixth aspect of the present invention is applied, a default occurring because a subject image has a low contrast, is defined as "1", and that a default occurring due to an existence of a plurality of minimum values in the correlative evaluation data, even when a subject to be photographed has a high contrast, is defined as "2", so as to distinguish the former type of default from the latter type. Note that the subject image could also have a low contrast due to either a dark subject or a blurry subject image (due to a subject being out of focus, for example).

The operation of the camera of the sixth embodiment having the above mentioned circuit structure will be hereinafter discussed. The main routine performed by the CPU 131 is the same as that of the camera of the fifth embodiment which is shown in FIG. 46.

Figure 47:
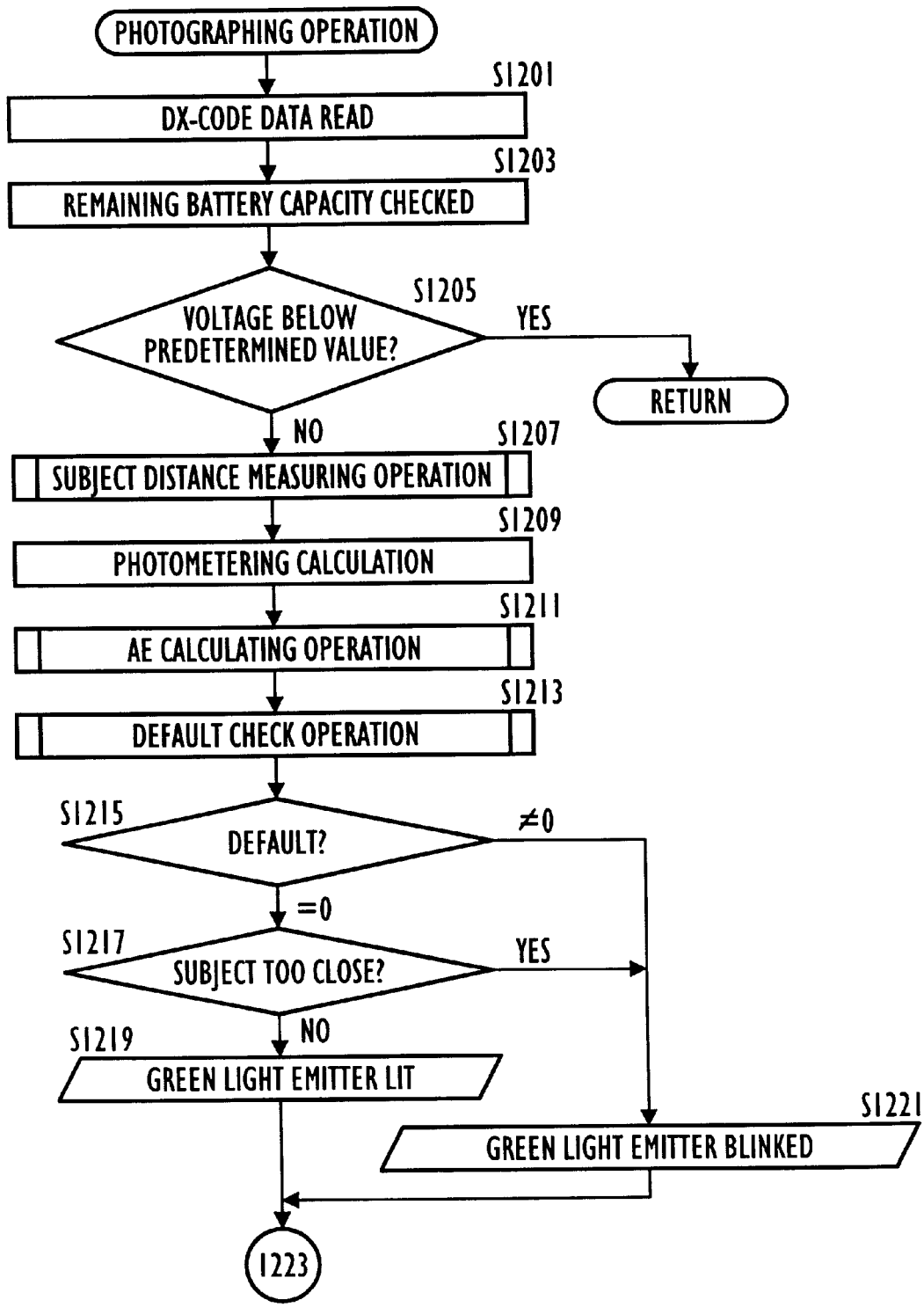
FIGS. 47 and 48 are flow charts showing a "Photographing Operation" subroutine in the main operation shown in FIG. 46.
Figure 48:
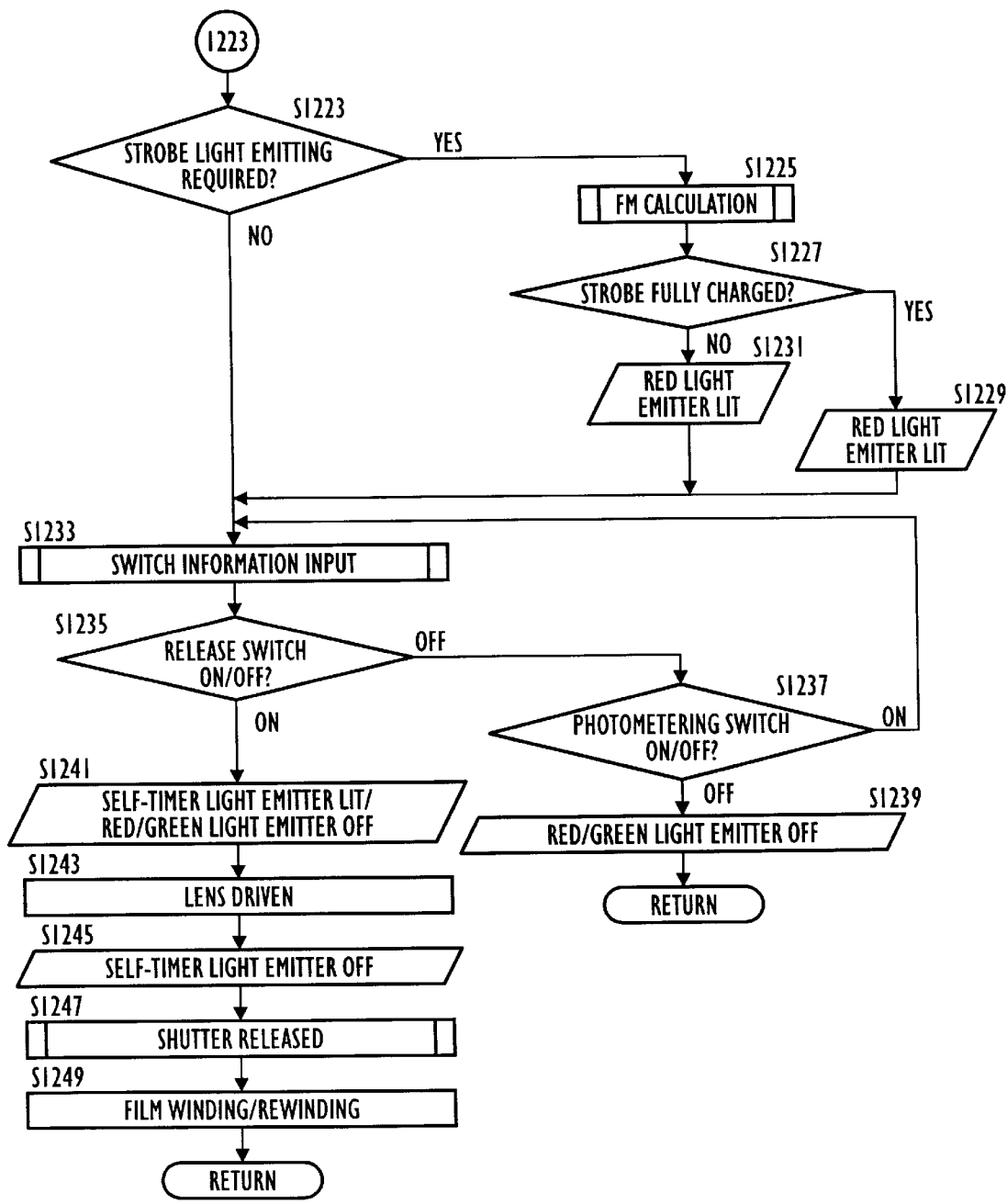

The subroutine "Photographing Operation" at Step S1125 in the main routine is also the same as that in the camera of the fifth embodiment which is shown in FIGS. 47 and 48.

Figure 60:
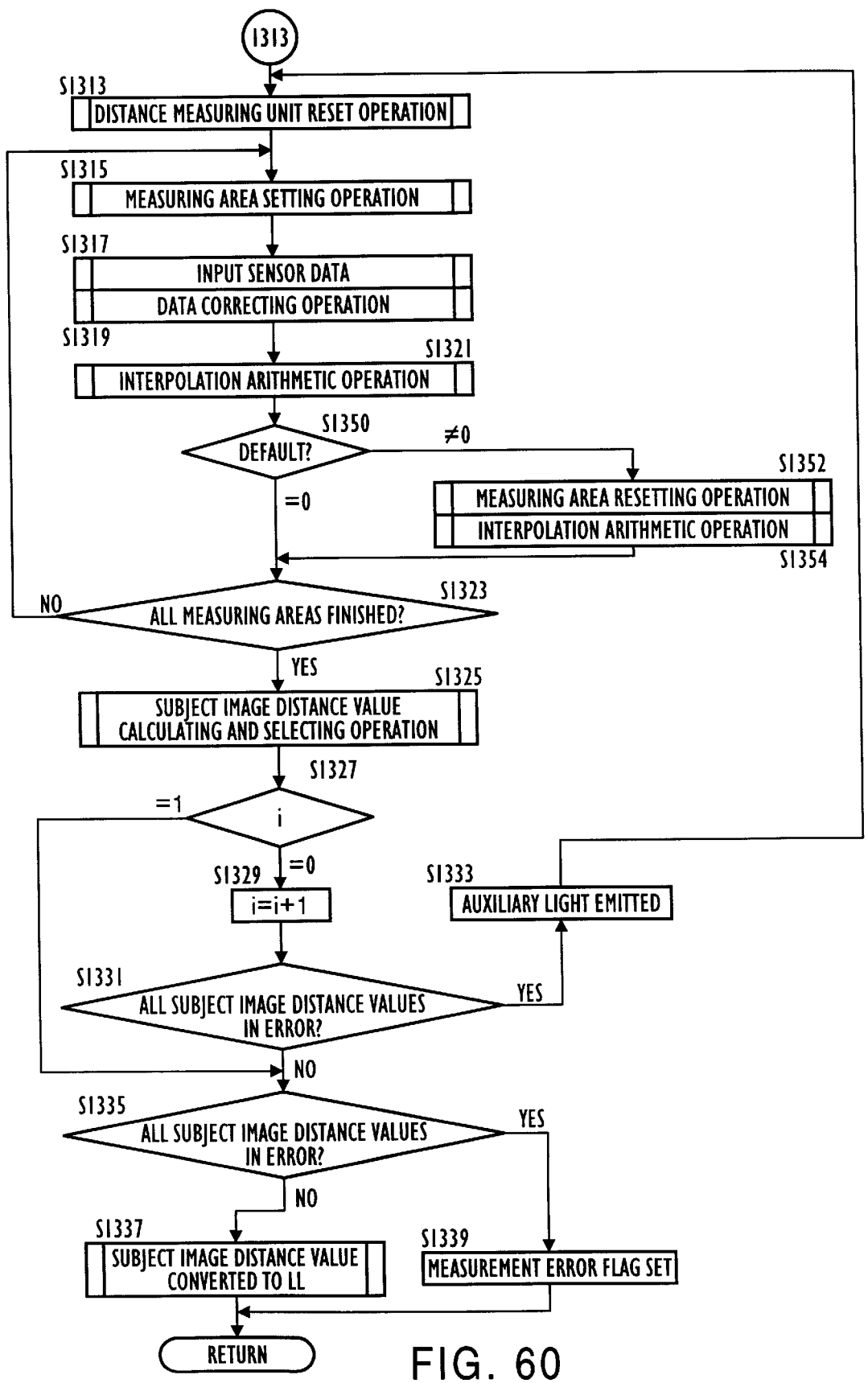
FIG. 60 is a flow chart showing a "Subject Distance Measuring Operation" subroutine in a camera to which a distance measuring apparatus according to the sixth aspect of the present invention is applied.

The subroutine "Subject Distance Measuring Operation" at Step S1207 in the camera of the sixth embodiment will be discussed below with reference to FIGS. 49, 50 and 60.

Figure 50:
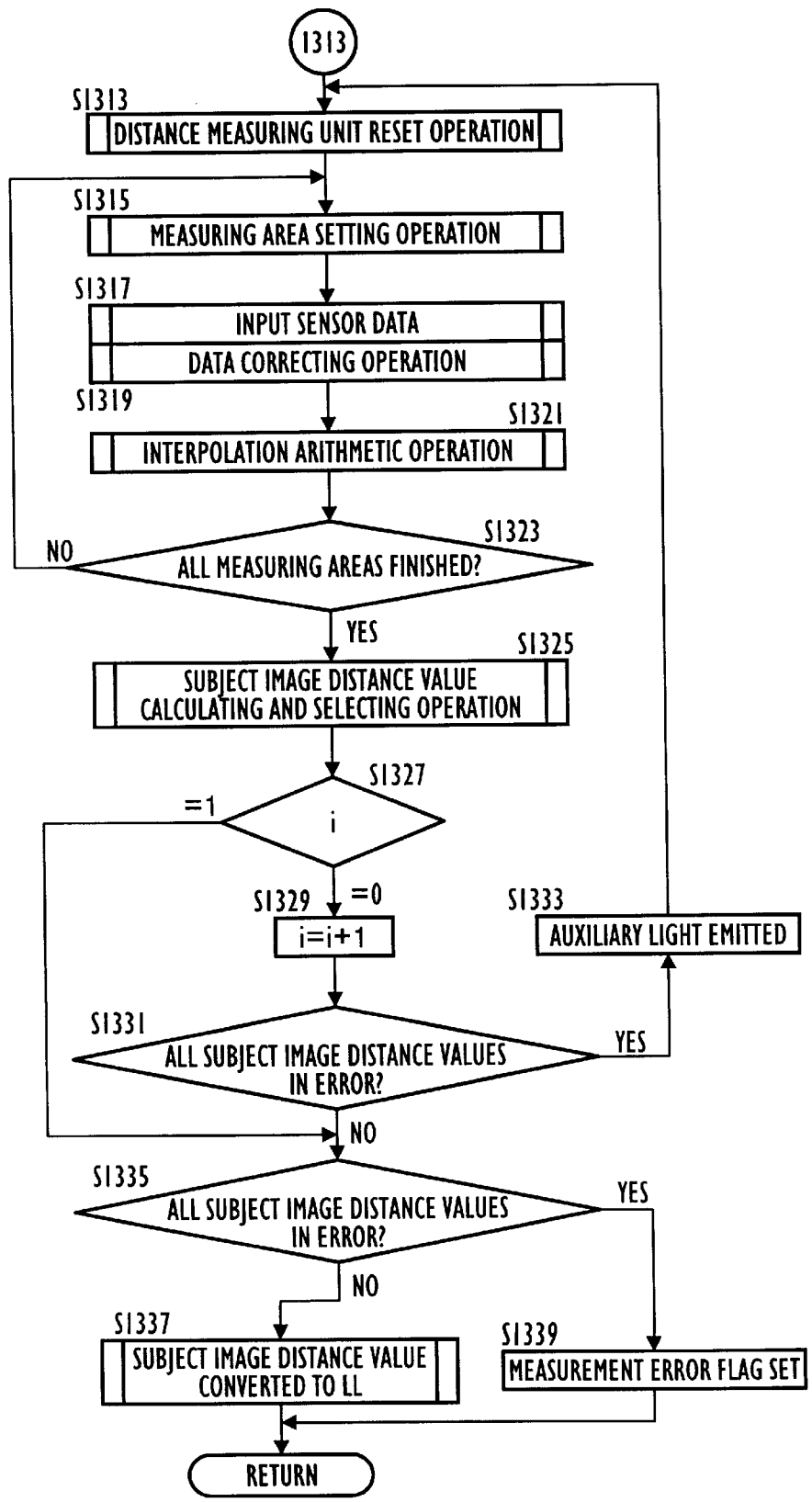

The subroutine "Subject Distance Measuring Operation" in the camera of the sixth embodiment is identical to that of the camera of the fifth embodiment (shown in FIGS. 49 and 50), except that the former subroutine includes the operations at Steps S1350, S1352 and S1354 between Steps S1321 and S1323 whereas the latter subroutine does not include the same between Steps S1321 and S1323 (FIG. 50). The following explanation of the subroutine "Subject Distance Measuring Operation" in the camera of sixth embodiment, will only be directed to those steps unique to the sixth embodiment, i.e., Steps S1350, S1352 and S1354.

After passing through the subroutine "Interpolation Arithmetic Operation" at Step S1321, the control proceeds to Step S1350 to check if the measuring data calculated in the subroutine "Interpolation Arithmetic Operation" at Step S1321 has a default or not, i.e., if the default is "0" or not. If it is judged that the default is not "0" at Step S1350, i.e., the default is "1" or "2", the control proceeds to a subroutine labelled "Measuring Area Resetting Operation" at Step S1352. Here the corresponding light receiving area having the default "1" or "2" is enlarged or narrowed.

After Step S1352 the control proceeds to a subroutine labelled "Interpolation Arithmetic Operation" at Step S1354, similar to the subroutine at Step S1321, to again carry out an interpolation arithmetic operation, and thereafter, the control proceeds to Step S1323. Hence, the operations at Steps S1315 through S1321 and Steps S1350 through S1354 are effected for each of the five light receiving areas MC, ML, MR, MLC and MRC (Steps S1323, S1315 to S1321, S1350 to S1354, and S1323).

Figure 61:
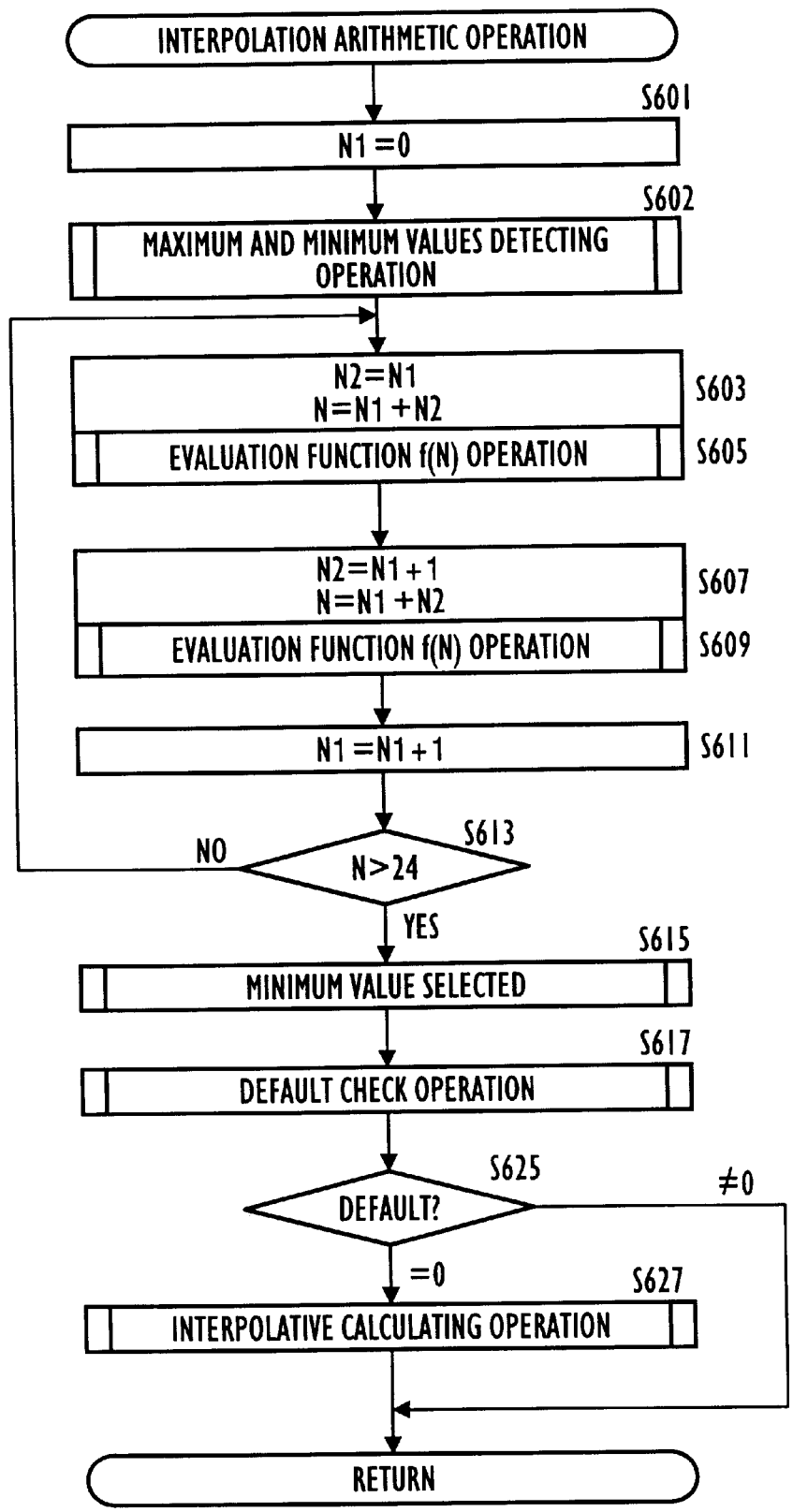
FIG. 61 is a flow chart showing an "Interpolation Arithmetic Operation" subroutine in a camera to which a distance measuring apparatus according to the sixth or seventh aspect of the present invention is applied.

The subroutine "Interpolation Arithmetic Operation" at Step S1321 or S1354 will be hereinafter discussed with reference to a flow chart shown in FIG. 61. The subroutine shown in FIG. 61 is the same as that in the camera of the fifth embodiment which is shown in FIG. 55, except that the subroutine "Interpolation Arithmetic Operation" of the sixth embodiment has an operation at Step S602 immediately after Step S601, and it does not have operations corresponding to Steps S619, S621 and S623, but instead has operations at Steps S625 and S627. The following explanation of the subroutine "Interpolation Arithmetic Operation" will only be directed to those steps unique to the sixth embodiment, i.e., Steps S602, S625 and S627.

After the operation of Step S601, the control proceeds to a subroutine labelled "Maximum and Minimum Values Detecting Operation" at Step S602. Here a maximum value and a minimum value in the bit data are detected for each line sensor 153L, 153R, and subsequently, the control proceeds to Step S603.

After the subroutine "Default Check Operation" at Step S617, the control proceeds to Step S625 to check whether the default is "0" or not. If it is judged at Step S625 that the default is "0", the control proceeds to a subroutine labelled "Interpolative Calculating Operation" at Step S627. If it is judged at Step S625 that the default is not "0", the control returns.

Figure 51:
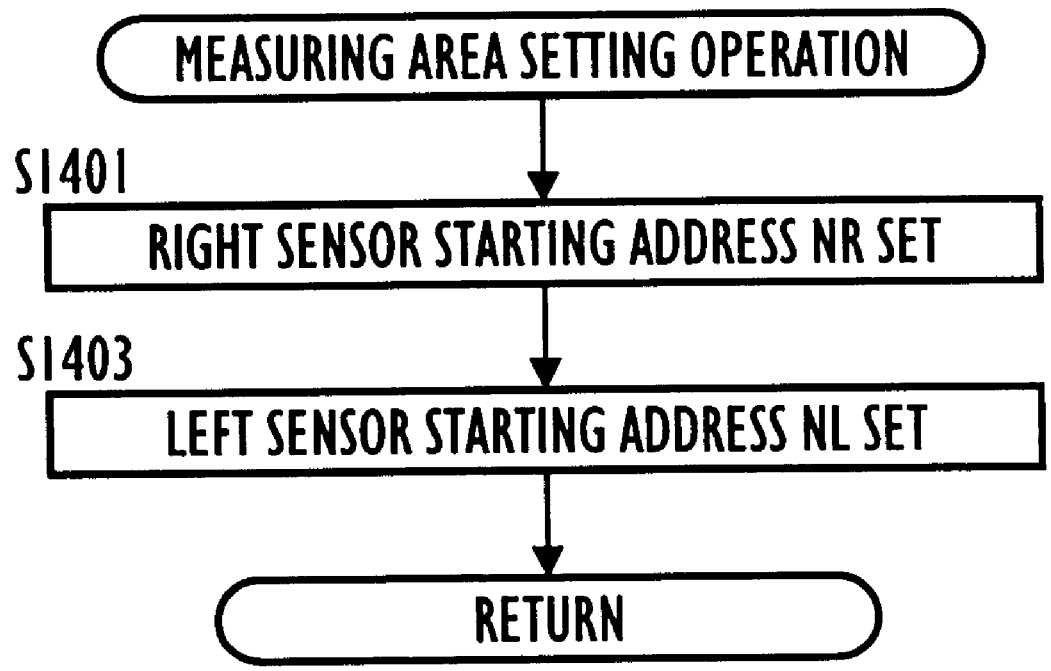
FIG. 51 is a flow chart showing a "Measuring Area Setting Operation" subroutine in the subroutine shown in FIGS. 49 and 50, in a camera to which a distance measuring apparatus according to the fifth, sixth or seventh aspect of the present invention is applied.

In the camera of the sixth embodiment, the subroutines "Measuring Area Setting Operation" at Step S1315 and "Data Correcting Operation" at Step S1319 are the same as those in the camera of the fifth embodiment which are shown in FIGS. 51 and 52, respectively. Furthermore, the subroutines "Sensor Correcting Operation" in the subroutine "Data Correcting Operation" at Step S1319 are also the same as those in the camera of the fifth embodiment which are shown in FIGS. 53 and 54, respectively.

The subroutine "Default Check Operation" at Step S617 will be hereinafter discussed with reference to a flowchart shown in FIG. 62. In this subroutine it is checked if the contrast of a subject image is low, and if images of near distance subjects and far distance subjects coexist in the light receiving area when judging that the contrast of a subject image is not low.

When the control enters this subroutine, the default is set at "0" at Step S651. Thereafter, at Step S653, maximum and minimum value bit data for each line sensor 153L and 153R, which have been detected at Step S602, are stored in an internal RAM, and the difference between the maximum value and the minimum value is calculated for each of the line sensors 153L and 153R as the difference DL and the difference DR, respectively.

Thereafter, at Step S655 each difference DL, DR is checked as to whether or not it is greater than a predetermined value, e.g., 12. If the differences DL, DR are both equal to or smaller than the predetermined value, the control proceeds to Step S657 where the default is set "1". Here it is judged that the contrast is too low.

If it is judged that at least one of the differences DL, DR is greater than the predetermined value at Step S655, the control proceeds to Step S659 to check if the number of the minimum value of the correlative evaluation data is one or more than one. The control returns if the number is one, and it is judged that the correlative evaluation data is an appropriate data, or proceeds to Step S661 if the number is more than one, i.e., a series of minimum values of the correlative evaluation data exist.

At Step S661 the lowest minimum value and the second lowest minimum value of the correlative evaluation data are defined as "K1" and "K2", respectively, and thereafter, at Step S663, the difference between K1 and K2 is calculated. If the difference is equal to or greater than a predetermined value, e.g., 50, the control returns with an assumption that an effective subject image distance value measuring data has been obtained. Conversely, if the difference is less than the predetermined value, the control proceeds to Step S665 where the default is set "2" since subject images of near distance subjects and far distance subjects possibly coexist in that light receiving area, and subsequently, the control returns.

It will be accordingly appreciated that to correspond to each light receiving area MC, MR, ML, MRC and MLC, the default is set "0" when a proper subject image distance value is obtained at a light receiving area, is set "1" when the contrast of a subject image is too low at a light receiving area, and is set "2" when images of near distance subjects and far distance subjects coexist in a light receiving area.

Figure 63:
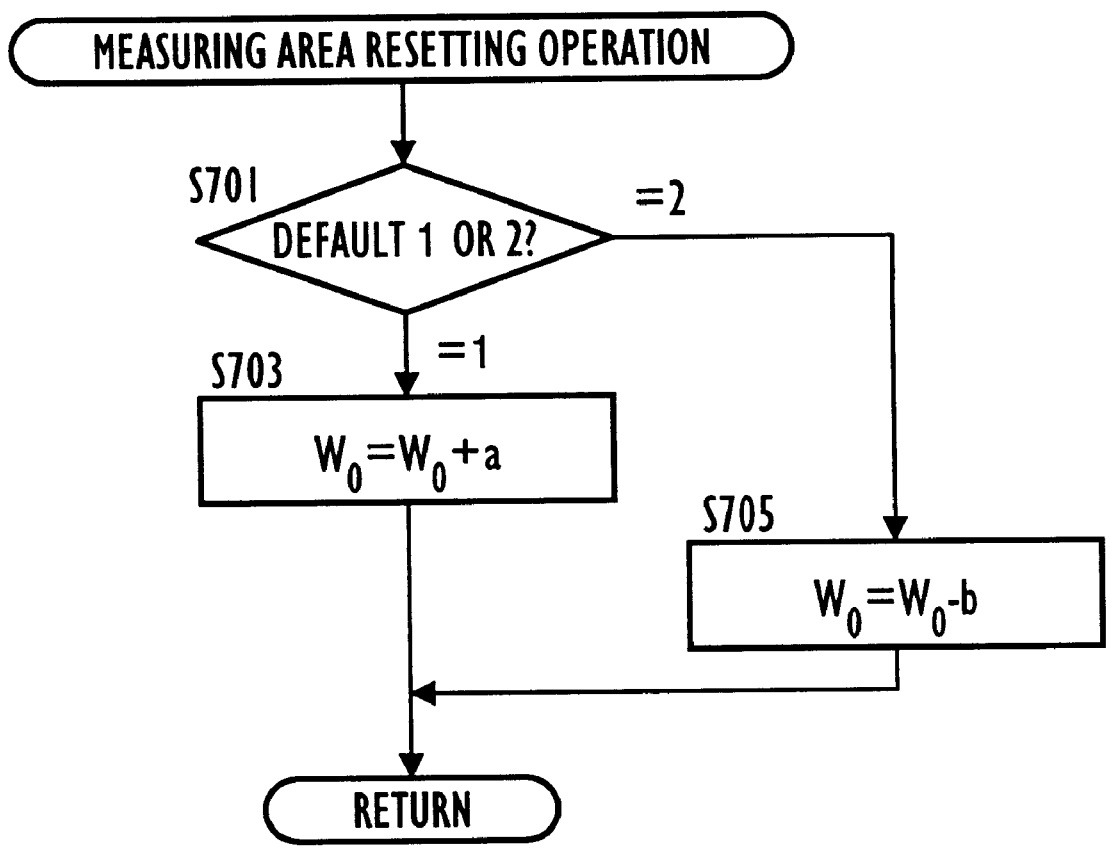
FIG. 63 is a flow chart showing a "Measuring Area Resetting Operation" subroutine in a camera to which a distance measuring apparatus according to the sixth aspect of the present invention is applied.

Next, the subroutine "Measuring Area Resetting Operation" at Step S1352 will be hereinafter discussed with reference to a flow chart shown in FIG. 63. In this subroutine, each light receiving area MC, MR, ML, MRC or MLC is respectively enlarged or narrowed when the contrast of a subject image is low or not low at a light receiving area.

When the control enters this subroutine, it is checked at Step S701 whether the default is "1" or "2". The control proceeds to Step S703 if the default is "1", or to Step S705 if the default is "2". At Step S703 a predetermined number "a" is added to the number "WO" (i.e., the number of bits used in a measuring area; "24" in this embodiment) so as to enlarge the corresponding light receiving area. At Step S705 a predetermined number "b" is subtracted from the number "WO" so as to narrow the corresponding light receiving area.

As can be understood from the foregoing, according to the sixth embodiment of the present invention, when the subject image contrast is low, a light receiving area MC, MR, ML, MRC or MLC having a low contrast subject image is enlarged, thereby the chances of obtaining a high contrast subject image in that subject distance measuring area increase, as shown in FIG. 58 (b) and (B) and also the chances of the correlative evaluation data having a certain inclination (or steeper), as shown in FIG. 58 (c) and (C), also increases. Thus, the possibility of performing a precise subject distance measuring when the subject image contrast is low increases.

On the other hand, in the case when a proper subject image distance value is not obtained, though the subject contrast is not low, with regular-size light receiving areas, i.e., when one subject image distance value, to be used for the focusing operation, cannot be decided even though the subject contrast is high enough with regular-size light receiving areas, it is assumed that images of near distance subjects and far distance subjects coexist in a light receiving area. In this case, according to the sixth embodiment of the present invention, a light receiving area MC, MR, ML, MRC or MLC, which may have therein subject images of near distance subjects and far distance subjects, is narrowed, thereby decreasing the probability of having subject images of near distance subjects and far distance subjects coexisting in a light receiving area, as shown in FIG. 59 (b) and (B) and also the chances of obtaining a single minimum value of the correlative evaluation data increase, as shown in FIG. 59 (c) and (C). Thus, the possibility of performing precise subject distance measuring, even when a proper subject image distance value is not obtained though the subject contrast is not low with regular-size subject distance measuring areas, increases.

With the above structures of the sixth embodiment, even when a proper subject image distance value could not be obtained when the subject distance measuring calculation is firstly performed, the possibility of obtaining a proper subject image distance value at later subject image distance measuring calculation increases because of an expansion or reduction in the size of the light receiving area.

In the sixth embodiment of the present invention, it is preferable that the aforementioned predetermined numbers "a" and "b" are each approximately "10" (10 bits), but may be any other number.

Furthermore, in the sixth embodiment of the present invention; a light receiving area may be enlarged or narrowed step by step (by a predetermined number of bits) until a proper subject image distance value is obtained.

Still furthermore, it the sixth embodiment of the present invention, although a light receiving area is enlarged or narrowed in accordance with the contrast of a subject image, a light receiving area may be enlarged or narrowed in accordance with the correlative evaluation data. In this case, a light receiving area is narrowed when the degree of correlatively, between the subject image formed on one line sensor and the subject image formed on the other line sensor, is low.

Another embodiment (i.e., a seventh embodiment) of a camera to which a distance measuring apparatus according to a seventh aspect of the present invention is applied will be discussed below. The camera of the seventh embodiment is similar to the camera of the fifth embodiment to which the fifth aspect of the present invention is applied, except in several respects. Furthermore, some aspects of the camera of the seventh embodiment are the same as those of the camera of the sixth embodiment. For this reason, only those aspects unique to the camera of the seventh embodiment will be discussed below with reference to FIGS. 35~43, 46~54, 56, 57, 61, 62, 64 and 65.

Although the minimum value of the evaluation function can be obtained by using the aforementioned evaluation function f(N) at each photodiode of each line sensor, sometimes the real minimum value exists between two photodiodes (i.e., between the center of one photodiode and the center of an adjacent photodiode). FIG. 57 shows the principle of calculating the minimum value of the evaluation function with the aforementioned evaluation function f(N) by interpolation.

In this interpolative calculation, a section between two photodiodes, in which the real minimum value is considered to exist, is firstly found, and subsequently, two straight lines which intersect in the section found are set. Then, the coordinate point of the intersection of the two straight lines is calculated. In the case shown in FIG. 57, the coordinates (x,y) of the intersection I of the two straight lines is calculated by two straight lines respectively passing through two pairs of points, i.e., the first pair $(x_0,y_0)$ and $(x_1,y_1)$ and the second pair $(x_2, y_2)$ and $(x_3,y_3)$, between which the real minimum value is considered to exist. In FIG. 57, the X-coordinate and the Y-coordinate represent the image point and the evaluation value, respectively. The X-coordinate "x" of the intersection I represents the image point of a specific subject.

It will be appreciated from FIG. 57 that the steeper the two straight lines are, the more precisely the position of the center "x" can be detected. In the camera of the seventh embodiment to which the seventh aspect of the present invention is applied, the degree of reliability of a calculated subject image distance value is measured, based upon the data of inclination of the above two straight lines, so as to judge if the calculated subject image distance value is effective or not.

The operation of the camera of the seventh embodiment will be hereinafter discussed.

The main routine performed by the CPU 131 is the same as that of the camera of the fifth embodiment which is shown in FIG. 46.

In the camera 11 of the seventh embodiment, in the subroutine "Photographing Operation" at Step S1125 in the main routine, the subroutine "Photographing Operation" shown in FIGS. 47 and 48 in the camera 11 of the fifth embodiment is performed. Furthermore, in the camera 11 of the seventh embodiment, in the subroutine "Subject Distance Measuring Operation" at Step S1207, the subroutine "Subject Distance Measuring Operation" shown in FIGS. 49 and 50 in the camera 11 of the fifth embodiment is performed. Still furthermore, in the camera 11 of the seventh embodiment, in the subroutines "Measuring Area Setting Operation" at Step S1315, "Data Correcting Operation" at Step S1319, "Sensor Correcting Operation" in the "Data Correcting Operation" at Step S1319 and "Sensor Correcting Operation" in the "Data Correcting Operation" at Step S1319, the corresponding subroutines in the camera 11 of the fifth embodiment are respectively performed.

Still furthermore, in the camera 11 of the seventh embodiment, in the subroutine "Interpolation Arithmetic Operation" at Step S1321, the subroutine "Interpolation Arithmetic Operation" shown in FIG. 61 in the camera of the sixth embodiment is performed.

Figure 62:
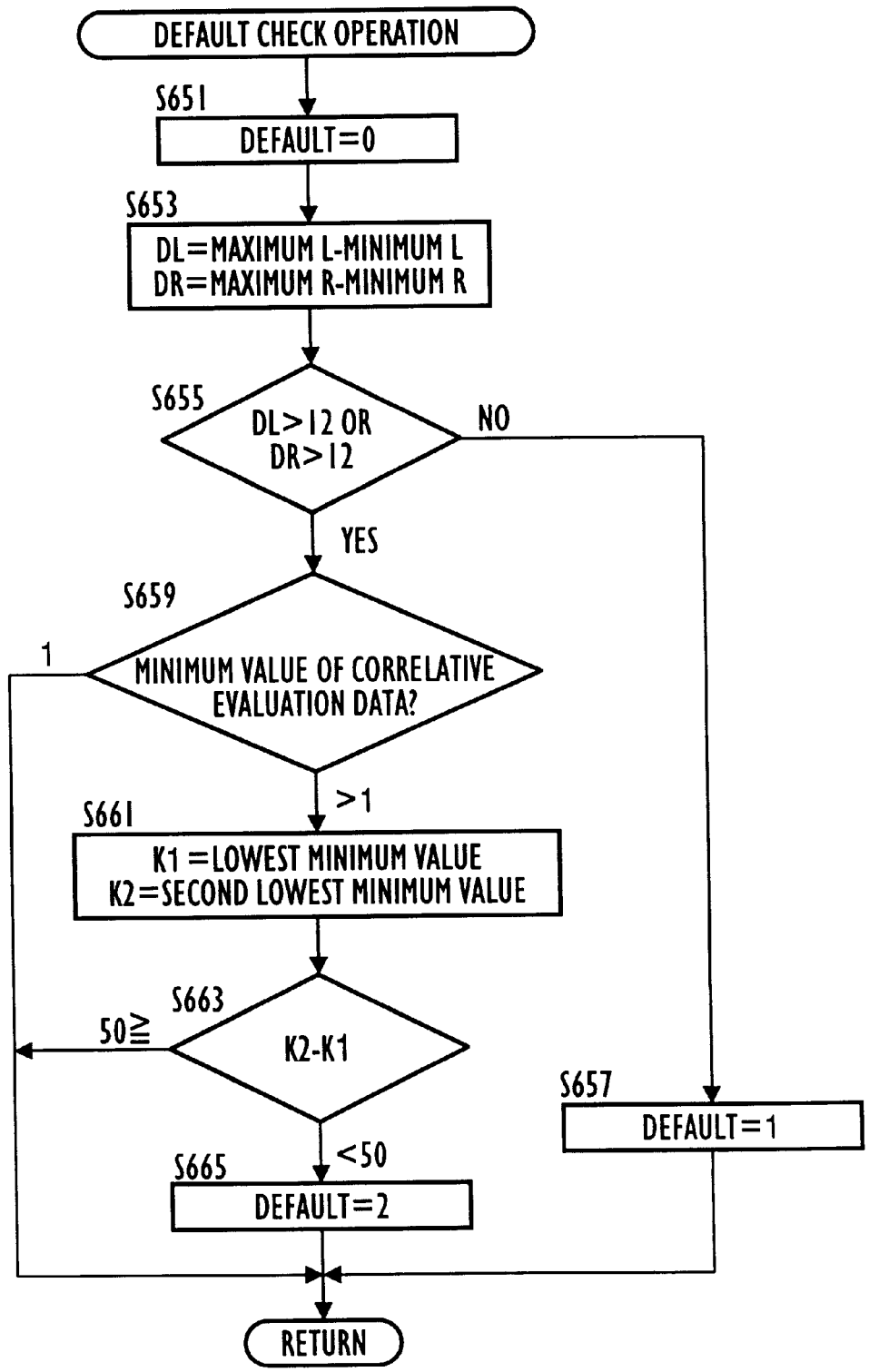
FIG. 62 is a flow chart showing a "Default Check Operation" subroutine in a camera to which a distance measuring apparatus according to the sixth or seventh aspect of the present invention is applied.

Still furthermore, in the camera 11 of the seventh embodiment, in the subroutine "Default Check Operation" at Step S617 in the subroutine "Interpolation Arithmetic Operation" at Step S1321, the subroutine "Default Check Operation" shown in FIG. 62 in the camera of the sixth embodiment is performed.

Figure 64:
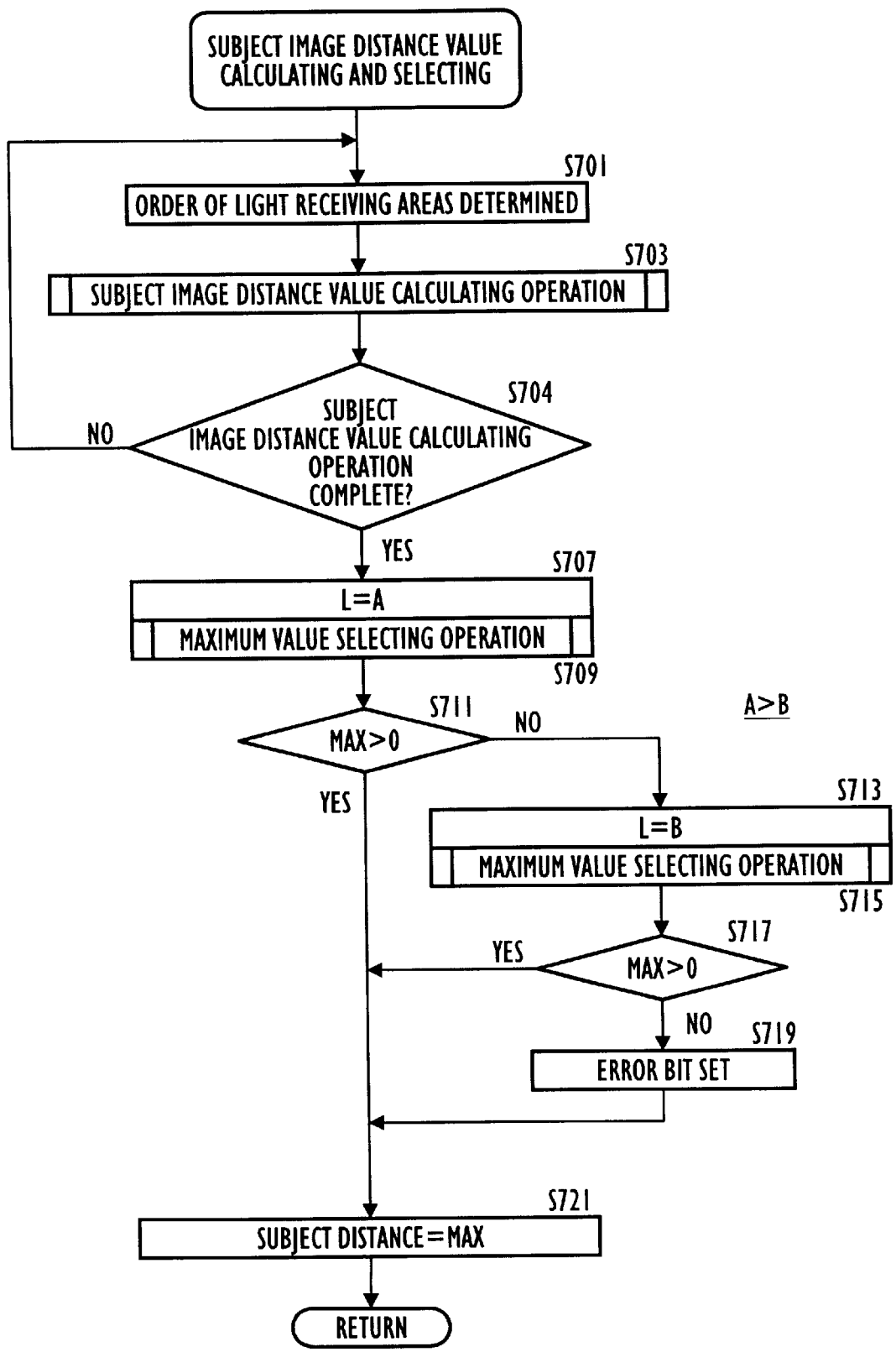
FIG. 64 is a flow chart showing a "Subject Image Distance Value Calculating and Selecting Operation" subroutine in a camera to which a distance measuring apparatus according to the seventh aspect of the present invention is applied.

In the camera 11 of the seventh embodiment, in the subroutine "Subject Image Distance Value Calculating and Selecting Operation" at Step S1325, the subroutine "Subject Image Distance Value Calculating and Selecting Operation" shown in FIG. 64 which is unique to the seventh embodiment of the present invention is operated. This subroutine shown in FIG. 64 will be hereinafter discussed.

In this subroutine "Subject Image Distance Value Calculating and Selecting Operation", two threshold values (i.e., two reliability judgement levels) are set, one having a first reliability judgement level "A" and the other having a second reliability judgement level "B" smaller than the first reliability judgement level "A". Each judgement level determines whether a subject image distance value is valid or invalid. In the case where even one subject image distance value greater than the first reliability judgement level "A" can not be obtained, one or more than one subject image distance value greater than the second predetermined value "B" is selected. Subsequently, among these values, i.e., those values greater than "B" but less than "A", the greatest subject image distance value is selected as an optimum calculated subject image distance value to be used in the focusing operation.

The aforementioned two threshold values, i.e., the first and second reliability judgement levels are each determined in accordance with the degree of inclination of the above mentioned two straight lines, between which the real minimum value of the evaluation function is considered to lie. It has been already mentioned before that the steeper the two straight lines are, the more precisely the center position "x" of a subject image formed on a light receiving area on a line sensor can be detected.

When the control enters the subroutine "Subject Image Distance Value Calculating and Selecting Operation" shown in FIG. 64, the order of light receiving areas for each of which a subject image distance value calculation is to be performed is determined at Step S701, and thereafter, a subject image distance value is calculated in a subroutine labelled "Subject Image Distance Value Calculating Operation" at Step S703. Thereafter, the control proceeds to Step S704. At Step S704 it is checked whether the "Subject Image Distance Value Calculating Operation" subroutine of Step S703 has completed for all the light receiving areas MC, MLC, MRC, ML and MR. The control proceeds to Step S707 if it is judged at Step S704 that the "Subject Image Distance Value Calculating Operation" subroutine has completed for all the light receiving areas, or returns to Step S701 if not.

At Step S707, the reference reliability judgement level "L" is set at the first level "A", and thereafter, the control proceeds to a subroutine labelled "Maximum Value Selecting Operation" at Step S709. At Step S709 the maximum value "max" is selected from among all the subject image distance values greater than the first level "A", at Step S709.

After Step S709 the control proceeds to Step S711 to check if the maximum value "max" selected at Step S709 is greater than "0" (zero). If the maximum value "max" is greater than "0", the control proceeds to Step S721. At Step S721 the maximum value "max" is set as a subject image distance value or data, to be used in a focusing operation.

If it is judged at Step S711 that the maximum value "max" is equal to or smaller than "0", or there is no subject image distance value greater than the first level "A", the control proceeds to Step S713.

At Step S713, the reference reliability judgement level "L" is set at the second level "B", and thereafter, the control proceeds to a subroutine labelled "Maximum Value Selecting Operation" at Step S715. This subroutine is similar to one at Step S709.

At Step S715, the maximum value "max" is selected from among all the subject image distance values greater than the second level "B". After Step S715 the control proceeds to Step S717 to check if the maximum value "max" selected at Step S715 is greater than "0" (zero). If the maximum value "max" is greater than "0", the control proceeds to Step S721, where the maximum value "max" is set as a subject image distance value or data, to be used in a focusing operation.

If it is judged at Step S717 that the maximum value is equal to or smaller than "0" the control proceeds to Step S719 where an error bit, which indicates there is no valid subject image distance value, is set. Thereafter, the control proceeds to Step S721, and subsequently, the control returns.

It will be appreciated that a subject image distance value of high reliability can be obtained through the operations of Steps S707, S709, S711 and S721, and that the subject image distance value can be obtained with less strict limits through the operations of Steps S711, S713, S715 and S717.

The subroutine "Maximum Value Selecting Operation" at Step S709 or Step S715 will be hereinafter discussed with reference to the flow chart of FIG. 65.

When the control enters this subroutine, firstly, the maximum value is set "0" (zero). Thereafter, the operations of Steps S733 through S745 are performed for all of the light receiving areas MC, MLC, MRC, ML and MR.

At Step S733 the absolute value of the inclination of one of the straight lines shown in FIG. 57 is calculated, using the following formula:

$$R_1 = |y_1 - y_0| / |x_1 - x_0|$$

wherein "$R_1$" represents the absolute value of the inclination of one of the straight lines shown in FIG. 57.

Subsequently, at Step S735 the absolute value of the inclination of the other straight line shown in FIG. 57 is calculated, using the following formula:

$$R_2=|y_3-y_2|/|x_3-x_2|$$

wherein "$R_2$" represents the absolute value of the inclination of the other straight line shown in FIG. 57.

Thereafter, at Step S737, the smaller of the two calculated absolute values $R_1$ and $R_2$ is set as a reliability value "R", and subsequently, the control proceeds to Step S739. Here the reliability value "R" is compared with the reference reliability judgement level "L" so as to judge whether the reliability value "R" is valid or invalid.

At Step S739, if the reliability value "R" is smaller than the reference reliability judgement level "L", the control proceeds to Step S741. If the reliability value "R" is equal to or greater than the reference reliability judgement level "L", the control proceeds to Step S745.

At Step S741, it is checked if the subject image distance value for a light receiving area is greater than the maximum value "max", and the control proceeds to Step S743 if this is the case.

At Step S743, the maximum value "max" is set equal to the subject image distance value.

At Step S741 if it is judged that the subject image distance value for a light receiving area is equal to or smaller than the maximum value "max", the control proceeds to Step S745.

At Step S745, it is checked whether or not the operation of Steps S733 through S743 has been performed for all the light receiving areas MC, MLC, MRC, ML and MR. The control returns to Step S733 if the operation of Steps S733 through S743 has not been performed for all of the light receiving areas, or the control returns if the operation of Steps S733 through S743 has been performed for all the light receiving areas.

Figure 65:
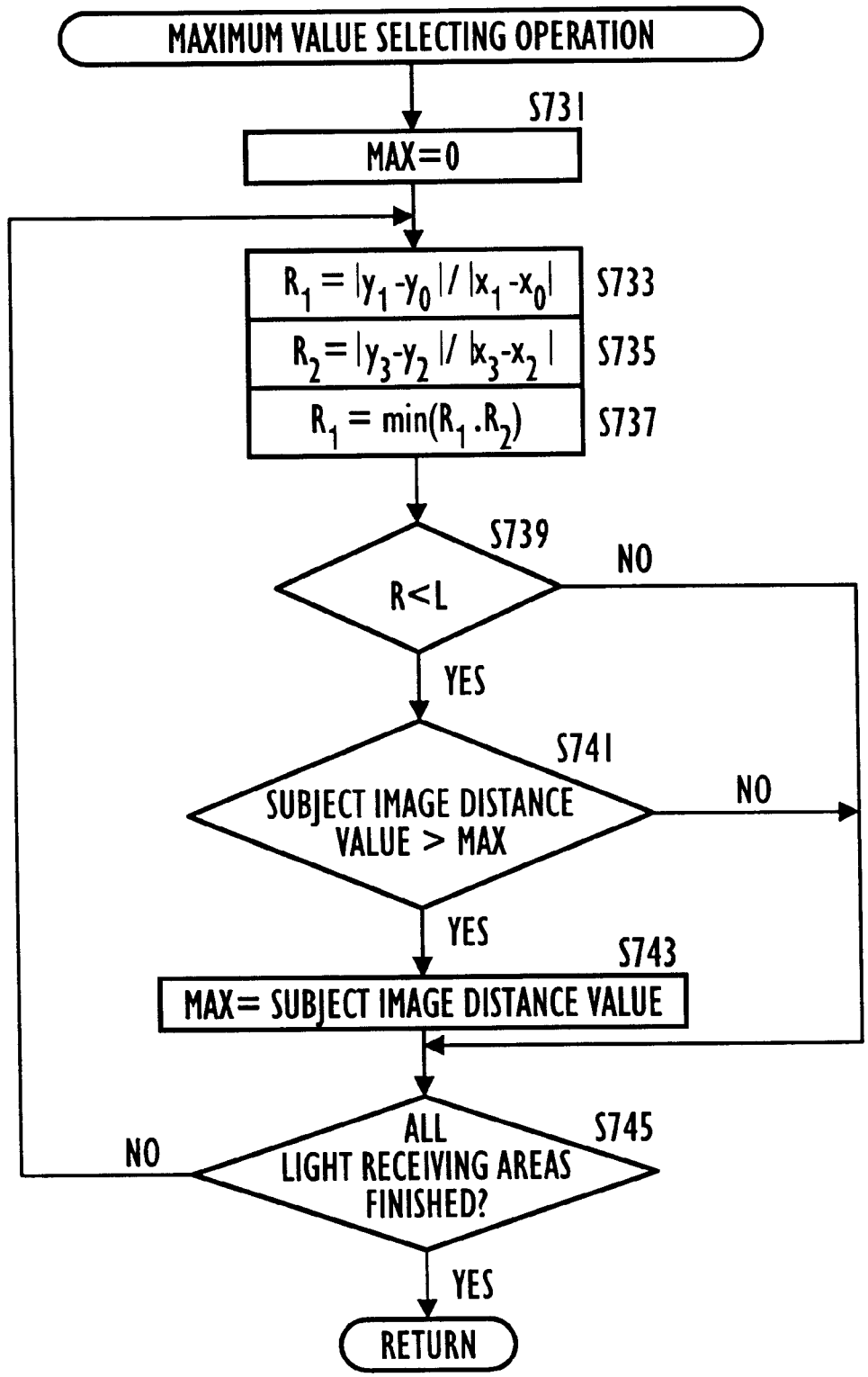
FIG. 65 is a flow chart showing a "Maximum Value Selecting Operation" subroutine in a camera to which a distance measuring apparatus according to the seventh aspect of the present invention is applied.

Note that the reference reliability judgement level "L" is the first level "A" when the subroutine "Maximum Value Selecting Operation" shown in FIG. 65 is called at Step S709 and that the reference reliability judgement level "L" is the second level "B", smaller than the first level "A", when the subroutine "Maximum Value Selecting Operation" shown in FIG. 65 is called at Step S715.

As is understood from the foregoing, according to the seventh embodiment of the present invention, a precise subject image distance value can be obtained since it is selected from among all the subject image distance values greater than the first reliability judgement level "A". Furthermore, the chance of a state occurring in which focus is impossible decreases, since a subject image distance value is selected from among all the subject image distance values greater than the second reliability judgement level "B", smaller than the first reliability judgement level "A", when any subject image distance value greater than the first reliability judgement level "A" cannot be obtained.

Moreover, according to the seventh embodiment of the present invention, since it is judged if a calculated subject distance value is valid or invalid in accordance with the inclination of correlative evaluation data, the calculated subject distance value of a low contrast can be removed without checking the contrast of a subject image.

In the seventh embodiment, although two threshold values or reliability judgement levels are set so as to judge if a calculated subject distance value is valid or invalid, more than two reliability judgement levels may be set to judge the same.

Furthermore, in the seventh embodiment, although the number of light receiving areas for each line sensor is five, the number may be less than or more than five. The arrangement of those light receiving areas on each line sensor may also be any other arrangement. Still furthermore, although the maximum value "max" is set equal to the value of the calculated subject image distance value, it could be set at any value.

Another embodiment (i.e., an eighth embodiment) of a camera to which a distance measuring apparatus according to an eighth aspect of the present invention is applied will be discussed below. The camera of the eighth embodiment is similar to the camera of the fifth embodiment to which the fifth aspect of the present invention is applied, except in several respects. Since much of the structure of the eighth embodiment is similar to the fifth embodiment, the following explanation will only be directed to that structure unique to the eighth embodiment. The camera of the eighth embodiment will be explained below with reference to FIGS. 35~38, 46~49, 66~71.

Figure 66:
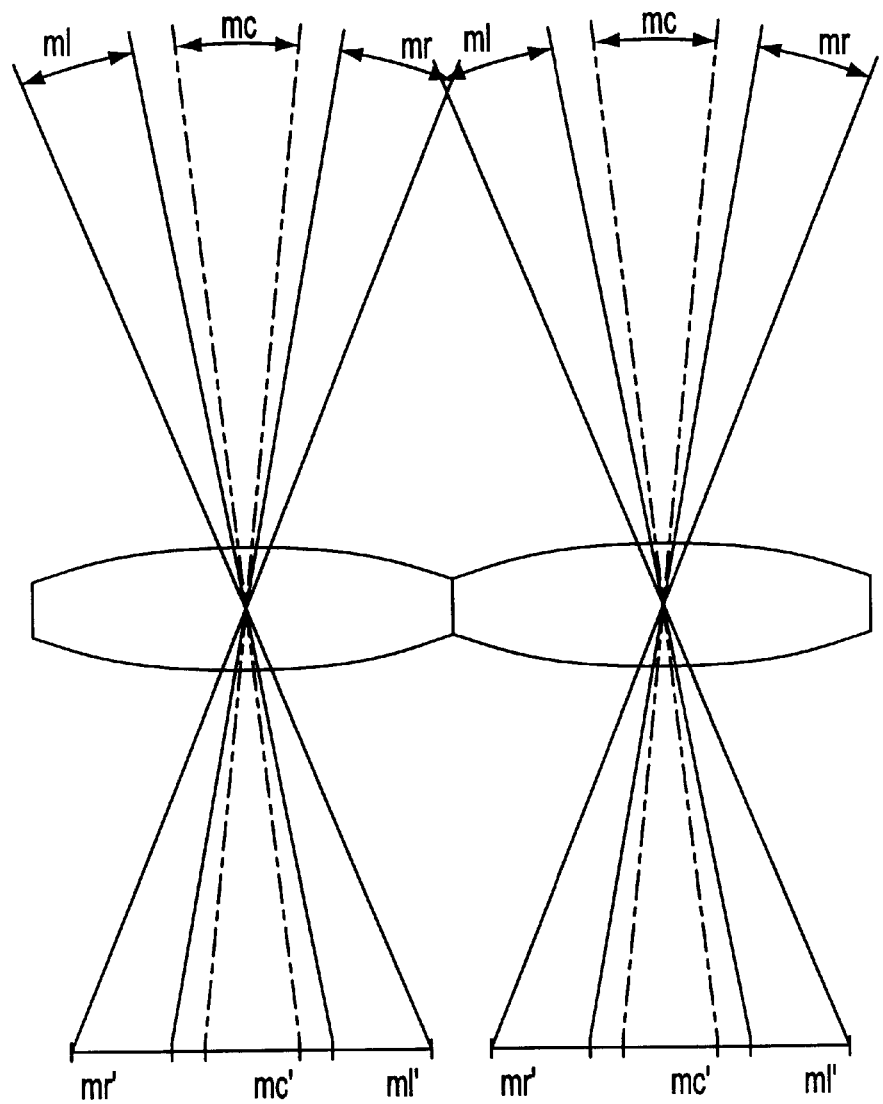
FIG. 66 shows a relationship between the light receiving areas used for a multiple measurement and line sensors, in a camera to which a distance measuring apparatus according to an eighth aspect of the present invention is applied.
Figure 67:
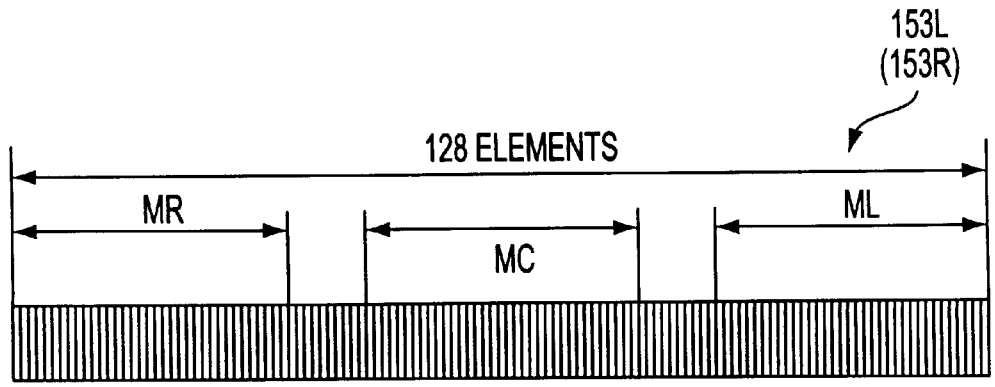
FIG. 67 is a diagram showing a relationship between light receiving areas of a line sensor in the camera shown in FIG. 66.

FIG. 66 shows a relationship between the light receiving areas used for a multiple measurement and the line sensors in the eighth embodiment of the present invention. According to the camera of the eighth aspect of the present invention there are three light receiving areas, namely, a central light receiving area MC and left and right light receiving areas ML and MR. The left and right light receiving areas ML and MR are positioned on the left and right sides of the central light receiving area MC, respectively (FIG. 67). Light receiving areas MC, ML and MR of the line sensors 153L and 153R correspond to respective subject light receivable ranges mc, ml and mr. The line sensors 153L and 153R are each provided with 128 photodiodes which serve as light receiving means. Each light receiving area contains 36 consecutive photodiodes.

The operation of the camera of the eighth embodiment will be hereinafter discussed. The main routine performed by the CPU 131 is the same as that of the camera of the fifth embodiment which is shown in FIG. 46.

The subroutine "Photographing Operation" at Step S1125 in the main routine is also the same as that in the camera of the fifth embodiment which is shown in FIGS. 47 and 48.

Figure 68:
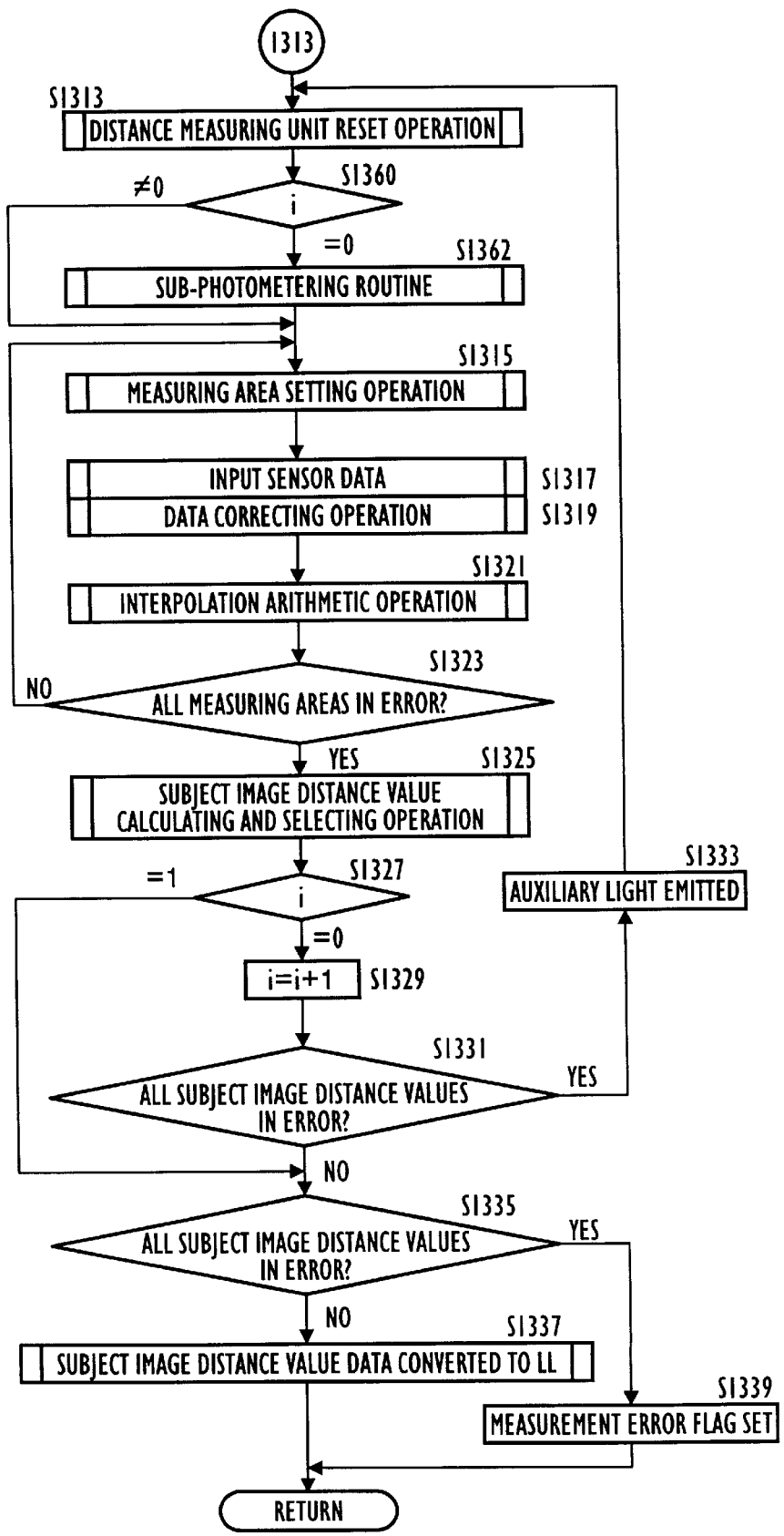
FIG. 68 is a flow chart of a "Subject Distance Measuring Operation" subroutine in the camera to which a distance measuring apparatus according to the eighth aspect of the present invention is applied.

The subroutine "Subject Distance Measuring Operation" at Step S1207 in the camera of the eighth embodiment will be discussed below with reference to FIGS. 49, 50 and 68.

The subroutine "Subject Distance Measuring Operation" in the camera of the eighth embodiment is identical to that of the camera of the fifth embodiment (shown in FIGS. 49 and 50), except that the former subroutine includes the operations at Steps S1360 and S1362 between Steps S1313 and S1315 whereas the latter subroutine does not include the same between Steps S1313 and S1315 (FIG. 50). The following explanation of the subroutine "Subject Distance Measuring Operation" in the camera of eighth embodiment, will only be directed to those steps unique to the eighth embodiment, i.e., Steps S1360 and S1362.

After the distance measuring unit 151 is reset at Step S1313; it is checked at Step S1360 whether or not the variable "i" is "0"(zero). The control proceeds to a subroutine labelled "Sub-Photometering Operation" at Step S1362 if the variable "i" is "0" (zero), or to Step S1315 if not. When the control first enters this subroutine "Subject Distance Measuring Operation", the control proceeds to Step S1362 since the variable "i" is "0" (zero). On or after the control enters this subroutine for the second time, the control proceeds to Step S1315, without performing the subroutine at Step S1362. In the subroutine at Step S1362, regarding either the line sensor 153L or 153R, a first sub-photometer value (i.e., the difference between the maximum brightness value and the average brightness value) and a second sub-photometer value (i.e., the intermediate value among three differences, that is, the difference between the average brightness value of the light receiving area MC and that of the light receiving area ML, the difference between the average brightness value of the light receiving area MC and that of the light receiving area MR and the difference between the average brightness value of the light receiving area MR and that of the light receiving area ML) are calculated.

The operations at Steps S1315 through S1321 are performed for each of all the three light receiving areas MC, ML and MR.

After the subject image distance value has been calculated for each of all the three light receiving areas MC, ML and MR, the control proceeds to the subroutine "Subject Image Distance Value Calculating and Selecting Operation" at Step S1325. At Step S1325, one of the three calculated subject image distance values is selected, to be used for a focusing operation.

Figure 69:
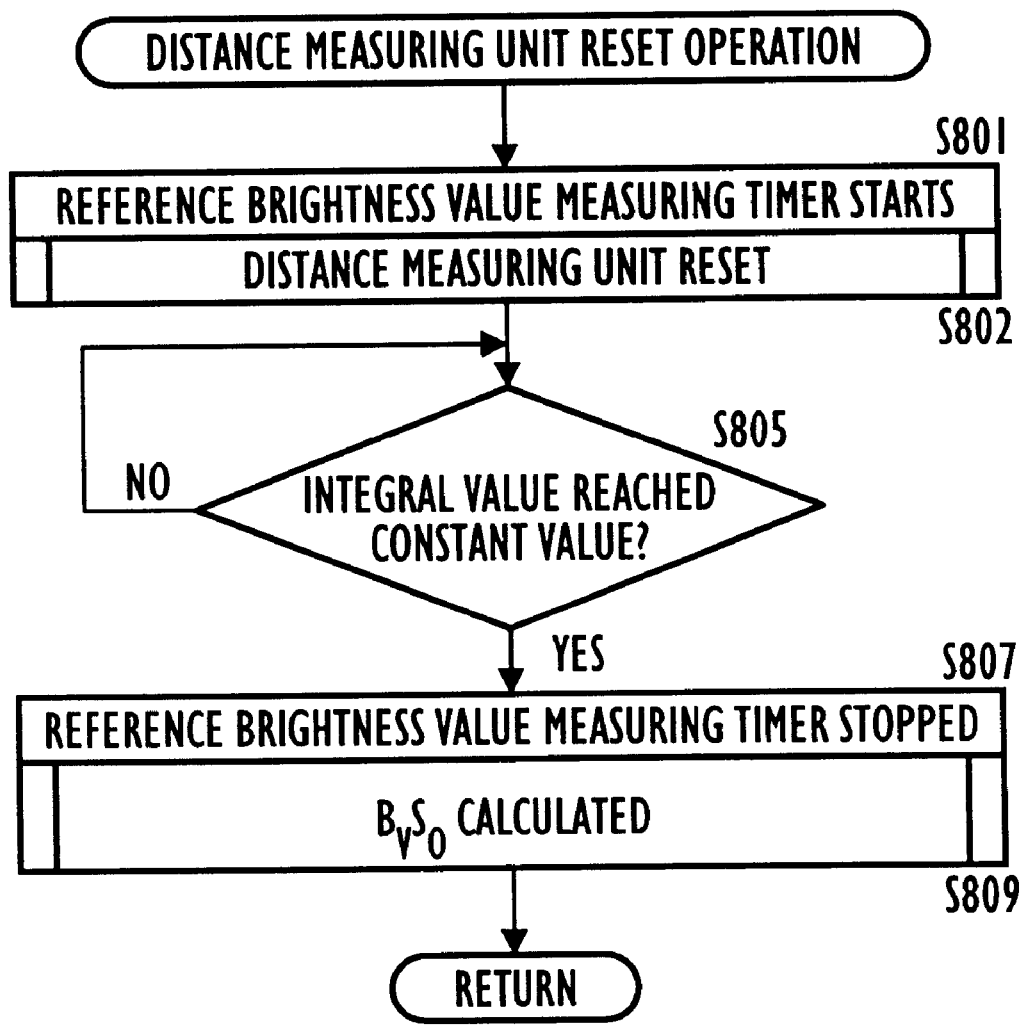
FIG. 69 is a flow chart showing a "Passive AF Unit Reset Operation" subroutine in the camera to which a distance measuring apparatus according to the eighth aspect of the present invention is applied.

The subroutine "Distance Measuring Unit Reset Operation" at Step S1313 in the eighth embodiment of the present invention will be discussed with reference to a flow chart shown in FIG. 69. In this subroutine shown in FIG. 69, each circuit in the distance measuring unit 151, a memory (e.g., RAM) etc., are all reset to start the integral operation of the distance measuring unit 151. Furthermore, in this subroutine, a reference brightness value $BvS_0$ (i.e., the maximum brightness value) is calculated.

When the control enters the subroutine "Distance Measuring Unit Reset Operation" at Step S1313, a reference brightness value measuring timer starts at Step S801, and subsequently, the distance measuring unit 151 is reset at Step S803, i.e., the electric charges of each line sensor 153L, 153R are swept or output to start the integral operation of the distance measuring unit 151.

Subsequently, the control proceeds to Step S805, and further proceeds to Step S807 at the time the integral value of any light receiving element first reaches a constant value, or re-enters Step S805 until the integral value of any light receiving element first reaches the constant value. When the integral value of any light receiving element first reaches the constant value, the controller 155 outputs a reference integral end signal to the CPU 131. When the CPU 131 receives the reference integral end signal, the CPU 131 makes the reference brightness value measuring timer stop (Step S807), and subsequently, calculates the aforementioned reference brightness value $BvS_0$ (Step S809) in accordance with the time necessary for the firstly-reached integral value to reach the constant value and a predetermined data table (not shown) showing the corresponding relation between the integral operation time and the brightness value.

Figure 70:
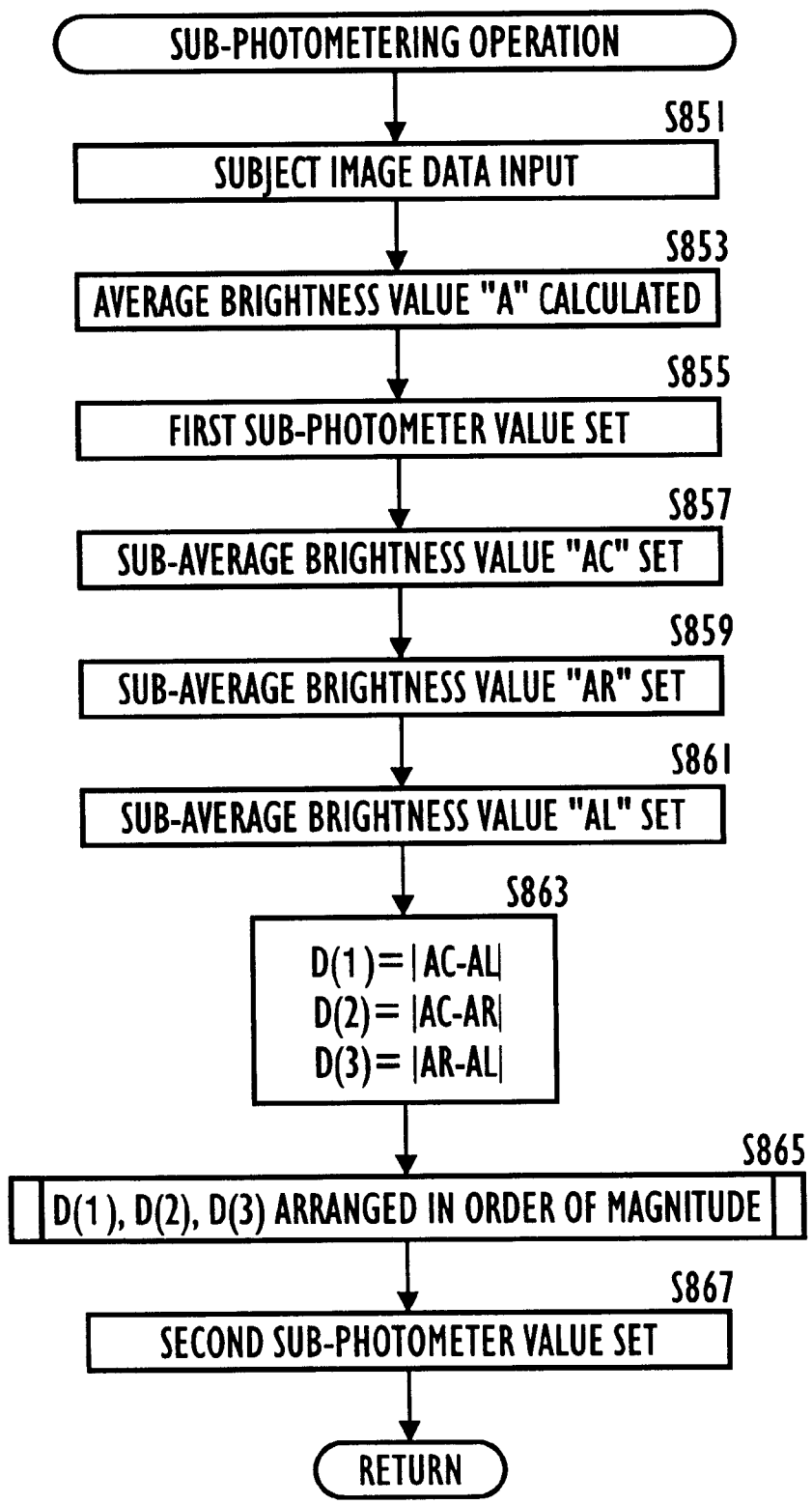
FIG. 70 is a flow chart showing a "Sub-Photometering Operation" subroutine in the camera to which a distance measuring apparatus according to the eighth aspect of the present invention is applied; and, FIG. 71 is a flow chart showing an "AE Calculating Operation" subroutine for an AE calculation operation in the camera to which a distance measuring according to the eighth aspect is applied.

The subroutine "Sub-Photometering Operation" at Step S1362 in the eighth embodiment of the present invention will be discussed with reference to a flow chart shown in FIG. 70. This subroutine shown in FIG. 70 is to calculate the data necessary for judging whether or not a backlit-state exists, in accordance with the subject image data detected by distance measuring unit 151.

When the control enters this subroutine shown in FIG. 70, all the subject image data of either the line sensor 153L or 153R are input to the CPU 131 at Step S851, and subsequently, the average brightness value (i.e., average intensity value) of all the input subject image data (i.e., average brightness value "A") is calculated at Step S853. Thereafter, at Step S855, the difference between the average brightness value "A" and the reference brightness value $BvS_0$ having been calculated at Step S809 is calculated and set as the first sub-photometer value.

Thereafter, at Step S857, the average brightness value of all the subject image data outputted from the light receiving elements in the light receiving area MC is calculated and set as a sub-average brightness value AC.

Likewise, at Step S859, the average brightness value of all the subject image data outputted from the light receiving elements in the light receiving area MR is calculated and set as a sub-average brightness value AR.

Likewise, at Step S861, the average brightness value of all the subject image data outputted from the light receiving elements in the light receiving area ML is calculated and set as a sub-average brightness value AL.

Thereafter, at Step S863, the absolute values of the difference between the sub-average brightness values AC and AL, between the sub-average brightness values AC and AR, and between the sub-average brightness values AR and AL are calculated and set as the absolute values D(1), D(2) and D(3), respectively. Thereafter, at Step S865, the calculated absolute values D(1), D(2) and D(3) are arranged in order of magnitude. Subsequently, at Step S867, the intermediate absolute value D(1), D(2) or D(3) is selected and set as the second sub-photometer value.

The subroutine "AE Calculating Operation" at Step S1211 in the eighth embodiment of the present invention will be discussed with reference to a flow chart shown in FIG. 71. In this subroutine shown in FIG. 71, it is judged whether or not a backlit-state exists, using the aforementioned first and second sub-photometer values calculated at the subroutine "Sub-Photometering Operation" at Step S1362.

When the control enters this subroutine, predetermined first and second backlit-state judging values Lv1 and Lv2 are set at Step S901. Thereafter, at Step S903, the difference between the main photometer value obtained through the photometering circuit 137 and the first sub-photometer value is calculated and set as a first brightness difference S1.

Thereafter, it is checked at Step S905 if the first brightness difference S1 is greater than the first backlit-state judging value Lv1, and the control proceeds to Step S907 if this is the case, or proceeds to Step S911 if this is not the case. When it is judged at Step S905 that the first brightness difference S1 is greater than the first backlit-state judging value Lv1, it can be judged that a backlit-state exists, thus the stroke circuit 143 is turned ON to prepare for a strobe emission at Step S907, and furthermore, at Step S909, a brightness value correction amount $\Delta$ bv is calculated according to the following equation:

$$\Delta bv = S1 - L1$$

wherein "L1" represents a first predetermined exposure value (e.g., 1.5 Ev in this embodiment).

Conversely, when it is judged at Step S905 that the first brightness difference S1 is equal to or smaller than the first backlit-state judging value Lv1, it can be judged that a backlit-state does not exist, thus the control proceeds to Step S911, without carrying out the operations at Steps S907 and S909.

At Step S911, it is checked if the second sub-photometer value is greater than the second backlit-state judging value Lv2, and the control proceeds to Step S913 if greater, or to Step S919 if the second sub-photometer value is equal to or smaller than the second backlit-state judging value Lv2.

When greater at Step S913, the strobe circuit 143 is turned ON to prepare for a strobe emission at Step S913, and subsequently, it is checked at Step S915 if the brightness value correction amount Δ bv is smaller than the difference between the second sub-photometer value and a second predetermined exposure value L2 (i.e., 1.5 Ev in this embodiment), and the control proceeds to Step S917 if that is the case, or to Step S919 if the brightness value correction amount Δ bv is equal to or greater than the difference between the second sub-photometer value and the second predetermined exposure value L2.

At Step S917 the brightness value correction amount Δ bv is set as the difference between the second sub-photometer value and the second predetermined exposure value L2.

It will be accordingly appreciated that the smaller one between the two differences, i.e., the difference between the first brightness difference S1 and the first predetermined exposure value L1 and the difference between the second sub-photometer value and the second predetermined exposure value L2, is adopted as the brightness value correction amount Δ bv to be used for exposure value correction.

In the operations at Steps S911 through S917, it is checked if the second sub-photometer value is greater than the second backlit-state judging value Lv2, the strobe circuit 143 is turned ON if that is the case, and the difference between the second sub-photometer value and the second backlit-state judging value Lv2 is replaced by the brightness value correction amount Δ bv if the difference is smaller than the firstly set brightness value correction At Step S919, in the case where the brightness value correction amount Δ bv obtained at Step S909 or S917 is over a predetermined amount, e.g., over +3 Ev or −3 Ev, the brightness value correction amount Δ bv is adjusted to be the predetermined amount, e.g., +3 Ev or −3 Ev, respectively.

After Step S919, at Step S921, the subject brightness value Bv is corrected by subtracting the brightness value correction amount Δ bv from the main photometer value (i.e., the subject brightness value Bv). Thereafter, at Step S923, the AE data is calculated, using the corrected subject brightness value Bv and the input ISO speed value Sv, so as to obtain an optimum time value (shutter speed) Tv and aperture value Av. Thereafter, an AE data limiting operation is performed at Step S925 in which the time value Tv and aperture value Av obtained at Step S923 are adjusted so as to fall within respective limit values predetermined in accordance with the capacity or ability of camera's shutter and aperture in the case where the time value Tv and aperture value Av are over the respective limit values. After Step S925 the control returns.

Figure 71:
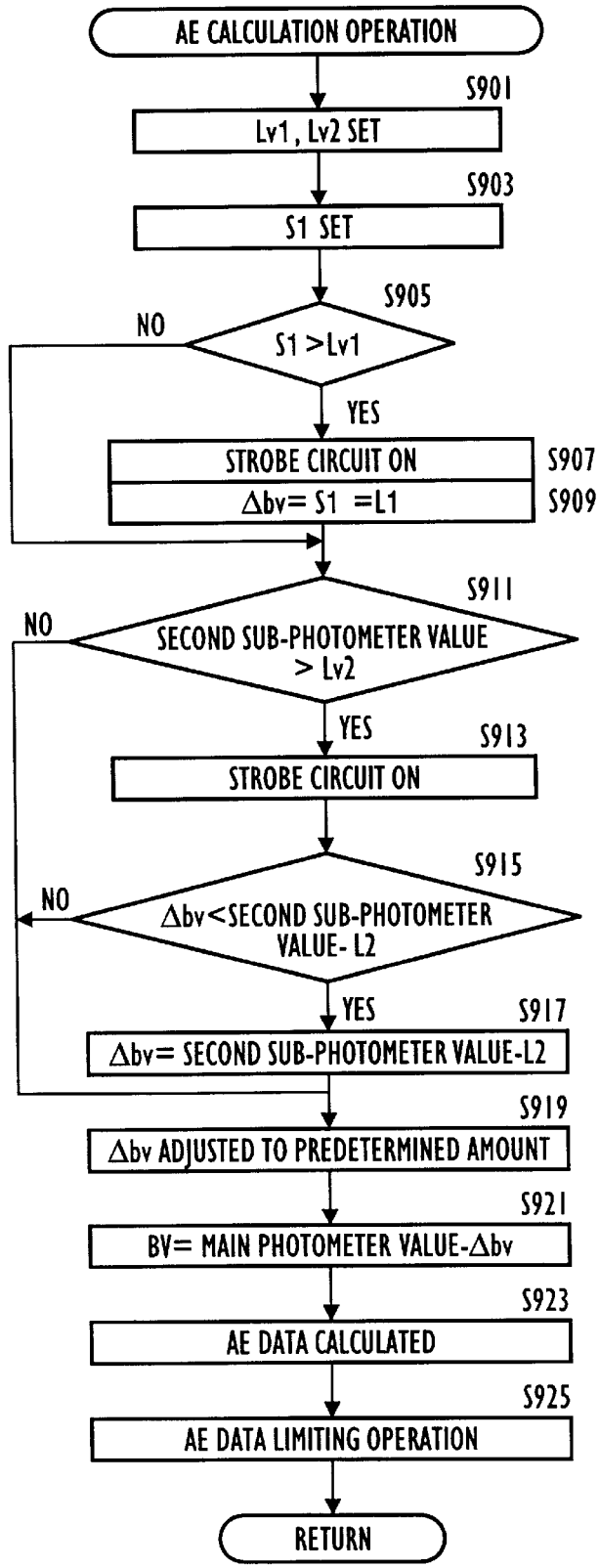

In the subroutine "AE Calculating Operation" shown in FIG. 71, although both operations, i.e., the operation in which the strobe circuit 143 is turned ON and the operation in which an exposure value is adjusted for a backlit-state, are both performed, only one of them may be performed.

As can be seen from the foregoing, according to the eighth aspect of the present invention, the distance measuring unit 151 also functions as a backlit-state detecting apparatus to detect a backlit-state. Therefore, it is not necessary to provide a plurality of photosensors or a split-type photosensor used exclusively for detecting a backlit-state.

In the eighth embodiment of the present invention, although each line sensor 153L or 153R is provided with three light receiving areas MC, ML and MR, more than three light receiving areas may be provided. In order to detect a backlit-state, it is preferable that two light receiving areas, used for detecting a backlit-state and respectively located on the right side of the center light receiving area and the left side thereof, be located apart from the center light receiving area by as far as possible.

In the aforementioned fourth through eighth embodiments of the present invention, although the corresponding aspect of the present invention is applied to the distance measuring unit provided in a lens-shutter type compact camera, it may also be applied to the distance measuring unit provided in an SLR camera.

Obvious changes may be made in the specific embodiments of the present invention described herein, such modifications being within the spirit and scope of the invention claimed. It is indicated that all matter contained herein is illustrative and does not limit the scope of the present invention.

We claim:

1. A distance measuring apparatus, comprising:
   a pair of image forming lenses, each image forming lens forming a subject image;
   a pair of line sensors on which said subject images are respectively formed through said pair of image forming lenses, wherein each line sensor has a plurality of light receiving elements, each light receiving element, when actuated, converting received light into an electrical signal which is integrated to output image data for each of said plurality of light receiving elements, so that a group of image data is obtained for each of said pair of line sensors, and wherein said image data contains at least a brightness value;
   a detection system that detects specific image data from said obtained group of image data for each of said pair of line sensors, said specific image data relating to a greatest brightness value; and
   a first calculation system that calculates a difference between said greatest brightness value for one of said pair of line sensors and said greatest brightness value for the other of said pair of line sensors and that corrects all of said output image data in said obtained group of image data of one of said pair of line sensors in accordance with said difference.

2. The distance measuring apparatus of claim 1, wherein said output image data corresponds to a time value starting from a first time when said electrical signal starts to be integrated until a second time when an integrated value of said electrical signal reaches a predetermined value, and wherein said specific image data corresponds to a minimum time value of all time values to which all image data of said group of image data correspond.

3. The distance measuring apparatus of claim 2, wherein said first calculation system subtracts said minimum time value at one of said line sensors from said minimum time value at the other of said line sensors to thereby obtain a difference therebetween,
   wherein said first calculation system further, where said difference is a positive value, subtracts said difference from each of said time values of said the other of said line sensors and, where said difference is a negative value, subtracts an absolute value of said difference from each of said time values of said one of said line sensors.

4. The distance measuring apparatus of claim 1, further comprising a second calculation system that calculates a subject distance, using all of said corrected output image data.

5. The distance measuring apparatus of claim 1, wherein said detection system, said first calculation system, and said second calculation system are all provided in a single microcomputer.

6. The distance measuring apparatus of claim 5, further comprising a distance measuring unit provided in a camera, said distance measuring unit including said pair of image forming lenses and said pair of line sensors.

7. The distance measuring apparatus of claim 1, further comprising a plurality of corresponding light receiving areas formed on each of said pair of line sensors, each light receiving area including a predetermined number of light receiving elements of said plurality of light receiving elements, wherein said plurality of light receiving areas respectively receive different areas of a corresponding one of said subject images formed through said pair of image forming lenses.

* * * * *